US010417879B2

(12) United States Patent
Moussette et al.

(10) Patent No.: US 10,417,879 B2
(45) Date of Patent: *Sep. 17, 2019

(54) SEMANTIC FRAMEWORK FOR VARIABLE HAPTIC OUTPUT

(71) Applicant: Apple Inc., Cupertino, CA (US)

(72) Inventors: Camille Moussette, Los Gatos, CA (US); Gary I. Butcher, San Jose, CA (US); Hugo D. Verweij, San Francisco, CA (US); Jonathan Ive, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/869,829

(22) Filed: Sep. 29, 2015

(65) Prior Publication Data

US 2016/0062464 A1 Mar. 3, 2016

Related U.S. Application Data

(63) Continuation of application No. 14/835,708, filed on Aug. 26, 2015.
(Continued)

(51) Int. Cl.
*G08B 6/00* (2006.01)
*G06F 3/01* (2006.01)
(Continued)

(52) U.S. Cl.
CPC ............... *G08B 6/00* (2013.01); *G06F 3/016* (2013.01); *G06F 3/0416* (2013.01);
(Continued)

(58) Field of Classification Search
CPC ........... H04W 4/16; H04W 4/12; H04W 4/14; H04M 3/42; G06F 3/016
(Continued)

(56) References Cited

U.S. PATENT DOCUMENTS 5,959,624 A 9/1999 Johnston, Jr. et al.
5,990,869 A 11/1999 Kubica et al.
(Continued)

FOREIGN PATENT DOCUMENTS

AU 2016100246 A4 4/2016
CN 101375582 A 2/2009
(Continued)

OTHER PUBLICATIONS

International Search Report and Written Opinion for PCT/US2015/041858, dated Mar. 15, 2016, 33 Pages.
(Continued)

*Primary Examiner* — Jack K Wang
(74) *Attorney, Agent, or Firm* — Morgan, Lewis & Bockius LLP

(57) ABSTRACT

Methods and apparatus organize a plurality of haptic output variations into a cohesive semantic framework that uses various information about the alert condition and trigger, application context, and other conditions to provide a system of haptic outputs that share characteristics between related events. In some embodiments, an event class or application class provides the basis for a corresponding haptic output. In some embodiments, whether an alert-salience setting is on provides the basis for adding an increased salience haptic output to the standard haptic output for the alert. In some embodiments, consistent haptics provide for branding of the associated application class, application, and/or context.

81 Claims, 40 Drawing Sheets

Related U.S. Application Data

(60) Provisional application No. 62/044,870, filed on Sep. 2, 2014, provisional application No. 62/129,905, filed on Mar. 8, 2015, provisional application No. 62/172,122, filed on Jun. 7, 2015.

(51) Int. Cl.

| | |
|---|---|
| *G06F 3/041* | (2006.01) |
| *G06F 3/0484* | (2013.01) |
| *H04L 12/58* | (2006.01) |
| *G06F 11/07* | (2006.01) |
| *G08B 3/10* | (2006.01) |
| *H04M 1/725* | (2006.01) |
| *H04M 19/04* | (2006.01) |
| *G06F 3/0488* | (2013.01) |
| *G08B 7/06* | (2006.01) |

(52) U.S. Cl.
CPC ........ *G06F 3/0488* (2013.01); *G06F 3/04842* (2013.01); *G06F 11/0745* (2013.01); *G06F 11/0763* (2013.01); *G08B 3/10* (2013.01); *H04L 51/24* (2013.01); *H04M 1/72569* (2013.01); *H04M 19/04* (2013.01); *G06F 2203/014* (2013.01); *G08B 7/06* (2013.01)

(58) Field of Classification Search
USPC .............. 340/407.1, 407.2; 345/173; 701/36; 455/41.1, 414.1
See application file for complete search history.

(56) References Cited

U.S. PATENT DOCUMENTS

| | | |
|---|---|---|
| 6,424,251 B1 | 7/2002 | Byre |
| 6,433,771 B1 | 8/2002 | Yocum et al. |
| 6,560,165 B1 | 5/2003 | Barker |
| 7,130,664 B1 | 10/2006 | Williams |
| 7,305,257 B2 | 12/2007 | Ladouceur et al. |
| 7,308,253 B2 | 12/2007 | Moody et al. |
| 7,469,381 B2 | 12/2008 | Ording |
| 7,479,949 B2 | 1/2009 | Jobs et al. |
| 7,720,213 B2 | 5/2010 | Desai et al. |
| 7,809,406 B2 | 10/2010 | Weinans |
| 7,978,183 B2 | 7/2011 | Rosenberg et al. |
| 8,026,814 B1 | 9/2011 | Heinze et al. |
| 8,131,848 B1 | 3/2012 | Denise |
| 8,165,640 B2 | 4/2012 | Mullen |
| 8,204,548 B1 | 6/2012 | Blinn et al. |
| 8,207,832 B2 | 6/2012 | Yun et al. |
| 8,209,606 B2 | 6/2012 | Ording |
| 8,266,550 B1 | 9/2012 | Cleron et al. |
| 8,331,268 B2 | 12/2012 | Hicks, III |
| 8,509,856 B1 | 8/2013 | Blinn et al. |
| 8,548,418 B1 | 10/2013 | Jintaseranee et al. |
| 8,619,051 B2 | 12/2013 | Lacroix et al. |
| 8,624,864 B2 | 1/2014 | Birnbaum et al. |
| 8,659,571 B2 | 2/2014 | Birnbaum et al. |
| 8,676,274 B2 | 3/2014 | Li |
| 8,698,766 B2 | 4/2014 | Ali et al. |
| 8,717,151 B2 | 5/2014 | Forutanpour et al. |
| 8,750,296 B2 | 6/2014 | Bosschaert et al. |
| 8,754,757 B1 | 6/2014 | Ullrich et al. |
| 8,768,838 B1 | 7/2014 | Hoffman |
| 8,773,356 B2 | 7/2014 | Martin et al. |
| 8,886,252 B2 | 11/2014 | Luke et al. |
| 8,886,576 B1 | 11/2014 | Sanketi et al. |
| 9,088,668 B1 | 7/2015 | Salvador |
| 9,092,953 B1 | 7/2015 | Mortimer et al. |
| 9,100,805 B2 | 8/2015 | Oshita |
| 9,110,529 B2 | 8/2015 | Kido |
| 9,166,823 B2 | 10/2015 | Karmarkar |
| 9,189,932 B2 | 11/2015 | Kerdemelidis |
| 9,247,525 B2 | 1/2016 | Jacobs et al. |
| 9,357,052 B2 | 5/2016 | Ullrich |
| 9,411,422 B1 | 8/2016 | McClendon et al. |
| 9,430,796 B1 | 8/2016 | So |
| 9,509,829 B2 | 11/2016 | Culbert et al. |
| 9,542,820 B2 | 1/2017 | Moussette et al. |
| 9,548,050 B2 | 1/2017 | Gruber et al. |
| 9,588,586 B2 | 3/2017 | Rihn |
| 9,690,382 B1 | 6/2017 | Moussette et al. |
| 9,830,784 B2 | 11/2017 | Moussette et al. |
| 9,852,590 B2 | 12/2017 | Bhatia |
| 9,864,432 B1 | 1/2018 | Moussette et al. |
| 9,928,699 B2 | 3/2018 | Moussette et al. |
| 9,984,539 B2 | 5/2018 | Moussette et al. |
| 10,034,129 B1 | 7/2018 | Ellis et al. |
| 2001/0002126 A1 | 5/2001 | Rosenberg et al. |
| 2002/0080112 A1 | 6/2002 | Braun et al. |
| 2002/0115478 A1 | 8/2002 | Fujisawa et al. |
| 2004/0088353 A1 | 5/2004 | Mendelsohn et al. |
| 2004/0213401 A1 | 10/2004 | Aupperle et al. |
| 2004/0233161 A1 | 11/2004 | Shahoian et al. |
| 2005/0231489 A1 | 10/2005 | Ladouceur et al. |
| 2005/0275638 A1 | 12/2005 | Kolmykov-Zotov et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0045252 A1 | 3/2006 | Gorti et al. |
| 2006/0248183 A1* | 11/2006 | Barton .................. H04L 51/24 709/224 |
| 2007/0046627 A1 | 3/2007 | Soh et al. |
| 2007/0055770 A1 | 3/2007 | Karmakar et al. |
| 2007/0088560 A1 | 4/2007 | Mock et al. |
| 2007/0106457 A1 | 5/2007 | Rosenberg |
| 2007/0146316 A1 | 6/2007 | Poupyrev et al. |
| 2007/0193436 A1 | 8/2007 | Chu |
| 2007/0226646 A1 | 9/2007 | Nagiyama et al. |
| 2007/0274503 A1 | 11/2007 | Klemm et al. |
| 2007/0283239 A1 | 12/2007 | Morris |
| 2008/0024459 A1 | 1/2008 | Poupyrev et al. |
| 2008/0122796 A1 | 5/2008 | Jobs et al. |
| 2008/0174570 A1 | 7/2008 | Jobs et al. |
| 2008/0270931 A1 | 10/2008 | Bamford |
| 2009/0085878 A1 | 4/2009 | Heubel et al. |
| 2009/0128581 A1 | 5/2009 | Brid et al. |
| 2009/0135142 A1 | 5/2009 | Fu et al. |
| 2009/0167509 A1 | 7/2009 | Fadell et al. |
| 2009/0167704 A1 | 7/2009 | Terlizzi et al. |
| 2009/0178008 A1 | 7/2009 | Herz et al. |
| 2009/0215432 A1 | 8/2009 | Matsuoka |
| 2009/0215479 A1 | 8/2009 | Karmarkar |
| 2009/0222902 A1 | 9/2009 | Bender et al. |
| 2009/0231271 A1 | 9/2009 | Heubel et al. |
| 2009/0284463 A1 | 11/2009 | Morimoto et al. |
| 2009/0292990 A1 | 11/2009 | Park et al. |
| 2009/0303031 A1 | 12/2009 | Strohallen et al. |
| 2009/0322497 A1 | 12/2009 | Ku et al. |
| 2009/0325645 A1 | 12/2009 | Bang et al. |
| 2009/0325647 A1 | 12/2009 | Cho et al. |
| 2010/0017489 A1 | 1/2010 | Birnbaum et al. |
| 2010/0099445 A1 | 4/2010 | Song et al. |
| 2010/0114974 A1 | 5/2010 | Jung et al. |
| 2010/0141411 A1 | 6/2010 | Ahn et al. |
| 2010/0144395 A1 | 6/2010 | Komiya |
| 2010/0156818 A1 | 6/2010 | Burrough et al. |
| 2010/0231367 A1 | 9/2010 | Cruz-Hernandez et al. |
| 2010/0231534 A1 | 9/2010 | Chaudhri et al. |
| 2010/0231537 A1 | 9/2010 | Pisula et al. |
| 2010/0267424 A1 | 10/2010 | Kim et al. |
| 2010/0299638 A1 | 11/2010 | Choi |
| 2010/0302003 A1 | 12/2010 | Zellner |
| 2010/0302042 A1 | 12/2010 | Barnett et al. |
| 2011/0001707 A1 | 1/2011 | Faubert et al. |
| 2011/0017828 A1 | 1/2011 | Pine |
| 2011/0018695 A1 | 1/2011 | Bells et al. |
| 2011/0053577 A1 | 3/2011 | Lee et al. |
| 2011/0074695 A1 | 3/2011 | Rapp et al. |
| 2011/0266375 A1 | 3/2011 | Ono et al. |
| 2011/0081889 A1 | 4/2011 | Gao et al. |
| 2011/0102349 A1 | 5/2011 | Harris |
| 2011/0126148 A1 | 5/2011 | Krishnaraj et al. |

(56) References Cited

U.S. PATENT DOCUMENTS

| | | |
|---|---|---|
| 2011/0141142 A1 | 6/2011 | Leffert et al. |
| 2011/0148608 A1 | 6/2011 | Grant et al. |
| 2011/0179388 A1 | 7/2011 | Fleizach et al. |
| 2011/0190595 A1 | 8/2011 | Bennett et al. |
| 2011/0202843 A1 | 8/2011 | Morris |
| 2011/0210926 A1* | 9/2011 | Pasquero ............... G06F 3/016 345/173 |
| 2011/0252346 A1 | 10/2011 | Chaudhri et al. |
| 2011/0264491 A1 | 10/2011 | Birnbaum et al. |
| 2011/0267181 A1 | 11/2011 | Kildal |
| 2011/0267294 A1 | 11/2011 | Kildal |
| 2011/0270358 A1 | 11/2011 | Davis et al. |
| 2011/0271181 A1 | 11/2011 | Tsai et al. |
| 2011/0279380 A1 | 11/2011 | Weber et al. |
| 2011/0279381 A1 | 11/2011 | Tong et al. |
| 2011/0316698 A1 | 12/2011 | Palin et al. |
| 2012/0019365 A1 | 1/2012 | Tuikka et al. |
| 2012/0026110 A1 | 2/2012 | Yamano |
| 2012/0050324 A1 | 3/2012 | Jeong et al. |
| 2012/0056806 A1 | 3/2012 | Rosenberg et al. |
| 2012/0062491 A1 | 3/2012 | Coni et al. |
| 2012/0105367 A1 | 5/2012 | Son et al. |
| 2012/0174033 A1 | 7/2012 | Joo |
| 2012/0191704 A1 | 7/2012 | Jones |
| 2012/0216139 A1* | 8/2012 | Ording ............... G06F 3/0488 715/773 |
| 2012/0229276 A1* | 9/2012 | Ronkainen ............. G08B 7/06 340/540 |
| 2012/0249461 A1 | 10/2012 | Flanagan et al. |
| 2012/0268412 A1 | 10/2012 | Cruz-Hernandez et al. |
| 2012/0286943 A1 | 11/2012 | Rothkopf et al. |
| 2012/0286944 A1 | 11/2012 | Forutanpour et al. |
| 2012/0299857 A1 | 11/2012 | Grant et al. |
| 2012/0299859 A1 | 11/2012 | Kinoshita |
| 2012/0306631 A1 | 12/2012 | Hughes |
| 2012/0306632 A1 | 12/2012 | Fleizach et al. |
| 2012/0306790 A1 | 12/2012 | Kyung et al. |
| 2012/0311477 A1 | 12/2012 | Mattos et al. |
| 2012/0327006 A1 | 12/2012 | Israr et al. |
| 2013/0091462 A1 | 4/2013 | Gray et al. |
| 2013/0165226 A1 | 6/2013 | Thorner |
| 2013/0167058 A1 | 6/2013 | Levee et al. |
| 2013/0174137 A1 | 7/2013 | Kim |
| 2013/0201115 A1 | 8/2013 | Heubel |
| 2013/0222224 A1 | 8/2013 | Eriksson et al. |
| 2013/0225300 A1 | 8/2013 | Brinlee |
| 2013/0234929 A1 | 9/2013 | Libin |
| 2013/0244633 A1 | 9/2013 | Jacobs et al. |
| 2013/0262298 A1 | 10/2013 | Morley |
| 2013/0265268 A1 | 10/2013 | Okumura et al. |
| 2013/0282325 A1 | 10/2013 | Takahashi et al. |
| 2013/0290442 A1 | 10/2013 | Dgani |
| 2013/0300684 A1 | 11/2013 | Kim et al. |
| 2013/0307786 A1 | 11/2013 | Heubel |
| 2013/0316744 A1 | 11/2013 | Newham et al. |
| 2013/0318437 A1 | 11/2013 | Jung et al. |
| 2013/0321317 A1 | 12/2013 | Hirukawa |
| 2013/0326367 A1 | 12/2013 | Nakamura et al. |
| 2013/0332721 A1 | 12/2013 | Chaudhri et al. |
| 2014/0002386 A1 | 1/2014 | Rosenberg et al. |
| 2014/0007005 A1 | 1/2014 | Libin et al. |
| 2014/0024414 A1* | 1/2014 | Fuji ................. G06F 3/04886 455/566 |
| 2014/0059427 A1 | 2/2014 | Dombrowski et al. |
| 2014/0074716 A1 | 3/2014 | Ni |
| 2014/0075375 A1 | 3/2014 | Hwang et al. |
| 2014/0082501 A1 | 3/2014 | Bae et al. |
| 2014/0091857 A1 | 4/2014 | Bernstein |
| 2014/0092037 A1 | 4/2014 | Kim |
| 2014/0132568 A1 | 5/2014 | Hirose et al. |
| 2014/0039900 A1 | 6/2014 | Heubel et al. |
| 2014/0168110 A1 | 6/2014 | Araki et al. |
| 2014/0176415 A1 | 6/2014 | Buuck et al. |
| 2014/0176452 A1 | 6/2014 | Aleksov et al. |
| 2014/0176455 A1 | 6/2014 | Araki et al. |
| 2014/0181222 A1 | 6/2014 | Geris et al. |
| 2014/0181756 A1 | 6/2014 | Kuo |
| 2014/0197946 A1 | 7/2014 | Park et al. |
| 2014/0207880 A1 | 7/2014 | Malkin et al. |
| 2014/0210740 A1 | 7/2014 | Lee |
| 2014/0215494 A1 | 7/2014 | Kim |
| 2014/0218317 A1 | 8/2014 | Aberg et al. |
| 2014/0232657 A1 | 8/2014 | Aviles et al. |
| 2014/0253319 A1 | 9/2014 | Chang |
| 2014/0258857 A1 | 9/2014 | Dykstra-Erickson et al. |
| 2014/0267076 A1 | 9/2014 | Birnbaum et al. |
| 2014/0273858 A1* | 9/2014 | Panther ............... A61B 5/0002 455/41.2 |
| 2014/0281924 A1 | 9/2014 | Chipman et al. |
| 2014/0292501 A1 | 10/2014 | Lim et al. |
| 2014/0292668 A1 | 10/2014 | Fricklas et al. |
| 2014/0292706 A1 | 10/2014 | Hunt et al. |
| 2014/0300454 A1 | 10/2014 | Lacroix et al. |
| 2014/0320402 A1 | 10/2014 | Ståhlberg |
| 2014/0320431 A1 | 10/2014 | Cruz-Hernandez et al. |
| 2014/0320435 A1 | 10/2014 | Modarres et al. |
| 2014/0329567 A1 | 11/2014 | Chan et al. |
| 2014/0333564 A1* | 11/2014 | Hong .................. G06F 3/016 345/173 |
| 2014/0340316 A1 | 11/2014 | Gu et al. |
| 2014/0351698 A1 | 11/2014 | Nakagawa |
| 2014/0358709 A1 | 12/2014 | Wu |
| 2014/0363113 A1 | 12/2014 | McGavran et al. |
| 2014/0368440 A1 | 12/2014 | Polyakov et al. |
| 2015/0002477 A1 | 1/2015 | Cheatham, III et al. |
| 2015/0020015 A1 | 1/2015 | Zhou |
| 2015/0050966 A1 | 2/2015 | West |
| 2015/0062052 A1 | 3/2015 | Bernstein et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067563 A1 | 3/2015 | Bernstein et al. |
| 2015/0067596 A1 | 3/2015 | Brown et al. |
| 2015/0070153 A1 | 3/2015 | Bhatia |
| 2015/0070260 A1 | 3/2015 | Saboune et al. |
| 2015/0077335 A1 | 3/2015 | Taguchi et al. |
| 2015/0078586 A1 | 3/2015 | Ang et al. |
| 2015/0089613 A1 | 3/2015 | Tippett et al. |
| 2015/0097657 A1* | 4/2015 | Gandhi .................. G08B 6/00 340/407.1 |
| 2015/0103028 A1 | 4/2015 | Ruemelin et al. |
| 2015/0116239 A1 | 4/2015 | Kaplan et al. |
| 2015/0123775 A1* | 5/2015 | Kerdemelidis .......... G08B 6/00 340/407.1 |
| 2015/0134531 A1 | 5/2015 | Xia |
| 2015/0135109 A1 | 5/2015 | Zambetti et al. |
| 2015/0138046 A1 | 5/2015 | Moon |
| 2015/0145656 A1* | 5/2015 | Levesque ............... G06F 1/163 340/407.1 |
| 2015/0145657 A1 | 5/2015 | Levesque et al. |
| 2015/0149899 A1 | 5/2015 | Bernstein et al. |
| 2015/0153828 A1 | 6/2015 | Monkhouse et al. |
| 2015/0153830 A1 | 6/2015 | Hirose et al. |
| 2015/0156196 A1 | 6/2015 | Kim et al. |
| 2015/0169059 A1* | 6/2015 | Behles ................ G06F 3/0488 345/173 |
| 2015/0199172 A1 | 7/2015 | Ringuette et al. |
| 2015/0201065 A1* | 7/2015 | Shim ................ H04M 1/72569 455/556.1 |
| 2015/0227204 A1 | 8/2015 | Gipson et al. |
| 2015/0227280 A1 | 8/2015 | Westerman et al. |
| 2015/0227589 A1 | 8/2015 | Chakrabarti et al. |
| 2015/0234464 A1 | 8/2015 | Yliaho |
| 2015/0244848 A1 | 8/2015 | Park et al. |
| 2015/0253835 A1 | 9/2015 | Yu |
| 2015/0254570 A1 | 9/2015 | Florence et al. |
| 2015/0254947 A1 | 9/2015 | Komori et al. |
| 2015/0261296 A1 | 9/2015 | Yoshikawa |
| 2015/0261387 A1 | 9/2015 | Petersen |
| 2015/0268725 A1 | 9/2015 | Levesque et al. |
| 2015/0286288 A1 | 10/2015 | Lee et al. |
| 2015/0293592 A1 | 10/2015 | Cheong et al. |
| 2015/0301838 A1 | 10/2015 | Steeves |
| 2015/0323996 A1 | 11/2015 | Obana et al. |

(56) References Cited

U.S. PATENT DOCUMENTS

| | | | |
|---|---|---|---|
| 2015/0332226 | A1 | 11/2015 | Wu et al. |
| 2015/0332565 | A1 | 11/2015 | Cho et al. |
| 2015/0346916 | A1 | 12/2015 | Jisrawi et al. |
| 2015/0350146 | A1 | 12/2015 | Cary et al. |
| 2015/0365306 | A1 | 12/2015 | Chaudhri et al. |
| 2016/0007290 | A1* | 1/2016 | Lindemann ....... H04M 1/72569 370/311 |
| 2016/0034253 | A1 | 2/2016 | Bang et al. |
| 2016/0041750 | A1 | 2/2016 | Cieplinski et al. |
| 2016/0062465 | A1 | 3/2016 | Moussette et al. |
| 2016/0062466 | A1 | 3/2016 | Moussette et al. |
| 2016/0062590 | A1 | 3/2016 | Karunamuni et al. |
| 2016/0063496 | A1 | 3/2016 | Royyuru et al. |
| 2016/0063825 | A1 | 3/2016 | Moussette et al. |
| 2016/0063826 | A1 | 3/2016 | Morrell et al. |
| 2016/0063827 | A1 | 3/2016 | Moussette et al. |
| 2016/0063828 | A1 | 3/2016 | Moussette et al. |
| 2016/0063850 | A1 | 3/2016 | Yang et al. |
| 2016/0065525 | A1 | 3/2016 | Dye et al. |
| 2016/0123745 | A1 | 5/2016 | Cotier et al. |
| 2016/0161922 | A1 | 6/2016 | Shin |
| 2016/0165038 | A1 | 6/2016 | Lim et al. |
| 2016/0179203 | A1 | 6/2016 | Modarres et al. |
| 2016/0205244 | A1 | 7/2016 | Dvortsov et al. |
| 2016/0246376 | A1 | 8/2016 | Birnbaum et al. |
| 2016/0259499 | A1 | 9/2016 | Kocienda et al. |
| 2016/0259519 | A1 | 9/2016 | Foss et al. |
| 2016/0259528 | A1 | 9/2016 | Foss et al. |
| 2016/0259542 | A1 | 9/2016 | Chaudhri et al. |
| 2016/0295010 | A1 | 10/2016 | Miller |
| 2016/0313875 | A1 | 10/2016 | Williams et al. |
| 2016/0342973 | A1 | 11/2016 | Jueng et al. |
| 2016/0349936 | A1 | 12/2016 | Cho et al. |
| 2016/0357354 | A1 | 12/2016 | Chen et al. |
| 2016/0357362 | A1 | 12/2016 | Gauci et al. |
| 2016/0357363 | A1 | 12/2016 | Decker et al. |
| 2017/0011210 | A1 | 1/2017 | Cheong et al. |
| 2017/0031495 | A1 | 2/2017 | Smith |
| 2017/0068511 | A1 | 3/2017 | Brown et al. |
| 2017/0075520 | A1 | 3/2017 | Bauer et al. |
| 2017/0075534 | A1 | 3/2017 | Leschenko |
| 2017/0357317 | A1 | 12/2017 | Chaudhri et al. |
| 2017/0357318 | A1 | 12/2017 | Chaudhri et al. |
| 2017/0357319 | A1 | 12/2017 | Chaudhri et al. |
| 2017/0357320 | A1 | 12/2017 | Chaudhri et al. |
| 2017/0358181 | A1 | 12/2017 | Moussette et al. |
| 2018/0067557 | A1 | 3/2018 | Robert et al. |
| 2018/0082552 | A1 | 3/2018 | Moussette et al. |
| 2018/0129292 | A1 | 5/2018 | Moussette et al. |
| 2018/0204425 | A1 | 7/2018 | Moussette et al. |
| 2018/0335848 | A1 | 11/2018 | Moussette et al. |
| 2019/0050055 | A1 | 2/2019 | Chaudhri et al. |

FOREIGN PATENT DOCUMENTS

| | | |
|---|---|---|
| CN | 101631162 A | 1/2010 |
| CN | 101901048 A | 12/2010 |
| CN | 102330123 A | 2/2012 |
| CN | 102484664 A | 5/2012 |
| CN | 102609078 A | 7/2012 |
| CN | 103503428 A | 1/2014 |
| CN | 103649885 A | 3/2014 |
| CN | 103838424 A | 6/2014 |
| CN | 104049746 A | 9/2014 |
| CN | 104123035 A | 10/2014 |
| CN | 104321723 A | 1/2015 |
| CN | 104412201 A | 3/2015 |
| CN | 104423595 A | 3/2015 |
| CN | 104508618 A | 4/2015 |
| CN | 105278746 A | 1/2016 |
| DE | 102010048745 A1 | 4/2012 |
| EP | 2141569 A2 | 1/2010 |
| EP | 2 194 697 A1 | 6/2010 |
| EP | 2 328 063 A1 | 1/2011 |
| EP | 2 378 406 A2 | 10/2011 |
| EP | 2 386 935 A1 | 11/2011 |
| EP | 2 434 387 A2 | 3/2012 |
| EP | 2 728 445 A2 | 5/2014 |
| EP | 2733575 A1 | 5/2014 |
| EP | 2 821 912 A1 | 1/2015 |
| EP | 2 827 225 A2 | 1/2015 |
| EP | 2 846 549 A1 | 3/2015 |
| EP | 2 847 658 A1 | 3/2015 |
| EP | 2 857 933 A1 | 4/2015 |
| EP | 2 977 859 A1 | 1/2016 |
| GB | 2532766 A | 6/2016 |
| GB | 2533572 A | 6/2016 |
| JP | 2000209311 A | 7/2000 |
| JP | 2004064117 A | 2/2004 |
| JP | 2004363999 A | 12/2004 |
| JP | 2008282125 A | 11/2008 |
| JP | 2010114702 A | 5/2010 |
| JP | 2010136151 A | 6/2010 |
| JP | 2011159110 A | 8/2011 |
| JP | 2013503578 A | 1/2013 |
| JP | 2013162167 A | 8/2013 |
| KR | 20130075412 A | 7/2013 |
| KR | 20140002563 A | 1/2014 |
| TW | I388995 | 3/2013 |
| WO | WO 01/24158 A1 | 4/2001 |
| WO | WO 2004/053830 A1 | 6/2004 |
| WO | WO 2008/075082 A1 | 6/2008 |
| WO | WO 2012/081182 A1 | 6/2012 |
| WO | WO 2013/089294 A1 | 6/2013 |
| WO | WO 2013/156815 A1 | 10/2013 |
| WO | WO 2013/169300 A1 | 11/2013 |
| WO | WO 2013/169853 A1 | 11/2013 |
| WO | WO 2013/169854 A2 | 11/2013 |
| WO | WO 2013/169865 A2 | 11/2013 |
| WO | WO 2013/169875 A2 | 11/2013 |
| WO | WO 2014/095756 A1 | 6/2014 |
| WO | WO 2014-105275 A1 * | 7/2014 |
| WO | WO 2015/116056 A1 | 8/2015 |
| WO | WO 2016/171848 A1 | 10/2016 |
| WO | WO 2017/027526 A1 | 2/2017 |

OTHER PUBLICATIONS

Office Action for U.S. Appl. No. U.S. Appl. No. 14/835,708, dated May 20, 2016, 7 Pages.
Office Action for U.S. Appl. No. 14/869,825, dated Feb. 12, 2016, 15 Pages.
Office Action for U.S. Appl. No. 14/869,835, dated Feb. 17, 2016, 15 Pages.
Office Action for U.S. Appl. No. 14/869,834, dated Feb. 18, 2016, 17 Pages.
PCT Invitation to Pay Additional Fees, PCT Application No. PCT/US2015/041858, dated Nov. 27, 2015, 14 pages.
United States Office Action, U.S. Appl. No. 14/869,837, dated Dec. 30, 2015, 35 pages.
United States Office Action, U.S. Appl. No. 14/835,708, dated Nov. 30, 2015, 28 pages.
Office Action for U.S. Appl. No. 14/835,708, dated May 20, 2016, 7 Pages.
Office Action for U.S. Appl. No. 14/869,837, dated Jun. 30, 2016, 37 Pages.
Office Action for U.S. Appl. No. 14/869,835, dated Aug. 4, 2016, 21 Pages.
Office Action for U.S. Appl. No. 14/869,825, dated Jul. 8, 2016, 20 Pages.
Office Action for U.S. Appl. No. 14/869,834, dated Aug. 8, 2016, 22 Pages.
Office Action for Taiwanese Patent Application No. TW 104126890, dated Aug. 1, 2016, 79 Pages.
Notice of Allowance, dated Aug. 29, 2016, received in U.S. Appl. No. 14/835,708, 9 pages.
Corrective Notice of Allowance, dated Oct. 31, 2016, received in U.S. Appl. No. 14/835,708, 5 pages.
Office Action, dated Dec. 20, 2016, received in Taiwanese Patent Application No. 104126890, which corresponds with U.S. Appl. No. 14/835,708, 5 pages.

(56) References Cited

OTHER PUBLICATIONS

Office Action, dated Dec. 28, 2016, received in Taiwanese Patent Application No. 104126890, which corresponds with U.S. Appl. No. 14/835,708, 3 pages.
Office Action, dated Dec. 27, 2016, received in U.S. Appl. No. 14/869,825, 27 pages.
Office Action, dated Jan. 6, 2017, received in U.S. Appl. No. 14/869,835, 17 pages.
Office Action, dated Jan. 17, 2017, received in U.S. Appl. No. 14/869,837, 27 pages.
Office action, dated Apr. 5, 2017, received in Taiwanese Patent Application No. 105139726, which corresponds with U.S. Appl. No. 14/835,708, 2 pages.
Office Action, dated Mar. 7, 2017, received in U.S. Appl. No. 14/869,834, 20 pages.
Final Office Action, dated Jun. 28, 2017, received in U.S. Appl. No. 14/869,835, 24 pages.
Dosher et al., "Human Interaction with Small Haptic Effects", University of Washington, Seattle, WA, Jun. 2005, 16 pages.
Immersion, "The Value of Haptics", San Jose, California, 2010, 12 pages.
Sulaiman et al., "User Haptic Experience and the Design of Drawing Interfaces", *Interacting with Computers*, http://doi.org/10.1016/j.intcom.2009.11.009, Dec. 5, 2009, 20 pages.
VladMaxSoft, "Make Your iPhone Ring Louder When Inside a Pocket or Bag with Ringing Pocket Tweak", https://www.reddit.com/r/jailbreak/comments/1zj6zx/release_make_your_iphone_ring_louder_when_inside/, Mar. 4, 2014, 8 pages.
Notice of Allowance, dated Jan. 31, 2018, received in U.S. Appl. No. 15/619,359, 8 pages.
Notice of Allowance, dated Oct. 2, 2017, received in U.S. Appl. No. 15/619,359, 9 pages.
Certificate of Grant, dated May 18, 2017, received in Australian Patent Application No. 2017100482, which corresponds with U.S. Appl. No. 15/619,359, 1 page.
Office Action, dated Jun. 27, 2017, received in Australian Patent Application No. 2017100482, which corresponds with U.S. Appl. No. 15/619,359, 7 pages.
Certificate of Examination, dated Oct. 27, 2017, received in Australian Patent Application No. 2017100482, which corresponds with U.S. Appl. No. 15/619,359, 1 page.
Office Action, dated Jan. 24, 2018, received in Danish Patent Application No. 201770369, which corresponds with U.S. Appl. No. 15/619,359, 6 pages.
Office Action, dated Aug. 6, 2018, received in Danish Patent Application No. 201770369, which corresponds with U.S. Appl. No. 15/619,359, 5 pages.
Intention to Grant, dated May 2, 2019, received in Danish Patent Application No. 201770369, which corresponds with U.S. Appl. No. 15/619,359, 2 pages.
Notice of Allowance, dated Dec. 14, 2016, received in U.S. Appl. No. 15/270,885, 13 pages.
Notice of Allowance, dated Apr. 10, 2017, received in U.S. Appl. No. 15/270,885, 5 pages.
Notice of Allowance, dated Jul. 21, 2017, received in U.S. Appl. No. 15/270,885, 10 pages.
Notice of Allowance, dated Nov. 22, 2017, received in U.S. Appl. No. 15/270,885, 5 pages.
Notice of Acceptance, dated Aug. 18, 2017, received in Australian Patent Application No. 2017216447, which corresponds with U.S. Appl. No. 15/270,885, 3 pages.
Grant, dated Dec. 21, 2017, received in Australian Application No. 2017216447, which corresponds with U.S. Appl. No. 15/270,885, 1 page.
Notice of Acceptance, dated Aug. 21, 2017, received in Australian Patent Application No. 2017216475, which corresponds with U.S. Appl. No. 15/270,885, 3 pages.
Grant, dated Dec. 21, 2017, received in Australian Application No. 2017216475, which corresponds with U.S. Appl. No. 15/270,885, 1 page.
Office Action, dated Mar. 22, 2019, received in Australian Patent Application No. 2017251751, which corresponds with U.S. Appl. No. 15/270,885, 3 pages.
Office Action, dated Feb. 2, 2019, received in Chinese Patent Application No. 2017107348777, which corresponds with U.S. Appl. No. 15/270,885, 10 pages.
Office Action, dated Jan. 5, 2017, received in Danish Patent Application No. 201670721, which corresponds with U.S. Appl. No. 15/270,885, 7 pages.
Office Action, dated Jul. 20, 2017, received in Danish Patent Application No. 201670721, which corresponds with U.S. Appl. No. 15/270,885, 2 pages.
Decision to Grant, dated Oct. 25, 2017, received in Danish Patent Application No. 201670721, which corresponds with U.S. Appl. No. 15/270,885, 2 pages.
Office action, dated Jan. 18, 2017, received in Danish Patent Application No. 201670726, which corresponds with U.S. Appl. No. 15/270,885, 7 pages.
Office Action, dated Apr. 5, 2017, received in Danish Patent Application No. 201670726, which corresponds with U.S. Appl. No. 15/270,885, 2 pages.
Notice of Allowance, dated Jul. 18, 2017, received in Danish Patent Application No. 201670726, which corresponds with U.S. Appl. No. 15/270,885, 2 pages.
Patent, dated Oct. 16, 2017, received in Danish Patent Application No. 201670726, which corresponds with U.S. Appl. No. 15/270,885, 2 pages.
Office Action, dated Aug. 25, 2017, received in European patent Application No. 17177160.3, which corresponds with U.S. Appl. No. 15/270,885, 3 pages.
Office Action, dated Jan. 24, 2018, received in European Patent Application No. 17177160.3, which corresponds with U.S. Appl. No. 15/270,885, 4 pages.
Intention to Grant, dated Dec. 7, 2018, received in European Patent Application No. 17177160.3, which corresponds with U.S. Appl. No. 15/270,885, 7 pages.
Intention to Grant, dated Feb. 1, 2019, received in European Patent Application No. 17177493.8, which corresponds with U.S. Appl. No. 15/270,885, 4 pages.
Decision to Grant, dated Apr. 18, 2019, received in European Patent Application No. 17177493.8, which corresponds with U.S. Appl. No. 15/270,885, 4 pages.
Office Action, dated Jan. 17, 2017, received in U.S. Appl. No. 15/271,073, 8 pages.
Notice of Allowance, dated May 2, 2017, received in U.S. Appl. No. 15/271,073, 5 pages.
Notice of Allowance, dated Aug. 21, 2017, received in Australian Application No. 2017213578, which corresponds with U.S. Appl. No. 15/271,073, 3 pages.
Grant, dated Dec. 21, 2017, received in Australian Application No. 2017213578, which corresponds with U.S. Appl. No. 15/271,073, 1 page.
Notice of Allowance, dated Sep. 7, 2017, received in Australian Application No. 2017216471, which corresponds with U.S. Appl. No. 15/271,073, 3 pages.
Grant, dated Dec. 21, 2017, received in Australian Application No. 2017216471, which corresponds with U.S. Appl. No. 15/271,073, 1 page.
Notice of Allowance, dated Aug. 24, 2017, received in Australian Application No. 2017216453, which corresponds with U.S. Appl. No. 15/271,073, 3 pages.
Grant, dated Dec. 21, 2017, received in Australian Application No. 2017216453, which corresponds with U.S. Appl. No. 15/271,073, 1 page.
Office Action, dated Oct. 5, 2018, received in Australian Patent Application No. 201761484, which corresponds with U.S. Appl. No. 15/271,073, 2 pages.
Office Action, dated Sep. 8, 2017, received in Chinese Application No. 201710735308.4, which corresponds with U.S. Appl. No. 15/271,073, 4 pages.
Office Action, dated Jan. 3, 2019, received in Chinese Application No. 201710735308.4, which corresponds with U.S. Appl. No. 15/271,073, 6 pages.

(56) References Cited

OTHER PUBLICATIONS

Office Action, dated Jan. 20, 2017, received in Danish Patent Application No. 201670720, which corresponds with U.S. Appl. No. 15/271,073, 9 pages.
Office Action, dated Sep. 4, 2017, received in Danish Patent Application No. 201670720, which corresponds with U.S. Appl. No. 15/271,073, 4 pages.
Office Action, dated Aug. 14, 2018, received in Danish Patent Application No. 201670720, which corresponds with U.S. Appl. No. 15/271,073 2 pages.
Office Action, dated Apr. 5, 2017, received in Danish Patent Application No. 2016-70724, which corresponds with U.S. Appl. No. 15/271,073, 5 pages.
Office Action, dated Aug. 1, 2017, received in Danish Patent Application No. 2016-70724, which corresponds with U.S. Appl. No. 15/271,073, 5 pages.
Office Action, dated Feb. 14, 2018, received in Danish Patent Application No. 2016-70724, which corresponds with U.S. Appl. No. 15/271,073, 2 pages.
Notice of Allowance, dated Feb. 13, 2019, received in Danish Patent Application No. 2016-70724, which corresponds with U.S. Appl. No. 15/271,073, 2 pages.
Office Action, dated Jan. 25, 2017, received in Danish Patent Application No. 201670725, which corresponds with U.S. Appl. No. 15/271,073, 6 pages.
Office Action, dated Apr. 5, 2017, received in Danish Patent Application No. 201670725, which corresponds with U.S. Appl. No. 15/271,073, 3 pages.
Office Action, dated Oct. 12, 2017, received in Danish Patent Application No. 201670725, which corresponds with U.S. Appl. No. 15/271,073, 3 pages.
Office Action, dated Jan. 14, 2019, received in Danish Patent Application No. 201670725, which corresponds with U.S. Appl. No. 15/271,073, 3 pages.
Office Action, dated May 16, 2018, received in Danish Patent Application No. 201670725, which corresponds with U.S. Appl. No. 15/271,073, 2 pages.
Office Action, dated Feb. 10, 2017, received in U.S. Appl. No. 15/272,380, 18 pages.
Notice of Allowance, dated Dec. 6, 2017, received in U.S. Appl. No. 15/272,380, 11 pages.
Notice of Allowance, dated Mar. 8, 2018, received in U.S. Appl. No. 15/272,380, 11 pages.
Certificate of Grant, dated Aug. 23, 2017, received in Australian Patent Application No. 2017101092, which corresponds with U.S. Appl. No. 15/272,380, 1 page.
Office Action, dated Oct. 4, 2017, received in Australian Patent Application No. 2017101092, which correspond with U.S. Appl. No. 15/272,380, 8 pages.
Certificate of Grant, dated Apr. 26, 2018, received in Australian Patent Application No. 2018100429, which corresponds with U.S. Appl. No. 15/272,380, 1 page.
Office Action, dated May 31, 2018, received in Australian Patent Application No. 2018100429, which corresponds with U.S. Appl. No. 15/272,380, 5 pages.
Certificate of Examination, dated Aug. 7, 2018, received in Australian Patent Application No. 2018100429, which corresponds with U.S. Appl. No. 15/272,380, 1 page.
Office Action, dated Apr. 2, 2019, received in Chinese Patent Application No. 2017800042913, which corresponds with U.S. Appl. No. 15/272,380, 5 pages.
Office Action, dated Feb. 23, 2017, received in Danish Patent Application No. 201670729, which corresponds with U.S. Appl. No. 15/272,380, 9 pages.
Office Action, dated Aug. 28, 2017, received in Danish Patent Application No. 201670729, which corresponds with U.S. Appl. No. 15/272,380, 3 pages.
Office Action, dated Mar. 9, 2018, received in Danish Patent Application No. 201670729, which corresponds with U.S. Appl. No. 15/272,380, 2 pages.

Office Action, dated May 17, 2018, received in Danish Patent Application No. 201670729, which corresponds with U.S. Appl. No. 15/272,380, 2 pages.
Notice of Allowance, dated Oct. 2, 2018, received in Danish Patent Application No. 201670729, which corresponds with U.S. Appl. No. 15/272,380, 2 pages.
Patent, dated Jan. 4, 2019, received in Danish Patent Application No. 201670729, which corresponds with U.S. Appl. No. 15/272,380, 7 pages.
Office Action, dated Jan. 24, 2017, received in Danish Patent Application No. 201670735, which corresponds with U.S. Appl. No. 15/272,380, 8 pages.
Office Action, dated Jul. 27, 2017, received in Danish Patent Application No. 201670735, which corresponds with U.S. Appl. No. 15/272,380, 3 pages.
Office Action, dated Dec. 7, 2017, received in Danish Patent Application No. 201670735, which corresponds with U.S. Appl. No. 15/272,380, 3 pages.
Office Action, dated Jun. 15, 2018, received in Danish Patent Application No. 201670735, which corresponds with U.S. Appl. No. 15/272,380, 2 pages.
Intention to Grant, dated Nov. 21, 2018, received in Danish Patent Application No. 201670735, which corresponds with U.S. Appl. No. 15/272,380, 2 pages.
Patent, dated Mar. 13, 2019, received in Danish Patent Application No. 201670735, which corresponds with U.S. Appl. No. 15/272,380, 3 pages.
Office Action, dated Jan. 11, 2017, received in Danish Patent Application No. 201670736, which corresponds with U.S. Appl. No. 15/272,380, 11 pages.
Office Action, dated Aug. 30, 2017, received in Danish Patent Application No. 201670736, which corresponds with U.S. Appl. No. 15/272,380, 4 pages.
Office Action, dated Mar. 16, 2018, received in Danish Patent Application No. 201670736, which corresponds with U.S. Appl. No. 15/272,380, 4 pages.
Office Action, dated Jan. 30, 2017, received in Danish Patent Application No. 201670737, which corresponds with U.S. Appl. No. 15/272,380, 9 pages.
Office Action, dated Aug. 31, 2017, received in Danish Patent Application No. 201670737, which corresponds with U.S. Appl. No. 15/272,380, 4 pages.
Office Action, dated Jul. 25, 2018, received in Danish Patent Application No. 201670737, which corresponds with U.S. Appl. No. 15/272,380, 5 pages.
Office Action, dated Oct. 26, 2018, received in European Patent Application No. 18183341.9, which corresponds with U.S. Appl. No. 15/272,380, 7 pages.
Notice of Allowance, dated Aug. 27, 2018, received in Patent Application No. 15/273,688, 27 pages.
Notice of Allowance, dated Jul. 12, 2018, received in U.S. Appl. No. 15/275,083, 22 pages.
Office Action, dated Jan. 14, 2019, received in European Patent Application No. 18191063.9, which corresponds with U.S. Appl. No. 15/275,083, 9 pages.
Notice of Allowance, dated Apr. 23, 2019, received in Japanese Patent Application No. 2018550359, which corresponds with U.S. Appl. No. 15/275,083, 4 pages.
Notice of Allowance, dated Feb. 22, 2017, received in U.S. Appl. No. 15/271,534, 13 pages.
Office Action, dated Nov. 23, 2018, received in Chinese Patent Application No. 201710736303.3, which corresponds with U.S. Appl. No. 15/271,534, 7 pages.
Notification to Grant, dated Apr. 10, 2019, received in Chinese Patent Application No. 201710736303.3, which corresponds with U.S. Appl. No. 15/271,534, 6 pages.
Office Action, dated Jan. 10, 2017, received in U.S. Appl. No. 15/271,653, 9 pages.
Office Action, dated Sep. 13, 2017, received in Chinese Patent Application No. 201710728497.2, which corresponds with U.S. Appl. No. 15/271,653, 3 pages.

(56) References Cited

OTHER PUBLICATIONS

Office Action, dated Dec. 29, 2018, received in Chinese Patent Application No. 201710728497.2, which corresponds with U.S. Appl. No. 15/271,653, 6 pages.
Office Action, dated Jan. 27, 2017, received in U.S. Appl. No. 15/271,708, 8 pages.
Notice of Allowance, dated Apr. 5, 2017, received in U.S. Appl. No. 15/271,708, 5 pages.
Office Action, dated Nov. 22, 2017, received in Chinese Patent Application No. 201710736331.5, which corresponds with U.S. Appl. No. 15/271,108, 3 pages.
Office Action, dated Mar. 5, 2019, received in Chinese Patent Application No. 201710736331.5, which corresponds with U.S. Appl. No. 15/271,108, 6 pages.
Office Action, dated Oct. 30, 2017, received in Australian Patent Application No. 2015312344, which corresponds with U.S. Appl. No. 14/835,708, 2 pages.
Notice of Acceptance, dated Apr. 5, 2018, received in Australian Patent Application No. 2015312344, which corresponds with U.S. Appl. No. 14/835,708, 5 pages.
Certificate of Grant, dated Aug. 2, 2018, received in Australian Patent Application No. 2015312344, which corresponds with U.S. Appl. No. 14/835,708, 1 page.
Office Action, dated Apr. 18, 2019, received in Chinese Patent Application No. 201580044092.6, which corresponds with U.S. Appl. No. 14/835,708, 5 pages.
Office Action, dated May 11, 2018, received in Japanese Patent Application No. 2017509011, which corresponds with U.S. Appl. No. 14/835,708, 8 pages.
Office Action, dated Dec. 14, 2018, received in Japanese Patent Application No. 2017509011, which corresponds with U.S. Appl. No. 14/835,708, 8 pages.
Office Action, dated Dec. 26, 2017, received in Korean Patent Application No. 2017-7005874, which corresponds with U.S. Appl. No. 14/835,708, 11 pages.
Final Office Action, dated Jul. 17, 2018, received in Korean Patent Application No. 2017-7005874, which corresponds with U.S. Appl. No. 14/835,708, 3 pages.
Final Office Action, dated Nov. 8, 2018, received in Korean Patent Application No. 2017-7005874, which corresponds with U.S. Appl. No. 14/835,708, 3 pages.
Patent, dated Apr. 11, 2018, received in Taiwanese Patent Application No. 104126890, which corresponds with U.S. Appl. No. 14/835,708, 5 pages.
Notice of Allowance, dated Jul. 21, 2017, received in Taiwanese Patent Application No. 105139726, which corresponds with U.S. Appl. No. 14/835,708, 6 pages.
Patent, dated Nov. 1, 2017, received in Taiwanese Patent Application No. 105139726, which corresponds with U.S. Appl. No. 14/835,708, 5 pages.
Final Office Action, dated Jul. 25, 2017, received in U.S. Appl. No. 14/869,834, 18 pages.
Notice of Allowance, dated Nov. 7, 2017, received in U.S. Appl. No. 14/869,834, 9 pages.
Office Action, dated Mar. 21, 2019, received in Korean Patent Application No. 2019-7000444, which corresponds with U.S. Appl. No. 14/869,870, 3 pages.
Office Action, dated Nov. 30, 2017, received in U.S. Appl. No. 14/869,835, 8 pages.
Notice of Allowance, dated May 29, 2018, received in U.S. Appl. No. 14/869,835, 12 pages.
Notice of Allowance, dated Jul. 31, 2017, received in U.S. Appl. No. 14/869,837, 27 pages.
Office Action, dated Aug. 31, 2017, received in Danish Patent Application No. 201770372, 10 pages.
Office Action, dated Apr. 17, 2018, received in Danish Patent Application No. 201770372, 5 pages.
Office Action, dated Mar. 7, 2018, received in U.S. Appl. No. 15/688,754, 9 pages.
Notice of Allowance, dated Aug. 27, 2018 received in U.S. Appl. No. 15/688,754, 5 pages.
Office Action, dated Feb. 12, 2019, received in U.S. Appl. No. 15/823,436, 7 pages.
Notice of Allowance, dated Apr. 11, 2019, received in U.S. Appl. No. 15/863,765, 10 pages.
Office Action, dated Jul. 20, 2018, received in U.S. Appl. No. 15/905,671, 7 pages.
Notice of Allowance, dated Dec. 20, 2018, received in U.S. Appl. No. 15/905,671, 9 pages.
Office Action, dated Feb. 13, 2019, received in U.S. Appl. No. 16/240,684, 9 pages.
Notice of Allowance, dated Mar. 19, 2019, received in U.S. Appl. No. 16/240,684, 5 pages.
International Search Report and Written Opinion, dated Nov. 29, 2017, received in International Patent Application No. PCT/US2017/037004, which corresponds with U.S. Appl. No. 15/619,359, 21 pages.
International Preliminary Report on Patentability, dated Dec. 18, 2018, received in International Patent Application No. PCT/US2017/037004, which corresponds with U.S. Appl. No. 15/619,359, 12 pages.
Extended European Search Report, dated Oct. 20, 2017, received in European Patent Application No. 17177493.8, 6 pages.
Invitation to Pay Additional Fees, dated Nov. 8, 2017, received in International Patent Application No. PCT/US2017/045152, which corresponds with U.S. Appl. No. 15/270,885, 17 pages.
International Search Report and Written Opinion, dated Jan. 18, 2018, received in International Patent Application No. PCT/US2017/045152, which corresponds with U.S. Appl. No. 15/270,885, 20 pages.
Extended European Search Report, dated Jan. 10, 2018, received in European Patent Application No. 17186196.6, which corresponds with U.S. Appl. No. 15/271,073, 8 pages.
Extended European Search Report, dated Jan. 9, 2018, received in European Patent Application No. 17186312.9, which corresponds with U.S. Appl. No. 15/271,073, 6 pages.
Extended European Search Report, dated Jan. 5, 2018, received in European Patent Application No. 17186313.7, which corresponds with U.S. Appl. No. 15/271,073, 9 pages.
International Search Report and Written Opinion, dated Jan. 16, 2018, received in International Patent Application No. PCT/US2017/045740, which corresponds with U.S. Appl. No. 15/271,073, 19 pages.
European Search Report, dated Sep. 27, 2018, received in European Patent Application No. 18183341.9, which corresponds with U.S. Appl. No. 15/271,073, 4 pages.
International Search Report and Written Opinion, dated Jan. 18, 2018, received in International Patent Application No. PCT/US2017/044851, which corresponds with U.S. Appl. No. 15/272,380, 17 pages.
European Search Report, dated Dec. 3, 2018, received in European Patent Application No. 1819163.9, which corresponds with U.S. Appl. No. 15/275,083, 4 pages.
International Search Report and Written Opinion, dated Aug. 22, 2018, received in International Patent Application No. PCT/US2018032936, which corresponds with U.S. Appl. No. 15/972,040, 14 pages.
Office Action, dated May 23, 2019, received in Australian Patent Application No. 2017286532, which corresponds with U.S. Appl. No. 15/619,359, 3 pages.
Patent, dated May 27, 2019, received in European Patent Application No. 17177493.8, which corresponds with U.S. Appl. No. 15/270,885, 2 pages.
Office Action, dated Jun. 5, 2019, received in Chinese Patent Application No. 2018108328493, which corresponds with U.S. Appl. No. 15/272,380, 4 pages.
Patent, dated May 17, 2019, received in Japanese Patent Application No. 2018550359, which corresponds with U.S. Appl. No. 15/275,083, 4 pages.
Patent, dated Jun. 7, 2019, received in Chinese Patent Application No. 201710736303.3, which corresponds with U.S. Appl. No. 15/271,534, 6 pages.

(56) References Cited

OTHER PUBLICATIONS

Notice of Allowance, dated May 24, 2019, received in Japanese Patent Application No. 2017509011, which corresponds with U.S. Appl. No. 14/835,708, 5 pages.

* cited by examiner

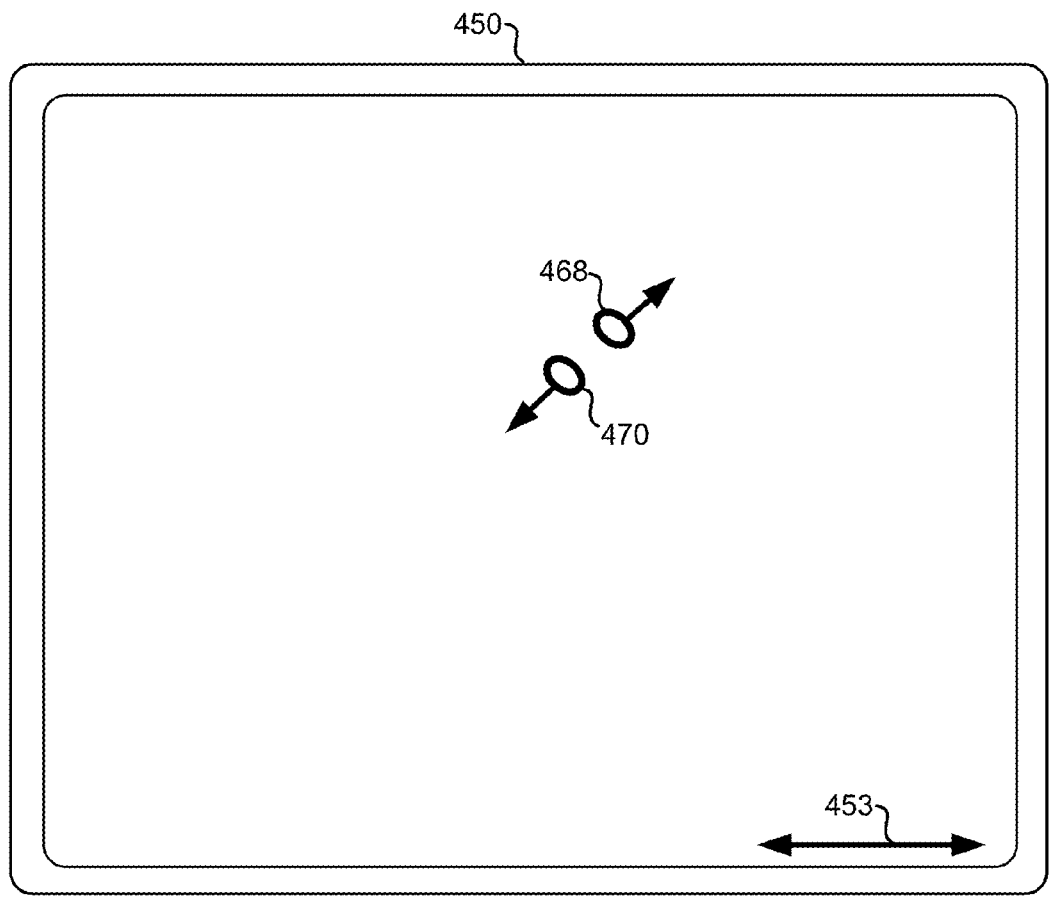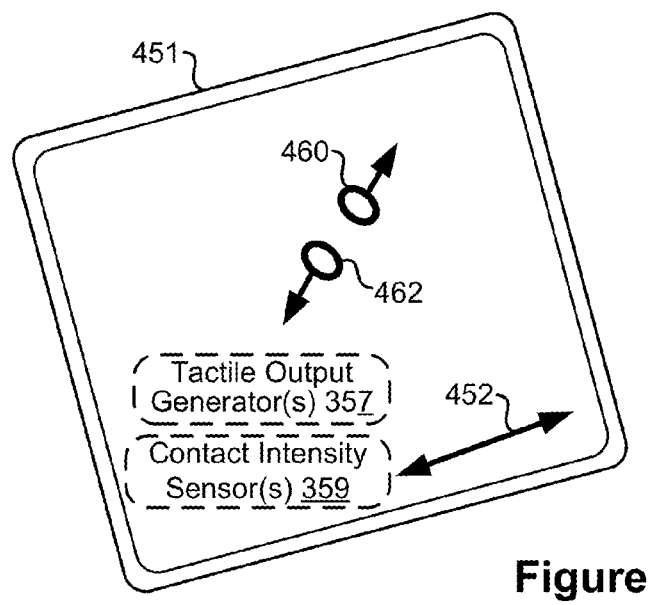
Figure 4B

SEMANTIC FRAMEWORK FOR VARIABLE HAPTIC OUTPUT

CROSS REFERENCE TO RELATED APPLICATIONS

This application is a continuation of U.S. patent application Ser. No. 14/835,708 filed Aug. 26, 2015, which claims the benefit of U.S. Provisional Application No. 62/172,122, filed Jun. 7, 2015, and of U.S. Provisional Application No. 62/129,905, filed Mar. 8, 2015, and of U.S. Provisional Application No. 62/044,870, filed Sep. 2, 2014, all of which are incorporated by reference in their entirety.

TECHNICAL FIELD

The present disclosure relates generally to methods and apparatus for providing haptic feedback, and more particularly relates to methods and apparatus for a semantic framework of haptic feedback that corresponds to conditions associated with a device or application.

BACKGROUND

Tactile feedback systems provide a user with the ability to interact with a subsystem through touch or contact. Haptic systems facilitate these tactile interactions by using actuators, sensors, or both.

SUMMARY

The embodiments herein disclose haptic feedback methods and apparatus that organize a plurality of haptic output variations into a cohesive semantic framework that uses various information about the alert condition and triggers, application context, and other conditions to provide a system of haptic outputs that shares characteristics between related events. This disclosure relates to systems and methods for providing haptic response in various conditions. The disclosed haptic response approaches may be implemented using any suitable software, hardware, or both.

In some embodiments, a state associated with an application at a time associated with a detected alert condition associated with the application provides the basis for providing a corresponding haptic output. For example, responsive to detecting the alert condition, a state associated with the application at a time associated with the alert condition is determined. If the application was in an active state at the time associated with the alert condition, a first haptic output is provided that represents the occurrence of the alert condition and if the application was in an inactive state at the time associated with the alert condition, a second haptic output is provided that represents the occurrence of the alert condition and is different from the first haptic output.

In some embodiments, whether a detected alert condition was manually or automatically triggered provides the basis for providing a corresponding haptic output. For example, responsive to detecting the alert condition, whether the alert condition was triggered by a manually-initiated event is determined. If the alert condition was triggered by a manually-initiated event, a first haptic output is provided corresponding to a manually-initiated event notification. If the alert condition was triggered by an automatically-initiated event, a second haptic output is provided corresponding to an automatically-initiated event notification and is different from the first haptic output.

In some embodiments, whether a detected alert condition is associated with user input or a predetermined system event provides the basis for providing a corresponding haptic output. For example, responsive to detecting a first alert condition associated with receiving user input to an application, a first haptic output is provided corresponding to the user input. Following the first haptic output, in response to detecting a second alert condition associated with receiving a predetermined system event in the application, a second haptic output of a greater intensity than the first haptic output is provided corresponding to the predetermined system event.

In some embodiments, whether a detected alert condition is part of a multi-part operation provides the basis for providing a corresponding haptic output. For example, responsive to receiving an input corresponding to a first part of a multi-part operation, an ongoing haptic output sequence is initiated. After initiation and responsive to receiving an input corresponding to a second part of the multi-part operation, the ongoing haptic output sequence is terminated.

In some embodiments, whether a detected request to perform an operation is a subset of another operation provides the basis for providing a corresponding haptic output. For example, responsive to detecting a first input that corresponds to a request to perform a first operation, a first output is provided that includes a haptic component and the first operation is performed. After performing the first operation, and responsive to detecting a second input that corresponds to a request to perform a second operation that includes the first operation and a supplemental operation, a second output is provided that includes a haptic component and includes the first output plus a supplemental output that corresponds to the supplemental operation, and the second operation is performed.

In some embodiments, whether two detected alert conditions are in the same or different class of alert condition or class of application provides the basis for providing a corresponding haptic output. For example, responsive to detecting the occurrence of a first alert condition, a first output is provided that includes a first haptic component and a first non-haptic component. After providing the first output, and responsive to detecting the occurrence of a second alert condition, a second output is provided that includes a second haptic component and a second non-haptic component. If the first alert condition and the second alert condition are different alert conditions that are in a same class of alert condition, the first output and the second output share one or more same components and have one or more different components, but if the first alert condition and the second alert condition are different alert conditions that are in different classes of alert condition, the first haptic component is different from the second haptic component and the first non-haptic component is different from the second non-haptic component.

Note that the various embodiments of the methods described herein can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 4B illustrates an exemplary user interface for a multifunction device with a touch-sensitive surface that is separate from the display in accordance with some embodiments.

DETAILED DESCRIPTION

Figure 1A:
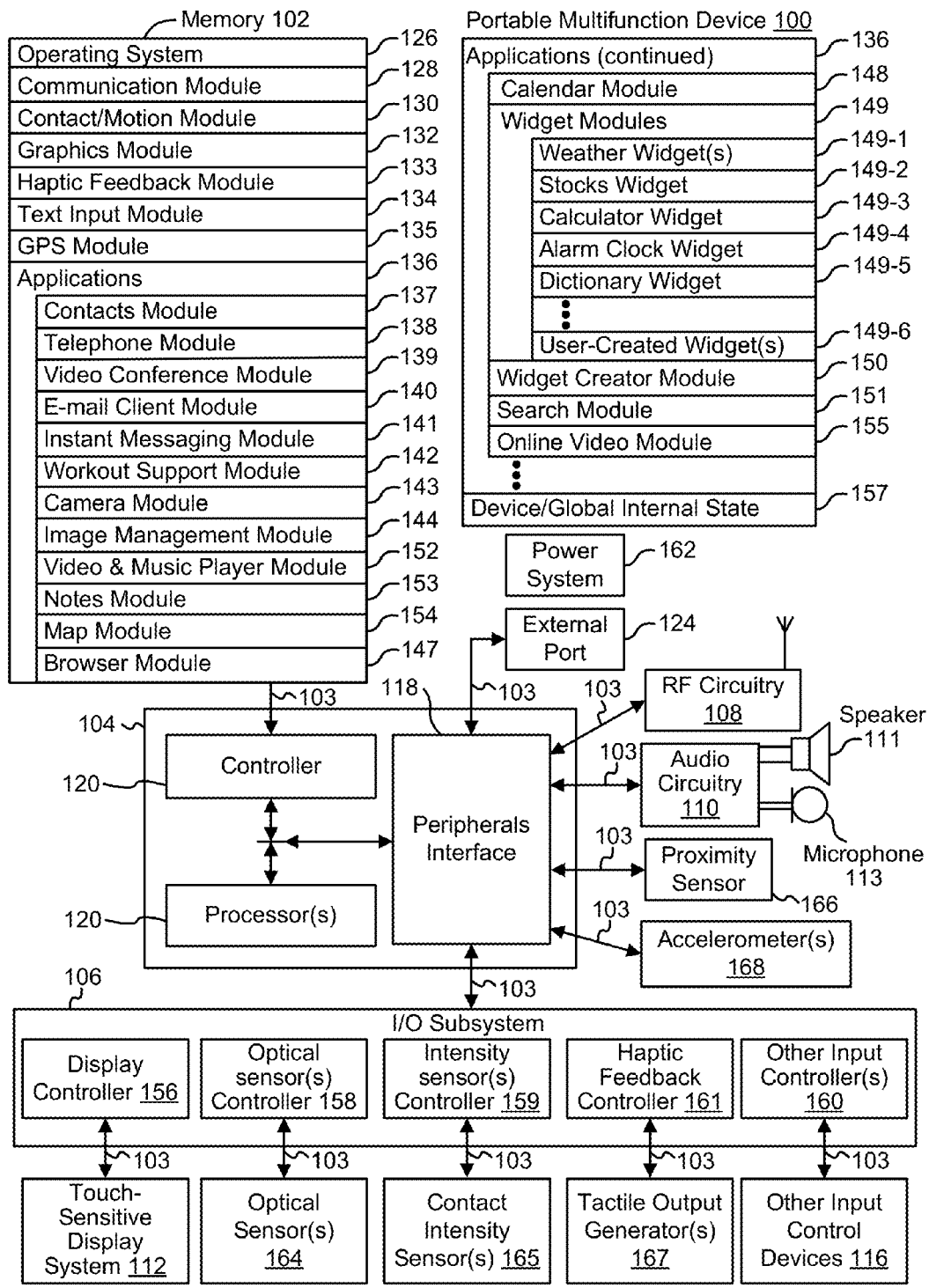
FIG. 1A is a block diagram illustrating a portable multifunction device with a touch-sensitive display in accordance with some embodiments.

The embodiments herein disclose haptic feedback methods and apparatus that organize a plurality of haptic output variations into a cohesive semantic framework that uses various information about the alert condition and trigger, application context, and other conditions corresponding to the haptic output to provide a system of haptic outputs that shares characteristics between related events.

In some embodiments, a state associated with an application at a time associated with a detected alert condition associated with the application provides the basis for providing a corresponding haptic output. In some embodiments, whether a detected alert condition was manually or automatically triggered provides the basis for providing a corresponding haptic output. In some embodiments, whether a detected alert condition is associated with user input or a predetermined system event provides the basis for providing a corresponding haptic output.

In some embodiments, whether a detected alert condition is part of a multi-part operation provides the basis for providing a corresponding haptic output. In some embodiments, whether a detected request to perform an operation is a subset of another operation provides the basis for providing a corresponding haptic output. In some embodiments, whether two detected alert conditions are in the same or different class of alert condition provides the basis for providing a corresponding haptic output.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in some embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100 as described in U.S. patent application Ser. No. 11/969,800 filed on Jan. 4, 2008, which is incorporated by reference in its entirety.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. IA and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the third threshold results in a third operation. In some embodiments, a comparison between the characteristic intensity and one or more thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some embodiments, the menu button is a physical push button or other physical input control device instead of a touchpad.

Figure 1B:
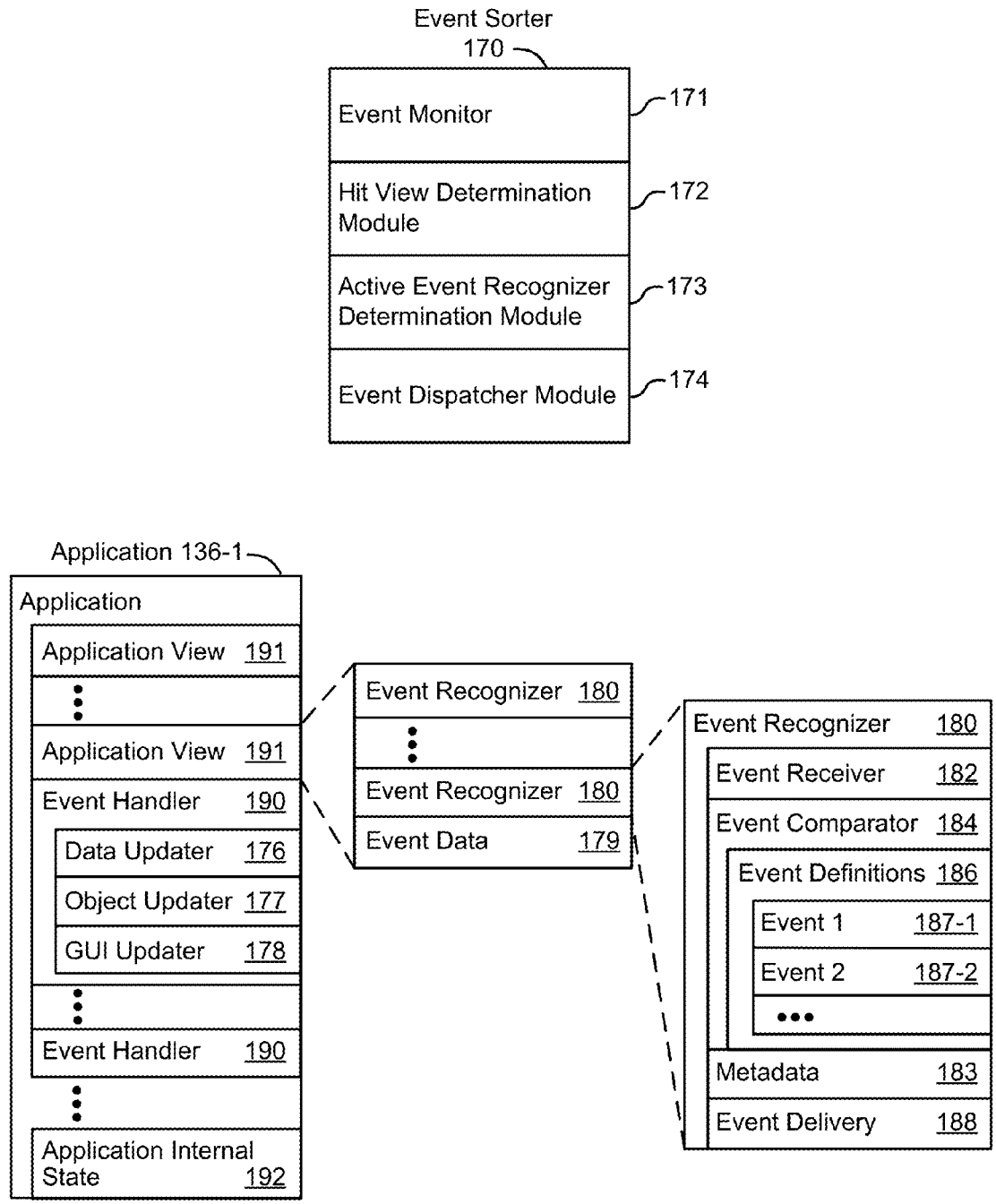
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in Figures IA) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In some embodiments, active event recognizer determination module 173 determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. However, in some embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In some embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
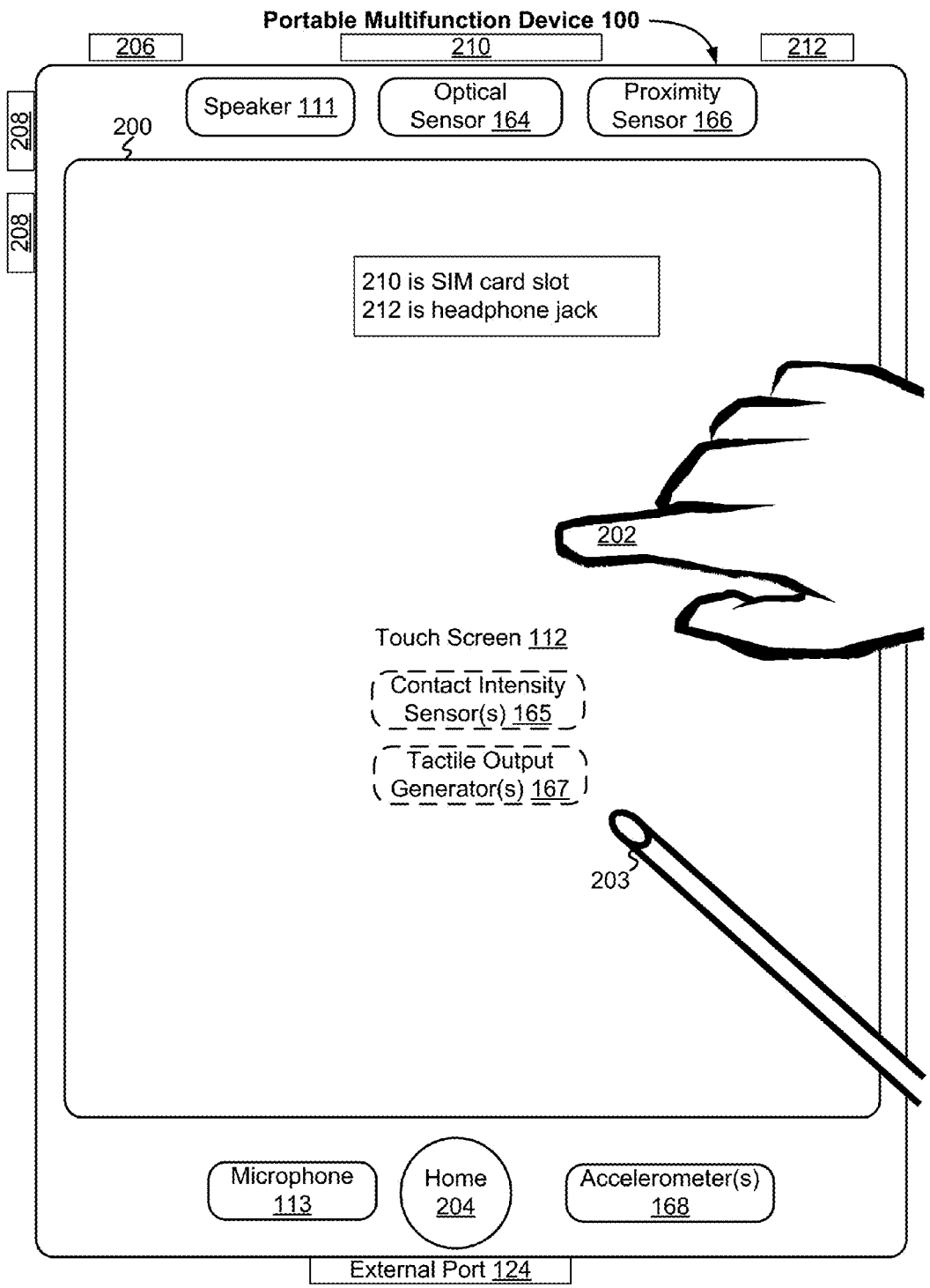
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. In some embodiments, the menu button 204 includes a fingerprint sensor that identifies a fingerprint on the menu button 204. The fingerprint sensor is optionally used to determine whether a finger on the menu button 204 has a fingerprint that matches a fingerprint used to unlock the device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

Figure 3:
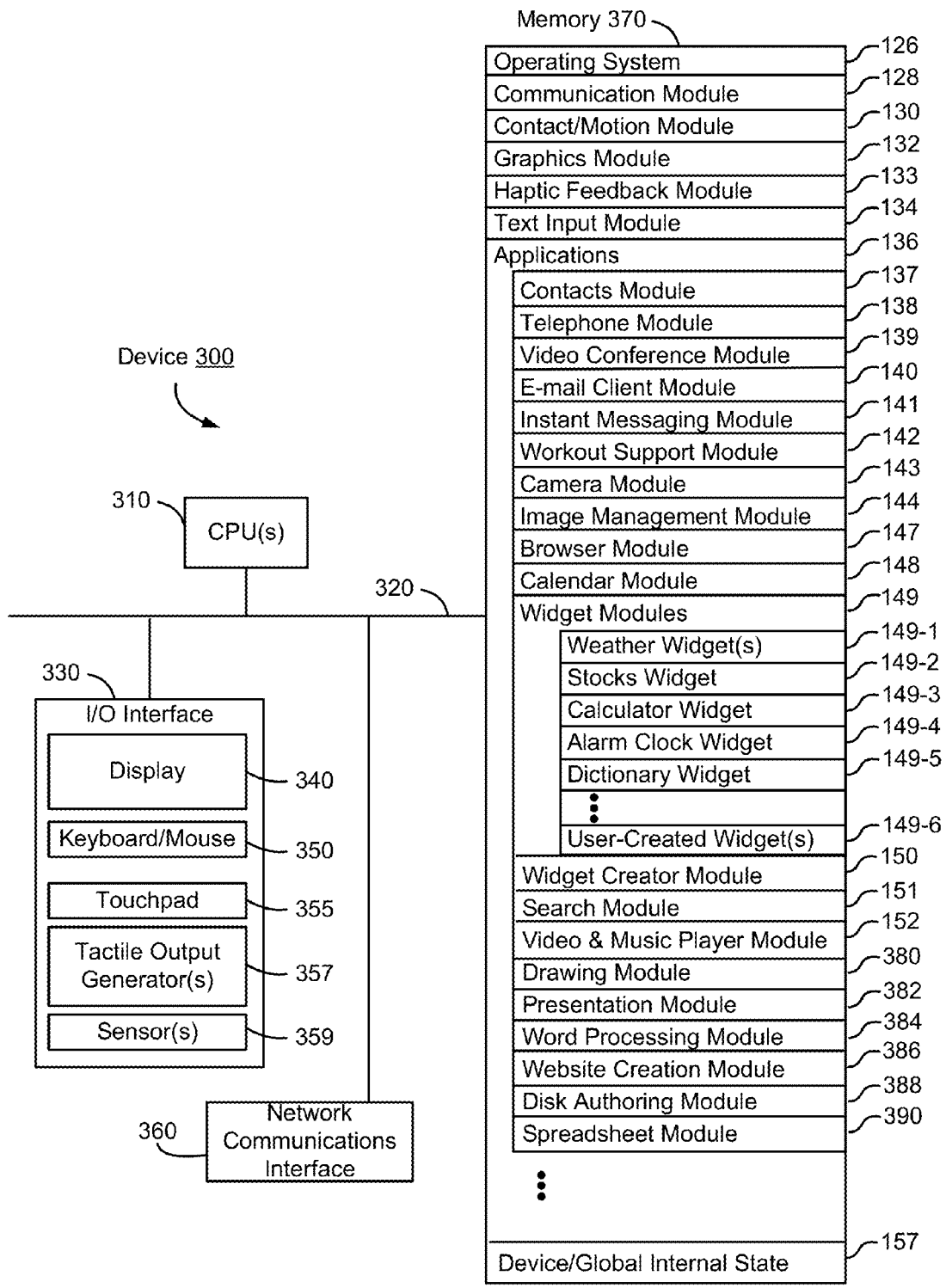
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to Figure IA). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
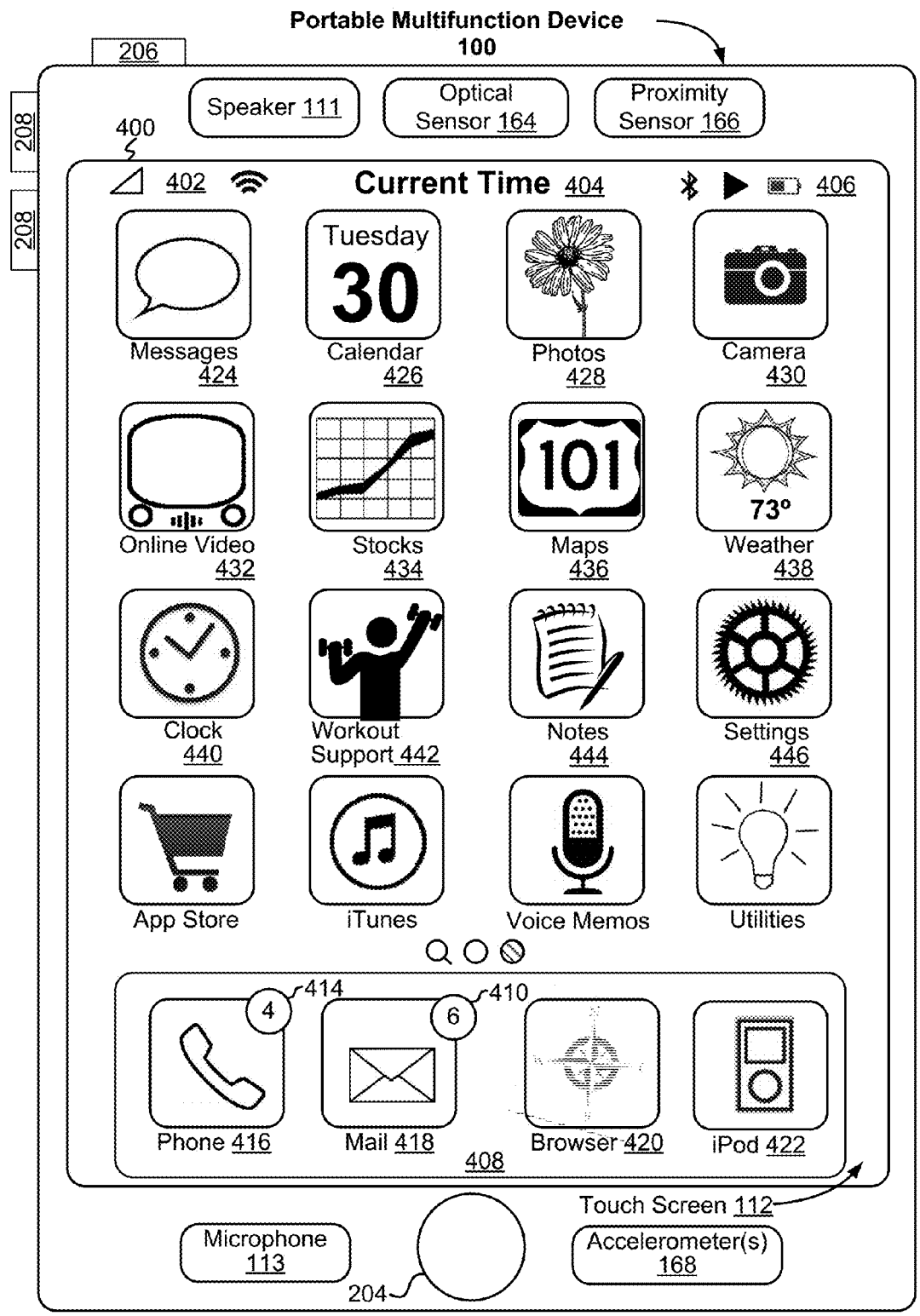
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals; Time 404; Bluetooth indicator 405; Battery status indicator 406; Tray 408 with icons for frequently used applications, such as: Icon 416 for telephone module 138, labeled "Phone," which optionally includes an indicator 414 of the number of missed calls or voicemail messages; Icon 418 for e-mail client module 140, labeled "Mail," which optionally includes an indicator 410 of the number of unread e-mails; Icon 420 for browser module 147, labeled "Browser;" and Icon 422 for video and music player module 152, also referred to as iPod (trademark of Apple Inc.) module 152, labeled "iPod;" and Icons for other applications, such as: Icon 424 for IM module 141, labeled "Text;" Icon 426 for calendar module 148, labeled "Calendar;" Icon 428 for image management module 144, labeled "Photos;" Icon 430 for camera module 143, labeled "Camera;" Icon 432 for online video module 155, labeled "Online Video"; Icon 434 for stocks widget 149-2, labeled "Stocks;" Icon 436 for map module 154, labeled "Map;" Icon 438 for weather widget 149-1, labeled "Weather;" Icon 440 for alarm clock widget 149-4, labeled "Clock;" Icon 442 for workout support module 142, labeled "Workout Support;" Icon 444 for notes module 153, labeled "Notes;" and Icon 446 for a settings application or module, which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with some embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

Haptic Output and Associated Processes

Attention is now directed towards embodiments of haptic output and associated processes that may be implemented on an electronic device, such as device 300 or portable multifunction device 100. Although the description below is with respect to device 100, the embodiments herein can be incorporated in device 300.

Figure 5:
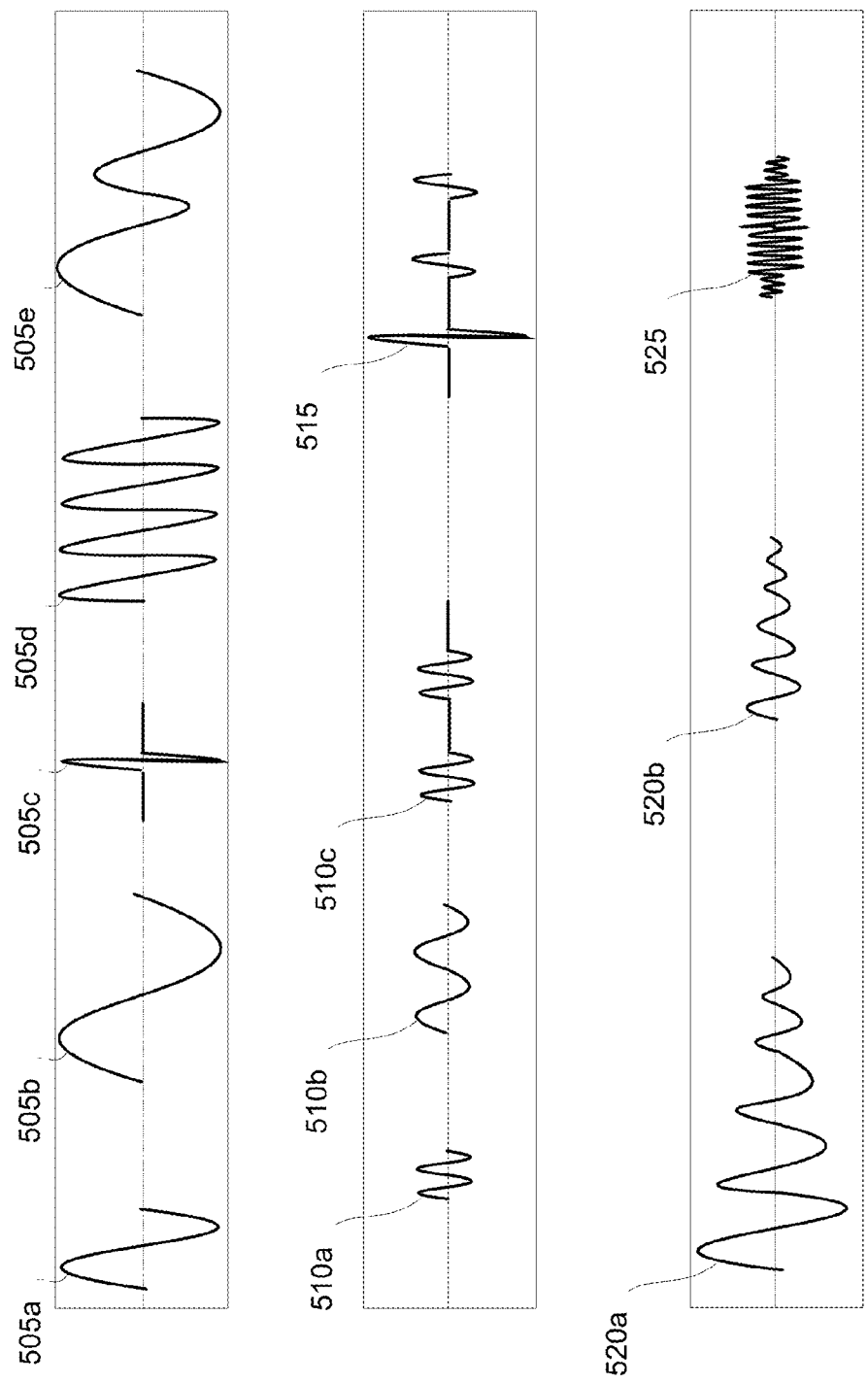
FIG. 5 depicts examples of various haptic waveform morphologies according to some embodiments.

FIG. 5 depicts examples of various haptic waveform morphologies according to some embodiments. The various haptic types serve as atomic haptic components that are used in various combinations to create various haptic waveforms having distinctive meanings. The examples below are described to establish a vocabulary for distinguishing between haptic output types herein. The haptic output types described herein are not meant to be exhaustive; other haptic waveforms can be used.

Waveforms 505 represent examples haptic waveforms with relatively large amplitudes, or "tap" type haptic outputs, according to some embodiments, that are readily perceptible (e.g., significantly above the absolute threshold of touch perceptibility for a given haptic device) by users of a device outputting the haptic, even if just a singular tap. As seen by the various tap haptic outputs 505a-e, the waveforms vary in amplitude, duration, and frequency. Typically, humans can perceive frequencies from 5 Hz to 29 Hz, and amplitudes of 0N to 1.0N (sones; equivalent to ~0-40 dBA), depending on kHz. Human hearing of audible amplitudes is the most sensitive at 1-4 kHz.

Waveforms 510 represent examples of haptic waveforms with relatively smaller amplitudes (and, optionally, shorter durations) as compared to waveforms 505, or "microtap" type haptic outputs, according to some embodiments, which are less readily perceptible (e.g., near the low threshold of touch perceptibility for a given haptic device) for users of a device outputting the haptic to detect as a singular microtap, but are easily perceptible if multiple microtaps are output in succession. The microtap waveforms 510a-c also vary in amplitude, duration, and frequency.

Waveform 515 represents an example combination haptic of a tap followed by two microtaps. Since microtaps less easily perceptible alone, waveforms that have a tap preceding a microtap can "prime" the user by getting his or her attention with tap, making the user more readily perceive the microtap.

Waveforms 520 represent examples of "fade" type waveforms, which have waves for a longer duration that decrease in amplitude over time. Waveform 520a is a "tap-fade" starting at a greater, tap-level amplitude, and ending in a microtap-level amplitude, and waveform 520b is a microtap-fade, starting at a lesser, microtap-level amplitude and ending at a lower amplitude.

Waveform 525 represents an example a "buzz" type waveform which is continuous high frequency typically lasting for a longer duration overall (e.g., 0.5 s to 1 s). A buzz can have a higher or lower amplitude according to various embodiments, and is perceptible to the user as a consistent vibration.

Various audio waveforms optionally are output synchronously to various haptic waveforms, so as to correspond in the audio domain to the frequency, amplitude and duration characteristics of the haptic outputs or to differentiate therefrom. Various atomic haptic components, such as those described above, are used in various combinations to create various haptic waveforms that correspond to audio waveforms. The atomic haptic components are modulated with different parameters (e.g., amplitudes, count/repetition, timing offsets) to generate different audio patterns directly from the haptic device itself, so that the audio waveform corresponds to the haptic waveform. In addition, some waveforms produced by haptic actuators (e.g., tactile output generator(s) 167) produce audible output of machine-like sounds such as "ticking" according to some embodiments. Alternatively, in some embodiments, a separate audio signal generator and output device (e.g., a tone generator and speaker) can be used to synchronously output audio waveforms that have differentiated waveforms from the haptic waveforms.

Figure 6:
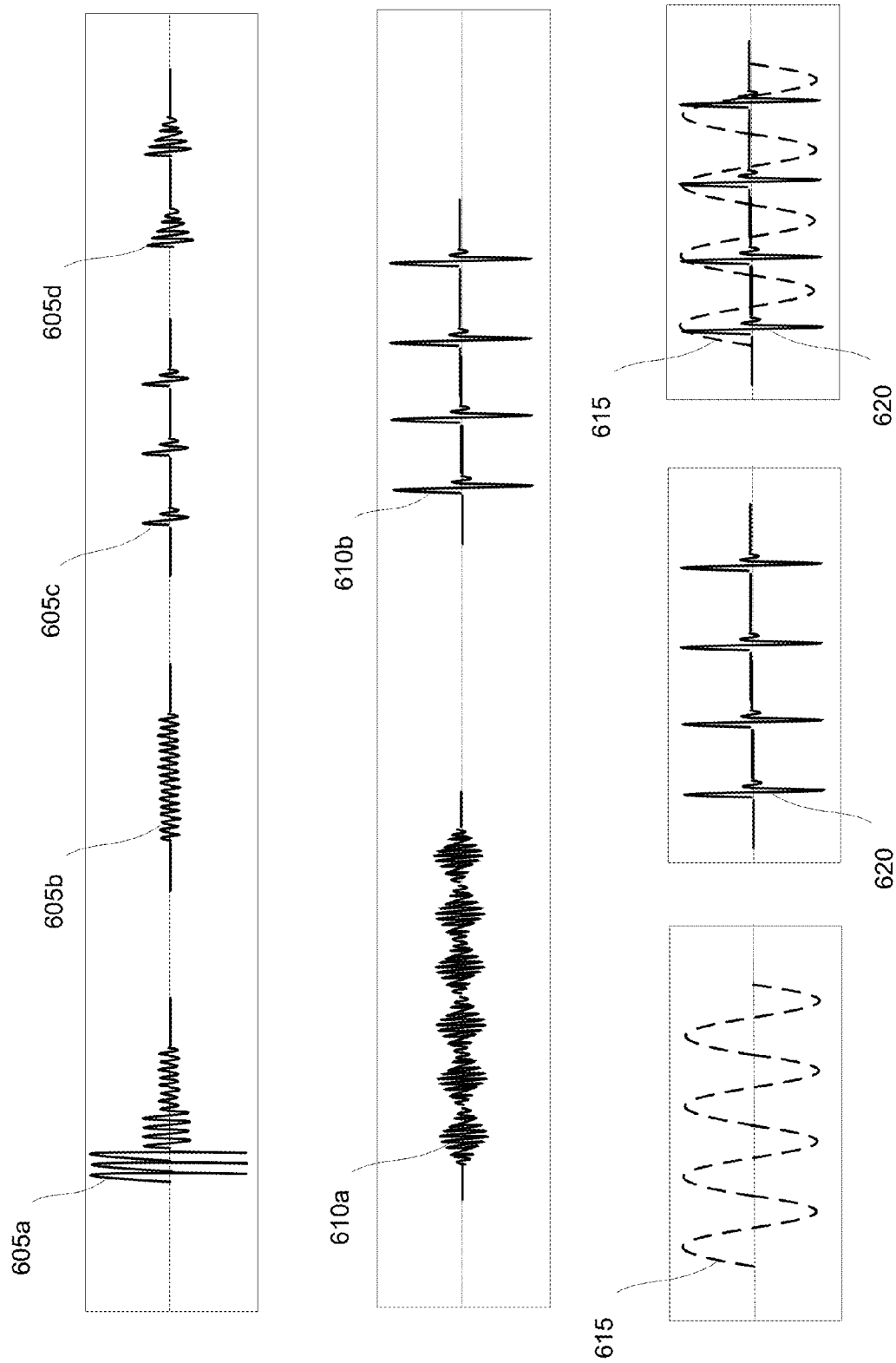
FIG. 6 depicts examples of various audio waveform morphologies according to some embodiments.

FIG. 6 depicts examples of various audio waveform morphologies according to some embodiments. Waveforms 605 represent examples of audio waveforms of various amplitude, duration, and frequency. Sometimes specialized waveforms are created to mimic common sounds that correlate with the activity the audio is to be paired with. Waveforms 610 are examples of specialized waveforms. Waveform 610a is a waveform that mimics a walkie-talkie sound, and waveform 610b is a waveform that mimics a heartbeat sound.

In some embodiments, when haptic and audio waveforms have corresponding morphologies, e.g., if the haptic waveform and the audio waveform have peaks at similar times and of similar durations such that the two waveforms look similar to each other, they are output synchronously. Waveforms 615 (haptic; dashed line) and 620 (audio; solid line) are shown separately, and then aligned and synchronized in time. In this example, the time alignment synchronizes a haptic waveform with a series of taps with a heartbeat-sounding audio waveform, to create a join sounds and feel of a heartbeat, e.g., for use in conjunction with a heartbeat monitor.

In some embodiments, the audio components share attributes, but still differ, e.g., a same ringtone or musical notes (same amplitude, frequency, and duration) played in different pitches or with using different musical instruments are used. Overlaying different audio (e.g., high vs. low pitch, same audio played in metallic vs. glass vs. ceramic tones, etc.) on the same haptic output creates different semantic components. These examples are not meant to be exhaustive; other audio waveforms can be used.

For example, a respective haptic output may be accompanied by a corresponding audio output, with at least a portion of the respective audio output concurrent with at least a portion of the respective haptic output, or the respective audio output occurs close in time to the respective haptic output so that the respective haptic output and the respective audio output are perceptually concurrent or simultaneous. The haptic and audio waveforms need not be perfectly aligned, and the device can take into account the fact that for certain classes of haptic and audio outputs, the haptic and audio outputs will be perceived by a user to be concurrent or simultaneous even if they are slightly offset in time (e.g., because audio output is processed more quickly than haptic output, so providing haptic output before providing audio output will, in some circumstance, cause a user to perceive the audio and haptic output as occurring concurrently or simultaneously). Variations in the accompanying audio portion also can vary between embodiments that include an audio output. For example, each of an amplitude of an audio component associated with the first output, a duration of the audio component associated with the first output, one or more musical qualities (e.g., pitch, tone, etc.) associated with the audio component associated with the first output, can vary in certain circumstances.

Application State-Based Haptic Output

Figure 7:
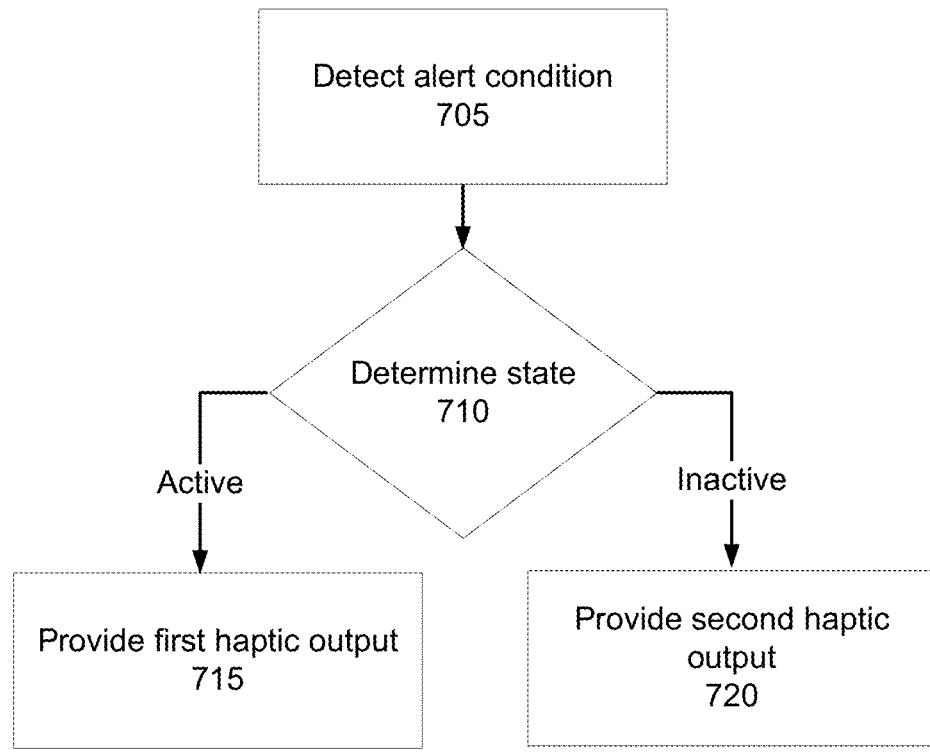
FIG. 7 is a flow diagram of a method for detecting an alert condition associated with an application and providing a corresponding haptic output according to some embodiments.

One or more states associated with an application at a time associated with a detected alert condition for the application provides the basis for providing a corresponding haptic output, according to some embodiments. Providing haptic output that correlates with the state of an application creates a more efficient human-machine interface, thereby reducing the amount of time it takes for a user to perform operations, which consequently reduces energy use and increases battery life for battery powered devices. FIG. 7 is a flow diagram of a method 700 for detecting an alert condition associated with an application and providing a corresponding haptic output according to some embodiments. Note that in some embodiments, different steps may be performed other than those shown in FIG. 7.

The method begins by a device 100 detecting 705 an alert condition associated with an application executing on a computing device 100 according to some embodiments. For an application executing on the computing device 100, the alert condition takes various form according to various embodiments. An alert condition is any event, notification, or other alert directed to a user of the device. One type of alert condition corresponds to an event that is automatically triggered by the application, or triggered from within the application. For example, an alert condition triggered by an application includes predetermined or scheduled alerts, such as reminders, scheduled notifications, or alarms generated by the application. A second type of alert condition is an automatically initiated event notification that is received by the application from a source external to the device. For example, a system generated email or message, such as a mass email, spam, system-generated email directed to a mailing list, or any other system generated communication. A third type of alert condition is a manually-initiated event notification, received by the application from a human user other than the user operating the device. For example, an incoming message or call from a known email address or phone number on the user's contact list. Various alert conditions can be detected, e.g., detecting receipt of an email or text message while a user interface of an email or messaging application is displayed on the display of the device.

Responsive to the alert condition, the device 100 determines 710 a state associated with the application at a time associated with the alert condition, according to some embodiments. In one example, the time associated with the alert condition is the time the alert is received. In a second example, the time associated with the alert condition is the time the alert is detected.

In some embodiments, determining 710 the state associated with the application at the time associated with the alert condition comprises determining whether a user interface for the application was displayed on the device at or around the time of the alert condition. In some circumstances it is the time of the alert condition, and in other circumstances the time period at issue includes a specified time interval surrounding the time associated with the alert condition, for example during a predefined time window spanning an interval before and/or after the time associated with the alert condition.

According to some embodiments, the state can be determined 710 by based on whether the application was executing on the computing device at the time associated with the alert condition, with a determination that the application was in the active state based on the application executing in the foreground. For example, a user interface element visible on the display of the device while the application is executing. In this case, a determination that the application was in the inactive state based on the application not executing on the computing device or executing in the background. For example, the device was not actively in use, or not performing calculations at the direction of the application, or not displaying a user interface element indicating an active state of the application. A combination of both the status of the user interface display and the activity state of the application optionally is used in the determination 710.

Figure 8:
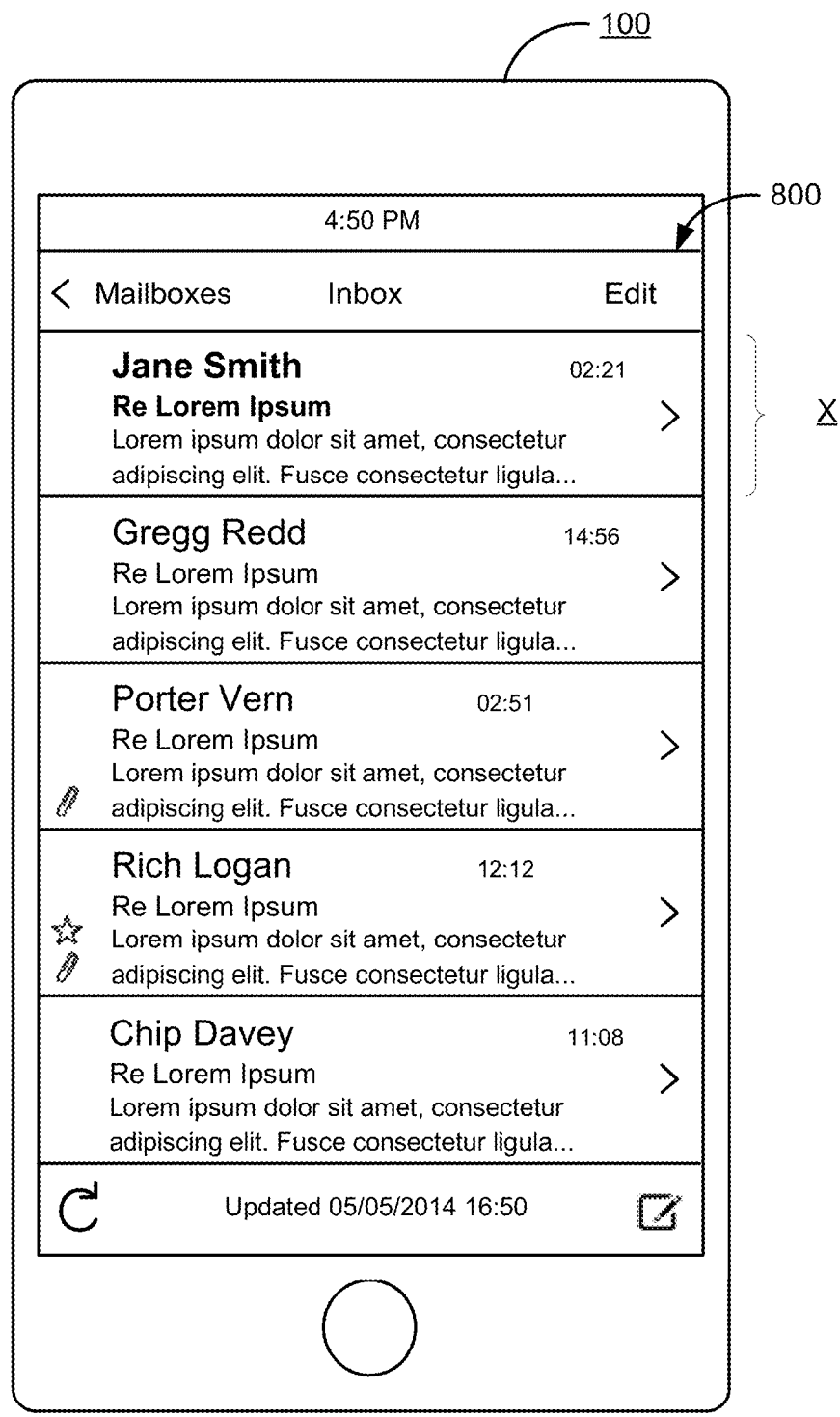
FIG. 8 displays an exemplary user interface of an email application according to some embodiments.

Referring to FIG. 8, there is shown an example of an email application 800 that is actively executing in the foreground on the device 100 and for which the user interface is visible, according to some embodiments. In this example, the email application 800 is in the active state. Conversely, an example of an inactive email application on device 100 is shown in FIG. 4A, in which the email application 800 either is not executing or is executing in the background, since it is not visible on the device 100.

Referring again to FIG. 7, in this example, the state associated with the application at the time associated with the alert condition is determined 710 based on whether the respective user interface window corresponding to the application was displayed in the foreground of the multi-application-window user interface at the time associated with the alert condition. For example, if multiple application windows are displayed in a stack, the application in the front most position in the z-layer is considered the active application. As known in the art, the respective user interface window is the application window that is receptive to, and/or configured to receive, user input or user interaction, sometimes referred to as the window that has focus.

According to some embodiments, one or more other user interface windows are concurrently displayed on a multi-application-window user interface on the device at the time associated with the alert condition, in which case determining 710 the state associated with the application at the time associated with the alert condition comprises determining whether a respective user interface window corresponding to the application was displayed in the multi-application-window user interface at the time associated with the alert condition.

According to some embodiments, another way of determining 710 the state associated with the application at the time associated with the alert condition comprises determining whether user input to the application was detected at the time associated with the alert condition, with the user interaction being different from the alert condition. For example, user input in various circumstances includes user touch input, speech input, or visual/gaze-based input, or any means of receiving user input to the application. The time associated with the alert in some cases is the time of the alert condition, and in other circumstances includes a specified time interval surrounding the time associated with the alert condition, for example during a predefined time window spanning an interval before and/or after the time associated with the alert condition.

In some embodiments in which it is determined 710 that the application was in the active state based on a detected user interaction at the time associated with the alert condition, the device 100 further determines a level of user engagement associated with the user interaction at the time associated with the alert condition. User engagement in some circumstances is a spectrum of possible user interactions with the application ranging from a lowest level of engagement such as eye gaze alone, through medium levels of engagement such as voice or touch alone, up to a greater level of engagement such as touch, voice, and eye gaze combined to focus on the application (e.g., either current level of engagement, historical level of engagement over a predetermined time period, or a combination of the two).

Determining 710 the state associated with the application at a time associated with the alert condition comprises, in some embodiments, determining a state of the computing device at the time associated with the alert condition. In this example, determining that the application was in the active state comprises determining that the computing device was active at the time associated with the alert condition. For example, an active device includes a device that is powered on (e.g., the display is on) and/or in active use according to some embodiments. Likewise, determining that the application was in the inactive state comprises determining that the computing device was inactive in some way at the time associated with the alert condition. For example, a powered down device, a device in sleep or hibernation mode, a device not in active use, a device with the display turned off each correspond to an inactive device in various circumstances.

In accordance with a determination that the application was in an active state at the time associated with the alert condition, the device 100 provides 715 a first haptic output having a first set of output characteristics, according to some embodiments.

The first set of characteristics for the first haptic output includes one or more of: an amplitude, a duration, a regularity, a repetition frequency, or a variations of atomic haptic features of the first haptic output. In some circumstances, the first haptic output is accompanied by a first audio output. For example, a respective haptic output may be accompanied by a corresponding audio output, with at least a portion of the respective audio output concurrent with at least a portion of the respective haptic output, or the respective audio output occurs close in time to the respective haptic output so that the respective haptic output and the respective audio output are perceptually concurrent or simultaneous. The haptic and audio waveforms need not be perfectly aligned, and the device 100 can take into account the fact that for certain classes of haptic and audio outputs, the haptic and audio outputs will be perceived by a user to be concurrent or simultaneous even if they are slightly offset in time (e.g., because audio output is processed more quickly than haptic output, so providing haptic output before providing audio output will, in some circumstance, cause a user to perceive the audio and haptic output as occurring concurrently or simultaneously). Variations in the accompanying audio portion also can vary between embodiments that include an audio output. For example, each of an amplitude of an audio component associated with the first output, a duration of the audio component associated with the first output, one or more musical qualities (e.g., pitch, tone, etc.) associated with the audio component associated with the first output, can vary in certain circumstances.

The first and second sets of characteristics correspond to a device type of the computing device, according to some embodiments. For example, for the same event, the device 100 optionally provides different haptic outputs based on type of device (e.g., phone vs. watch vs. laptop computer vs. other handheld device). In some embodiments, however, the difference between the haptic component of the first output and the haptic component of the second output are maintained without regard to the device on which they are being performed. In this circumstance, on all device types the same pattern of haptic outputs is provided, but the differences in amplitude of the haptic outputs is based on the device on which the outputs are being performed.

Variations in the device itself, and thus the specifics of the haptic outputs, vary according to different embodiments. For example, in some circumstances the device has a touch-sensitive display. In some embodiments, the first haptic output and the second haptic output are provided via the touch-sensitive display on the computing device. In this example, the device 100 can both received user touch input via the touch-sensitive display and provide haptic output via the same touch-sensitive display. This bi-directional touch sensitivity allows the device 100 to provide feedback based on received user input according to some embodiments.

As noticed above, the device 100 optionally determines a level of user engagement associated with the user interaction at the time associated with the alert condition. In these circumstances, the device 100 further determines one or more of the first set of output characteristics for the first haptic output based on the determined level of engagement. In some embodiments, amplitude, duration, repetition frequency of the audio and/or haptic component may be varied inversely with a measure of user interaction/engagement with the application. Thus, for higher degrees of user interaction, the first set of output characteristics are selected so as to make the first output have a lower intensity, such that it is more subtle and less perceptible. Thus, the user is not exposed to an unduly strong signal when the user already has a high degree of engagement or interaction with the application. If the user is less engaged, then a higher intensity signal is provided to the user to draw additional attention to the device or application, according to some embodiments. For example, if the detected user interaction comprises a touch input or touch gesture (and/or user gaze) reflecting an elevated level of user interaction/engagement, then a weaker or less pronounced output is provided to the user, since the user is likely aware of the alert condition by virtue of being more engaged with the application (interacting with the application through sight or touch). If the detected user interaction comprises a voice input but no accompanying touch or gaze, reflecting lower level or measure of engagement with the application, then a stronger and more pronounced output optionally is provided to draw additional attention to the alert condition.

In accordance with a determination that the application was in an inactive state at the time associated with the alert condition, the device 100 optionally provides 720 a second haptic output that represents the occurrence of the alert condition, the second haptic output having a second set of output characteristics, wherein the second haptic output is different from the first haptic output.

According to some embodiments, the second haptic output is different and has a greater intensity than the first haptic output. For example, the signal amplitude optionally is larger, the frequency higher, and/or the duration longer than the first haptic output. The second haptic output has a greater intensity than the first haptic output in some circumstances. In some embodiments, the haptic component of the first output has a first set of parameters (e.g., lower amplitude, less periodic/regular, lower repetition frequency or count of events, shorter duration of output, less intrusive/perceptible/pronounced), is constituted of a first set of haptic features or atomic haptic components that are less pronounced (e.g., microtaps) during the active state of the device than a second set of parameters during the second state. Similarly, if accompanied with respective audio components, the audio component of the first output has a first set of parameters (e.g., lower amplitude, shorter duration of output, less intrusive/perceptible/intense audio notes) during the active state and a second set of parameters during the inactive state. The purpose of the higher intensity output is to draw elevated user attention to the alert condition when the application is in the inactive state according to some embodiments.

As discussed above, the device 100 state optionally is used to determine the modulation, or output characteristics, of the haptic output. For example, when the device is in a power conserving state (e.g., because the device battery life has dropped below a predefined threshold, such as 5%, 10%, 15%, or 20%), haptic outputs that conserve power are used according to some embodiments (e.g., haptic outputs with lower amplitude, shorter duration, and/or lower frequency), even if those haptic outputs are less likely to be noticed by the user. When the device is not in the power conserving state, default haptic outputs are used in some circumstances even if those haptic outputs do not conserve power (e.g., haptic outputs with relatively higher amplitude, longer duration, and/or higher frequency relative to the haptic outputs that conserve power). In some embodiments the difference between the haptic component of the first output and the haptic component of the second output is maintained even when power conserving haptic outputs are used because the device is in a power conserving state.

As with the first haptic output, the second haptic output optionally is accompanied by an audio output, with the waveform of the second haptic output generated being based on, mirroring, and synchronized to a waveform of the accompanying audio output. In some embodiments, waveforms of the haptic components are generated from and match with, mimic, mirror, or are synchronized to waveforms of the respective audio components, as discussed in conjunction with FIG. 6.

Various combinations of haptic and audio can be output by the device to provide different semantic information to the user. As a first example, the first haptic output is not accompanied by audio output but the second haptic output is accompanied by an audio output. As a second example, the first haptic output is accompanied by a first audio output and the second haptic output is accompanied by a second audio output different from the first audio output.

A given haptic waveform can generate different perceptions and hence semantic information when accompanied by different audio waveforms. For example, a haptic component output with a high frequency audio tone results in different perceptible unit, and hence semantic information as compared to the same haptic component output with a low frequency audio tone. The high frequency tone may be used to draw elevated user attention to a significant occurrence in the class of events represented by the haptic output, whereas the low frequency tone may be used to indicate a state change in the class of events. For example, a given haptic output may be used to indicate receipt of a text message, and accompanied by either a high frequency tone for an urgent message (or one from a designated sender) or a low frequency tone for a non-urgent message or one received from a non-designated sender. Additionally, for two related alerts (e.g., an alert corresponding to receiving a text message and an alert corresponding to receiving a mail message) have different corresponding audio components with the same cadence and thus use the same haptic component (e.g., the shared haptic component provides information that the two alerts correspond to message receipt alerts, while the different audio components provide information as to which type of message was received).

In some embodiments, the first haptic output is similar, identical, or substantially identical to the second haptic output. As one example, the first haptic output is accompanied by an audio output and the second haptic output is accompanied by the same audio output; in this example the first haptic output is different from the second haptic output. Recall the above example of the active email application 800 of FIG. 8 and the inactive one of FIG. 4A. Below is a table showing exemplary alert condition information for an email application 800 and outputs corresponding to the various conditions, states, modes, and conditions.

TABLE 1

EMAIL

| Alert Condition | Primary Application State | Mode | Condition | Haptic Output | Audio Output |
|---|---|---|---|---|---|
| Email received | Active | Mailboxes | No new message | X | X |
| Email received | Active | Inbox | No new message | X | X |
| Email received | Active | Message | No new message | X | X |
| Email received | Active | Sent | No new message | X | X |
| Email received | Active | Draft | No new message | X | X |
| Email received | Active | Search | No new message | X | X |
| Email received | Active | Background | No new message | X | X |
| Email received | Inactive | N/A | No new message | X | X |
| Email received | Active | Mailboxes | New message | Microtap | Email Receive Default |
| Email received | Active | Inbox | New message | X | Email Receive Default |
| Email received | Active | Message | New message | Microtap | Email Receive Default |
| Email received | Active | Sent | New message | Microtap | Email Receive Default |
| Email received | Active | Draft | New message | Microtap | Email Receive Default |
| Email received | Active | Search | New message | Microtap | Email Receive Default |
| Email received | Active | Background | New message | Fade tap | Email Receive Default |
| Email received | Inactive | N/A | New message | Fade tap | Email Receive Default |

Table 1 shows a variety of possible outputs based on variations of a single alert condition of an email being received. The first seven rows show the application in an active state with no new message, according to various modes that the application could be in when the email is received: with the application displaying the mailboxes screen, displaying the inbox, displaying a selected message, displaying the sent messages box, displaying a draft in progress, an email search field, and when the application is executing in the background. Since no new message is received in the first eight rows, no output (haptic or otherwise) is present.

However, the last eight rows show the condition of a new message being received and the corresponding outputs. As shown, for most of the active modes, the haptic output is a microtap and the audio output is an email received default audio. However, for the last row in which the application is inactive and the second to last row in which the application is active but is executing in the background, the haptic output is a fade tap and the audio output remains the email received default. Thus, the audio output is maintained regardless of whether the application is active, but the haptic output has a higher intensity (a fade tap versus a microtap) when the application is inactive or executing in the background. Table 1 provides conditions and corresponding outputs according to some embodiments, but is merely exemplary; other combinations of alerts, states, modes, conditions and outputs are used according to different embodiments.

As one example, at a first point in time, while the application is in the active state, the device 100 detects 705 a first alert condition associated with the application and responsive to detecting the first alert condition while the first application is in the active state, provides 715 a first output representing the first alert condition. At a second point in time, while the first application is in an inactive state, the device 100 detects a second alert condition and responsive to detecting the second alert condition while that the application is in the inactive state, providing 720 the second haptic output representing the second alert condition, the second haptic output different from the first haptic output.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 1200, 1300, 2500, 2600, 3000, and 3200) are also applicable in an analogous manner to method 700 described above with respect to FIG. 7. For example, the inputs, alert conditions, applications, states, and haptic outputs described above with reference to method 700 optionally have one or more of the characteristics of the inputs, alert conditions, applications, states, and haptic outputs described herein with reference to other methods described herein (e.g., methods 900, 1000, 1100, 1200, 1300, 2500, 2600, 3000, and 3200). For brevity, these details are not repeated here.

Alert Condition Trigger-Based Haptic Output

Figure 9:
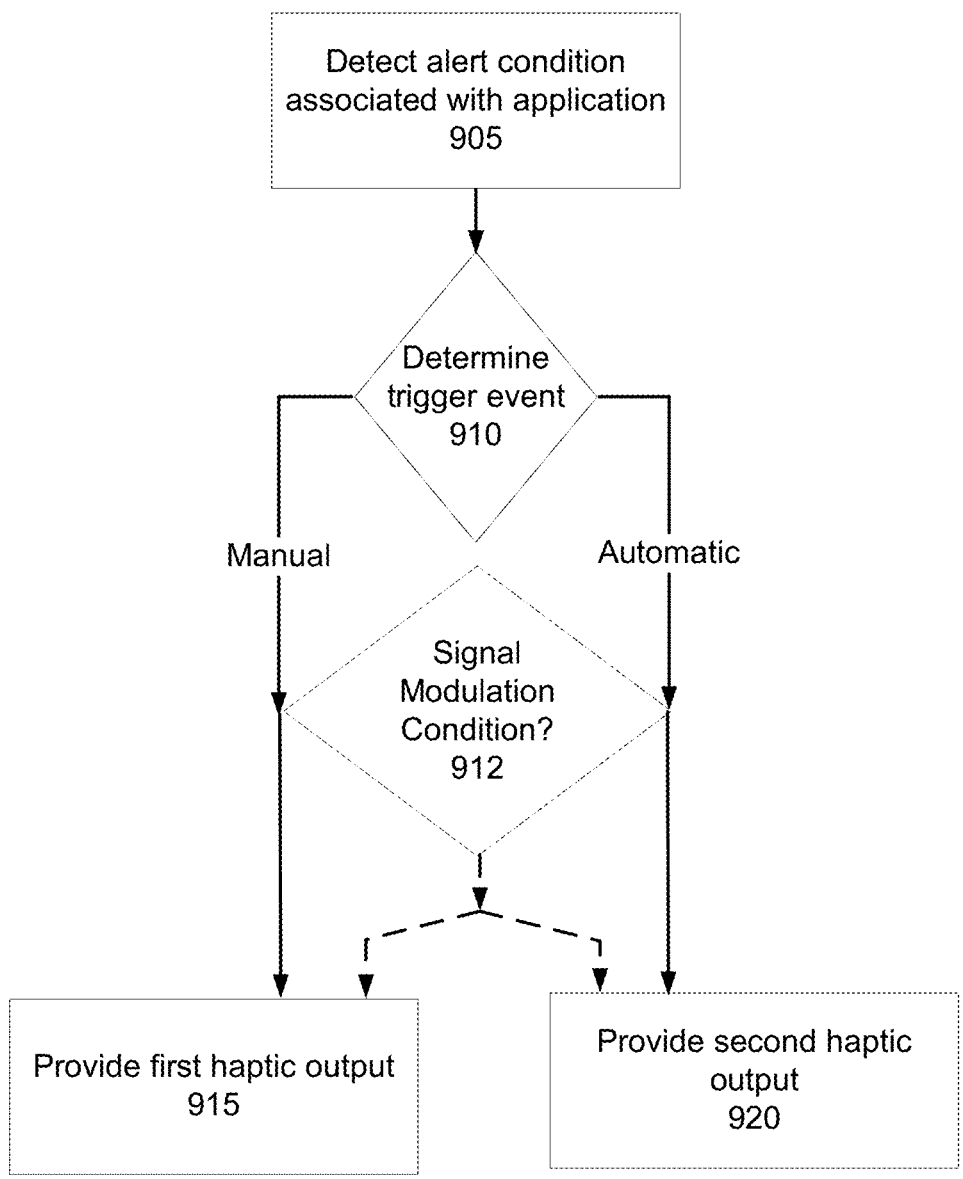
FIG. 9 is a flow diagram of a method for detecting an alert condition associated with an application and providing a haptic output depended on whether the condition was triggered by a manually- or automatically-initiated event according to some embodiments.

Alert conditions can be manually or automatically triggered. Whether a detected alert condition was manually or automatically triggered provides the basis for providing a corresponding haptic output, according to some embodiments. Providing haptic output that correlates with whether an alert condition was manually or automatically triggered creates a more efficient human-machine interface, thereby reducing the amount of time it takes for a user to perform operations, which consequently reduces energy use and increases battery life for battery powered devices. FIG. 9 is a flow diagram of a method 900 for detecting an alert condition associated with an application and providing a haptic output dependent on whether the condition was triggered by a manually-initiated or automatically-initiated event according to some embodiments. Note that in some embodiments, different steps may be performed other than those shown in FIG. 9.

The method begins by the device 100 detecting 905 an alert condition associated with an application. For an application executing on a computing device 100, the alert condition takes various forms according to various embodiments. An alert condition is any event, notification, or other alert directed to a user of the device. One type of alert condition corresponds to an event that is triggered by a manually-initiated event, and a second type of alert condition corresponds to an event that is triggered by an automatically-initiated event. In some circumstances, the device 100 has a touch-sensitive display.

Responsive to detecting the alert condition, the device 100 determines 910 whether the alert condition was triggered by a manually-initiated event. This step comprises determining whether the alert condition corresponds to an event initiated by a human user. Various circumstances can contribute to determination by the device 100 whether the event was initiated by a human user, as further discussed below in conjunction with Table 2.

In some embodiments, determining 910 that the alert condition characteristics indicate that the alert condition was triggered by a manually-initiated event comprises determining whether the alert condition corresponds to an event initiated by a human user other than a user of the computing device. Some exemplary conditions for this determination also are shown in Table 2 as discussed below.

Determining that the alert condition was triggered by a manually-initiated event, in some embodiments, comprises determining whether the alert condition corresponds to an input received from a human user, identifying a user of the computing device, and comprising an indication from the human user to alert the user of the computing device as to the input. In some embodiments, the input received from a human user is from the user of the device 100, however, in some embodiments the input is received from another user on another device (e.g., a sender of a personal message from the other user to the device user).

Table 2 shows a few exemplary circumstances under which the device 100 has information used to determine 910 that the alert condition was triggered by a manually-initiated event, whether it was initiated by a human user, and whether that user was a user different from the user of the device 100. The applications shown in Table 2 include Messages, Email, Phone, Calendar, Timer, Activity Monitor, and Social Networking, but could be any other applications providing similar information to the device 100 for making this determination.

TABLE 2

MANUAL/AUTOMATIC

| Application | Alert Condition | Condition | Human/ Auto Initiated | User | Haptic Output | Audio Output |
|---|---|---|---|---|---|---|
| Messages | Message received | New message | Human/ Auto | No | Tap | Message Receive Default |
| Messages | Message sent | New message | Human | Yes | Tap-Tap | Message Sent Alert |
| Email | Email received | New message | Human/ Auto | No | X | Email Receive Default |
| Email | Email sent | New message | Human | Yes | X | Email Send Default |
| Phone | Incoming call | Call | Human/ Auto | No | Buzz-Buzz | Default ring |
| Phone | Answer call | Answer | Human | Yes | Microtap | Default receiver |
| Phone | Hang up call | Hang up | Human | Yes | Microtap | Default receiver |
| Calendar | Reminder | Event start | Auto | No | Tap | Default Reminder |
| Timer | End | Time elapsed | Auto | No | Buzz-buzz | Default timer |
| Activity Monitor | Update | Activity target reached | Auto | No | Tap | Intense Activity Chime |
| Social Networking | Notification | Tagged in post | Human | No | Tap | Default Notification |
| Social Networking | Email | Activity Summary | Auto | No | X | Email Receive Default |

For the examples shown, the human/auto column shows whether the particular alert, condition, and application corresponds to an alert that could be manually (human) initiated, automatically initiated, or if it could be initiated by either human or automatic means. For example, the second, fourth, sixth, and seventh rows each indicate a manual action by a human user. In these examples, an action has been taken specifically by the user of the device (User column), such as user input into an application on the device (e.g., the Message, Email, or Phone applications), so the device 100 can easily determine that the user was human user, and the device user more specifically. However, in other circumstances some alert conditions are of the type known to the device 100 as able to be generated either manually, by a human user, or automatically. For example, rows one, three, and five have alert conditions in this category. Specifically, a New message received in a Messages application typically is a manual (human-initiated) event, e.g., a text or other message sent by a different device user. However, messages also can be auto-generated by a system, such as spam or advertising text messages. Similarly, a New email message can be initiated by either a human user or automatically by a system, such as a mass email, spam email, or subscription listsery email, which could be generated by a bot, for example. In the final example, an Incoming call in a Phone application typically is a human-initiated event, but also can be an auto-initiated call by a system auto-dialing a list of callers, e.g., soliciting donations or as part of a political campaign. In each of these circumstances, additional information is needed about the source of the alert condition to be able to make a more conclusive determination as to whether the event was manually or automatically initiated.

For example, for an email or message, the device 100 can determine whether the alert condition corresponds to a personal communication from a sender in a list of contacts managed, created, controlled, or otherwise associated with the user. The simplest example is an actual contacts file, such as contacts cards with email addresses or phone numbers, but other contacts lists also include email addresses or phone numbers that the user previous has communicated to or from in some circumstances. These examples are just that; there are many other means by which the device 100 could ascertain whether a communication is likely to have been initiated manually by a human user.

Another example is shown in the second to last row of Table 2. In this example, a Social Networking application sends a Notification that the user has been Tagged in a post. While the communication itself came from a social networking server, the content of the Notification indicates that the post was initiated manually by a human user who is connected to the device user within the social networking application.

In accordance with a determination that the alert condition was triggered by a manually-initiated event, the device 100 provides 915 a first haptic output corresponding to a manually-initiated event notification according to some embodiments.

Once the device 100 determines that the alert condition was initiated by a manual event, a haptic output is provided that corresponds to the alert condition. The first haptic output is provided via a touch-sensitive display of the computing device, according to some embodiments. In some embodiments, the determining further comprises determining a measure of urgency associated with the manually-initiated event and modulating 912 an intensity of the first haptic output based on the measure of urgency. For example, the device 100 analyzes the content of an incoming message from another end user to determine the urgency of the message. Accordingly, the device 100 examines date information in an email or subject/contents of a message, keywords used in the subject or message (e.g., "urgent"), or examines metadata included in the message such as an "important" flag in some embodiments. The device 100 determines whether senders or recipients of the message include individuals flagged by the user as important people or with some other special designation according to some embodiments. The device 100 then provides 915 haptic and/or audio output that is proportionate in intensity (e.g., amplitude, duration, frequency) to the urgency associated with the content of the incoming message. In general, expected or less urgent notifications/outputs have one set of output characteristics and unexpected notifications have a second set of output characteristics that are more intense, in order to attempt to draw elevated user attention, according to some embodiments.

In some circumstances, the device 100 determines one or more contextual attributes associated with the manually-initiated event and modulates 912 the intensity of the haptic output on that basis. For example, various factors may be considered to evaluate contextual attributes associated with an incoming manual notification and the strength of the haptic or audio notification that should be provided. Contextual attributes include an identity of the recipient sending the message, inclusion of and identification of other recipients of the message, timing of receiving the message, location of the user when receiving the notification, activity being performed by the user when receiving the notification, the medium used to communicate the message, etc.; this list is not exhaustive.

According to some embodiments, wherein the first haptic output that corresponds to the manually-initiated event notification is more intense than the second haptic output that corresponds to the automatically-initiated event notification. For example, the more intense output is more likely to draw elevated user attention to the manually-initiated event. In some circumstances, by virtue of being more personal, targeted, and having a higher likelihood of being directly relevant to the user of the device, the haptic for the manually-initiated alert helps to draw the user's immediate attention to an event determined by the system to be more in need of the user's immediate attention.

For example, the first haptic output is characterized by a first set of characteristics comprising one or more of: an amplitude of the first haptic output, a duration of the first haptic output, a regularity associated with the first haptic output, repetition frequency of haptic features in the first haptic output, and a selection of haptic features constituting the first haptic output, according to some embodiments. The second haptic output is characterized by a second set of characteristics comprising one or more of: an amplitude of the second haptic output, a duration of the second haptic output, a regularity associated with the second haptic output, repetition frequency of haptic features in the second haptic output, and a selection of haptic features constituting the second haptic output.

In some circumstances two manually-initiated events can be received in a row. A first alert condition can be detected corresponding to an incoming email message from a first human sender and responsive to determining that the incoming email message corresponds to a manually-initiated event, the device 100 provides the first haptic output. A second alert condition is detected corresponding to an incoming text message from a second human sender and responsive to determining that the incoming text message corresponds to a manually-initiated event, the device 100 provides the first haptic output. Many other variations are possible according to some embodiments.

In response to detecting the alert condition associated with the application, in accordance with a determination that the alert condition was triggered by an automatically-initiated event, the device 100 provides 920 a second haptic output corresponding to an automatically-initiated event notification, wherein the second haptic output is different from the first haptic output.

Many examples exist of alert conditions triggered by automatically-initiated events. Referring again to Table 2, the alert conditions for the Calendar, Timer, and Activity Monitor applications each are of the automatic variety, and are generated by the application itself. In a slightly different example, the last row shows an alert condition that is an Activity Summary for social networking in the form of an email. In this example, the alert condition is a scheduled, regular occurrence. Thus, even though the summary may include some event information related to user-initiated actions (e.g., the example above of being tagged in a post by another user), the email from the social network summarizes activity over the course of a day or a week that includes the specific post, but the email is not considered a manually-initiated event, because it was not triggered by a request or indication from a human user (it merely includes that information). The second haptic output is provided via a touch-sensitive display of the computing device, according to some embodiments.

According to some embodiments, the device 100 determines that the alert condition was automatically triggered by the application (e.g., a predetermined or scheduled alert such as a reminder notification or an automated alarm generated by the application), or was an automatically-initiated event notification received by the application from a source external to the device (e.g., an automatically/system-generated email or message). For example, a sender's email address of noreply@domain.com is a hint that the email was sent by automatic means, as there is no actual human sender to reply to in response to the email.

In accordance with a determination that the automatically-initiated event corresponds to an event occurring external to the device 100, the device 100 provides a first variant of the second haptic output according to some embodiments, corresponding to a notification of an externally occurring automatically-initiated event. Likewise, in accordance with a determination that the automatically-initiated event corresponds to an event initiated within the device, the device 100 provides a second variant of the second haptic output corresponding to a notification of an internally-generated, automatically-initiated event. Thus, different notifications are provided for the same application depending on whether the event was generated by an incoming message or not according to some embodiments.

Determining by the device 100 that the alert condition occurs at predetermined time or reports on satisfaction of a predetermined triggering condition indicates that the alert condition has an automatic trigger according to some embodiments. For example, satisfaction of some predetermined triggering condition (e.g., your activity goal for the day has been met, you have left the geo-fenced area, etc.) is an automatic-type trigger.

As with manually-initiated alert triggers, the device 100 analyzes characteristics associated with the alert condition to determine one or more contextual attributes associated with the automatically-initiated event and modulates 912 intensity of the second output based on the one or more contextual attributes. Various factors are considered when evaluating contextual attributes associated with an automated notification and the strength of the haptic or audio notification that should be provided according to various circumstances. For example, the type of notification (e.g., a one-time event versus a repeating event such as a periodic/ repeating alarm), location of the user at a time of occurrence of the event, externally triggered or internally triggered notifications, activities being performed by the user at a time of receiving the notification, and for an external notification, the medium used to communicate the message.

As with manually-triggered events, for an automatically-initiated event the device 100 determines a time-varying measure of urgency associated with the automatically-initiated event and modulates 912, over a specified window of time, a intensity of the second haptic output to indicate the time-varying measure of urgency. For example, for an automatically-initiated (e.g., internal, prescheduled) trigger, the set of haptic parameters are modulated 912 based on urgency or timing of the event associated with the notification. For instance, for a camera application, the device 100 provides a series of microtap outputs building up to the photo being taken, the intervals between the microtaps progressively decreasing as the time for taking the photo approaches according to some embodiments, providing a time-varying output that builds up the sense of urgency or aids in user understanding of the timing factor.

In some embodiments, the first set of characteristics for the first haptic output differs from the second set of characteristics for the second haptic output. Similarly, if accompanied by respective audio components, the audio component of the first output has a first set of parameters (higher amplitude, longer duration of output, more intrusive/perceptible/pronounced audio notes) for the manually-initiated event notification than for the automatically-initiated event notification.

A specific example includes detecting an alert condition associated with an application and responsively determining whether the alert condition corresponds to a personal communication from a sender in a list of contacts associated with the user, in which case a first haptic output corresponding to a personal alert notification is provided, or whether the alert condition does not correspond to a personal communication from a sender in a list of contacts associated with the user, in which case a second haptic output corresponding to an automatic alert notification is provided, with the first haptic output having a greater intensity than the second haptic output.

A haptic output optionally is accompanied by a corresponding audio output, with at least a portion of the respective audio output being concurrent with at least a portion of the respective haptic output, or the respective audio output occurring close in time to the respective haptic output so that the haptic output and the respective audio output are perceptually concurrent or simultaneous. The haptic and audio waveforms need not be perfectly aligned, and the device 100 can take into account the fact that for certain classes of haptic and audio outputs, the haptic and audio outputs will be perceived by a user to be concurrent or simultaneous even if they are slightly offset in time (e.g., because audio output is processed more quickly than haptic output, so providing haptic output before providing audio output will, in some circumstance, cause a user to perceive the audio and haptic output as occurring concurrently or simultaneously). Variations in the accompanying audio portion also can vary between embodiments that include an audio output. For example, each of an amplitude of an audio component associated with the first output, a duration of the audio component associated with the first output, one or more musical qualities (e.g., pitch, tone, etc.) associated with the audio component associated with the first output, can vary in certain circumstances.

As with the first haptic output, the second haptic output is accompanied by an audio output, with the waveform of the second haptic output generated being based on, mirroring, and synchronized to a waveform of the accompanying audio output, according to some embodiments. In some embodiments, waveforms of the haptic components are generated from and match with, mimic, mirror, or are synchronized to waveforms of the respective audio components, as discussed in conjunction with FIG. 6.

Various combinations of haptic and audio waveforms are output according to some embodiments. According to some embodiments, the first haptic output is not accompanied by audio output but the second haptic output is accompanied by an audio output. In one example, the first haptic output is accompanied by a first audio output and the second haptic output is accompanied by a second audio output; in this case the first haptic output is identical to the second haptic output and the first audio output is different from the second audio output. In some embodiments, the same haptic waveform generates different perceptions when accompanied by different audio waveforms. For example, if an audio (ring) tone is played with a high pitch versus a low pitch, and accompanied by the same haptic component (or substantially similar haptic components that a typical user will not be able to differentiate between), the perception of the haptic component differs despite the identical haptic. The higher pitched or shrill version of the ring tone might be used with the second output to draw elevated user attention. In some embodiments, the first haptic output is similar, identical, or substantially identical to the second haptic output.

In another example the first haptic output is accompanied by an audio output and the second haptic output is accompanied by the same audio output; in this example the first haptic output is different from the second haptic output.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1000, 1100, 1200, 1300, 2500, 2600, 3000, and 3200) are also applicable in an analogous manner to method 900 described above with respect to FIG. 9. For example, the inputs, alert conditions, events, applications, states, and haptic outputs described above with reference to method 900 optionally have one or more of the characteristics of the inputs, alert conditions, events, applications, states, and haptic outputs described herein with reference to other methods described herein (e.g., methods 700, 1000, 1100, 1200, 1300, 2500, 2600, 3000, and 3200). For brevity, these details are not repeated here.

Feedback Versus Notification-Based Haptic Output

Figure 10:
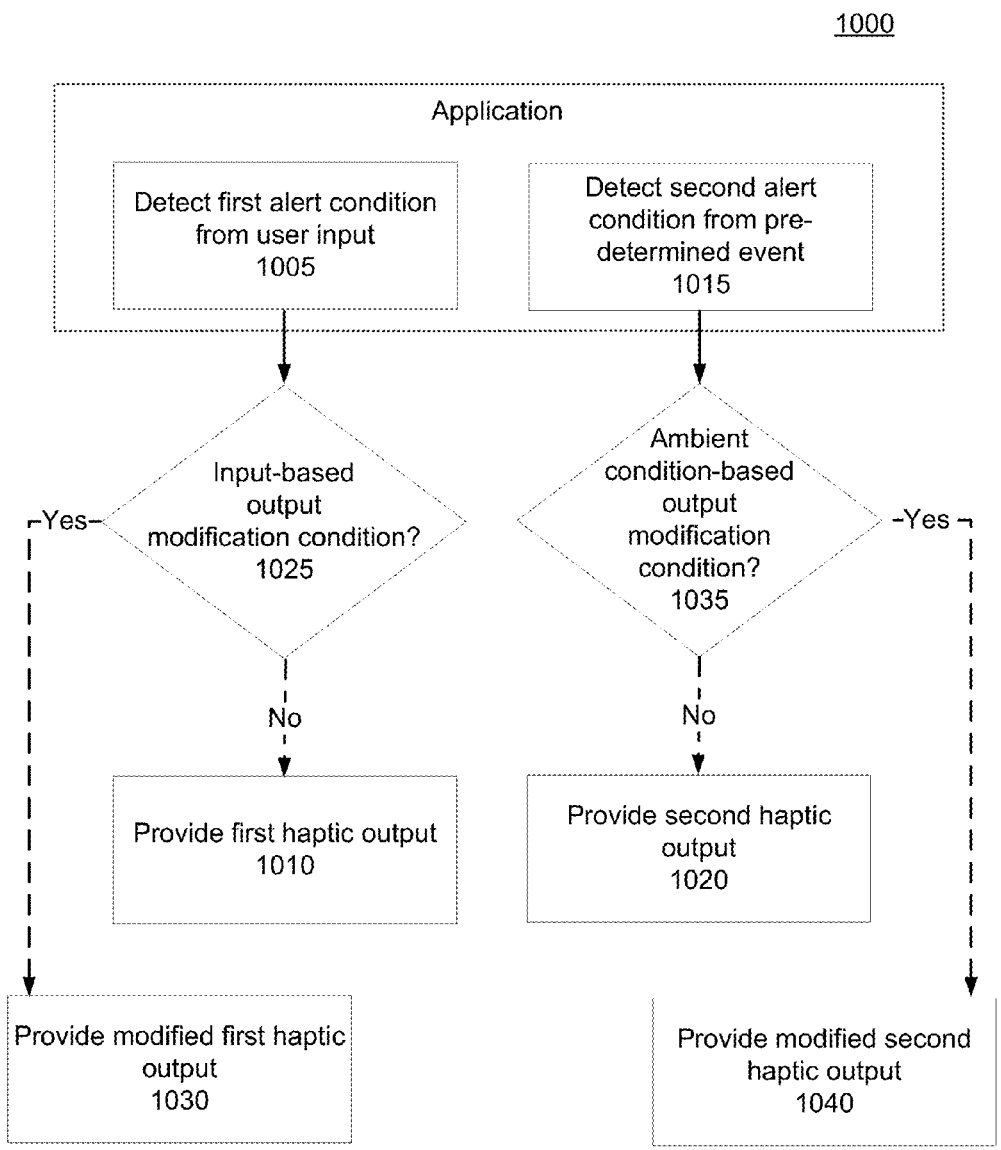
FIG. 10 is a flow diagram of a method for detecting a first alert condition from user input and a second alert condition from a predetermined event associated with an application and providing corresponding haptic outputs according to some embodiments.

Alert conditions can be triggered by user input or by predetermined system events (e.g., reminders, notification). Whether a detected alert condition is associated with user input or a predetermined system event provides the basis for providing a corresponding haptic output, according to some embodiments. Providing haptic output that correlates with the type of alert condition creates a more efficient human-machine interface, thereby reducing the amount of time it takes for a user to perform operations, which consequently reduces energy use and increases battery life for battery powered devices. FIG. 10 is a flow diagram of a method 1000 for detecting a first alert condition from user input and a second alert condition from a predetermined event associated with an application and providing corresponding haptic outputs according to some embodiments. Note that in some embodiments, different steps may be performed other than those shown in FIG. 10.

The method begins by detecting 1005 a first alert condition on the computing device 100 associated with receiving user input to an application. The first alert condition can be any of the various alert conditions described elsewhere herein, and the application can be any application executing on the device 100, according to some embodiments. According to some embodiments, the computing device 100 comprises a touch-sensitive display for receiving the user input.

Responsive to detecting the first alert condition, the device 100 provides 1010 a first haptic output having a first intensity and corresponding to the user input to the application, according to some embodiments. The first haptic output optionally is feedback provided in direct response to and as a consequence of the user input. According to some embodiments, more intense haptics (e.g., higher amplitude or longer haptics) are used for unexpected alerts that are not responsive to user input than those haptics used for feedback that is in direct response to user inputs. In some embodiments, unexpected alerts are alerts that occur outside of a context where the user's attention is directed toward the device (e.g., alerts that occur while a user is not actively using the device or while the user is not looking at the device). For example an electronic message alert that is generated by the device while the user of the device is wearing the device but not looking at the device and not interacting with a messaging app is an unexpected alert, while the same alert received while the user is looking at the device an/or has the messaging application open on the device would be an expected alert. Similarly, feedback for specific user inputs (e.g., a "click" when a user places a pin on a map) is expected by the user because the user is actively engaged with the device and thus is more likely to notice a less intense haptic alert. According to some embodiments, the first haptic output is provided via the touch-sensitive display on the computing device 100. The first intensity can be a pre-determined or adjustable combination of haptic waveform amplitude, frequency, and/or duration, as described elsewhere herein.

The device also 100 detects 1015 a second alert condition associated with receiving a predetermined system event in the application. For example, the second alert condition corresponds to an event that is automatically triggered by the application, or from within the application. Such events include an alert that occurs at a predetermined time or reports on satisfaction of a predetermined criterion, a reminder notification or an alarm generated by the application, an automatically-initiated event notification received by the application (e.g., an automatically/system generated email or message such as a system-generated mass mail, spam, system-generated email directed to a mailing list, etc.), or a manually initiated event notification received by the application (e.g., an event initiated by a human user—such as an incoming message or call from a known email address or phone number on the user's contact list), according to various embodiments.

Responsive to detecting the second alert condition, the device 100 provides 1020 a second haptic output having a second intensity, and corresponding to the predetermined system event, wherein the second intensity is greater than the first intensity. The second intensity is greater than the first intensity in one or more of amplitude, frequency, and/or duration. When the computing device 100 comprises a touch-sensitive display, the second haptic output is provided via the touch-sensitive display on the computing device.

The greater second intensity of the second haptic output is so designed to draw elevated user attention to alert conditions that do not result from user input. For example, user feedback while using an application—in which case a finger may already be touching the device 100—requires a lesser haptic output for the user to notice it as compared to a user who is not touching the device with a finger. The feedback while touching the device is expected by the user, and thus optionally is weaker and more subtle than unexpected output. Direct manipulation should result in short, immediate haptic feedback (<100 ms) according to some embodiments. Haptic feedback is less intrusive (e.g., has lower amplitude, fewer haptic features, more periodic/repetitive, shorter duration, weaker haptic features, etc.) when it is responsive to a user input. Notifications, on the other hand, often are unexpected output, and thus need to be stronger in order to draw elevated user attention in some circumstances. Thus, notifications optionally are longer (~1.5 s) and more intrusive.

As an example, a device 100 detects 1005 a first alert condition corresponding to a user selection of a user interface element displayed on an application user interface associated with a first application, and responsive to the first alert condition, provides 1010 a respective first haptic output representing the user selection of a user interface element, the respective first haptic output comprising a first haptic component including a first haptic feature of a first intensity and a first duration, according to some embodiments. After providing the respective first haptic output, the device 100 detects 1015 a second alert condition corresponding to an alert notification received by the first application, and responsive to the second alert condition, provides 1020 a respective second haptic output representing the receipt of the alert notification, the respective second haptic output comprising a second haptic component: (1) including a second haptic feature of a second intensity and a second duration, and (2) different from and more pronounced than the respective first output, based on the second haptic feature being more pronounced than the first haptic feature, the second intensity being greater than the first intensity, or the second duration being longer than the first duration according to some embodiments. For example, an incoming phone call might have a more intense haptic output than answering or hanging up a call on a phone application.

TABLE 3

PHONE

| Alert Condition | Primary Application State | Mode | Condition | Haptic Output | Audio Output |
| --- | --- | --- | --- | --- | --- |
| Incoming call | Active | Keypad | No call | X | X |
| Incoming call | Active | Favorites | No call | X | X |
| Incoming call | Active | Recents | No call | X | X |
| Incoming call | Active | Contacts | No call | X | X |

TABLE 3-continued

PHONE

| Alert Condition | Primary Application State | Mode | Condition | Haptic Output | Audio Output |
|---|---|---|---|---|---|
| Incoming call | Active | Voicemail | No call | X | X |
| Incoming call | Active | Call in progress | No call | X | X |
| Incoming call | Active | Keypad | Call | Buzz-Buzz | Default ring |
| Incoming call | Active | Favorites | Call | Buzz-Buzz | Default ring |
| Incoming call | Active | Recents | Call | Buzz-Buzz | Default ring |
| Incoming call | Active | Contacts | Call | Buzz-Buzz | Default ring |
| Incoming call | Active | Voicemail | Call | Buzz-Buzz | Default ring |
| Incoming call | Active | Call in progress | Call | Buzz-Buzz | Default ring |
| Incoming call | Inactive | N/A | No call message | X | X |
| Incoming call | Inactive | N/A | Call | Buzz-Buzz | Default ring |
| Answer call | Active | Incoming | No answer | X | X |
| Answer call | Active | Incoming | Answer | Microtap | Default receiver |
| Answer call | Inactive | Incoming | Answer | Microtap | Default receiver |
| Hang up call | Active | Call in progress | No hang up | X | X |
| Hang up call | Active | Call in progress | Hang up | Microtap | Default receiver |

Table 3 shows a phone application and outputs corresponding to three different alert conditions: incoming call, answer call, and hang up call. In this example, a user answering or hanging up a call an action that is expected by the user taking the action, and thus the corresponding haptic output that accompanies the action is considered feedback to the user. For these two alert conditions, the haptic output is less intense (e.g., a microtap). In contrast, an incoming call is a more unexpected type of alert condition, and in fact one that exists for a limited period of time, and thus has a haptic with a greater intensity intended to get the user's attention (e.g., a buzz-buzz). According to some embodiments, more intense haptics (e.g., higher amplitude or longer haptics) are used for unexpected alerts that are not responsive to user input than those haptics used for feedback that is in direct response to user inputs.

Table 3 provides conditions and corresponding outputs according to some embodiments, but is merely exemplary; other combinations of alerts, states, modes, conditions, and outputs are used according to different embodiments.

In some circumstances, haptic outputs can vary based on whether they result from a specific user input or not. In some embodiments, the device 100 first detects a first alert condition associated with a first application, the first alert condition resulting from a respective user input. For example, a user providing touch inputs to type an email message in an email application. The device 100 provides a respective first haptic output representing the first alert condition according to some embodiments. Continuing the above example, the device provides low intensity, short interval buzzes for each user contact input. After providing the respective first haptic output, the device 100 detects a second alert condition associated with the first application, the second alert condition not resulting from receiving user input. In the email application context, this alert condition optionally is an incoming email in email application. The device 100 then provides a respective second haptic output representing the second alert condition, the respective second haptic output different from and having greater intensity than the respective first output according to some embodiments. For example, the second haptic output optionally has a higher intensity and/or prolonged taps to notify a user of the device of the incoming message.

The first and second haptic outputs can have various characteristics that impact their intensity and their ability to draw the attention of the user according to some embodiments. For example, a first haptic output has a first set of characteristics comprising one or more of: an amplitude of the first haptic output, a duration of the first haptic output, a regularity associated with the first haptic output, repetition frequency of haptic features in the first haptic output, a selection of haptic features constituting the first haptic output and the second haptic output has a second set of characteristics comprising one or more of: an amplitude of the second haptic output, a duration of the haptic component associated with the second haptic output, a regularity associated with the second haptic output, repetition frequency of haptic features in the second haptic output, a selection of haptic features constituting the second haptic output. Any of the characteristics can differ between the first and second haptic, or all of them can be different according to various embodiments.

Various combinations of haptic and audio are output according to some embodiments. According to some embodiments, the first haptic output is not accompanied by audio output but the second haptic output is accompanied by an audio output. In one example, the first haptic output is accompanied by a first audio output and the second haptic output is accompanied by a second audio output; in this case the first haptic output is identical to the second haptic output and the first audio output is different from the second audio output. In some embodiments, the same haptic waveform generates different perceptions when accompanied by different audio waveforms. For example, if an audio (ring) tone is played with a high pitch versus a low pitch, and accompanied by the same haptic component (or substantially similar haptic components that a typical user will not be able to differentiate between), the perception of the haptic component differs despite the identical haptic. The higher pitched or shrill version of the ring tone might be used with the second output to draw elevated user attention. In some embodiments, the first haptic output is similar, identical, or substantially identical to the second haptic output.

Any of the haptic outputs can be accompanied by an audio output, with the waveform of the second haptic output generated being based on, mirroring, and synchronized to a waveform of the accompanying audio output according to some embodiments. In some embodiments, waveforms of the haptic components are generated from and match with, mimic, mirror, or are synchronized to waveforms of the respective audio components, as discussed in conjunction with FIG. 6. The haptic and audio waveforms need not be perfectly aligned, and the device 100 can take into account the fact that for certain classes of haptic and audio outputs, the haptic and audio outputs will be perceived by a user to be concurrent or simultaneous even if they are slightly offset in time (e.g., because audio output is processed more quickly than haptic output, so providing haptic output before providing audio output will, in some circumstances, cause a user to perceive the audio and haptic output as occurring concurrently or simultaneously). Variations in the accompanying audio portion also can vary between embodiments that include an audio output. For example, each of an amplitude of an audio component associated with the first output, a duration of the audio component associated with the first output, one or more musical qualities (e.g., pitch, tone, etc.) associated with the audio component associated with the first output, can vary in certain circumstances.

In some embodiments, there is coordination between the haptic intensity and the volume of the device. For example, the first intensity of the first haptic output and the second intensity of the second haptic output is adjusted in inverse relation to a volume setting on the device, such that the haptic output optionally is intensified, either independently or over and above the default/predetermined intensity settings, if the audio channel is turned off or turned down.

In some embodiments, prior to providing the first haptic output, the device 100 determines 1025 whether an input-based modulation condition exists, and responsive to determining that an input-based modulation condition exists, prior to providing the first haptic output, the device 100 modifies 1030 the first haptic output.

For example, one input-based modulation condition is user engagement. In this case, the device 100 detects a respective alert condition and determines that the respective alert condition resulted from a respective user input received on the computing device. Then the device 100 identifies a measure of user engagement associated with the detected user input and modulates the first signal intensity of the first haptic output based on the measure of user engagement according to some embodiments. For example, in some embodiments, the strength (e.g., amplitude, duration, repetition frequency) of the audio and/or haptic components are varied inversely with a measure of user input interaction/engagement with the application/device. For higher degrees/measures of user interaction/engagement (such as touch or direct manipulation), the output characteristics are selected so as to make the first output more subtle or less invasive/perceptible. Thus, the user is not bombarded with an unduly strong feedback signal when the user has a high degree of engagement or interaction with the application/device. For example, weakest output is provided for touch/direct manipulation, e.g., if the user is making contact with the device while providing the input, then the user should not be bombarded with unduly strong haptic feedback. On the other hand, if the user is less engaged, then a stronger signal is provided to the user to draw additional attention.

TABLE 4

LEVEL OF ENGAGEMENT/HAPTIC FEEDBACK

| Alert Condition | Primary Application State | Primary Focus | Secondary Focus | Condition | Haptic Output |
|---|---|---|---|---|---|
| Feedback | Active | Application | Direct manipulation | New event | Level 1 |
| Notification | Active | Application | Eye gaze | New event | Level 2 |
| Notification | Active | Other application | Touch | New event | Level 2 |
| Notification | Active | Background | Touch | New event | Level 2 |
| Notification | Active | Other application | No touch | New event | Level 3 |
| Notification | Active | Background | No touch | New event | Level 3 |
| Notification | Inactive | Background | No touch | New event | Level 4 |

Table 4 shows various levels of user engagement for alert conditions with variations in the user's focus, and the resultant haptic output levels. The haptic output levels shown can be thought of as a sliding scale of the level of haptic intensity needed to get the user's attention in view of the primary and secondary user focus. For example, the highest level of user engagement is direct manipulation of the application generating the alert condition, when the alert condition is in the form of feedback. For example, if the user is inputting information into an application, the application is already the user's primary focus, so little haptic is necessary to get the user's attention, and thus the lowest level of haptic, "Level 1," can be output. This may be the most minimal haptic possible, e.g., a single microtap.

Skipping to the third row, if the user it touching the device but is inputting into a different application, the user is focused on the device, and thus has some level of engagement, but since the user is using a different application than the one providing the alert, the user has a lower engagement than if the user were inputting into the application providing the alert. In this case, the appropriate output is a "Level 2" haptic output. For example, a Level 2 output might be two microtaps in a row.

Skipping to the second to last row, the user may have the application issuing the alert active, but operating in the background, and may not be touching the device at the time of the alert condition. As a result, it may take a greater haptic to get the user's attention in this circumstance. Thus, a "Level 3" haptic output may be appropriate, e.g., a priming tap followed by a microtap or series of microtaps.

Finally, the last row shows a user with the application issuing the alert in an inactive state. In some circumstances, the application is not executing even in the background, or the device is asleep. In this instance, the maximum haptic, "Level 4," is appropriate to get the user's attention. For example, a Buzz-Buzz haptic output might be appropriate in some circumstances. According to some embodiments, more intense haptics (e.g., higher amplitude or longer haptics) are used for unexpected alerts that are not responsive to user input than those haptics used for feedback that is in direct response to user inputs.

This is just one example, using a limited number of circumstances and haptic output examples, and assuming that all applications and alerts are treated the same, which may not be the case in other circumstances. In addition, a particular level of haptic output may be a "default" output, e.g., Level 2, and then depending on the user's focus the device may adjust up or down the intensity of the haptic output. Table 4 provides conditions and corresponding outputs according to some embodiments, but is merely exemplary; other combinations of alerts, states, focuses, conditions and outputs are used according to different embodiments.

In some embodiments, the haptic output is modified based on the location of the user input. In this example, the device 100 detects a respective alert condition and determines that the respective alert condition resulted from receiving a tactile user input on the device. The device 100 modulates a spatial haptic energy profile of the first haptic output, by reducing the amplitude of haptic energy of the first haptic output such that it is perceptible at the location of receiving the tactile user input on the device. The reduced amplitude of the haptic energy may be such that it is not perceptible at locations farther from the user's finger/tactile input location, according to some embodiments. For example, the low amplitude may be perceptible by finger at the point of contact, but not the rest of the hand and/or the wrist. Similarly, the device 100 in some embodiments detects a respective alert condition and determines that the respective alert condition resulted from receiving a tactile user input on the device, but then specifically identifies a location of receiving the tactile user input on the device and modulates a spatial haptic energy profile of the first haptic output by providing greater than a specified proportion of haptic energy of the first haptic output within a specified radius threshold of the location of receiving the tactile user input on the device. According to some embodiments, the location of receiving the tactile user input on the device varies with time, and thus the spatial haptic energy also varies with time corresponding to the time-varying location of receiving the tactile user input.

According to some embodiments, morphological characteristics of the haptic output mimic the tactile input. For example, the device 100 detects a respective alert condition and determines that the respective alert condition resulted from receiving a tactile user input, and then identifies time-varying morphological attributes of the tactile user input. Time-varying morphological attributes of the tactile input include detection of a contact on a touch-sensitive surface, monitoring whether the contact is maintained with the surface and how far and in which direction it moves, determining amount of pressure placed on the point of contact, etc., according to various embodiments. Then, the device 100 modifies, over time, morphological characteristics of the first haptic output to mimic the time-varying morphological attributes of the tactile user input. For example, morphological characteristics of the first haptic output to mimic include varying the amplitude, duration, frequency, etc. of the haptic output to mirror the tactile input.

In some embodiments, waveforms of the haptic components need not be perfectly aligned with the user tactile input, and the device 100 can take into account the fact that the haptic outputs will be perceived by a user to be concurrent or simultaneous with the tactile input even if they are slightly offset in time (e.g., because the haptic output is processed more quickly than the user can perceive it as a delayed response, thus causing a user to perceive the haptic output as occurring concurrently or simultaneously). In some embodiments, specific haptic features of the available predetermined set of haptic features are selected to constitute the haptic component of the first output, the selection based on which haptic features best mimic the user input. Some examples include a microtap for a simple touch, pen-click tap for a longer/deeper touch, buzz for a swipe, buzz with a boost at the end for a swipe ending in finger lift-off. For example, the time-varying morphological attributes include a time-dependent contact pressure profile between the tactile user input and a touch-sensitive surface of the computing device according to some embodiments, and the modifying comprises modulating, with time, an energy profile of the first haptic output to mirror the time-dependent contact pressure profile between the tactile user input and the touch-sensitive surface of the computing device.

According to some embodiments, the haptic output can mimic the time duration of a sustained user input, gesture, mechanical adjustment, or other device manipulation by the user. For example, the device 100 first detects a respective alert condition, and determines that the respective alert condition resulted from a sustained user input. The sustained user input includes tactile user input on a touch-sensitive display on the computing device, rotting a knob, pushing a button, or any other user input of device manipulation with a detectable start/end time, according to some embodiments. In some embodiments, the device can determine that the alert condition resulted from a gesture, mechanical adjustment, or the like. Responsive to the determining, the device 100 initiates the first haptic output at an initiation time of the sustained user input, detects termination of the sustained user input, and then terminates the first haptic output at a termination time of the sustained user input (e.g., mimicking the user input). In some embodiments, the haptic output is initiated by/at a start time of the user input and terminates at an end time of the user input. Therefore, the haptic feedback/output extends substantially throughout the duration of time of the user input. Haptic output could be provided at location of user input, not limited to a touch-sensitive surface. For example, if a rotating knob on the side of a watch is turned, a haptic that feels like a click could provide sustained feedback as the user turns the knob.

In some embodiments, prior to providing the second haptic output, the device 100 determines 1035 whether an ambient condition-based modulation condition exists, and responsive to determining that an ambient condition-based modulation condition exists, and prior to providing the second haptic output, the device modifies 1040 the second haptic output.

For example, the device 100 determines whether an ambient condition exists as a potential hindrance to the user perception of the haptic output. In this example, the device 100 determines whether one or more ambient conditions exist for the device as potential interference to haptic output at a time of occurrence of the respective alert condition. Ambient conditions include, according to some embodiments: noise (can include measured ambient noise as well as identifying that the user is in a library, museum, movie theatre, hospital or other place generally known to be quiet), movement/vibration impacting the user's physical receptiveness to a haptic sensation, engagement level with the device (e.g., as discussed above: viewing, touching, talking to), user proximity to the device (e.g., device on the user's person vs. located at greater than a specified proximity threshold from the device, etc.).

TABLE 5

AMBIENT CONDITIONS/HAPTIC FEEDBACK

| Ambient Condition | Primary Application State | Haptic Modification |
|---|---|---|
| Noise (Low) | Active | None |
| Noise (Low) | Inactive | None |
| Noise (High) | Active | Increase 1 |
| Noise (High) | Inactive | Increase 2 |
| Vibration (Low) | Active | None |
| Vibration (Low) | Inactive | Increase 1 |
| Vibration (High) | Active | Increase 1 |
| Vibration (High) | Inactive | Increase 3; Delay |
| Distance to device (Short) | Active | None |
| Distance to device (Short) | Inactive | None |
| Distance to device (Long) | Active | Increase 1 |
| Distance to device (Long) | Inactive | Increase 3; Delay |
| Engagement level (High) | Active | Decrease 1 |
| Engagement level (Low) | Active | None |

Table 5 shows various ambient conditions that can be present during alert conditions, and for various application states, and possible modifications to the haptic output provided based on those conditions according to some embodiments. The ambient conditions shown include low and high noise levels, low and high vibration levels, short and long distances to a device, and high and low user engagement levels, which ties into the above section and Table 4. The table is set up with examples of various ambient conditions and for a given application state (active or inactive), how the haptic output might be modified to adjust for the ambient condition. Table 5 only shows modification to haptic output, but similar adjustments could be made to non-haptic output, such as audio. The Haptic Modification column lists possible modifications of None (maintain default haptic for the alert), Increase 1, 2, or 3, and Decrease 1, although many variations are possible; these are just examples. For some conditions, such as High Noise, Low Vibration (Inactive), High Vibration (Active), and Long Distance to Device (rows 3, 4, 6, 7, and 11), the device can modify the default haptic by increasing it one or two steps, e.g., a microtap to a tap or two microtaps, or a tap to a buzz, etc., in these ambient conditions that may cause some level of distraction to the user. For other conditions, such as High Vibration (Inactive) or Long Distance to Device (rows 8 and 12), the device can modify the default haptic by increasing it by a greater amount, e.g., a microtap to a buzz, etc., in these ambient conditions that may cause a greater level of distraction to the user. In some circumstances, the haptic may be accompanied by audio output as part of the modification. Alternatively or in addition to modifying the intensity of the haptic, the device may delay the haptic output until the ambient condition becomes more conducive to the user receiving the haptic output, e.g., for the ambient conditions marked Increase 3. In this example, the device may periodically determine the ambient conditions to ascertain if the interfering ambient condition has subsided and thus the haptic may be output. In other circumstances, no delay is applied. These examples are very limited, using a limited number of circumstances and haptic output examples, and assumes that all applications and alerts are treated the same, which may not be the case in other circumstances.

In some embodiments, no modification is required because the ambient condition does not cause the user much if any distraction (e.g., rows with "none" in the modification column). Finally, under some ambient conditions the device may reduce the default haptic associated with the alert condition, e.g., for a high engagement level, in which case lesser output is needed since the user is engaged. Table 5 provides conditions and corresponding outputs according to some embodiments, but is merely exemplary; other combinations of ambient conditions, alerts, states, and outputs are used according to different embodiments.

According to some embodiments, the device 100 delays the haptic output. First the device 100 makes a determination that no interferential ambient conditions exist for the device. In this example, the device 100 provides a respective second haptic output based on the state of receptiveness of the user, and in accordance with a determination that one or more ambient conditions exist for the device as potential interference to haptic output, the device 100 delays providing the respective second output to the user. For example, a delay may continue until a subsequent instance in which no interferential ambient conditions exist (e.g., the device 100 determines again at some later point in time whether the interfering ambient condition exists). For example, if the user is very active (e.g., running or in the midst of a workout) when the notification is received, and is therefore unable to perceive the haptic sensation, the device can delay the haptic output until activity is completed, such as waiting until the user has completed the activity, and then provide the haptic output corresponding to the notification. Under other circumstances the alert is of sufficient urgency that the device may not delay it regardless of ambient condition. In these examples, the determination of ambient conditions act as a proxy for estimating the user's physical receptiveness to a haptic sensation, for example, based on properties of the user's current surroundings.

According to some embodiments, the device 100 provides a variant of the haptic output, e.g., a modification as described in conjunction with Table 5. In this example, the device 100 detects a respective alert condition associated with a respective application and determines that the respective alert condition did not result from receiving user input. Responsive to determining that the respective alert condition did not result from receiving user input, the device 100 determines whether one or more ambient conditions exist for the device as potential interference to haptic output at a time of occurrence of the respective alert condition, and in accordance with a determination that no interferential ambient conditions exist for the device, the device 100 provides a first variant of the second haptic output to the user, the first variant of the second haptic output having a first set of output characteristics. For example, the variant can be a haptic output that is softer, of shorter duration, includes more subtle haptic features (e.g., microtaps), according to some embodiments. In accordance with a determination that one or more ambient conditions exist for the device as potential interference to haptic output, the device 100 provides a second variant of the second haptic output to the user, the second variant of the second haptic output having a second set of output characteristics, the second set of characteristics different from the first set of characteristics, and the second variant of the second haptic output having greater intensity than the first variant of the second haptic output.

In some embodiments, the device 100 can modify the haptic output to "prime" the user. For example, a device 100 first detects a respective alert condition associated with a respective application and then determines that the respective alert condition did not result from receiving user input. Responsive to determining that the respective alert condition did not result from receiving user input, the device provides a priming haptic output as a precursor to the second haptic output, the priming haptic output designed to increase an engagement level of a user operating the device to the second haptic output, wherein at least a portion of the priming haptic output is more pronounced than the second haptic output, according to some embodiments. The device 100 optionally provides the second haptic output following and within a specified time interval of providing the priming haptic output.

The device 100 can provide variations of priming according to some embodiments. In one example, the priming haptic output comprises a priming haptic component with a time-varying waveform morphology characterized by a progressively increasing intensity of the haptic component with time. In some embodiments, the priming haptic output includes a gradually increasing intensity of haptic waveform to subconsciously prepare user for notification. After priming, a large increase in audio volume occurs in concert with the haptic component according to some embodiments. In another example the priming haptic output optionally comprises a priming haptic component with a time-varying waveform morphology characterized by an emphasized haptic feature followed by a progressively diminishing intensity of the haptic component. Alternatively, the device 100 can deliberately prime the user's sensitivity by providing a stronger priming haptic (and optionally audio) output first and then follow it up with milder outputs once the user's senses are primed, according to some embodiments. According to some embodiments, the second haptic output is preceded by the priming haptic output and the first haptic output is provided directly, without a corresponding preceding priming haptic output, in response to a corresponding alert condition that results from a received user input. In various embodiments, characteristics of the priming haptic output are selected based on an urgency or context associated with the alert condition, with the intensity of the output mirroring the urgency of the alert.

It should be understood that the particular order in which the operations in FIG. 10 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1200, 1300, 2500, 2600, 3000, and 3200) are also applicable in an analogous manner to method 1000 described above with respect to FIG. 10. For example, the inputs, alert conditions, applications, and haptic outputs described above with reference to method 1000 optionally have one or more of the characteristics of the inputs, alert conditions, applications, and haptic outputs described herein with reference to other methods described herein (e.g., methods 700, 900, 1100, 1200, 1300, 2500, 2600, 3000, and 3200). For brevity, these details are not repeated here.

Haptic Output for Multi-Part Operations

Figure 11:
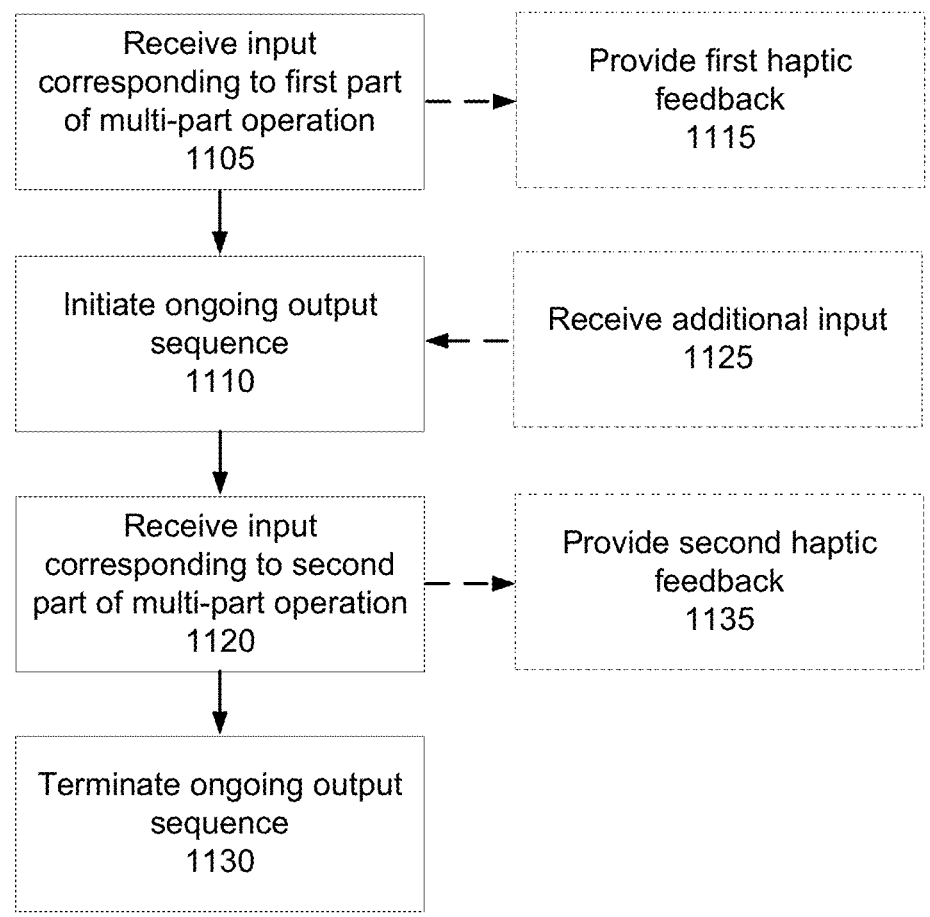
FIG. 11 is a flow diagram of a method for detecting an alert condition associated with a multi-part operation and providing a corresponding haptic output according to some embodiments.

Whether a detected alert condition is part of a multi-part operation provides the basis for providing a corresponding haptic output, according to some embodiments. Providing haptic output that correlates with whether an alert condition is part of a multi-part operation creates a more efficient human-machine interface, thereby reducing the amount of time it takes for a user to perform operations, which consequently reduces energy use and increases battery life for battery powered devices. FIG. 11 is a flow diagram of a method 1100 for detecting an alert condition associated with a multi-part operation and providing a corresponding haptic output according to some embodiments. Note that in some embodiments, different steps may be performed other than those shown in FIG. 11.

The method begins by receiving 1105 an input that corresponds to a first part of a multi-part operation performed by an application executing on a computing device 100. In some embodiments, the input corresponding to the first part of the multi-part operation is detected on a touch-sensitive surface of the device 100.

Responsive to receiving the input corresponding to the first part of the multi-part operation, the device 100 initiates 1110 an ongoing haptic output sequence. The outgoing haptic sequence can be ongoing in the sense that it is sustained, constant, varying but continuing over a period of time, or intermittent according to various embodiments, so long as it continues until the second input is received. In some embodiments, responsive to detecting the input corresponding to the first part of the multi-part operation, the device also initiates an ongoing audio output sequence to accompany the ongoing haptic output.

According to some embodiments, the device 100 has a touch-sensitive surface, and the haptic output sequence is provided via the touch-sensitive surface. For example, the haptic output includes haptic vibration of the touch-sensitive surface in a predetermined pattern that is perceptible to a user of the device that is touching the touch-sensitive surface.

In some embodiments, in addition to the ongoing haptic output sequence, the device 100 provides 1115 a first haptic feedback responsive to receiving the input corresponding to the first part of the multi-part operation. The first haptic feedback is selected based on the event and indicating an initiation of the event, and is distinct from the ongoing haptic output sequence in some circumstances. For example, the first haptic feedback has a greater intensity haptic output than the ongoing haptic output sequence according to some embodiments.

After initiating the ongoing haptic output sequence, the device 100 receives 1120 an input that corresponds to a second part of the multi-part operation according to some embodiments. For a device 100 having a touch-sensitive surface, the input corresponding to the second part of the multi-part operation is detected on the touch-sensitive surface.

In some embodiments two devices are involved. Thus, in some embodiments the inputs corresponding to both the first part of the multi-part operation and the second part of the multi-part operation are detected by the device 100. However, in some embodiments the input corresponding to the first part of the multi-part operation is detected by the device 100 and the input corresponding to the second part of the multi-part operation detected by a second device.

According to some embodiments, additional user input can be received by the device 100. For example, after initiating 1110 the ongoing haptic output sequence responsive to the first part of the multi-part operation, and before receiving 1120 the input that corresponds to the second part of the multi-part operation, the device 100 receives 1125 one or more additional user inputs, distinct from the input that corresponds to the second part of the multi-part operation according to some embodiments. In these circumstances, the device continues to provide the ongoing haptic output regardless of the additional user inputs, until receipt of the input corresponding to the second part of the multi-part operation, according to some embodiments.

Responsive to receiving the input corresponding to the second part of the multi-part operation, the device 100 terminates 1130 the ongoing haptic output sequence according to some embodiments. In some embodiments, responsive to detecting the input corresponding to the second part of the multi-part operation, the device 100 also terminates any ongoing audio output sequence.

The input corresponding to the second part of the multi-part operation follows the input corresponding to the first part of the multi-part operation and is separated in time from the input corresponding to the first part of the multi-part operation by a specified interval of time corresponding to a duration of the event according to some embodiments. Further, the ongoing haptic output sequence is provided throughout the duration of the event and indicates occurrence of the event in some circumstances.

According to some embodiments, the device also provides 1135 a second haptic feedback responsive to receiving the input corresponding to the second part of the multi-part operation, the second haptic feedback distinct from the ongoing haptic output sequence. The second haptic feedback indicates termination of the event, and is distinct from the ongoing haptic output sequence in some circumstances. For example, the second haptic feedback has a greater intensity haptic output than the ongoing haptic output sequence according to some embodiments.

The multi-part operation can take various forms according to different embodiments. According to some embodiments the multi-part operation is a secure transaction, with the first part of the multi-part operation including arming the device to authorize the secure transaction. In this example, in response to the user providing credentials, e.g., a password or biometric authentication such as a fingerprint, the device is put into in a payment mode where payment information can be provided to a payment terminal via a near field communication (NFC) subsystem. Thus, the arming of the device is the first part, and would initiate a corresponding ongoing haptic output. In addition, the second part the multi-part operation includes authorizing the secure transaction according to this example. The authorizing thus is the second step and includes, e.g., providing payment information to the payment terminal when the NFC subsystem comes into range of an NFC field of the payment terminal while the NFC subsystem is armed from the first step according to some embodiments.

In some embodiments of a NFC multi-part secure transaction, the first part of the multi-part operation includes determining that user authentication is required to complete the secure transaction. For example, in response to an NFC subsystem coming into range of an NFC field of a payment terminal, prompting the user to provide credentials such as a password or biometric authentications such as a fingerprint to authorize the secure transaction. In this example, the second part the multi-part operation includes receiving user authentication for the secure transaction. For example, the haptic output is provided to remind a user that the user needs to provide user authentication information before the payment process can proceed, the user authentication information optionally includes passcode based or biometric based authentication. In some embodiments, a first haptic output pattern is provided by the device between when the need for user authentication is determined and when user authentication is received (e.g., between requesting user authentication and receiving user authentication) to remind the user to provide user authentication information, and a second haptic output pattern is provided by the device between when the user authentication information is received and the secure transaction is authorized (e.g., between receiving user authentication and providing the payment information to the payment terminal). In this example, the second haptic output pattern is different from the first haptic output pattern to remind the user to place the NFC subsystem near the payment terminal according to some embodiments.

According to other payment embodiments, the input corresponds to a secure transaction that does not use NFC. In this example, the first part of the multi-part operation is a selection of a first user interface element that initiates a transaction. For a financial transaction such as an online purchase, selection of on element corresponding to activating an online payment enables a user to enter a user interface for entering secure or confidential information. As another example, a user requests to log into a secure location, such a secure email account or online retailer. Continuing the above example, the multi-part operation comprises one or more inputs for entry of information required to process the transaction. For example, entry of credit card information and other verification information necessary to authorize the financial transaction, and a corresponding ongoing haptic output sequence is provided throughout the duration of entry of the information. Similarly the input may be entry of username and password to log into a secure web account. In some embodiments, the event corresponds to population of one or more data entry fields that receive the information required to process the transaction and the input corresponding to the second part of the multi-part operation is a selection of a user interface element that authorizes completion of the transaction, e.g., an authorize payment user interface element.

According to some embodiments, the first part of the multi-part operation includes closing a draft of a document, and the second part of the multi-part operation includes returning to the draft of the document. Examples of closing of the document include closing a draft of an email or text message to switch to another task or to open another application on the device and returning to the document includes switching back to the draft of the email or text message from the other task or other application, according to various embodiments.

In some embodiments the inputs are separate inputs occurring close together in time. For example, the input corresponding to the first part of the multi-part operation is a first user input interacting with an application executing on the device and the input corresponding to the second part of the multi-part operation is a second user input interacting with the application, with the second user input distinct from the first user input according to some embodiments. For instance, the first user input into the application could be a first tap and liftoff, and the second user input could be a second tap and liftoff within the same application.

In some circumstances the multi-part operation is a multi-part gesture. For example, the operation comprises first detecting the input that corresponds to the first part of the multi-part operation as a contact on a touch-sensitive surface of the device 100 and detecting the input that corresponds to the second part of the multi-part operation includes detecting movement of the contact on the touch-sensitive surface according to some embodiments. In the example of a swipe gesture, the first part is a user touching the touch-sensitive surface, and the second part is the user maintain in the contact with the surface while moving the contact across the touch surface. In another example, the operation comprises first detecting the input that corresponds to the first part of the multi-part operation as movement of a contact on the touch-sensitive surface and detecting the input that corresponds to the second part of the multi-part operation as detecting liftoff of the contact from the touch-sensitive surface.

According to some embodiments, the inputs corresponding to the first and second parts of the multi-part operation comprise a single gesture, wherein the input corresponding to the first part of the multi-part operation is an initial part of the gesture (e.g., touch and hold with a finger contact) and the input corresponding to the second part of the multi-part operation is a subsequent part of the gesture (e.g., a liftoff of the finger contact). For example, in a text editing or viewing application, holding a finger down on a word first highlights the word and then continuing to hold the finger down on the highlighted word invokes a cut-copy-paste menu. In this example, the liftoff of the contact would represent selection of a displayed aspect corresponding to the touch and hold.

In some embodiments, the gesture is initiated on a portion of the touch-sensitive surface that corresponds to a first location in a user interface displayed on a display of the device 100 and terminates on a second portion of the touch-sensitive surface that corresponds to a second location in the user interface that is different from the first location. For example, a touch-swipe-liftoff sequence can be used to perform a drag and drop, or to relocate a focal region in a camera viewer, according to some embodiments.

According to some embodiments, the input corresponding to the first part of the multi-part operation initiates an event associated with the respective application and the event is sustained until receipt of the input corresponding to the second part of the multi-part operation, at which time the input corresponding to the second part of the multi-part operation terminates the event associated with the respective application. For example, the first input is a selection of a user interface element (e.g., provided on the application user interface of an application) that initiates an event associated with the application and the second input is a selection of a different user interface element (e.g., on the application user interface of the same application) that terminates the event associated with that application according to some embodiments.

The application is a text editing application according to some embodiments, and the input corresponding to the first part of the multi-part operation is a selection of a first user interface element that enables a text-entry mode of the text editing application. In this example, the multi-part operation comprises one or more inputs for text-entry to the text editing application, the event corresponds to text manipulation in the text editing document responsive to the inputs for text-entry, and the input corresponding to the second part of the multi-part operation is a selection of a user interface element that disables the text-entry mode of the text editing application. According to some embodiments, the text editing application is a communication application such as an email or messaging application that allows the device user to communicate with other users. According to some embodiments, the text editing application is a non-communication text editing application, such as a word processing application, a notepad or sticky note application, or other application that allows text entry but does not provide independent communication functionality.

According to some embodiments, characteristics of the ongoing haptic output sequence are selected based on the event that is initiated by the input corresponding to the first part of the multi-part operation. For example, putting a call on hold is accompanied by a lower intensity (e.g., lower energy, less invasive, less perceptible) haptic output sequence than a financial transaction event or a secure login, for which the user has provided confidential or secure information and thus is a transaction that should garner additional attention. In this example, throughout the duration of the multi-part operation (e.g., after the confidential information is entered but before the transaction is complete) the user is thus reminded of the prior entry such that he or she completes the transaction quickly so as to avoid compromising the confidentiality of the information being entered. In some circumstances, a timeout function is used so that the confidential information is not left available. Additionally, different haptic output patterns optionally provide the user with information as to what task they are in the middle of completing.

The input corresponding to the first part of the multi-part operation suspends an ongoing event associated with the application, and the input corresponding to the second part of the multi-part operation resumes the ongoing event associated with the application according to some embodiments. For example, the first part initiates a pause in an ongoing event in some circumstances. In some embodiments, the first input corresponds to a selection of a user interface element that pauses an action, such as playing of a multimedia file, a video clip, a song, or a phone call in progress, and the second input is a selection of a different) user interface element that resumes the action.

According to some embodiments, an intensity of the ongoing haptic output sequence increases with time until a subsequent input corresponding to the multi-part operation is received. For example, haptic energy (e.g., amplitude, frequency, haptic features) of the ongoing haptic output sequence is modulated (e.g., via increasing intensity or haptic energy) over time to remind the user with increasing urgency to provide further input corresponding to the multi-part operation. Such an increasing output can correspond to a reminder to terminate the event that was started by the first part of the multi-part input, or to resume the event that was suspended by the first part of the multi-part input according to various embodiments.

In some embodiments, a time-varying haptic energy profile of the haptic output sequence mimics a time-varying acoustic energy profile of the audio output sequence. As discussed in conjunction with FIG. 6, the time-varying waveform morphologies of the haptic and audio sequences mimic, mirror, align, and/or synchronize with each other according to some embodiments.

According to some embodiments, the output includes audio output depending on whether the first part of the multi-part operation initiates a new event or pauses an ongoing event. Responsive to determining that the input corresponding to the first part of the multi-part operation does not pause an ongoing event, but initiates an event associated with the respective application, the device 100 provides the haptic output sequence without an accompanying audio output sequence, and responsive to determining that the input corresponding to the first part of the multi-part operation pauses an ongoing event associated with the respective application, the device 100 provides an ongoing audio output sequence accompanying the ongoing haptic output sequence according to some embodiments. In some embodiments, the audio output sequence accompanies the haptic output sequence only when the first part of the multi-part operation pauses or suspends an ongoing event or action. During the pause, the user is presumably not as engaged with the device and/or application. For instance, the user may be passively waiting for a call to be transferred, and therefore can tolerate additional stimulus associated with an audio output. However, in some embodiments, the audio sequence does not accompany the haptic sequence if an actual event is initiated by the first part of the multi-part operation according to some embodiments, such as a user actively typing an email message or entering secure financial or log in information.

The application is a voice communication application according to some embodiments. For example, the application can be a regular phone application, a voice over internet application such as Skype, or a voice communication application embedded in an email application such as Gchat according to some embodiments. The event is an ongoing voice communication occurring at a time of receipt of the input corresponding to the first part of the multi-part operation and the input corresponding to the first part of the multi-part operation is a selection of a first user interface element of the voice communication application, the selection suspending the ongoing voice communication according to some embodiments. For example, a voice call is paused due to a call transfer or call on hold request. The input corresponding to the second part of the multi-part operation is a selection of a second user interface element that resumes the voice communication according to some embodiments.

It should be understood that the particular order in which the operations in FIG. 11 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1000, 1200, 1300, 2500, 2600, 3000, and 3200) are also applicable in an analogous manner to method 1100 described above with respect to FIG. 11. For example, the inputs, operations, applications, and haptic outputs described above with reference to method 1100 optionally have one or more of the characteristics of the inputs, operations, applications, and haptic outputs described herein with reference to other methods described herein (e.g., methods 700, 900, 1000, 1200, 1300, 2500, 2600, 3000, and 3200). For brevity, these details are not repeated here.

Haptic Output for Subset Operations

Figure 12:
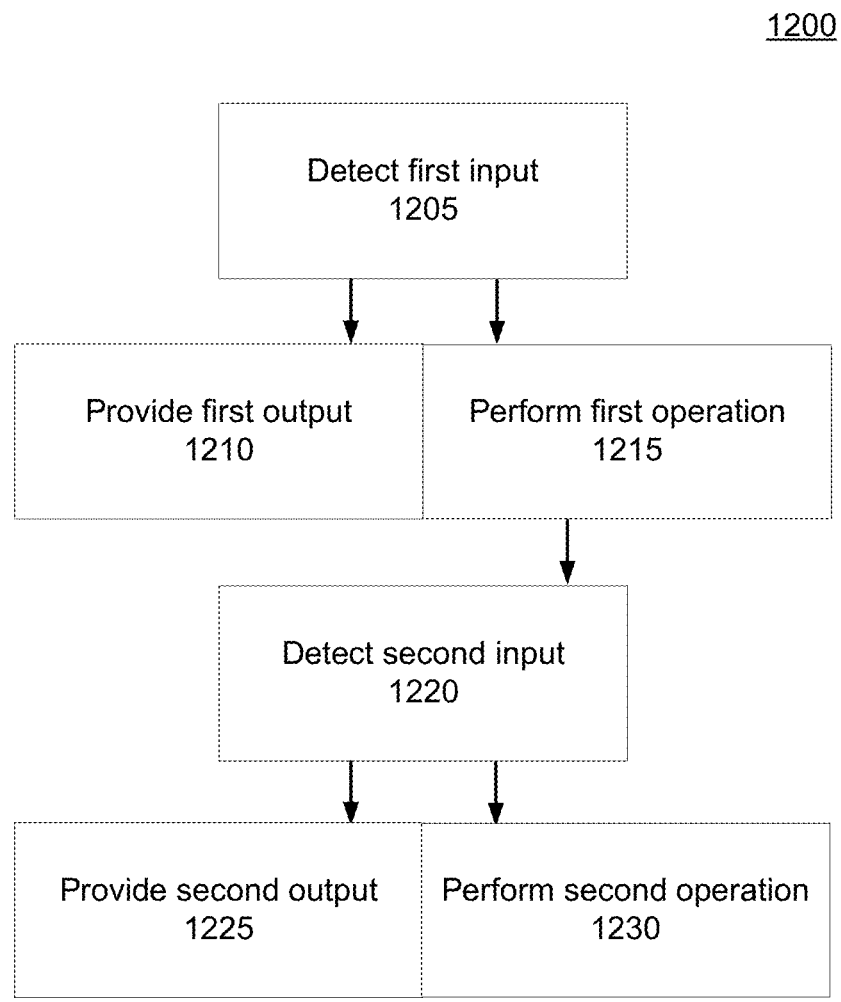
FIG. 12 is a flow diagram of a method for detecting first and second inputs to perform first and second operations, performing the operations, and providing corresponding outputs according to some embodiments.

Whether a detected request to perform an operation related to an operation that is a subset of another operation provides the basis for providing a corresponding haptic output, according to some embodiments. Providing haptic output that correlates with whether a request to perform an operation pertains to an operation that is a subset of another operation creates a more efficient human-machine interface, thereby reducing the amount of time it takes for a user to perform operations, which consequently reduces energy use and increases battery life for battery powered devices. FIG. 12 is an exemplary method flow diagram of a method 1200 for detecting first and second inputs to perform first and second operations, performing the operations, and providing corresponding outputs according to some embodiments. Note that in some embodiments, different steps may be performed other than those shown in FIG. 12.

The method begins by detecting 1205 a first input that corresponds to a request to perform a first operation. According to some embodiments, the computing device 100 comprises a touch-sensitive display, and the first input is received through the touch-sensitive display according to some embodiments.

According to some embodiments, responsive to detecting the first input, the device 100 provides 1210 a first output that includes a haptic component. If the comprises a touch-sensitive display, the haptic component of the first output is provided via the touch-sensitive display according to some embodiments.

Also responsive to detecting the first input according to some embodiments, the device 100 performs 1215 the first operation. The first operation can be any operation performed by the device 100 in response to an input. The examples described below, according to various embodiments, include capture of an image with a camera, a transaction-enable operation for enabling the device to authorize a secure transaction, a save operation for saving content within an existing file, and a send operation for sending a reply to a message that is in a message inbox, but this list is not meant to be exhaustive; other operations by the device 100 are envisioned as following the steps of the method.

After performing the first operation, the device 100 detects 1220 a second input that corresponds to a request to perform a second operation that includes the first operation and a supplemental operation according to some embodiments. If the computing device 100 comprises a touch-sensitive display, and the second input is received through the touch-sensitive display, according to some embodiments.

According to some embodiments, responsive to detecting the second input the device 100 provides 1225 a second output that includes a haptic component, wherein the second output includes the first output in conjunction with providing supplemental output that corresponds to the supplemental operation. If the comprises a touch-sensitive display, the haptic component of the second output is provided via the touch-sensitive display according to some embodiments.

In some embodiments, the haptic component corresponding to the second output comprises a first haptic component corresponding to the first output and a second haptic component corresponding to the supplemental output, and the second haptic component is distinct from the first haptic component. For example the second haptic component has a higher intensity (e.g., amplitude, duration, frequency) than the first haptic component according to some embodiments.

The supplemental output comprises a non-haptic component according to some embodiments. The non-haptic component can be any of audio or visual (e.g., graphic, textual) according to various embodiments. In some embodiments the supplemental output comprises an audio component but the first output does not include an audio component. For example, an audio output is provided during an interval when a camera application measures the specified interval of time counting down to the image capture, but the operation of capturing the image itself is not accompanied by an audio sound.

For supplemental output including audio output, a haptic output is accompanied by a corresponding audio output according to some embodiments, and the audio and haptic portion are aligned when at least a portion of the audio output is concurrent with at least a portion of the haptic output, or the audio output occurs close in time to the haptic output according to some embodiments. The haptic and audio waveforms need not be perfectly aligned, and the device 100 can take into account the fact that for certain classes of haptic and audio outputs, the haptic and audio outputs will be perceived by a user to be concurrent or simultaneous even if they are slightly offset in time (e.g., because audio output is processed more quickly than haptic output, so providing haptic output before providing audio output will, in some circumstance, cause a user to perceive the audio and haptic output as occurring concurrently or simultaneously). Variations in the accompanying audio portion also can vary between embodiments that include an audio output. For example, each of an amplitude of an audio component associated with the first output, a duration of the audio component associated with the first output, one or more musical qualities (e.g., pitch, tone, etc.) associated with the audio component associated with the first output, can vary in certain circumstances.

In some embodiments, the same haptic waveform generates different perceptions when accompanied by different audio waveforms. For example, if an audio (ring) tone is played with a high pitch versus a low pitch, and accompanied by the same haptic component (or substantially similar haptic components that a typical user will not be able to differentiate between), the perception of the haptic component differs despite the identical haptic. The higher pitched or shrill version of the ring tone might be used with the second output to draw elevated user attention. In some embodiments, the first haptic output is similar, identical, or substantially identical to the second haptic output.

According to some embodiments, the second output comprises a textual component that identifies the supplemental operation as different from the first operation. For example, the textual component may describe the supplemental information. For instance, an output corresponding to a send and archive operation provides a textual information indicating that the message has been archived. As another example, an output corresponding to a payment success message indicates that the secure information has been validated.

The supplemental operation has a variable value and the supplemental output is based on the value of the variable attribute according to some embodiments. For example, a time interval before a picture is taken by a camera can be five seconds, 10 seconds, 15 second, etc. according to various embodiments. For a 10 second camera timer, the supplemental output thus correspondingly lasts for 10 seconds according to some embodiments.

According to some embodiments, the device 100 then performs 1230 the second operation. The timing of the performance of the first and second operations, respectively, can vary. According to some embodiments, the first operation is performed concurrently with providing the first output and the supplemental operation is performed concurrently with providing the supplemental output. For example, for a shutter self-timer, the first output is provided when the timer counts down, which corresponds to the first operation, and the supplemental output is provided when the shutter takes the picture, corresponding to the supplemental operation.

The first operation can be performed prior to performing the supplemental operation and the first output provided prior to providing the supplemental output according to some embodiments. For example, for a first operation corresponding to a send message (e.g., email) function, a second operation is a send and archive operation, and the send operation is performed prior to the supplemental operation, which is the archiving portion.

According to some embodiments, at least a portion of the first operation is performed concurrently with a portion of the supplemental operation and at least a portion of the first output is provided concurrently with a portion of the supplemental output.

A few examples follow that help to illustrate the steps of the method 1200. In a first example, the first operation corresponds to capture of an image with a camera. The camera is integrated into the device 100 or is remote from the device but is remotely controlled by the device, according to various embodiments. The second operation in this example corresponds to capturing an image after a specified interval of time. Specifically, the method of this example begins by detecting a first input that corresponds to a request to capture of a first image with a camera, and responsive to detecting the first input, provides a first output that includes a haptic component according to some embodiments. Also responsive to detecting the first input, the device 100 captures the first image. After capturing the first image, the device 100 detects a second input that corresponds to a request to capture a second image after a specified interval of time, and responsive to detecting the second input provides a second output that includes a haptic component according to some embodiments. In this example, the second output includes the first output in conjunction with providing supplemental output that corresponds to measuring lapse of the specified interval of time and the second image is captured after the specified interval of time.

In another example, the first operation corresponds to a transaction-enable operation for enabling the device to authorize a secure transaction and the second operation corresponds to enabling the device to authorize a secure transaction and authorizing the secure transaction according to some embodiments. For example, in an online payment context in which credit card information is needed, the enable operation prepares an NFC subsystem to provide payment credentials at a payment terminal or other point of sale, or a user log in request that needs user credentials and password. Specifically, according to this example the method begins by detecting a first input that corresponds to a request to perform a transaction-enable operation for enabling the device to authorize a secure transaction, and responsive to detecting the first input, providing a first output that includes a haptic component. Also responsive to detecting the first input, enabling the device to authorize a secure transaction. After performing the transaction-enable operation, detecting a second input that corresponds to a request to authorize a secure transaction, and responsive to detecting the second input, providing a second output that includes a haptic component, wherein the second output includes the first output in conjunction with providing supplemental output that corresponds to authorizing the secure transaction the supplemental operation. Also responsive to detecting the second input, authorizing the secure transaction.

The first operation corresponds to a save operation for saving content within an existing file, and the second operation corresponds to a save-as operation to save content within an existing file to a new file according to some embodiments. In this example, a first input is detected that corresponds to a request to perform a save operation, and responsive to detecting the first input, a first output is provided that includes a haptic component. Also responsive to detecting the first input, the save operation is performed for saving content within an existing file. After performing the save operation, a second input is detected that corresponds to a request to perform a save as operation to save content within an existing file to a new file, and responsive to detecting the second input, a second output is provided that includes a haptic component, wherein the second output includes the first output in conjunction with providing supplemental output that corresponds to a creation of the new file according to some embodiments. Also responsive to detecting the second input, the save as operation is performed.

According to some embodiments the first operation corresponds to a send operation for sending a reply to a message that is in a message inbox and the second operation corresponds to a send and archive operation for sending a reply to a message that is in the message inbox and removing it from the message inbox.

It should be understood that the particular order in which the operations in FIG. 12 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1000, 1100, 1300, 2500, 2600, 3000, and 3200) are also applicable in an analogous manner to method 1200 described above with respect to FIG. 12. For example, the inputs, operations, applications, components, and haptic outputs described above with reference to method 1200 optionally have one or more of the characteristics of the inputs, operations, applications, components, and haptic outputs described herein with reference to other methods described herein (e.g., methods 700, 900, 1000, 1100, 1300, 2500, 2600, 3000, and 3200). For brevity, these details are not repeated here.

Alert Condition Class-Associated Haptic Output

Figure 13:
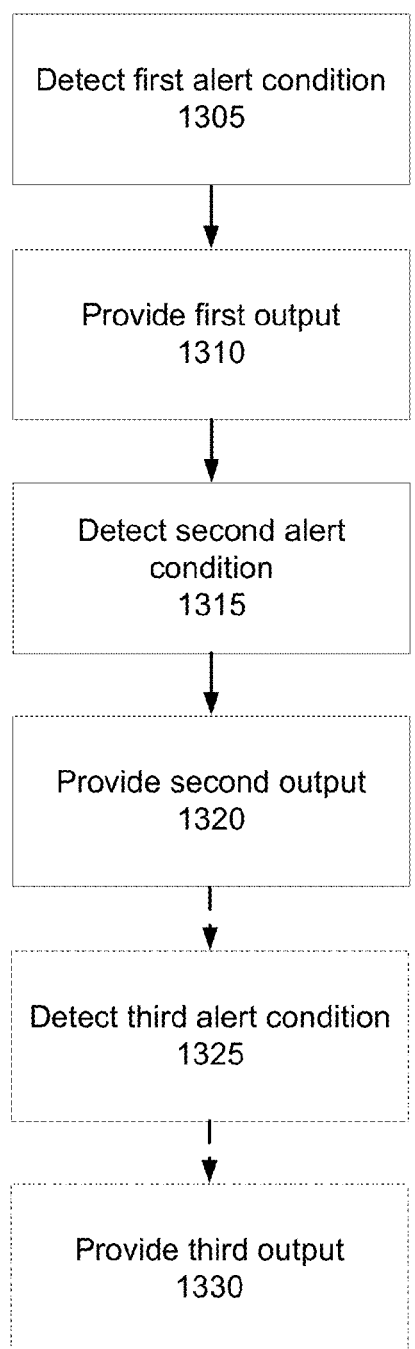
FIG. 13 is a flow diagram of a method for detecting first and second alert conditions and providing corresponding outputs according to some embodiments.

Whether two detected alert conditions are in the same or different class of alert condition provides the basis for providing a corresponding haptic output, according to some embodiments. Providing haptic output that correlates with whether alert conditions are in the same or different class of alert condition creates a more efficient human-machine interface, thereby reducing the amount of time it takes for a user to perform operations, which consequently reduces energy use and increases battery life for battery powered devices. FIG. 13 is an exemplary method flow diagram of a method 1300 for detecting first and second alert conditions and providing corresponding outputs according to some embodiments. Note that in some embodiments, different steps may be performed other than those shown in FIG. 13.

The method begins by detecting 1305 occurrence of a first alert condition according to some embodiments. The first alert condition can be any of the various alert conditions described elsewhere herein.

According to some embodiments, a first output is provided 1310 that includes a first haptic component and a first non-haptic component responsive to detecting the occurrence of the first alert condition. The non-haptic component can be any of audio or visual (e.g., graphic, textual) according to various embodiments. When an audio component is included, the audio and haptic components are aligned according to some embodiments. The haptic and audio waveforms need not be perfectly aligned, and the device 100 can take into account the fact that for certain classes of haptic and audio outputs, the haptic and audio outputs will be perceived by a user to be concurrent or simultaneous even if they are slightly offset in time (e.g., because audio output is processed more quickly than haptic output, so providing haptic output before providing audio output will, in some circumstance, cause a user to perceive the audio and haptic output as occurring concurrently or simultaneously). According to some embodiments, the non-haptic portion includes a textual component.

After providing the first output, the device 100 detects 1315 occurrence of a second alert condition, and responsive to detecting the occurrence of the second alert condition, provides 1320 a second output that includes a second haptic component and a second non-haptic component according to some embodiments. When the first alert condition and the second alert condition are different alert conditions that are in a same class of alert condition, the first output and the second output share one or more same components and have one or more different components according to some embodiments. Alternatively, when the first alert condition and the second alert condition are in a same class of alert condition, the first and second outputs have one or more components in common. When the first alert condition and the second alert condition are different alert conditions that are in different classes of alert condition, the first haptic component is different from the second haptic component and the first non-haptic component is different from the second non-haptic component according to some embodiments. Alternatively, when the first alert condition and the second alert condition are in different classes of alert condition, the first and second outputs have no common components.

Classes of alert conditions include messages, activity alerts, media playback alerts, virtual assistant alerts, system alerts, scheduling reminders, and internet browser updates according to some embodiments.

According to some embodiments, when the first alert condition and the second alert condition correspond to separate instances of the same alert condition, the first output is identical to the second output. If the computing device 100 has a touch-sensitive display, the first haptic component of the first output and the second haptic component of the second output are provided via the touch-sensitive display on the computing device.

In some embodiments, the first and second non-haptic components are audio outputs. For non-haptic output including audio output, a haptic output is accompanied by a corresponding audio output according to some embodiments, and the audio and haptic portion are aligned when at least a portion of the audio output is concurrent with at least a portion of the haptic output, or the audio output occurs close in time to the haptic output according to some embodiments. The haptic and audio waveforms need not be perfectly aligned, and the device 100 can take into account the fact that for certain classes of haptic and audio outputs, the haptic and audio outputs will be perceived by a user to be concurrent or simultaneous even if they are slightly offset in time (e.g., because audio output is processed more quickly than haptic output, so providing haptic output before providing audio output will, in some circumstance, cause a user to perceive the audio and haptic output as occurring concurrently or simultaneously). Variations in the accompanying audio portion also can vary between embodiments that include an audio output. For example, each of an amplitude of an audio component associated with the first output, a duration of the audio component associated with the first output, one or more musical qualities (e.g., pitch, tone, etc.) associated with the audio component associated with the first output, can vary in certain circumstances.

In some embodiments, the same haptic waveform generates different perceptions when accompanied by different audio waveforms. For example, if an audio (ring) tone is played with a high pitch versus a low pitch, and accompanied by the same haptic component (or substantially similar haptic components that a typical user will not be able to differentiate between), the perception of the haptic component differs despite the identical haptic. The higher pitched or shrill version of the ring tone might be used with the second output to draw elevated user attention. In some embodiments, the first haptic output is similar, identical, or substantially identical to the second haptic output.

In some embodiments, the first and second non-haptic components are visual outputs, such as text, graphic or metadata output.

According to some embodiments, the first alert condition and the second alert condition are in the same class of alert condition, wherein the class is associated with alert conditions for an application. In this example, all alerts from a respective application fall within a common class, and classes are differentiated by application. For example, all virtual assistant events optionally have same haptic component with different audio components. In another example, incoming and outgoing messages have the same haptic output with different audio, the same haptic output optionally based on being associated with a common instant messaging application. The common component (in this example, the haptic component) identifies the application. In yet another example, events for a personal automated assistant including confirm, cancel, and invoke events optionally all have the same audio, but differing haptic outputs.

TABLE 6

MESSAGES

| Alert Condition | Primary Application State | Mode | Condition | Haptic Output | Audio Output |
|---|---|---|---|---|---|
| Message received | Active | Messages | No new message | X | X |
| Message received | Active | Message | No new message | X | X |
| Message received | Active | Draft | No new message | X | X |
| Message received | Active | Background | No new message | X | X |
| Message received | Active | Messages | New message | Tap | Message Receive Default |
| Message received | Active | Message | New message | Tap | Message Receive Default |
| Message received | Active | Draft | New message | Tap | Message Receive Default |
| Message sent | Active | Draft | No new message | X | X |
| Message sent | Active | Draft | New message | Tap | Message Sent Default |

Table 6 shows message received and message sent alert conditions for a messaging application according to some embodiments. In this example, various modes are listed for an active application state. In the case of a new message received, as shown in rows five, six, and seven, a tap-type haptic is output and a message received default audio is output. In the case of a new message sent, shown in the last row, a tap-type haptic is output, and a message send default audio is output. Because message received (a first alert condition) and message sent (the second alert condition) are in the same class of alert condition in which the class is associated with an application (messaging), the haptic output for both alert conditions is the same, but the audio output is different. Table 6 provides conditions and corresponding outputs according to some embodiments, but is merely exemplary; other combinations of alerts, states, modes, conditions and outputs are used according to different embodiments.

According to some embodiments, the first alert condition and the second alert condition are in the same class of alert condition, and the class is associated with a category of applications. For example, classes of application include messaging applications, game applications, health/fitness applications, productivity applications, or social networking applications according to some embodiments. In some embodiments, applications that have or perform common or similar functions optionally belong to a common class of applications. Examples of classes of applications include, text-based communication applications (instant messaging, email, social media), voice-based communication applications (phone, voice over internet), multimedia applications (photo viewer applications, camera application, music player, video player), text editing applications (word, notepad), scheduling applications (calendar, alarm), and internet browser applications (chrome, safari). Classes are therefore differentiated by function across applications according to some embodiments. As one example, email messages and text messages although belonging to different applications (email and instant messaging) have the same haptic output and different audio outputs according to some embodiments, by virtue of being associated with applications that are in the same class of applications (both text-based communication applications).

According to some embodiments, the first alert condition and the second alert condition are in the same class of alert condition, and the class corresponds to functions in a predefined class of functions. For example, alerts that report on accomplishment of activity goals within an activity monitoring application (e.g., goal close, behind on goal, goal attained; achieved 10% of target, 50% of target, etc.) optionally fall within the same class of alerts. Various alarms or reminders within a same scheduling application can be set for different predefined time instances, or to report on the satisfaction of various different predefined criteria according to some embodiments.

TABLE 7

ACTIVITY GOALS

| Alert Condition | Primary Application State | Mode | Condition | Haptic Output | Audio Output |
|---|---|---|---|---|---|
| Sedentary timer end | Active | Background | No event | X | X |
| Sedentary timer end | Active | In use | No event | X | X |
| Sedentary timer end | Inactive | N/A | No event | X | X |
| Sedentary timer end | Active | Background | Timer end | Tap | Default Activity Chime |
| Sedentary timer end | Active | In use | Timer end | Tap | Default Activity Chime |
| Sedentary timer end | Inactive | N/A | Timer end | Tap | Default Activity Chime |
| Activity 50% of target | Active | Background | No event | X | X |
| Activity 50% of target | Active | In use | No event | X | X |
| Activity 50% of target | Inactive | N/A | No event | X | X |
| Activity 50% of target | Active | Background | 50% goal attained | Tap | X |
| Activity 50% of target | Active | In use | 50% goal attained | Tap | X |
| Activity 50% of target | Inactive | N/A | 50% goal attained | Tap | X |
| Activity target reached | Active | Background | No event | X | X |
| Activity target reached | Active | In use | No event | X | X |
| Activity target reached | Inactive | N/A | No event | X | X |
| Activity target reached | Active | Background | Goal attained | Tap | Intense Activity Chime |
| Activity target reached | Active | In use | Goal attained | Tap | Intense Activity Chime |
| Activity target reached | Inactive | N/A | Goal attained | Tap | Intense Activity Chime |

Table 7 depicts various activity related goals according to some embodiments. In this example, three different alert conditions belonging to the same alert condition class are shown: sedentary end timer, activity 50% of target, and activity target reached. The class of alert conditions shown corresponds to functions in a predefined class of functions of alerts that report on accomplishment of activity goals within an activity monitoring application. For each event in the table, the haptic output is a tap-type output, although the audio output for each different type varies (e.g., default activity chime, no audio, intense activity chime). Table 7 provides conditions and corresponding outputs according to some embodiments, but is merely exemplary; other combinations of alerts, states, modes, conditions and outputs are used according to different embodiments.

According to some embodiments, the first alert condition and the second alert condition are associated with two different applications, wherein the first alert condition and the second alert condition are in the same class of alert condition, the class corresponding to functions in a predefined class of functions within the two different applications. Examples of predefined classes of functions include, alerts that report on incoming text communication from another user across applications (incoming email, incoming instant message, incoming social media message) fall into the same class, alerts that report on incoming voice communication from another user across all applications (phone, voice over internet, voice call within an email application) fall into a common class, alerts that report application software upgrades for all applications fall into a common class, system alerts that report on various states of the device (Wi-Fi connected/not available, GPS turned on/off, battery life indicator, device on/off), according to some embodiments.

TABLE 8

SOFTWARE UPGRADES

| Alert Condition | Application | Primary Application State | Mode | Condition | Haptic Output | Non-Haptic Output |
|---|---|---|---|---|---|---|
| SW upgrade available | Calendar | Active | Background | No event | Buzz-tap | X |
| SW upgrade available | Messages | Active | Background | No event | Buzz-tap | X |
| SW upgrade available | Social Networking | Active | Background | No event | Buzz-tap | Pop-up |
| SW upgrade available | Game | Active | Background | No event | Buzz-tap | Pop-up |

Table 8 includes various software upgrade available alert conditions for four different application types: calendar, messages, Social Networking, and Game. These alert conditions each are associated with different applications, but are in the same class of alert condition corresponding to functions in a predefined class of functions, in this case application software upgrades for all applications. For each alert condition, a haptic of buzz-tap is output. Some of the alert conditions also have a non-haptic output. In the case of social networking or gaming applications, the haptic output is complimented by a pop-up type notification. Table 8 provides conditions and corresponding outputs according to some embodiments, but is merely exemplary; other combinations of alerts, states, modes, conditions and outputs are used according to different embodiments.

According to some embodiments, when the first alert condition and the second alert condition are different alert conditions that are in a same class of alert condition, the first haptic component of the first output is identical (or substantially identical) to the second haptic component of the second output, and the first non-haptic component (e.g., audio or visual) of the first output is different from the second non-haptic component of the second output. Each of the examples of Tables 4, 5, and 6 above fall into this category, as they each share a common haptic component and differing non-haptic components. In some embodiments, "identical" haptic components are haptic components that are generated based on same haptic output instructions delivered to a haptic output generator, even if the haptic output generator (sometimes an analog component) generates haptic outputs that are slightly different (even while being substantially perceptually identical to a typical user). In some embodiments, the audio components may share attributes, but still differ. For example, the same ringtone or musical notes played in different pitches or using different musical instruments. Overlaying different audio (e.g., high vs low pitch, same audio played in metallic vs. glass vs. ceramic tones) on the same haptic output creates different perceptions. In some embodiments, different haptic components are haptic components that are generated based on different haptic output instructions delivered to a haptic output generator so as to produce haptic outputs that are perceptually differentiable by a typical user).

According to some embodiments, the opposite correlation applies for haptic versus non-haptic similarities and differences in their respective outputs. When the first alert condition and the second alert condition are different alert conditions that are in a same class of alert condition, the first non-haptic component of the first output is identical (or substantially identical) to the second non-haptic component of the second output, and the first haptic component of the first output is different from the second haptic component of the second output.

When the first alert condition and the second alert condition correspond to a same alert condition, the first output is accompanied by a first additional component that is different from a second additional component that accompanies the second output according to some embodiments. For example, a first and a second incoming instant message both are incoming instant messages, and therefore are the same alert condition. In this example, the first additional component is unique to a first event that triggered the first alert condition, and the second additional component is unique to a second event that triggered the second alert condition, e.g., the additional component of the first incoming instant message includes a visual component (text, metadata, graphic) that is unique to the first instant message (e.g., name of sender, contact information of the sender, body/content of the message) according to some embodiments. Likewise, the additional component of the second incoming instant message includes a visual component (text, metadata, graphic) that is unique to the second instant message (e.g., name of sender, contact information of the sender, body/content of the message). The first additional component accompanying the first output optionally provides information (e.g., textual information) describing the first event that triggered the first alert (e.g., a snippet of the message or text version of the automated assistant response), and the second additional component accompanying the second output provides information (e.g., textual information) describing the second event that triggered the second alert according to some embodiments.

According to some embodiments, after providing 1320 the second output, the device 100 detects 1325 occurrence of a third alert condition, and responsive to detecting the occurrence of the third alert condition, provides 1330 a third output that includes a third haptic component and a third non-haptic component. When the first alert condition, the second alert condition, and the third alert condition are different alert conditions that are in a same class of alert condition, the first output, the second output, and the third output optionally share one or more same components and have one or more different components. When the third alert condition is in a different class of alert condition from the first alert condition and the second alert condition, the third haptic component optionally is different from both the first haptic component and the second haptic component and the third non-haptic component optionally is different from both the first non-haptic component and the second non-haptic component. Alternatively, when the first alert condition, the second alert condition, and the third alert condition are different alert conditions that are in the same class of alert condition, and the first, second, and third outputs have one or more components in common (e.g., haptic, non-haptic) and when the third alert condition is in a different class of alert condition from the first alert condition and the second alert condition, the third haptic output has no common components with the first output and the second output, according to some embodiments.

It should be understood that the particular order in which the operations in FIG. 13 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1000, 1100, 1200, 2500, 2600, 3000, and 3200) are also applicable in an analogous manner to method 1300 described above with respect to FIG. 13. For example, the inputs, alert conditions, applications, and haptic outputs described above with reference to method 1300 optionally have one or more of the characteristics of the inputs, alert conditions, applications, and haptic outputs described herein with reference to other methods described herein (e.g., methods 700, 900, 1000, 1100, 1200, 2500, 2600, 3000, and 3200). For brevity, these details are not repeated here.

The operations described above with reference to FIGS. 7, 9-13 are, optionally, implemented by components depicted in FIGS. 1A-1B, and 14-19. For example, receiving input, detecting alert conditions, determining states, determining alert condition triggers, providing haptic and audio output, and performing operations, are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and 14-19.

Figure 14:
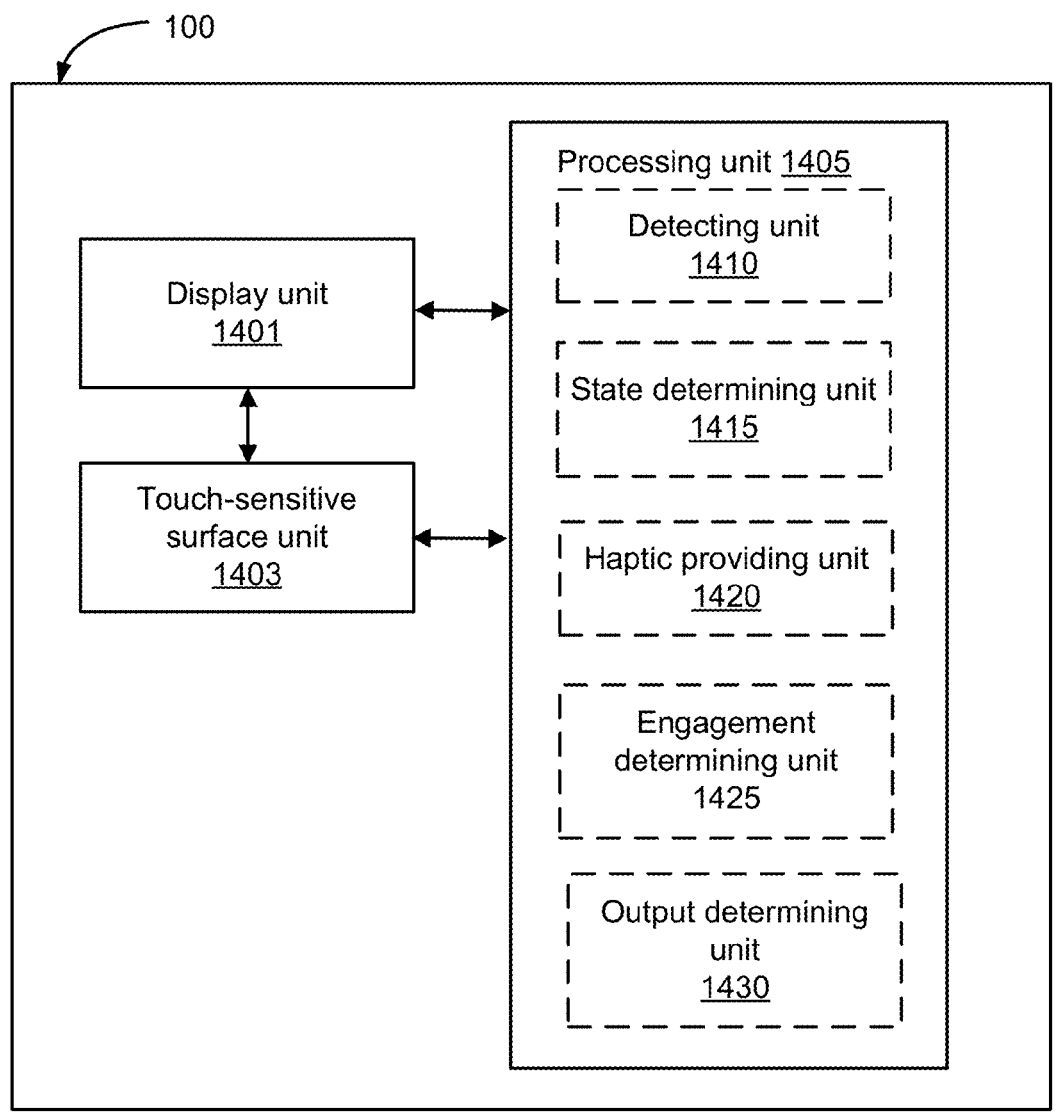
FIG. 14 is a functional block diagram of an electronic device in accordance with some embodiments.

As mentioned above, the operations described with reference to FIGS. 7 and 9-13 are optionally implemented by components depicted in FIGS. 14-19. FIG. 14 shows an example functional block diagram of device 100 configured in accordance with the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, the device 100 includes a display unit 1401 configured to display an application, a touch-sensitive surface unit 1403 configured to receive user contacts, and a processing unit 1405 coupled to the display unit 1401 and the touch-sensitive surface unit 1403. In some embodiments, the processing unit 1405 includes a detecting unit 1410, a state determining unit 1415, a haptic providing unit 1420, an engagement determining unit 1425, and output determining unit 1430.

The processing unit 1405 is configured to detect an alert condition associated with an application executing on the computing device (e.g., with the detecting unit 1410). The processing unit 1405 also is configured to determine a state associated with the application at a time associated with the alert condition responsive to detecting the alert condition (e.g., with the state determining unit 1415). In accordance with a determination that the application was in an active state at the time associated with the alert condition, the processing unit 1405 provides a first haptic output (e.g., with the haptic providing unit 1420) that represents the occurrence of the alert condition, the first haptic output having a first set of output characteristics and in accordance with a determination that the application was in an inactive state at the time associated with the alert condition, providing a second haptic output (e.g., with the haptic providing unit 1420) that represents the occurrence of the alert condition, the second haptic output having a second set of output characteristics, wherein the second haptic output is different from the first haptic output.

The following 12 paragraphs describe different embodiments that may be implemented, individually or in any combination, by the device 100 illustrated in FIG. 14:

The processing unit 1405 determines the state associated with the application at a time associated with the alert condition by determining whether a user interface for the application was displayed on a touchscreen of the device at the time associated with the alert condition (e.g., with the state determining unit 1415).

The processing unit 1405 determines the state associated with the application at a time associated with the alert condition by determining whether a user input to the application triggered the alert condition (e.g., with the state determining unit 1415), with the user interaction being different from the alert condition.

If the application was in the active state based on a detected user interaction at the time of the alert condition and the processing unit 1405 determines a level of user engagement associated with the user interaction at the time of the alert condition (e.g., with the engagement determination unit 1425) and determines one or more of the first set of output characteristics for the first haptic output based on the determined level of engagement (e.g., with the output determining unit).

The processing unit 1405 determining that the application was in the active state comprises determining that the application was executing in the foreground on the computing device at the time associated with the alert condition. The processing unit 1405 determining that the application was in the inactive state comprises determining that the application was not executing on the computing device or was executing in the background on the computing device at the time associated with the alert condition.

The display unit 1401 displays a respective user interface window corresponding to the application concurrently with one or more other user interface windows on a multi-application-window user interface on the device. The processing unit 1405 determines whether the respective user interface window corresponding to the application was displayed in the foreground of the multi-application-window user interface at the time associated with the alert condition (e.g., with the state determining unit 1415).

The display unit 1401 displays one or more other user interface windows are concurrently on a multi-application-window user interface on the device at the time associated with the alert condition and the processing unit 1405 determines the state associated with the application (e.g., with the state determining unit 1415) at the time associated with the alert condition comprises determining whether a respective user interface window corresponding to the application was displayed in the multi-application-window user interface at the time associated with the alert condition.

In some embodiments, the alert condition corresponds to an event that is automatically triggered by the application, an automatically initiated event notification received by the application from a source external to the device, or a manually initiated event notification received by the application from a human user other than a user of operating the device.

The processing unit 1405 provides output (e.g., with output determining unit 1430) comprising a first haptic output accompanied by a first audio output and a second haptic output accompanied by a second audio output, with the first haptic output being identical to the second haptic output and the first audio output being different from the second audio output. Alternatively, the processing unit 1405 provides output (e.g., with output determining unit 1430) comprising a first haptic output accompanied by an audio output and the second haptic output accompanied by the same audio output, with the first haptic output being different from the second haptic output.

The processing unit 1405 accompanies the second haptic output by an audio output, a waveform of the second haptic output generated based on, mirroring, and synchronized to a waveform of the accompanying audio output. The processing unit 1405 provides output (e.g., with output determining unit 1430) comprising a first haptic output not accompanied by audio output and a second haptic output accompanied by an audio output. In some embodiments, the first haptic output is similar to the second haptic output. In some embodiments, the second haptic output has a greater intensity than the first haptic output.

The first set of characteristics of the haptic output (e.g., provided by output determining unit 1430) comprises one or more of: an amplitude, a duration, a regularity, a repetition frequency, or a selection of haptic features of the first haptic output. In some embodiments, the second haptic output is different and has a greater intensity than the first haptic output.

The processing unit 1405 determines a state of the computing device (e.g., with the state determining unit) at the time associated with the alert condition by determining that the computing device was active at the time associated with the alert condition, and determining that the application was in the inactive state comprises determining that the computing device was inactive at the time associated with the alert condition. The first and second sets of characteristics correspond to a device type of the computing device according to some embodiments.

In some embodiments, at a first point in time, while the application is in the active state, the processing unit 1405 detects a first alert condition associated with the application (e.g., with the detecting unit 1410), and responsive to detecting the first alert condition while the first application is in the active state, the processing unit 1404 provides (e.g., with the output determining unit 1430) a first output representing the first alert condition. At a second point in time, while the first application is in an inactive state, the processing unit 1405 detects a second alert condition, and responsive to detecting the second alert condition while that the application is in the inactive state, the processing unit 1405 provides the second haptic output representing the second alert condition (e.g., with output determining unit 1440), the second haptic output different from the first haptic output.

In some embodiments, the device has a touch-sensitive display (e.g., provided by touch-sensitive surface unit 1403), and the first haptic output and the second haptic output are provided via a touch-sensitive display on the computing device (e.g., with output determining unit 1430). As mentioned above, the operations described with reference to FIGS. 7 and 9-13 are optionally implemented by components depicted in FIGS. 14-19. FIG. 14 shows an example functional block diagram of device 100 configured in accordance with the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

Figure 15:
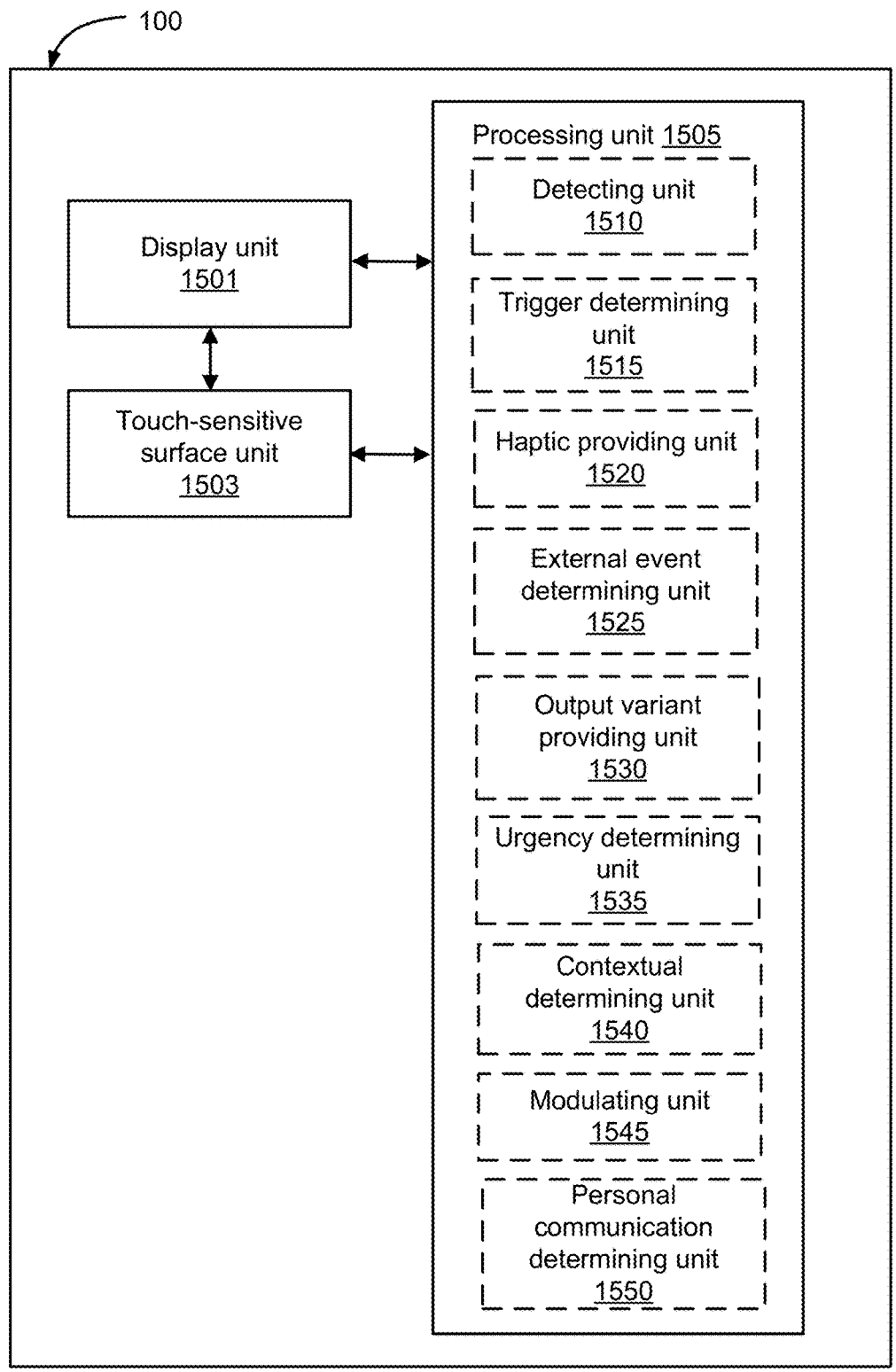
FIG. 15 is a functional block diagram of an electronic device in accordance with some embodiments.

As mentioned above, the operations described with reference to FIGS. 7 and 9-13 are optionally implemented by components depicted in FIGS. 14-19. FIG. 15 shows an example functional block diagram of device 100 configured in accordance with the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, the device 100 includes a display unit 1501 configured to display an application, a touch-sensitive surface unit 1503 configured to receive user contacts, and a processing unit 1505 coupled to the display unit 1501 and the touch-sensitive surface unit 1503. In some embodiments, the processing unit 1505 includes a detecting unit 1510, a trigger determining unit 1515, a haptic providing unit 1520, an external event determining unit 1525, an output variant providing unit 1530, an urgency determining unit 1535, a contextual determining unit 1540, a modulating unit 1545, and a personal communication determining unit 1550.

The processing unit 1505 is configured to detect occurrence of an alert condition associated with an application (e.g., with detecting unit 1510), and responsive to detecting the occurrence of the alert condition, determine whether the alert condition was triggered by a manually-initiated event (e.g., with trigger determining unit 1515). In accordance with a determination that the alert condition was triggered by a manually-initiated event, the processing unit 1505 provides a first haptic output (e.g., with haptic providing unit 1520) corresponding to a manually-initiated event notification in accordance with a determination that the alert condition was triggered by an automatically-initiated event, the processing unit 1505 provides a second haptic output (e.g., with haptic providing unit 1520) corresponding to an automatically-initiated event notification, wherein the second haptic output is different from the first haptic output.

The following 12 paragraphs describe different embodiments that may be implemented, individually or in any combination, by the device 100 illustrated in FIG. 15:

The processing unit 1505 determines that the alert condition was triggered by a manually-initiated event by determining whether the alert condition corresponds to an event initiated by a human user (e.g., with trigger determining unit 1515), according to some embodiments. In some embodiments, the processing unit 1505 determines that the alert condition was triggered by a manually-initiated event by determining whether the alert condition corresponds to an event initiated by a human user other than a user of the computing device (e.g., with trigger determining unit 1515).

The processing unit 1505 determines that the alert condition was triggered by a manually-initiated event by determining whether the alert condition corresponds to an input received from a human user (e.g., with trigger determining unit 1515), the input identifying a user of the computing device and the input comprising an indication from the human user to alert the user of the computing device as to the input, according to some embodiments.

The processing unit 1505 determines whether the alert condition was automatically triggered by the application or was an automatically-initiated event notification received by the application from a source external to the device (e.g., with trigger determining unit 1515), according to some embodiments. Alternatively, the processing unit 1505 determines that the alert condition was triggered by an automatically-initiated event by determining that the alert condition occurs at predetermined time or reports on satisfaction of a predetermined triggering condition (e.g., with trigger determining unit 1515).

In accordance with a determination that the alert condition was triggered by an automatically-initiated event, the processing unit 1505 determines whether the automatically-initiated event corresponds to an automatically-initiated event occurring external to the device (e.g., with external event determining unit 1525), according to some embodiments. In accordance with a determination that the automatically-initiated event corresponds to an event occurring external to the device, the processing unit 1505 provides a first variant of the second haptic output (e.g., with the output variant providing unit 1530), corresponding to a notification of an externally occurring automatically-initiated event. In accordance with a determination that the automatically-initiated event corresponds to an event initiated within the device, the processing unit 1505 provides a second variant of the second haptic output corresponding to a notification of an internally generated automatically-initiated event (e.g., with the output variant providing unit 1530).

In accordance with a determination that the alert condition was triggered by a manually-initiated event, he processing unit 1505 determines a measure of urgency associated with the manually-initiated event (e.g., with urgency determining unit 1535), and modulates an intensity of the first haptic output based on the measure of urgency (e.g., with modulating unit 1545), according to some embodiments. In accordance with a determination that the alert condition was triggered by a manually-initiated event, the processing unit 1505 according to some embodiments determines one or more contextual attributes associated with the manually-initiated event (e.g., with contextual determining unit 1540), and modulates an intensity of the first haptic output based on the one or more contextual attributes (e.g., with the modulating unit 1545), according to some embodiments.

In accordance with a determination that the alert condition was triggered by an automatically-initiated event, the processing unit 1505 analyzes characteristics associated with the alert condition to determine one or more contextual attributes associated with the automatically-initiated event (e.g., with contextual determining unit 1540), and modulates an intensity the second output based on the one or more contextual attributes (e.g., with the modulating unit 1545), according to some embodiments.

In accordance with a determination that the alert condition was triggered by an automatically-initiated event, the processing unit 1505 determines a time-varying measure of urgency associated with the automatically-initiated event (e.g., with urgency determining unit 1535), and modulates, over a specified window of time, an intensity of the second haptic output to indicate the time-varying measure of urgency (e.g., with modulating unit 154), according to some embodiments.

In some embodiments, the first haptic output is accompanied by a first audio output and the second haptic output is accompanied by a second audio output, the first haptic output is similar to the second haptic output, and the first audio output is different from the second audio output. In some embodiments, the first haptic output is accompanied by a first audio output and the second haptic output is accompanied by a second audio output, the first audio output is similar to the second audio output, and the first haptic output is different from the second haptic output. In some embodiments, the first haptic output is accompanied by a first audio output and the second haptic output is not accompanies by an audio output. The first haptic output optionally is similar to the second haptic output.

The first haptic output that corresponds to the manually-initiated event notification is more intense than the second haptic output that corresponds to the automatically-initiated event notification, according to some embodiments. In some circumstances, the first haptic output is characterized by a first set of characteristics comprising one or more of: an amplitude of the first haptic output, a duration of the first haptic output, a regularity associated with the first haptic output, repetition frequency of haptic features in the first haptic output, and a selection of haptic features constituting the first haptic output, and the second haptic output is characterized by a second set of characteristics comprising one or more of: an amplitude of the second haptic output, a duration of the second haptic output, a regularity associated with the second haptic output, repetition frequency of haptic features in the second haptic output, and a selection of haptic features constituting the second haptic output.

The processing unit 1505 detects a first alert condition corresponding to an incoming email message from a first human sender (e.g., with the detecting unit 1510), according to some embodiments. Responsive to determining that the incoming email message corresponds to a manually-initiated event, the processing unit 1505 provides the first haptic output (e.g., with haptic providing unit 1520). The processing unit 1505 detects a second alert condition corresponding to an incoming text message from a second human sender (e.g., with the detecting unit 1510), and responsive to determining that the incoming text message corresponds to a manually-initiated event, provides the first haptic output (e.g., with haptic providing unit 1520).

In some embodiments, the device has a touch-sensitive display (e.g., provided by touch-sensitive surface unit 1503), and the first haptic output and the second haptic output are provided via a touch-sensitive display on the computing device (e.g., with haptic providing unit 1520).

The processing unit 1505 detects occurrence of an alert condition associated with an application (e.g., with the detecting unit 1510), according to some embodiments, and responsive to detecting the occurrence of the alert condition, determines whether the alert condition corresponds to a personal communication from a sender in a list of contacts associated with the user (e.g., with personal communication determining unit 1550). In accordance with a determination that the alert condition corresponds to a personal communication from a sender in a list of contacts associated with the user, the processing unit 1505 provides a first haptic output corresponding to a personal alert notification (e.g., with haptic providing unit 1520), and in accordance with a determination that the alert condition does not correspond to a personal communication from a sender in a list of contacts associated with the user, the processing unit 1505 provides a second haptic output corresponding to an automatic alert notification (e.g., with haptic providing unit 1520), wherein the first haptic output is greater in magnitude than the second haptic output.

Figure 16:
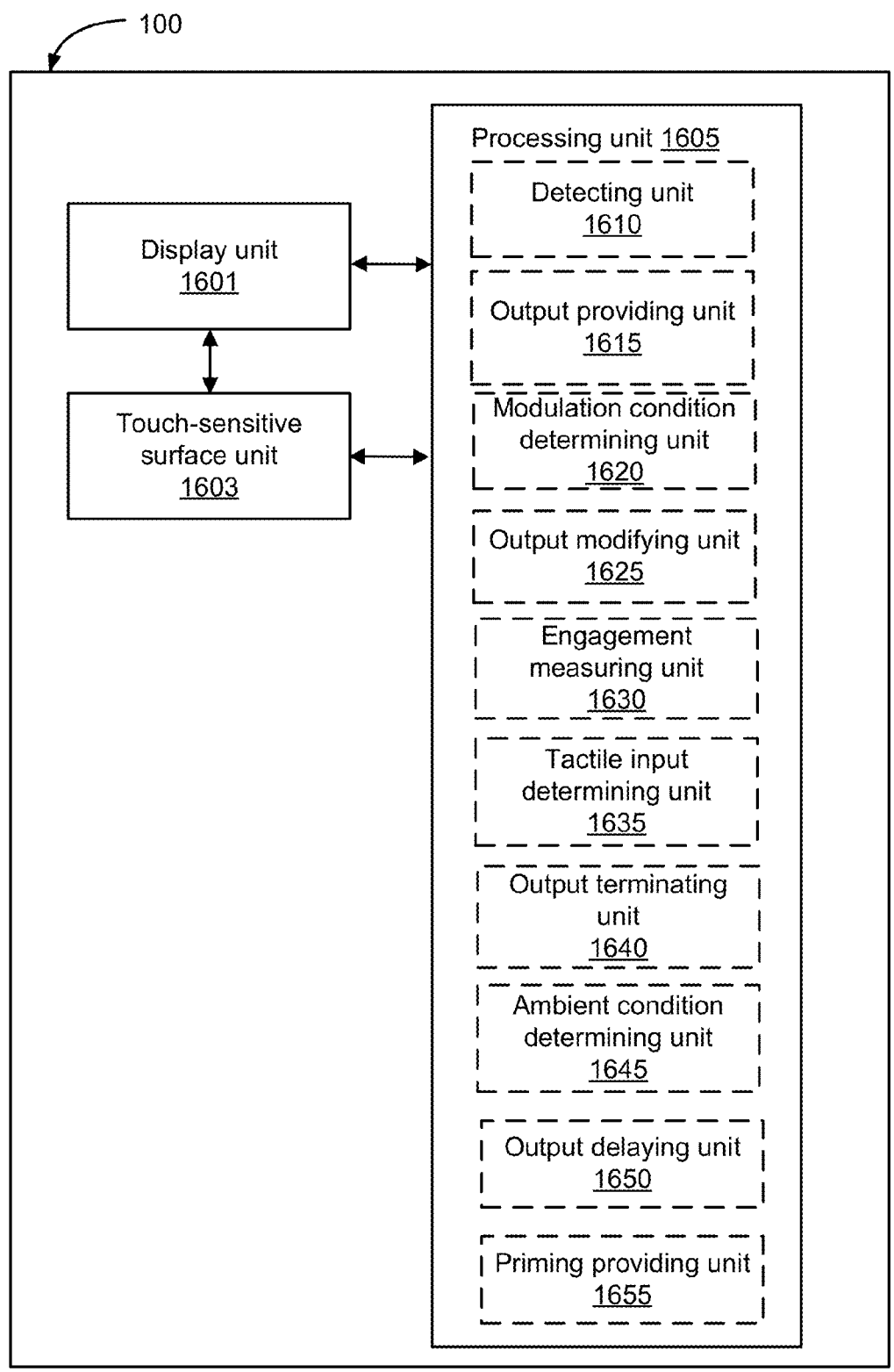
FIG. 16 is a functional block diagram of an electronic device in accordance with some embodiments.

As mentioned above, the operations described with reference to FIGS. 7 and 9-13 are optionally implemented by components depicted in FIGS. 14-19. FIG. 16 shows an example functional block diagram of device 100 configured in accordance with the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, the device 100 includes a display unit 1601 configured to display an application, a touch-sensitive surface unit 1603 configured to receive user contacts, and a processing unit 1605 coupled to the display unit 1601 and the touch-sensitive surface unit 1603. In some embodiments, the processing unit 1605 includes a detecting unit 1610, an output providing unit 1615, a modulation condition determining unit 1620, an output modifying unit 1625, an engagement measuring unit 1630, a tactile input determining unit 1635, an output terminating unit 1640, an ambient condition determining unit 1645, an output delaying unit 1650, and a priming providing unit 1655.

The processing unit 1605 is configured to detect a first alert condition on the computing device associated with receiving user input to an application (e.g., with the detecting unit 1610), and responsive to detecting the first alert condition, provides a first haptic output having a first intensity and corresponding to the user input to the application (e.g., with the output providing unit 1615). After providing the first haptic output, the processing unit 1605 detects a second alert condition associated with receiving a predetermined system event in the application (e.g., with the detecting unit 1610), and responsive to detecting the second alert condition, provides a second haptic output having a second intensity (e.g., with the output providing unit 1615), and corresponding to the predetermined system event, wherein the second intensity is greater than the first intensity.

The following 18 paragraphs describe different embodiments that may be implemented, individually or in any combination, by the device 100 illustrated in FIG. 16:

In some embodiments, the first haptic output is feedback provided in direct response to and as a consequence of the user input. The second alert condition corresponds to an event that is automatically triggered by the application, an automatically initiated event notification received by the application, or a manually initiated event notification received by the application, according to some embodiments.

The processing unit 1605 determines whether an input-based modulation condition exists (e.g., with the modulation condition determining unit 1620), and responsive to determining that an input-based modulation condition exists, prior to providing the first haptic output, the processing unit 1605 modifies the first haptic output (e.g., with the output modifying unit 1625), according to some embodiments.

In some embodiments, after detecting a respective alert condition, the processing unit 1605 determines that the respective alert condition resulted from a respective user input received on the computing device and identifies a measure of user engagement associated with the detected user input (e.g., with the engagement measuring unit 1630). The processing unit 1605 modulates the first signal intensity of the first haptic output based on the measure of user engagement (e.g., with the output modifying unit 1625).

In some embodiments, after detecting a respective alert condition, the processing unit 1605 determines that the respective alert condition resulted from receiving a tactile user input on the device (e.g., with the tactile input determining unit 1635), and identifies a location of receiving the tactile user input on the device. The processing unit 1605 modulates a spatial haptic energy profile of the first haptic output, by providing greater than a specified proportion of haptic energy of the first haptic output within a specified radius threshold of the location of receiving the tactile user input on the device (e.g., with the output modifying unit 1625).

In some embodiments, after detecting a respective alert condition, the processing unit 1605 determines that the respective alert condition resulted from receiving a tactile user input on the device (e.g., with the tactile input determining unit 1635), and modulates a spatial haptic energy profile of the first haptic output (e.g., with the output modifying unit 1625), by reducing the amplitude of haptic energy of the first haptic output such that it is perceptible at the location of receiving the tactile user input on the device. The location of receiving the tactile user input on the device can vary with time, and the spatial haptic energy can varies with time corresponding to the time-varying location of receiving the tactile user input.

In some embodiments, after detecting a respective alert condition, the processing unit 1605 determines that the respective alert condition resulted from receiving a tactile user input, and identifies time-varying morphological attributes of the tactile user input (e.g., with the tactile input determining unit 1635). The processing unit 1605 modifies, over time, morphological characteristics of the first haptic output to mimic the time-varying morphological attributes of the tactile user input (e.g., with the output modifying unit 1625). The time-varying morphological attributes include a time-dependent contact pressure profile between the tactile user input and a touch-sensitive surface of the computing device, according to some embodiments, and the modifying comprises modulating, with time, an energy profile of the first haptic output to mirror the time-dependent contact pressure profile between the tactile user input and the touch-sensitive surface of the computing device (e.g., with the output modifying unit 1625).

In some embodiments, after detecting a respective alert condition, the processing unit 1605 determines that the respective alert condition resulted from a sustained user input (e.g., with the tactile input determining unit 1635), and responsive to the determining, initiates the first haptic output at an initiation time of the sustained user input (e.g., with the output providing unit 1615). The processing unit 1605 detects termination of the sustained user input, and terminates the first haptic output at a termination time of the sustained user input (e.g., with the output terminating unit 1640).

The processing unit 1605 determines whether an ambient condition-based modulation condition exists (e.g., with the ambient condition determining unit 1645), and responsive to determining that an ambient condition-based modulation condition exists, prior to providing the second haptic output, modifies the second haptic output (e.g., with the output modifying unit 1625).

In some embodiments, after detecting a respective alert condition associated with a respective application, the processing unit 1605 determines that the respective alert condition did not result from receiving user input, and responsive to determining that the respective alert condition did not result from receiving user input, the processing unit 1605 determines whether one or more ambient conditions exist for the device as potential interference to haptic output at a time of occurrence of the respective alert condition (e.g., with the ambient condition determining unit 1645). In accordance with a determination that no interferential ambient conditions exist for the device, the processing unit 1605 provides a respective second haptic output based on the state of receptiveness of the user (e.g., with the output providing unit 1615). In accordance with a determination that one or more ambient conditions exist for the device as potential interference to haptic output, the processing unit 1605 delays providing the respective second output to the user (e.g., with the output delaying unit 1650).

In some embodiments, after detecting a respective alert condition associated with a respective application, the processing unit 1605 determines that the respective alert condition did not result from receiving user input, and responsive to determining that the respective alert condition did not result from receiving user input, the processing unit 1605 determines whether one or more ambient conditions exist for the device as potential interference to haptic output at a time of occurrence of the respective alert condition (e.g., with the ambient condition determining unit 1645). In accordance with a determination that no interferential ambient conditions exist for the device, the processing unit 1605 provides a first variant of the second haptic output to the user (e.g., with the output modifying unit 1625), the first variant of the second haptic output having a first set of output characteristics. In accordance with a determination that one or more ambient conditions exist for the device as potential interference to haptic output, the processing unit 1605 provides a second variant of the second haptic output to the user (e.g., with the output modifying unit 1625), the second variant of the second haptic output having a second set of output characteristics, the second set of characteristics different from the first set of characteristics, the second variant of the second haptic output having greater intensity than the first variant of the second haptic output.

In some embodiments, after detecting a respective alert condition associated with a respective application, the processing unit 1605 determines that the respective alert condition did not result from receiving user input, and responsive to determining that the respective alert condition did not result from receiving user input, the processing unit 1605 provides a priming haptic output as a precursor to the second haptic output (e.g., with the priming providing unit 1655), the priming haptic output to increase an engagement level of a user operating the device to the second haptic output, wherein at least a portion of the priming haptic output is more pronounced than the second haptic output. In addition, the processing unit 1605 provides the second haptic output following and within a specified time interval of providing the priming haptic output (e.g., with the output providing unit 1615). In some embodiments, the priming haptic output comprises a priming haptic component with a time-varying waveform morphology characterized by a progressively increasing intensity of the haptic component with time. In some embodiments, the priming haptic output comprises a priming haptic component with a time-varying waveform morphology characterized by an emphasized haptic feature followed by a progressively diminishing intensity of the haptic component.

In some embodiments, the second haptic output is preceded by the priming haptic output, and the first haptic output is provided directly, without a corresponding preceding priming haptic output, in response to a corresponding alert condition that results from a received user input. In some embodiments, characteristics of the priming haptic output are selected based on an urgency or context associated with the alert condition.

In some embodiments, the processing unit 1605 detects a first alert condition corresponding to a user selection of a user interface element displayed on an application user interface associated with a first application (e.g., with the detecting unit 1610). Responsive to the first alert condition, the processing unit 1605 provides a respective first haptic output representing the user selection of a user interface element (e.g., with the output providing unit 1615), the respective first haptic output comprising a first haptic component including a first haptic feature of a first intensity and a first duration. After providing the respective first haptic output, the processing unit 1605 detects a second alert condition corresponding to an alert notification received by the first application (e.g., with the detecting unit 1610), and responsive to the second alert condition, the processing unit 1605 provides a respective second haptic output representing the receipt of the alert notification (e.g., with the output providing unit 1615), the respective second haptic output comprising a second haptic component including a second haptic feature of a second intensity and a second duration, the respective second haptic output different from and more pronounced than the respective first output based on the second haptic feature being more pronounced than the first haptic feature, the second intensity being greater than the first intensity, or the second duration being longer than the first duration.

In some embodiments, the processing unit 1605 detects a first alert condition associated with a first application, the first alert condition resulting from a respective user input (e.g., with the detecting unit 1610), and provides a respective first haptic output representing the first alert condition (e.g., with the output providing unit 1615). After providing the respective first haptic output, the processing unit 1605 detects a second alert condition associated with the first application (e.g., with the detecting unit 1610), the second alert condition not resulting from receiving user input, and provides a respective second haptic output representing the second alert condition (e.g., with the output providing unit 1615), the respective second haptic output different from and having greater intensity than the respective first output.

In some embodiments, the first haptic output has a first set of characteristics comprising one or more of: an amplitude of the first haptic output, a duration of the first haptic output, a regularity associated with the first haptic output, repetition frequency of haptic features in the first haptic output, a selection of haptic features constituting the first haptic output, and the second haptic output has a second set of characteristics comprising one or more of: an amplitude of the second haptic output, a duration of the haptic component associated with the second haptic output, a regularity associated with the second haptic output, repetition frequency of haptic features in the second haptic output, a selection of haptic features constituting the second haptic output.

In some embodiments, the first haptic output is accompanied by a first audio output and the second haptic output is accompanied by a second audio output, the first haptic output is similar to the second haptic output, and the first audio output is different from the second audio output. In some embodiments, the first haptic output is accompanied by a first audio output and the second haptic output is accompanied by a second audio output, the first audio output is similar to the second audio output, and the first haptic output is different from the second haptic output.

In some embodiments, the first intensity of the first haptic output and the second intensity of the second haptic output is further adjusted in inverse relation to a volume setting on the device. The second haptic output is accompanied by an audio output and the first haptic output is not accompanied by an audio output, according to some embodiments.

In some embodiments, the computing device comprises a touch-sensitive display for receiving the user input (e.g., with the touch-sensitive surface unit 1603), and the first haptic output and the second haptic output are provided via the touch-sensitive display on the computing device (e.g., with the output providing unit 1615).

Figure 17:
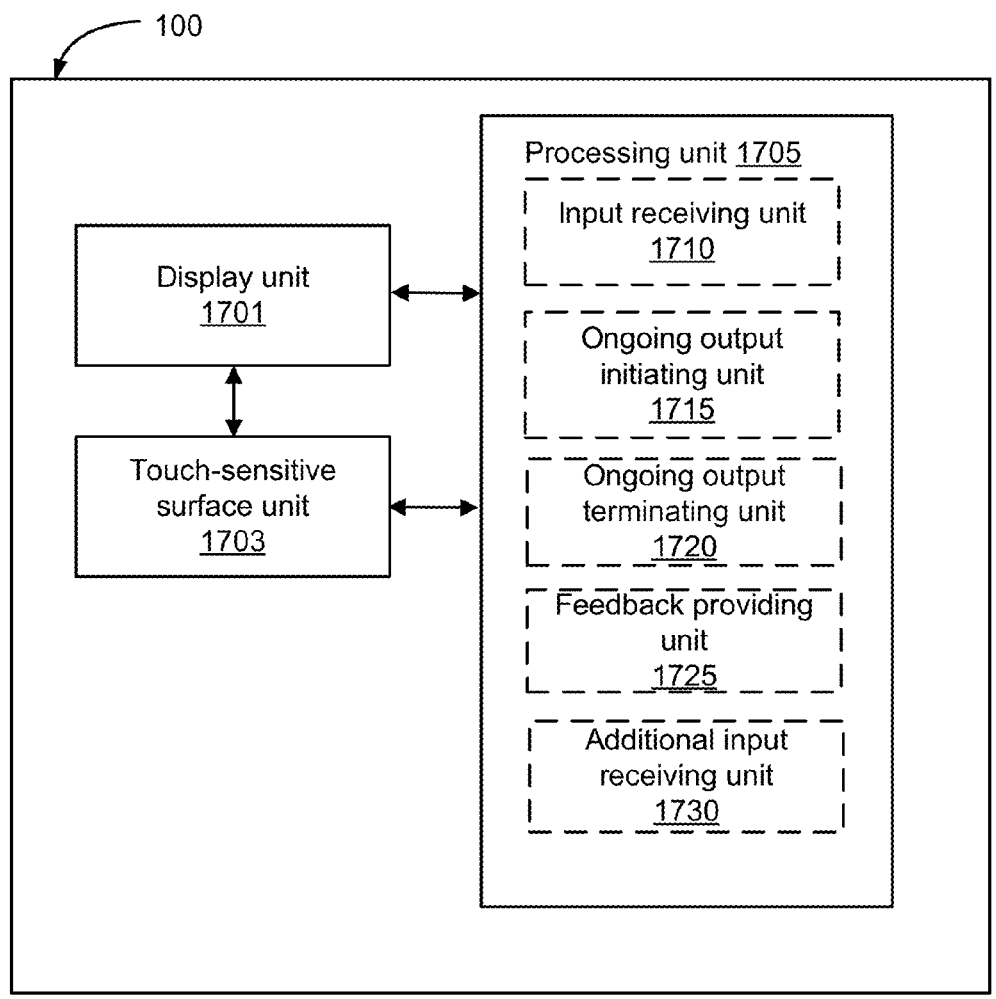
FIG. 17 is a functional block diagram of an electronic device in accordance with some embodiments.

As mentioned above, the operations described with reference to FIGS. 7 and 9-13 are optionally implemented by components depicted in FIGS. 14-19. FIG. 17 shows an example functional block diagram of device 100 configured in accordance with the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, the device 100 includes a display unit 1701 configured to display an application, a touch-sensitive surface unit 1703 configured to receive user contacts, and a processing unit 1705 coupled to the display unit 1701 and the touch-sensitive surface unit 1703. In some embodiments, the processing unit 1705 includes an input receiving unit 1710, an ongoing output initiating unit 1715, an ongoing output termination unit 1720, a feedback providing unit 1725, and an additional input receiving unit 1730.

The processing unit 1705 is configured to receive an input that corresponds to a first part of a multi-part operation performed by an application executing on the computing device (e.g., with the input receiving unit 1710), and responsive to receiving the input corresponding to the first part of the multi-part operation, initiate an ongoing haptic output sequence (e.g., with the ongoing output initiating unit 1715). After initiating the ongoing haptic output sequence, the processing unit 1705 receives an input on the that corresponds to a second part of the multi-part operation (e.g., with the input receiving unit 1710), and responsive to receiving the input corresponding to the second part of the multi-part operation, terminates the ongoing haptic output sequence (e.g., with the ongoing output termination unit 1720).

The following 16 paragraphs describe different embodiments that may be implemented, individually or in any combination, by the device 100 illustrated in FIG. 17:

In some embodiments, the input corresponding to the first part of the multi-part operation is detected on a touch-sensitive surface of the device (e.g., with the touch-sensitive surface unit 1703), and the input corresponding to the second part of the multi-part operation is detected on the touch-sensitive surface of the device (e.g., with the input receiving unit 1710). The haptic output sequence is provided via the touch-sensitive surface (e.g., with the ongoing output initiating unit 1715), according to some embodiments.

In some embodiments, the input corresponding to the first part of the multi-part operation is detected by the device (e.g., with the input receiving unit 1710), and the input corresponding to the second part of the multi-part operation detected by a second device. In some embodiments, the input corresponding to the first part of the multi-part operation and the input corresponding to the second part of the multi-part operation is detected by the device (e.g., with the input receiving unit 1710).

According to some embodiments, the multi-part operation is a secure transaction, the first part of the multi-part operation includes arming the device to authorize the secure transaction, and the second part the multi-part operation includes authorizing the secure transaction. According to some embodiments, the multi-part operation is a secure transaction, the first part of the multi-part operation includes determining that user authentication is required to complete the secure transaction, and the second part the multi-part operation includes receiving user authentication for the secure transaction.

In some embodiments, the first part of the multi-part operation includes closing a draft of a document, and the second part of the multi-part operation includes returning to the draft of the document. In some embodiments, the input corresponding to the first part of the multi-part operation is a first user input interacting with an application executing on the device, and the input corresponding to the second part of the multi-part operation is a second user input interacting with the application, the second user input distinct from the first user input.

According to some embodiments, detecting the input that corresponds to the first part of the multi-part operation includes detecting a contact on the touch-sensitive surface (e.g., with the input receiving unit 1710), and detecting the input that corresponds to the second part of the multi-part operation includes detecting movement of the contact on the touch-sensitive surface (e.g., with the input receiving unit

1710). In some embodiments, detecting the input that corresponds to the first part of the multi-part operation includes detecting movement of a contact on the touch-sensitive surface (e.g., with the input receiving unit 1710), and detecting the input that corresponds to the second part of the multi-part operation includes detecting liftoff of the contact from the touch-sensitive surface (e.g., with the input receiving unit 1710).

In some embodiments, the inputs corresponding to the first and second parts of the multi-part operation comprise a single gesture, wherein the input corresponding to the first part of the multi-part operation is an initial part of the gesture, and the input corresponding to the second part of the multi-part operation is a subsequent part of the gesture. According to some embodiments, the gesture is initiated on a portion of the touch-sensitive surface that corresponds to a first location in a user interface displayed on a display of the device and terminates on a second portion of the touch-sensitive surface that corresponds to a second location in the user interface that is different from the first location (e.g., with the touch-sensitive surface unit 1703).

In some embodiments, the input corresponding to the first part of the multi-part operation initiates an event associated with the respective application, and the event is sustained until receipt of the input corresponding to the second part of the multi-part operation, and the input corresponding to the second part of the multi-part operation terminates the event associated with the respective application (e.g., with the ongoing output termination unit 1720).

According to some embodiments, the application is a text editing application, and the input corresponding to the first part of the multi-part operation is a selection of a first user interface element that enables a text-entry mode of the text editing application. The multi-part operation comprises one or more inputs for text-entry to the text editing application and the event corresponds to text manipulation in the text editing document responsive to the inputs for text-entry, according to some embodiments. The input corresponding to the second part of the multi-part operation is a selection of a user interface element that disables the text-entry mode of the text editing application.

In some embodiments, the input corresponding to the first part of the multi-part operation is a selection of a first user interface element that initiates a transaction, and the multi-part operation comprises one or more inputs for entry of information required to process the transaction. The event in some embodiments corresponds to population of one or more data entry fields that receive the information required to process the transaction, and the input corresponding to the second part of the multi-part operation is a selection of a user interface element that authorizes completion of the transaction.

In some embodiments, the input corresponding to the second part of the multi-part operation follows the input corresponding to the first part of the multi-part operation and is separated in time from the input corresponding to the first part of the multi-part operation by a specified interval of time corresponding to a duration of the event, and the ongoing haptic output sequence is provided throughout the duration of the event and indicates occurrence of the event. Characteristics of the ongoing haptic output sequence optionally are selected based on the event that is initiated by the input corresponding to the first part of the multi-part operation.

In some embodiments, the processing unit 1705 provides a first haptic feedback responsive to receiving the input corresponding to the first part of the multi-part operation (e.g., with the feedback providing unit 1725), the first haptic feedback selected based on the event and indicating an initiation of the event, the first haptic feedback distinct from the ongoing haptic output sequence. The processing unit 1705 further provides a second haptic feedback responsive to receiving the input corresponding to the second part of the multi-part operation (e.g., with the feedback providing unit 1725), the second haptic feedback distinct from than the ongoing haptic output sequence.

The input corresponding to the first part of the multi-part operation suspends an ongoing event associated with the application, and the input corresponding to the second part of the multi-part operation resumes the ongoing event associated with the application, according to some embodiments.

In some embodiments, the application is a voice communication application, and the event is an ongoing voice communication occurring at a time of receipt of the input corresponding to the first part of the multi-part operation. In some embodiments, the input corresponding to the first part of the multi-part operation is a selection of a first user interface element of the voice communication application, the selection suspending the ongoing voice communication, and the input corresponding to the second part of the multi-part operation is a selection of a second user interface element that resumes the voice communication.

In some embodiments, after initiating an ongoing haptic output sequence responsive to the first part of a multi-part operation and before receiving an input that corresponds to a second part of the multi-part operation, the processing unit 1705 receives one or more additional user inputs (e.g., with the additional input receiving unit 1730), distinct from the input that corresponds to the second part of the multi-part operation. The processing unit 1705 continues to provide the ongoing haptic output regardless of the additional user inputs (e.g., with the ongoing output initiating unit 1715), until receipt of the input corresponding to the second part of the multi-part operation. In some embodiments, the intensity of the ongoing haptic output sequence increases with time until a subsequent input corresponding to the multi-part operation is received.

According to some embodiments, responsive to detecting the input corresponding to the first part of the multi-part operation (e.g., with the input receiving unit 1710), the processing unit 1705 initiates an ongoing audio output sequence to accompany the ongoing haptic sequence (e.g., with the ongoing output initiating unit 1715), and responsive to detecting the input corresponding to the second part of the multi-part operation (e.g., with the input receiving unit 1710), terminating the ongoing the audio output sequence (e.g., with the ongoing output termination unit 1720).

In some embodiments, a time-varying haptic energy profile of the haptic output sequence mimics a time-varying acoustic energy profile of the audio output sequence. In some circumstances, responsive to determining that the input corresponding to the first part of the multi-part operation does not pause an ongoing event, but initiates an event associated with the respective application, the processing unit 1705 provides the haptic output sequence without an accompanying audio output sequence (e.g., with the ongoing output initiating unit 1715), and responsive to determining that the input corresponding to the first part of the multi-part operation pauses an ongoing event associated with the respective application, the processing unit 1705 provides an ongoing audio output sequence accompanying the ongoing haptic output sequence (e.g., with the ongoing output initiating unit 1715).

Figure 18:
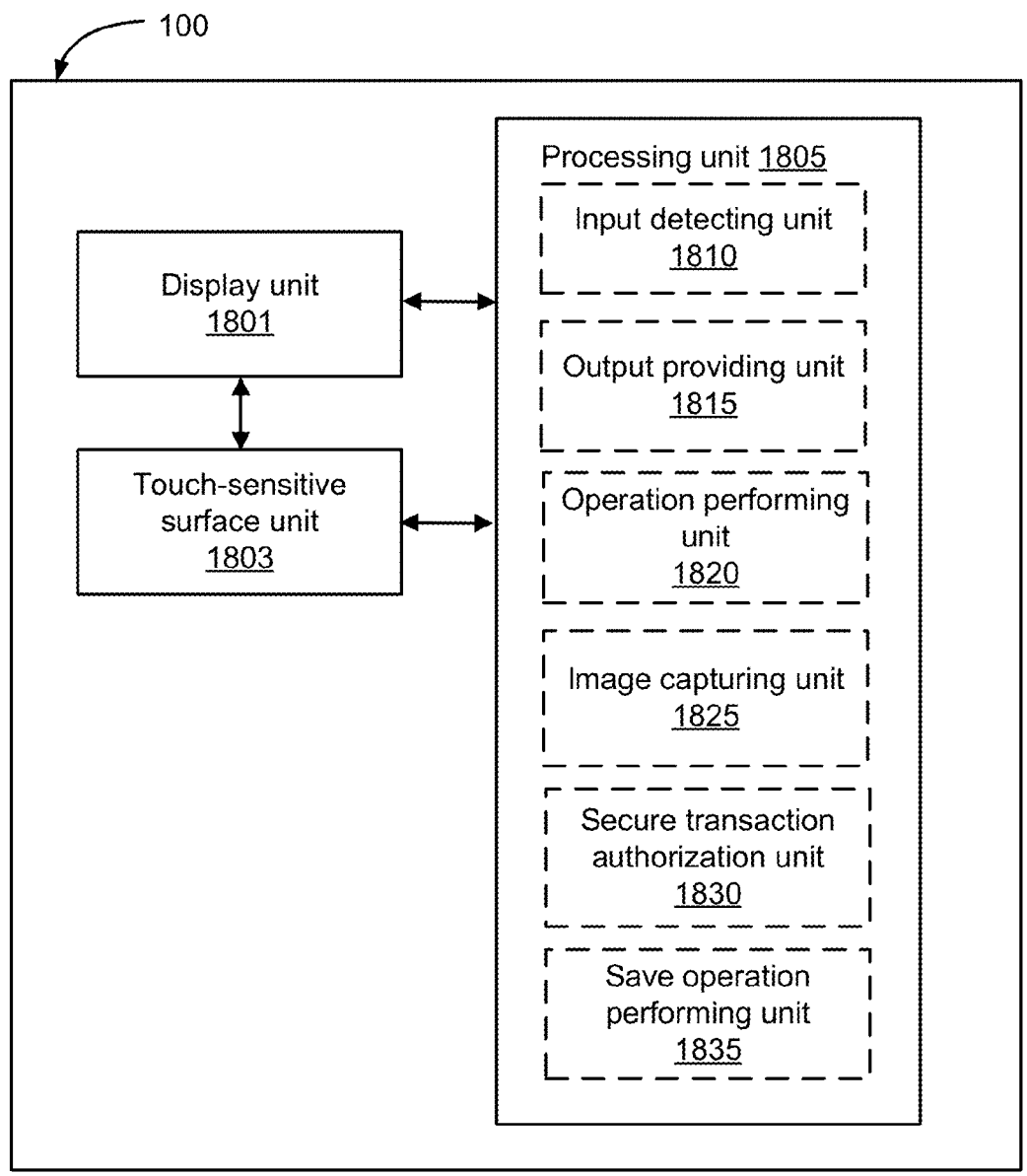
FIG. 18 is a functional block diagram of an electronic device in accordance with some embodiments.

As mentioned above, the operations described with reference to FIGS. 7 and 9-13 are optionally implemented by components depicted in FIGS. 14-19. FIG. 18 shows an example functional block diagram of device 100 configured in accordance with the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, the device 100 includes a display unit 1801 configured to display an application, a touch-sensitive surface unit 1803 configured to receive user contacts, and a processing unit 1805 coupled to the display unit 1801 and the touch-sensitive surface unit 1803. In some embodiments, the processing unit 1805 includes an input detecting unit 1810, an output providing unit 1815, an operation performing unit 1820, an image capturing unit 1825, a secure transaction authorization unit 1830, and a save operation performing unit 1835.

The processing unit 1805 is configured to detect a first input that corresponds to a request to perform a first operation (e.g., with the input detecting unit 1810), and responsive to detecting the first input, to provide a first output that includes a haptic component (e.g., with the output providing unit 1815). Also responsive to detecting the first input, the processing unit 1805 is configured to perform the first operation (e.g., with the operation performing unit 1820). After performing the first operation, the processing unit 1805 is configured to detect a second input that corresponds to a request to perform a second operation that includes the first operation and a supplemental operation (e.g., with the input detecting unit 1810), and responsive to detecting the second input, to provide a second output that includes a haptic component (e.g., with the output providing unit 1815), wherein the second output includes the first output in conjunction with providing supplemental output that corresponds to the supplemental operation. Also responsive to detecting the second input, the processing unit 1805 is configured to perform the second operation (e.g., with the operation performing unit 1820).

The following 10 paragraphs describe different embodiments that may be implemented, individually or in any combination, by the device 100 illustrated in FIG. 18:

In some embodiments, responsive to detecting the second input the processing unit 1805 performs the first operation and concurrently provides the first output, and performs the supplemental operation and concurrently provides the supplemental output (e.g., with the operation performing unit 1820 and the output providing unit 1815).

In some embodiments, responsive to detecting the second input, the processing unit 1805 performs the first operation prior to performing the supplemental operation (e.g., with the operation performing unit 1820), and provides the first output prior to providing the supplemental output (e.g., with the output providing unit 1815). In some embodiments, responsive to detecting the second input, the processing unit 1805 performs the first operation after performing the supplemental operation (e.g., with the operation performing unit 1820), and provides the first output after providing the supplemental output (e.g., with the output providing unit 1815).

In some embodiments, responsive to detecting the second input, the processing unit 1805 performs at least a portion of the first operation concurrently with a portion of the supplemental operation (e.g., with the operation performing unit 1820), and provides at least a portion of the first output concurrently with a portion of the supplemental output (e.g., with the output providing unit 1815).

In some embodiments, the first operation corresponds to capture of an image with a camera, and the second operation corresponds to capturing an image after a specified interval of time. In some embodiments, the first operation corresponds to a transaction-enable operation for enabling the device to authorize a secure transaction, and the second operation corresponds to enabling the device to authorize a secure transaction and authorizing the secure transaction.

According to some embodiments, the first operation corresponds to a save operation for saving content within an existing file, and the second operation corresponds to a save-as operation to save content within an existing file to a new file. According to some embodiments, the first operation corresponds to a send operation for sending a reply to a message that is in a message inbox, and the second operation corresponds to a send and archive operation for sending a reply to a message that is in the message inbox and removing it from the message inbox. In some embodiments, the supplemental operation has a variable value, and the supplemental output is based on the value of the variable attribute.

In some embodiments, the haptic component corresponding to the second output comprises a first haptic component corresponding to the first output and a second haptic component corresponding to the supplemental output, the second haptic component is distinct from the first haptic component. In some circumstances, the supplemental output comprises a non-haptic component. In some embodiments, the second output comprises a textual component that identifies the supplemental operation as different from the first operation. And in some cases the supplemental output comprises an audio component and the first output does not include an audio component.

According to some embodiments, the computing device comprises a touch-sensitive display and the first and second inputs are received through the touch-sensitive display (e.g., with the touch-sensitive surface unit 1803). In some embodiments, the haptic component of the first output and the haptic component of the second output are provided via the touch-sensitive display (e.g., with the output providing unit 1815).

In some embodiments, the processing unit 1805 detects a first input that corresponds to a request to capture of a first image with a camera (e.g., with the input detecting unit 1810), and responsive to detecting the first input, the processing unit 1805 provides a first output that includes a haptic component (e.g., with the output providing unit 1815). Also in response to detecting the first input, the processing unit 1805 captures the first image (e.g., with the image capturing unit 1825), and after capturing the first image, detects a second input that corresponds to a request to capture a second image after a specified interval of time (e.g., with the input detecting unit 1810). Responsive to detecting the second input, the processing unit 1805 provides a second output that includes a haptic component (e.g., with the output providing unit 1815), wherein the second output includes the first output in conjunction with providing supplemental output that corresponds to measuring lapse of the specified interval of time, and the processing unit 1805 captures the second image after the specified interval of time (e.g., with the image capturing unit 1825).

In some embodiments, processing unit 1805 detects a first input that corresponds to a request to perform a transaction-enable operation for enabling the device to authorize a secure transaction (e.g., with the input detecting unit 1810), and responsive to detecting the first input, provides a first output that includes a haptic component (e.g., with the output providing unit 1815). Also responsive to detecting the first input, the processing unit 1805 enables the device to authorize a secure transaction (e.g., with the secure transaction authorization unit 1830). After performing the transaction-enable operation, the processing unit 1805 detects a second input that corresponds to a request to authorize a secure transaction (e.g., with the input detecting unit 1810), and responsive to detecting the second input, provides a second output that includes a haptic component (e.g., with the output providing unit 1815), wherein the second output includes the first output in conjunction with providing supplemental output that corresponds to authorizing the secure transaction. Also responsive to detecting the second input, the processing unit 1805 authorizes the secure transaction (e.g., with the secure transaction authorization unit 1830).

In some embodiments, the processing unit 1805 detects a first input that corresponds to a request to perform a save operation (e.g., with the input detecting unit 1810), and responsive to detecting the first input, provides a first output that includes a haptic component (e.g., with the output providing unit 1815). Also responsive to detecting the first input, the processing unit 1805 performs a save operation for saving content within an existing file (e.g., with the save operation performing unit 1835), and after performing the save operation, the processing unit 1805 detects a second input that corresponds to a request to perform a save as operation to save content within an existing file to a new file (e.g., with the input detecting unit 1810), and responsive to detecting the second input, provides a second output that includes a haptic component (e.g., with the output providing unit 1815), wherein the second output includes the first output in conjunction with providing supplemental output that corresponds to a creation of the new file. Also responsive to detecting the second input, the processing unit 1805 performs the save as operation (e.g., with the save operation performing unit 1835).

Figure 19:
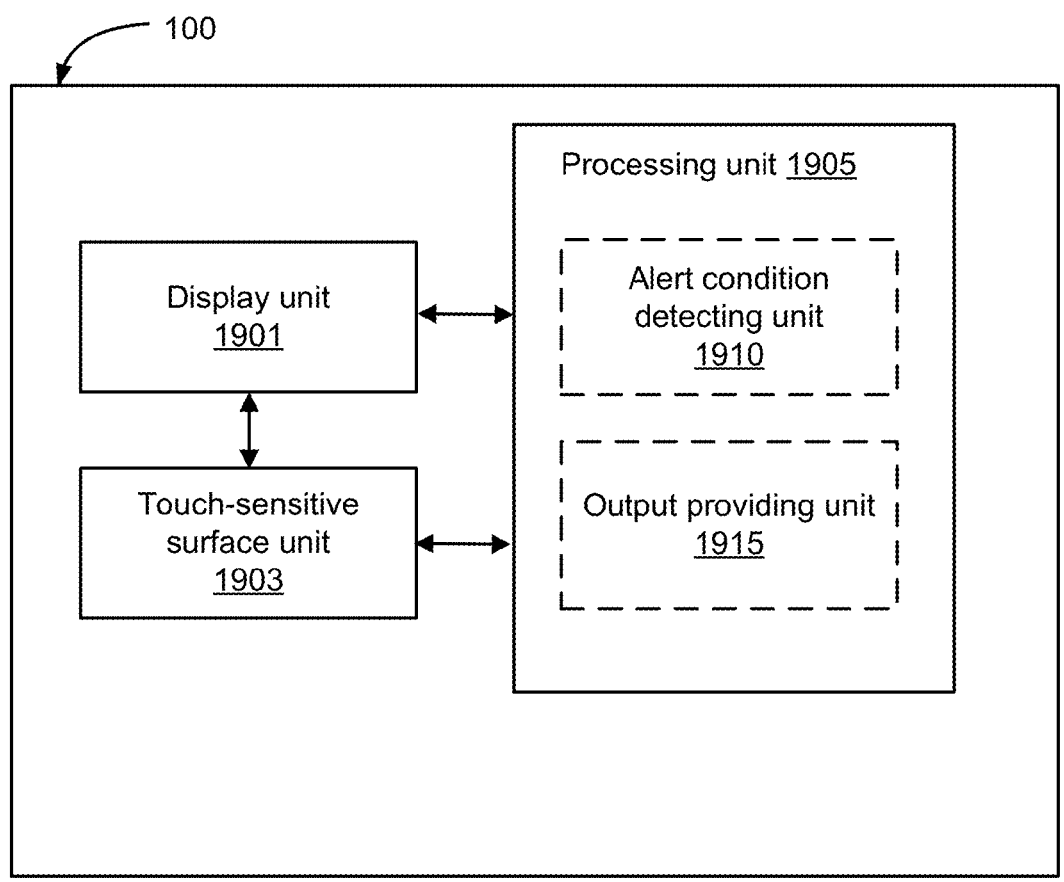
FIG. 19 is a functional block diagram of an electronic device in accordance with some embodiments.

As mentioned above, the operations described with reference to FIGS. 7 and 9-13 are optionally implemented by components depicted in FIGS. 14-19. FIG. 19 shows an example functional block diagram of device 100 configured in accordance with the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, the device 100 includes a display unit 1901 configured to display an application, a touch-sensitive surface unit 1903 configured to receive user contacts, and a processing unit 1905 coupled to the display unit 1901 and the touch-sensitive surface unit 1903. In some embodiments, the processing unit 1905 includes an alert condition detecting unit 1910 and an output providing unit 1915.

The processing unit 1905 is configured to detect occurrence of a first alert condition (e.g., with the alert condition detecting unit 1910), and responsive to detecting the occurrence of the first alert condition, provide a first output that includes a first haptic component and a first non-haptic component (e.g., with the output providing unit 1915). After providing the first output, the processing unit 1905 is configured to detect occurrence of a second alert condition (e.g., with the alert condition detecting unit 1910), and responsive to detecting the occurrence of the second alert condition, providing a second output that includes a second haptic component and a second non-haptic component (e.g., with the output providing unit 1915). If the first alert condition and the second alert condition are different alert conditions that are in a same class of alert condition, the first output and the second output share one or more same components and have one or more different components, and if the first alert condition and the second alert condition are different alert conditions that are in different classes of alert condition, the first haptic component is different from the second haptic component and the first non-haptic component is different from the second non-haptic component.

The following 7 paragraphs describe different embodiments that may be implemented, individually or in any combination, by the device 100 illustrated in FIG. 19:

In some embodiments, the first alert condition and the second alert condition are in the same class of alert condition, wherein the class is associated with alert conditions for an application. In some embodiments, the first alert condition and the second alert condition are in the same class of alert condition, the class associated with a category of applications. In some embodiments, the first alert condition and the second alert condition are associated with two different applications, wherein the first alert condition and the second alert condition are in the same class of alert condition, the class corresponding to functions in a predefined class of functions within the two different applications. According to some embodiments, the first alert condition and the second alert condition are associated with a common application, wherein the first alert condition and the second alert condition are in the same class of alert condition, the class corresponding to functions in a predefined class of functions.

In some embodiments, the classes of alert conditions include messages, activity alerts, media playback alerts, virtual assistant alerts, system alerts, scheduling reminders, and internet browser updates. In some embodiments, the first alert condition and the second alert condition correspond to separate instances of the same alert condition, the first output is identical to the second output. According to some embodiments, the first and second non-haptic components are audio outputs. According to some embodiments, the first and second non-haptic components are visual outputs.

In some embodiments, when the first alert condition and the second alert condition are different alert conditions that are in a same class of alert condition, the first haptic component of the first output is identical to the second haptic component of the second output, and the first non-haptic component of the first output is different from the second non-haptic component of the second output. In some embodiments, when the first alert condition and the second alert condition are different alert conditions that are in a same class of alert condition, the first non-haptic component of the first output is identical to the second non-haptic component of the second output, and the first haptic component of the first output is different from the second haptic component of the second output.

According to some embodiments, the first alert condition and the second alert condition correspond to a same alert condition, and the first output is accompanied by a first additional component that is different from a second additional component that accompanies the second output.

In some embodiments, the first additional component accompanying the first output provides information describing the first event that triggered the first alert, and the second additional component accompanying the second output provides information describing the second event that triggered the second alert.

In some embodiments, after providing the second output, the processing unit 1905 detects occurrence of a third alert condition (e.g., with the alert condition detecting unit 1910), and responsive to detecting the occurrence of the third alert condition, provides a third output that includes a third haptic component and a third non-haptic component (e.g., with the output providing unit 1915), wherein when the first alert condition, the second alert condition, and the third alert condition are different alert conditions that are in a same class of alert condition, the first output, the second output, and the third output share one or more same components and have one or more different components, and when the third alert condition is in a different class of alert condition from the first alert condition and the second alert condition, the third haptic component is different from both the first haptic component and the second haptic component and the third non-haptic component is different from both the first non-haptic component and the second non-haptic component.

In some embodiments, the computing device has a touch-sensitive display (e.g., with the touch-sensitive surface unit) and the first haptic component of the first output and the second haptic component of the second output are provided via the touch-sensitive display on the computing device (e.g., with the output providing unit 1915).

Hardware Specifications

In certain embodiments, the device 100 may include one or more acoustic modules 2006 for transmitting and receiving acoustic energy, shown in simplified schematic form. The acoustic module 2006 may be a speaker or microphone of an electronic device, as non-limiting examples.

Figure 20:
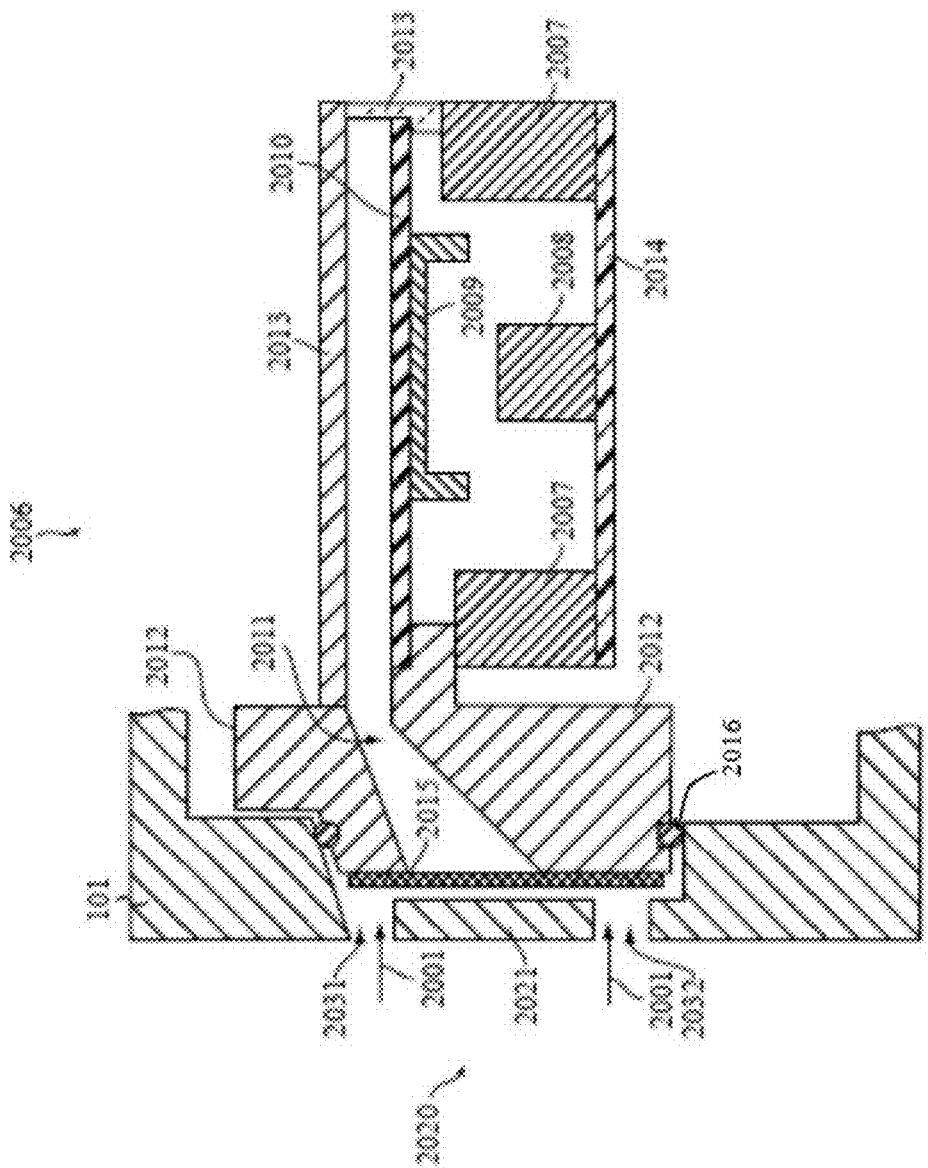
FIG. 20 depicts a device housing including a first acoustic port according to some embodiments.

As shown in FIG. 20, the device housing includes a first acoustic port 2020 that is coupled to the acoustic module 2006. In some instances, the acoustic module 2006 is configured to function as either a microphone or a speaker element for the device 100. However, for the purposes of the following description, the acoustic module 2006 is described as a speaker element or module. The acoustic port 2020 includes orifices 2031, 2032 that facilitate the transmission of audible signals from acoustic module 2006 to the user's ear. In this example, the orifices extend through the housing 101 and acoustically connect internal components of the acoustic module with the external environment. In other examples, a single acoustic port may include multiple orifices or a single orifice. In some embodiments, the acoustic port 2020 may also include a housing structure 2021 ("umbrella"), screen mesh 2015 or other protective element configured to inhibit ingress of liquid or other foreign matter.

The umbrella structure 2021 generally prevents water or fluid 2001 from directly impacting the acoustic module 2006. In one example, the acoustic port 2001 includes one or more orifices or openings 2031, 2032 that are offset with respect to an acoustic chamber of the module (e.g., the space between umbrella 2021 and mesh 2015 and including orifices 2031, 2032). The umbrella structure may be formed into the outer surface of the case or housing 101. For example, the umbrella structure 2021 may be formed from the material located between two or more orifices or openings 2031, 2032 that are offset with respect to the acoustic chamber.

Further, certain embodiments may shape the acoustic chamber to reduce the likelihood that water accumulates in the chamber or other portion of the orifice. A screen 2015 may separate the acoustic cavity 2011 from the external environment and may impede the ingress of liquids or other foreign material from the external environment into the acoustic cavity 2011. For example, the sidewalls of the orifice(s) 2031, 2032 may extend substantially to the surface of the screen 2015 in order to reduce surface tension of water in the orifice or chamber. Likewise, an exterior of the orifice may be chamfered to reduce surface tension of a liquid adjacent the orifice and thus facilitate liquid removal.

In the present example depicted in FIG. 20, the acoustic module 2006 is a speaker module. As shown in FIG. 20, a speaker acoustic module includes various components for producing and transmitting sound, including a diaphragm 2010, a voice coil 2009, a center magnet 2008, and side magnets/coils 2007. In a typical implementation, the diaphragm 2010 is configured to produce sound waves or an acoustic signal in response to a stimulus signal in the voice coil 2009. That is, a modulated stimulus signal in the voice coil 2009 causes movement of the diaphragm 2010. Movement of the diaphragm 2010 creates sound waves, which propagate through the acoustic cavity 2011 of acoustic module 2006 and eventually out the port 2020 to the exterior environment. In some cases, the acoustic cavity 106 functions as an acoustical resonator having a shape and size that is configured to amplify and/or dampen sound waves produced by movement of the diaphragm 2010.

In certain embodiments, the acoustic module 2006 also includes structural support elements, such as an end wall 2013 and base 2014. These elements may provide physical support for the speaker elements; various yokes, connectors and the like may also provide such support. Certain embodiments may include a gasket 2016 to seal the interior of the device against the environment. It should be appreciated that the structure recited herein is meant as an example and not a limitation. For example, in alternative embodiments, the acoustic cavity may be formed from additional components or may be formed from a single component.

The acoustic module 2006 depicted in FIG. 20 is provided as one example of a type of speaker acoustic module; some embodiments may use different types of speakers, microphones and the like. Further, although described in the context of a speaker, the foregoing is equally applicable to a microphone and many embodiments may likewise incorporate a microphone.

Embodiments described herein may include one or more sensors for detecting the location of a touch. In particular, a touch sensor may be disposed relative to the display of a wearable electronic device to form a touch-sensitive surface. The following description is provided with respect to individual touch sensors that may be used to determine the location of a touch.

Figure 21A:
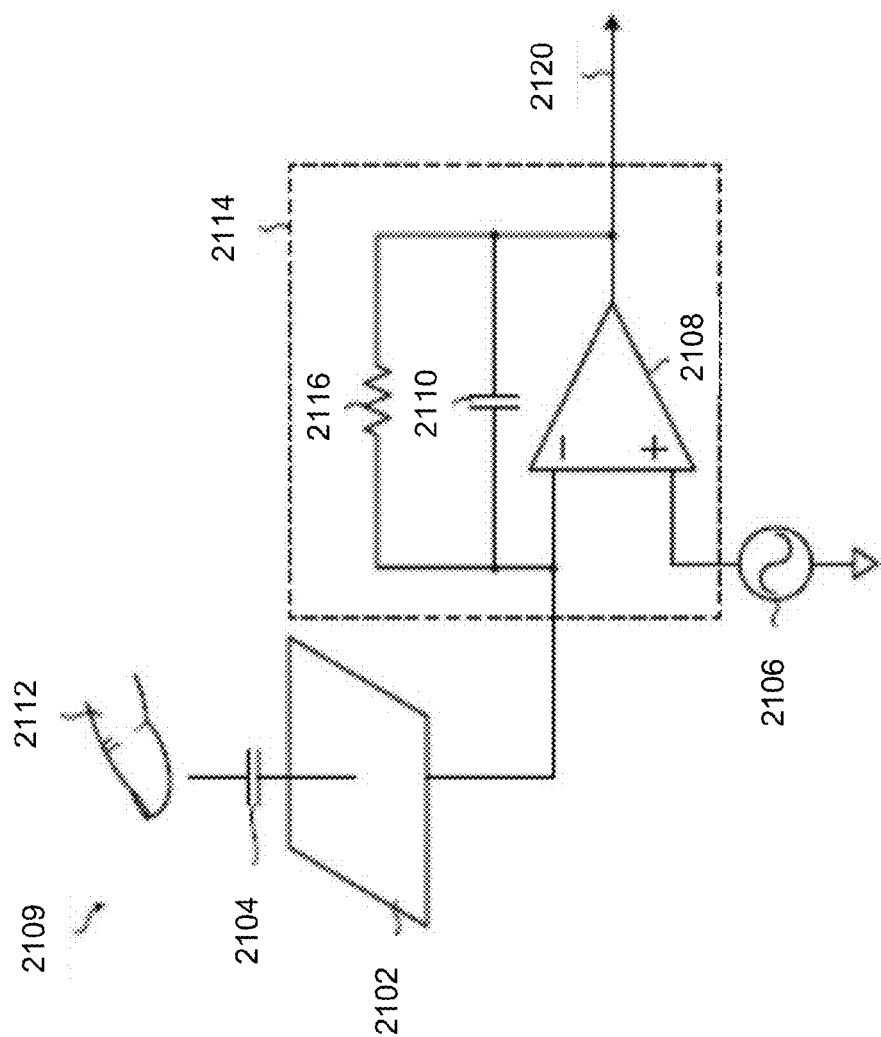
FIG. 21A depicts a touch sensor circuit corresponding to a self-capacitance touch pixel electrode and sensing circuit according to some embodiments.

In one embodiment, the device may include self-capacitive touch sensors that may be formed from an array of self-capacitive pixels or electrodes. FIG. 21A depicts an example touch sensor circuit corresponding to a self-capacitance touch pixel electrode and sensing circuit. Touch sensor circuit 2109 can have a touch pixel electrode 2102 with an inherent self-capacitance to ground associated with it, and also an additional self-capacitance to ground that can be formed when an object, such as finger 2112, is in proximity to or touching the touch pixel electrode 2102. The total self-capacitance to ground of touch pixel electrode 2102 can be illustrated as capacitance 2104. Touch pixel electrode 2102 can be coupled to sensing circuit 2114. Sensing circuit 2114 can include an operational amplifier 2108, feedback resistor 2116, feedback capacitor 2110 and an input voltage source 2106, although other configurations can be employed. For example, feedback resistor 2116 can be replaced by a switch capacitor resistor. Touch pixel electrode 2102 can be coupled to the inverting input of operational amplifier 2108. An AC voltage source 2106 can be coupled to the non-inverting input of operational amplifier 2108. Touch sensor circuit 2109 can be configured to sense changes in the total self-capacitance 2104 of touch pixel electrode 2102 induced by finger 2112 either touching or in proximity to the touch sensor panel. Output 2120 can be used by a processor to determine a presence of a proximity or touch event, or the output can be inputted into a discreet logic network to determine the presence of a touch or proximity event.

Figure 21B:
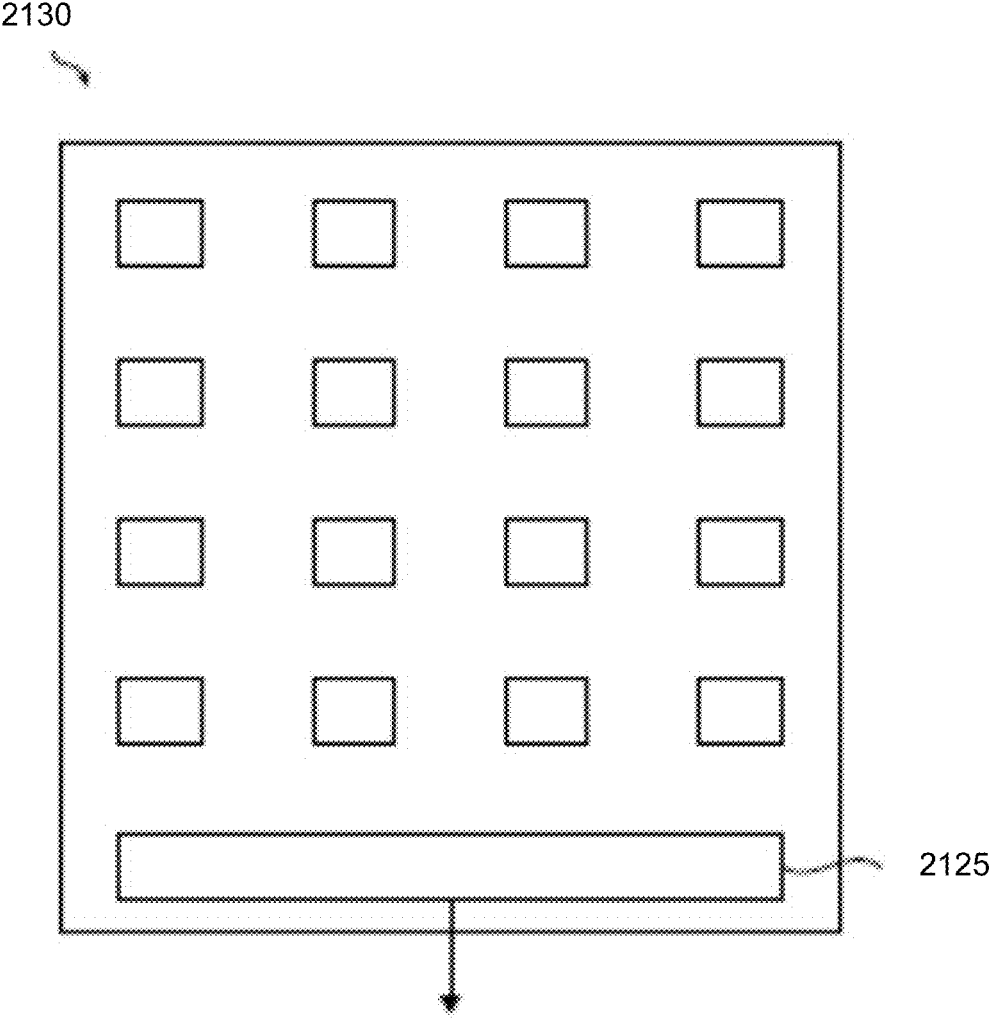
FIG. 21B depicts a self-capacitance touch sensor according to some embodiments.

FIG. 21B depicts an example self-capacitance touch sensor 2130. Touch sensor 2130 can include a plurality of touch pixel electrodes 2102 disposed on a surface and coupled to sense channels in a touch controller, can be driven by stimulation signals from the sense channels through drive/sense interface 2125, and can be sensed by the sense channels through the drive/sense interface 2125 as well. After the touch controller has determined an amount of touch detected at each touch pixel electrode 2102, the pattern of touch pixels in the touch screen panel at which touch occurred can be thought of as an "image" of touch (e.g., a pattern of objects touching or in close proximity to the touch screen). The arrangement of the touch pixel electrodes 2102 in FIG. 21B is provided as one example, however, the arrangement and/or the geometry of the touch pixel electrodes may vary depending on the embodiment.

Certain embodiments may employ different touch-sensing mechanisms. For example, certain embodiments may use a mutual-capacitance sensor array to detect a touch. Some embodiments may use a resistive touch sensor, an optical touch sensor, or any combination of any touch-sensing technology discussed herein. Accordingly, although self-capacitive touch sensing is described in some detail, it should be understood and appreciated that references herein to touch sensing and the like are intended to cover the detection of a touch regardless of the particular type of touch sensor used in any given embodiment.

In certain embodiments, an electronic device may include one or more haptic modules for providing haptic feedback to the user. The embodiments described herein may relate to or take the form of one or more haptic actuators suitable to provide perceivable haptic feedback. Such actuators may include an electromagnetic coil, a permanent magnet or other magnetic field source. The magnetic field may induce motion in a mass of the haptic actuator by exerting a Lorentz force on the mass when the coil is energized. A direction of current through the coil determines the direction of motion of the mass, while the strength of the magnetic field determines the velocity of the mass and thus the magnitude of the haptic output.

In general, haptic actuators implemented in some embodiments may be configured to maximize or enhance resultant mechanical energy, given a very compact form factor of the electronic device.

Figure 22A:
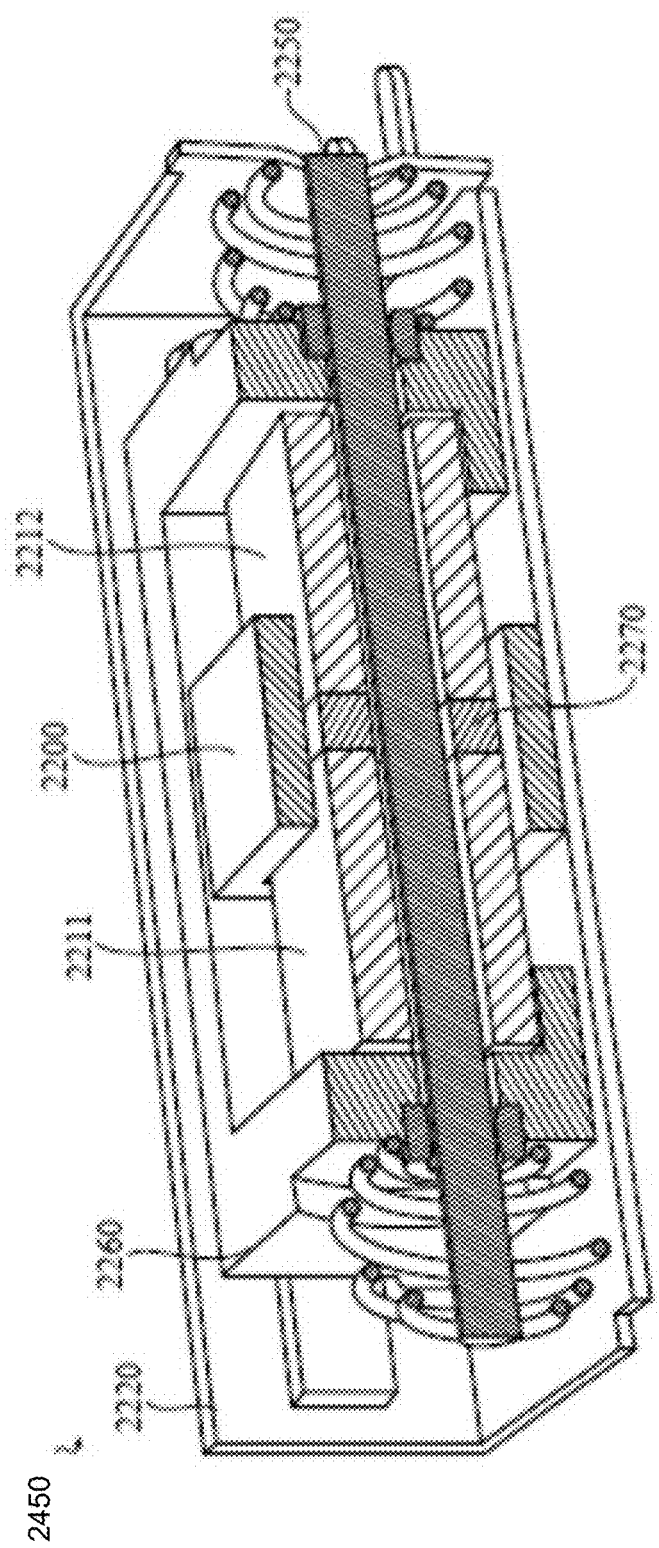
FIG. 22A depicts a haptic actuator according to some embodiments.
Figure 22B:
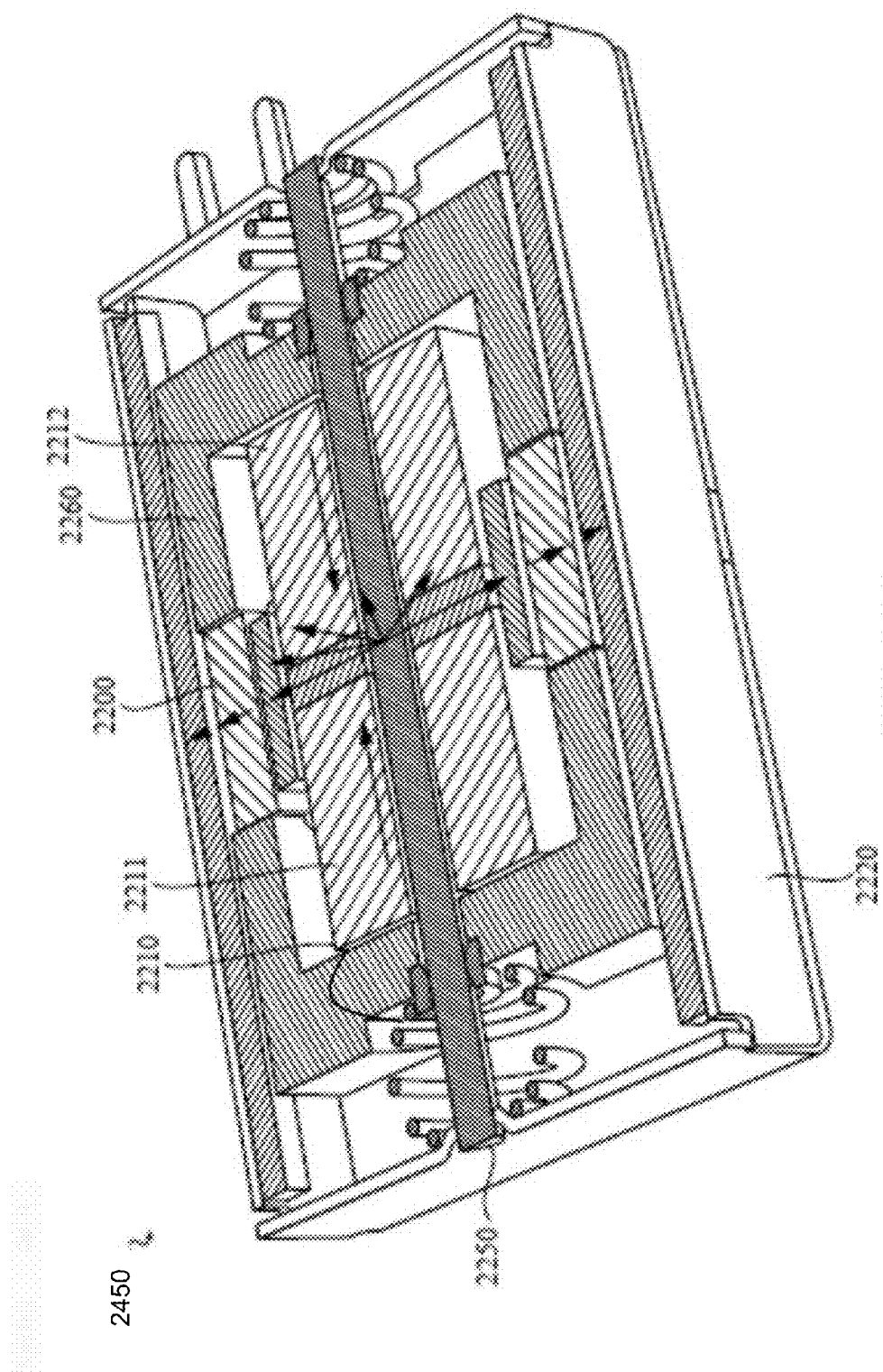
FIG. 22B depicts a haptic actuator according to some embodiments.

In one embodiment and as shown in FIGS. 22A-22B, the haptic actuator 2450 may have a mass at least partially disposed within the coil 2200 when the mass is in a rest state. This mass may include two magnets 2211, 2212 of opposing polarities implemented as a magnet array affixed within a frame 2260; the frame 2260 may provide extra weight to the mass and thus a stronger haptic output may be generated. A center block 2270 may separate the magnets, although this is optional. A shaft 2250 may extend through the mass such that the mass may freely slide on the shaft.

The magnet array (formed from the magnets 2211, 2212 and center block 2270) may generate a radial magnetic field (see FIG. 22B) that interacts with the magnetic field of the coil 2200 when the coil is energized by a current. The Lorentz force resulting from the interaction of the magnetic fields causes the mass to move along the shaft 2250 in a first direction. Reversing current flow through the coil 2200 reverses the Lorentz force. As a result, the magnetic field or force on the magnets 2211, 2212 is also reversed and the mass may move in a second direction. Thus, mass may move in both directions along the shaft, depending on the direction of current flow through the coil. Passing an alternating current through the coil 2200 may cause the central magnet array to move back and forth along the shaft. This motion may induce a motion in the housing 2220 of the actuator, which in turn may induce a motion in the housing of the electronic device.

In order to prevent the central magnet array from being attracted to the shaft 2250, which could increase friction between the two and thereby increase the force necessary to move the central magnet array and frame 2260, the shaft may be formed from a non-ferritic material such as tungsten, titanium, stainless steel, or the like, and the mass may slide along the shaft on bearings.

The actuator also may have structures that provide restoring force to the mass. For example, a spring 2210 may be located at either end of the shaft. As the mass impacts the spring, the spring compresses and stores kinetic energy. This kinetic energy may be released to return the mass along the shaft 2250, thereby sending it to or near its initial starting position. The kinetic energy in the spring(s) may cooperate with the coil to move the magnet in such a fashion.

Although a linear actuator has been described herein, it should be appreciated that other types of actuators may be used in different embodiments. For example, some embodiments may employ a rotary actuator, a piezoelectric actuator, or any other suitable linear or non-linear actuator. Likewise, certain embodiments may employ multiple actuators working in concert.

Figure 23B:
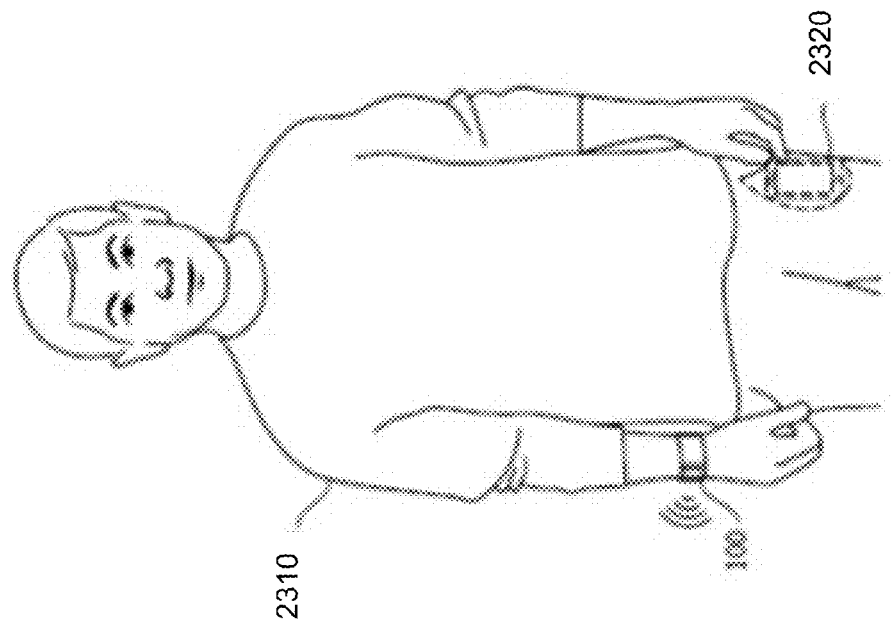
FIG. 23B depicts a user wearing a wearable device with a second electronic device in his pocket according to some embodiments.
Figure 23A:
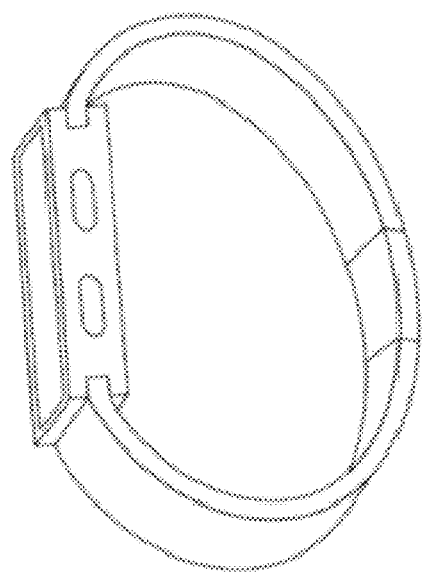
FIG. 23A is a wearable device according to some embodiments.

Embodiments described herein may take the form of, be incorporated in, or operate with a suitable electronic device. One example of such a device is shown in FIG. 23A and takes the form of a wearable mechanism. As shown, the mechanism may be worn on a user's wrist and secured thereto by a band. The mechanism may have a variety of functions including, but not limited to: keeping time; monitoring a user's physiological signals and providing health-related information based on those signals; communicating (in a wired or wireless fashion) with other electronic devices, which may be different types of devices having different functionalities; providing alerts to a user, which may include audio, haptic, visual and/or other sensory output, any or all of which may be synchronized with one another; visually depicting data on a display; gather data from one or more sensors that may be used to initiate, control, or modify operations of the device; determine a location of a touch on a surface of the device and/or an amount of force exerted on the device, and use either or both as input; accepting voice input to control one or more functions; accepting tactile input to control one or more functions; and so on.

Alternative embodiments of suitable electronic devices include a phone, a tablet computing device, a portable media player, or other portable multifunction device 100 as shown in FIG. 4A. Still other suitable electronic devices may include laptop/notebook computers, personal digital assistants, touch screens, input-sensitive pads or surfaces, and so on.

Figure 24:
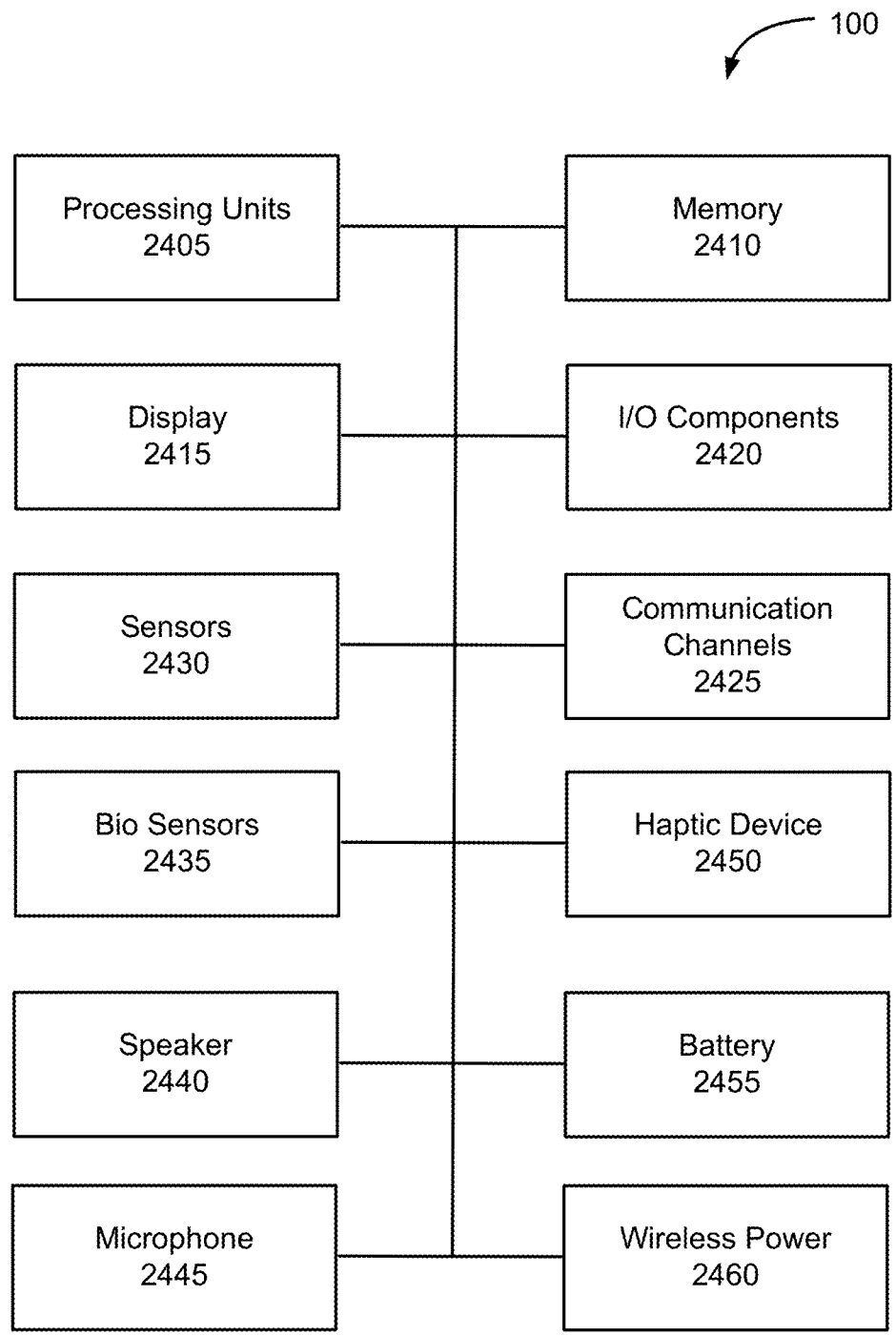
FIG. 24 depicts a schematic diagram of a wearable electronic device according to some embodiments.

FIG. 24 depicts an example schematic diagram of a wearable electronic device. As shown in FIG. 24, the device 100 includes one or more processing units 2405 that are configured to access a memory 2410 having instructions stored thereon. The instructions or computer programs may be configured to perform one or more of the operations or functions described with respect to the device 100. For example, the instructions may be configured to control or coordinate the operation of the various components of the device. Such components include, but are not limited to, display 2415, one or more input/output components 2420, one or more communication channels 2425, one or more sensors 2430, 2435, a speaker 2440, microphone 2445, and/or one or more haptic feedback devices 2450. In some embodiments the speaker and microphone may be combined into a single unit and/or may share a common port through a housing of the device. Some embodiments also include a battery 2455 or wireless power 2460. Each of the components of the device 100 as depicted in FIG. 24 can instead be a component in another figure with a corresponding name or function.

The processing units 2405 of FIG. 24 may be implemented as any electronic device capable of processing, receiving, or transmitting data or instructions. For example, the processing units 2405 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments the electronic device may accept a variety of bands, straps, or other retention mechanisms (collectively, "bands"). These bands may be removably connected to the electronic device by a lug that is accepted in a recess or other aperture within the device and locks thereto. The lug may be part of the band or may be separable (and/or separate) from the band. Generally, the lug may lock into the electronic device's recess and thereby maintain connection between the band and device. The user may release a locking mechanism to permit the lug to slide or otherwise move out of the recess. In some embodiments, the recess may be formed in the band and the lug may be affixed or incorporated into the device.

A user may change combinations of bands and electronic devices, thereby permitting mixing and matching of the two categories. It should be appreciated that devices having other forms and/or functions may include similar recesses and may releasably mate with a lug and/or band incorporating a lug. In this fashion, an ecosystem of bands and devices may be envisioned, each of which is compatible with another. A single band may be used to connect to devices, as one further example; in such embodiments the band may include electrical interconnections that permit the two devices to transmit signals to one another and thereby interact with one another.

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

The device also may comprise one or more touch sensors to determine a location of a touch on the cover glass. A touch sensor may be incorporated into or on the display stack in order to determine a location of a touch. The touch sensor may be self-capacitive in certain embodiments, mutual-capacitive in others, or a combination thereof.

Similarly, the device may include a force sensor to determine an amount of force applied to the cover glass. The force sensor may be a capacitive sensor in some embodiments and a strain sensor in some embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

The electronic device may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

The example electronic device may communicate with other electronic devices either through a wired connection or wirelessly. Data may be passed between devices, permitting one device to relay information to another; control another; employ another's sensors, outputs, and/or inputs; and so on. FIG. 23B depicts a user 2310 wearing a sample electronic device 100 with a second electronic device 2320 in his pocket. The second device optionally has any of the capabilities described herein for devices 100 and 300. Data may be wirelessly transmitted between the electronic devices 100, 2320, thereby permitting the user 210 to receive, view, and interact with data from the second device 2320 by means of the first electronic device 100. Thus, the user 2310 may have access to part or all of the second device's functionality through the first electronic device 100 without actually needing to interact directly with the second device.

Further, the electronic devices 100, 2320 may cooperate not only to share data but to share functionality as well. For example, one of the two devices may incorporate a sensor, application, or function that the other lacks. The electronic device lacking such capabilities may request them from the other device, which may share wirelessly with the requesting device. Thus, multiple devices may operate together to provide expanded functions, software, access and the like between the two and ultimately to a user. As one non-limiting example, the electronic device 100 may be unable to place or receive telephone calls while the second device 2320 may be able to do so. A user may nonetheless make and/or receive calls through the first device 100, which may employ the second device 2320 to actually place or accept a call.

As another non-limiting example, an electronic device 100 may wirelessly communicate with a sales terminal nearby, thus permitting a user to quickly and efficiently conduct a transaction such as selling, buying, or returning a good. The electronic device may use near field communications technology to perform these and other functions.

As mentioned above, a band may be connected to two electronic devices and may serve as a wired communication path between the two. As another example, the devices may communicate wirelessly, thereby permitting one device to relay information from a second to a user. This latter example may be particularly useful when the second is inaccessible.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. Also include blood pressure, ultraviolet exposure, etc. Depending on the sensors incorporated into or associated with the electronic device, a variety of user characteristics may be measured and/or estimated, thereby permitting different health information to be provided to a user.

Certain embodiments may be wirelessly charged. For example, an inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes.

In certain embodiments, the device may include a rotary input, which may take the form of a crown with a stem. The crown and stem may be rotated to provide the rotary input. Rotation of the stem and/or crown may be sensed optically, electrically, magnetically, or mechanically. Further, in some embodiments the crown and stem may also move laterally, thereby providing a second type of input to the device.

The electronic device may likewise include one or more buttons. The button(s) may be depressed to provide yet another input to the device. In various embodiments, the button may be a dome switch, rocker switch, electrical contact, magnetic switch, and so on. In some embodiments the button may be waterproof or otherwise sealed against the environment.

Various embodiments may include or otherwise incorporate one or more motion sensors. A motion sensor may detect motion of the device and provide, modify, cease, or otherwise affect a state, output, or input of the device or associated applications based on the motion. As non-limiting examples, a motion may be used to silence the device or acknowledge an alert generated by the device. Sample motion sensors include accelerometers, gyroscopic sensors, magnetometers, GPS sensors, distance sensors, and so on. Some embodiments may use a GPS sensor to facilitate or enable location and/or navigation assistance.

As shown in FIG. 24, the device 100 may also include one or more acoustic elements, including a speaker 2440 and/or a microphone 2445. The speaker 2440 may include drive electronics or circuitry and may be configured to produce an audible sound or acoustic signal in response to a command or input. Similarly, the microphone 2445 may also include drive electronics or circuitry and is configured to receive an audible sound or acoustic signal in response to a command or input. The speaker 2440 and the microphone 2445 may be acoustically coupled to port or opening in the case that allows acoustic energy to pass, but may prevent the ingress of liquid and other debris.

Certain embodiments may incorporate an ambient light sensor. The ambient light sensor may permit the device to sense a brightness of its environment and adjust certain operational parameters accordingly. For example, the electronic device may modify a brightness of a display in response to the sensed ambient light. As another example, the electronic device may turn the display off if little or no light is sensed for a period of time.

These and other functions, operations, and abilities of the electronic device will be apparent upon reading the specification in its entirety.

Alert Class Based Haptic Output

Alert conditions can be triggered in many different ways according to some embodiments. For example, some alerts are triggered by a communication from another person, such as receiving an email, receiving a voicemail message, and receiving a text message. Other alerts are triggered by user-set notifications, such as a calendar alert or reminder. Yet other alerts are triggered by system based notifications, such as application-based or device-based alerts, such as a financial transaction event or a device pairing event. Some alerts are triggered by third party applications, whereas other alerts are triggered from applications or other aspects native to the device. What type of triggered resulted in the alert provides the basis for providing a corresponding haptic output, according to some embodiments.

Figure 25:
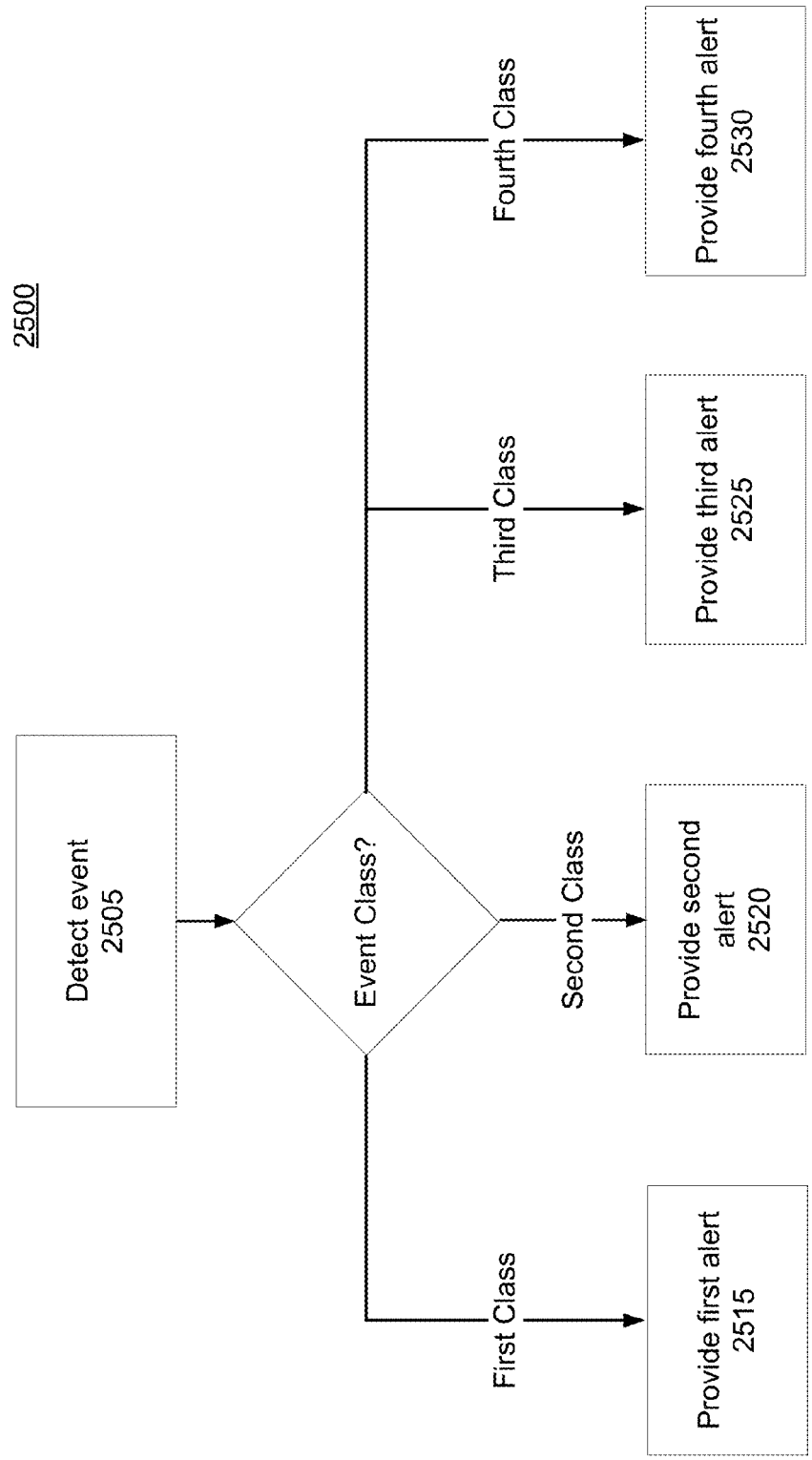
FIG. 25 is a flow diagram of a method for providing various haptic and other feedback alerts according to class according to some embodiments.

A corresponding haptic is associated with an alert class according to some embodiments, allowing the user to, over time, come to understand the haptic feedback as a language with specific haptic and other output associated with specific alert classes. Providing haptic output that correlates with various alert classes creates a more efficient human-machine interface, thereby reducing the amount of time it takes for a user to understand alerts and perform operations, which consequently reduces energy use and increases battery life for battery powered devices. FIG. 25 is a flow diagram of a method 2500 for providing various haptic and other feedback alerts, each corresponding to a different alert class according to some embodiments. Note that in some embodiments, different steps may be performed other than those shown in FIG. 25.

The method begins by the device 100 detecting 2505 an event. For an application executing on a computing device 100 with a tactile output generator, the event takes various forms according to various embodiments. An event is any notification, alert, or other event directed to a user of the device. In some circumstances, the device 100 has a touch-sensitive display.

Different types of alert events correspond to different event classes according to some embodiments. In accordance with a determination of the event type falling into a particular class, an alert is provided corresponding to the event class. For example, in accordance with a determination that the event is a type of event in the first event class, a first alert is provided 2515 that includes a first haptic component generated by the tactile output generator. Similarly, in accordance with a determination that the event is a type of event in a second event class that includes a plurality of different event types, a second alert is provided 2520 that includes a second haptic component, generated by the tactile output generator, that is different from the first haptic component. Likewise, in accordance with a determination that the event is a type of event in a third event class that includes a plurality of different event types, a third alert is provided 2525 that includes a third haptic component, generated by the tactile output generator, that is different from the first haptic component and the second haptic component. Thus, the haptic output depends on the event class that the event belongs to according to some embodiments.

According to some embodiments, the first haptic component is different from the second haptic component and the third haptic component based on one or more of spacing between haptic outputs, number of haptic outputs, and change in the amplitude of haptic outputs over time during the haptic component.

In some embodiments, the haptic components are designed to be substantially different so as to enable a user to easily distinguish between the different classes of alerts whether or not an audible component of the alert is provided by the device, as discussed in conjunction with FIG. 25 above. For example, the device may have a plurality of unique alerts that correspond to different events, and the first event class, the second event class, and the third event class correspond to types of events that typically occur more frequently than the events that correspond to unique alerts.

In some circumstances the event classes corresponds to events generated based on different factors. For example, according to some embodiments, a first class of events includes events generated based on communications from other users, a second class of events includes events generated based on predefined criteria entered by a user of the device, and a third class of events includes events generated based on the satisfaction of device-monitored criteria.

According to some embodiments, the event classes correspond to various events, as further discussed below in conjunction with Table 9. For example, the first type of event is in a personal event class, the second type of event is in a user-set event class, and the third type of event is in a system event class, according to some embodiments. A personal event class may include events such as incoming messages, incoming email, incoming voicemail, etc. A user-set event class may include events such as calendar notifications, reminder notifications, timer/alarm events, etc. A system event class may include events such as a pairing event, a financial transaction event, or a battery level event, etc. According to some embodiments, the alerts corresponding to each class are pre-configured for that class, such that the class shares one or more attribute of the haptic output. According to some embodiments, the haptic corresponding to a class is configurable by the user of the device 100.

According to some embodiments, in response to detecting 2506 the event, and in accordance with a determination that the event is a type of event in a fourth event class that includes a plurality of different event types, providing 2530 a fourth alert that includes a fourth haptic component, generated by the tactile output generator, that is different from the first haptic component, the second haptic component, and the third haptic component. The fourth event class corresponds to an event generated by a third party application according to come embodiments, which may include various second-party or third party events, for example a social network providing a social networking message or a game application providing a game notification.

According to some embodiments, the fourth haptic component is differentiated from the first haptic component, the second haptic component, and the third haptic component by a haptic output element that is not included in the first haptic component, the second haptic component, or the third haptic component. For example, in the case of the fourth event class corresponding to an event generated by a third party application, the fourth haptic component may include a haptic component unique to third party events (e.g., a particular vibration pattern) and not included in the haptic output provided corresponding to the other classes, such that a user can easily tell that an alert is from a third party application rather than from any of the native applications or features that are supplied by the device. In this example, the first, second, and third event classes correspond to events initiating from the device directly or from an application native to the device. However, in some embodiments a haptic component corresponding to a given class may be unique to that class and not included in the haptic output provided corresponding to the other classes, such that a user can easily tell from the haptic output that an alert is from a particular event class as distinguished from other classes.

In some embodiments, if the haptic output is accompanied by respective audio component output, the audio components are reflective of the event class as well. For example, the audio component for a class may be unique to that class (e.g., a particular type of sound) and not included in the audio output provided corresponding to the other classes, such that a user can easily tell from the audio output that an alert is from a particular event class as distinguished from other classes.

Table 9 shows a few exemplary circumstances under which the device 100 has information used to determine that the detected event is of a known event class. The examples shown represent four event classes: personal, user-set, system, and third party, but could be any event class. The event types shown in Table 9 include email messages, text messages, and voicemail messages (Personal), calendar and reminder notifications, timer and alarm alerts (User-Set), device pairing, financial translations, and battery level indications (System), and third party messages and notifications (Third Party), but could be any other events providing similar information to the device 100 for making this determination.

TABLE 9

MULTIPLE EVENT CLASS HAPTICS

| Event Class | Event Type | Condition | Haptic Output | Audio Output |
|---|---|---|---|---|
| Personal | Email message | Email received | Fast double tap | /Ding long fade |
| Personal | Text message | Text message received | Fast double tap | /Ding long fade |
| Personal | Voicemail | Voicemail received | Fast double tap | /Ding long fade |
| User-Set | Calendar | Calendar notification | Slow double tap | /Chime |
| User-Set | Reminder | Reminder notification | Slow double tap | /Chime |
| User-Set | Timer | Timer end | Slow double tap | /Chime |
| User-Set | Alarm | Alarm time reached | Slow double tap | /Chime |
| System | Device pairing | Pairing event | Rumble | Dit (o)/Ding short fade |
| System | Financial application | Transaction event | Rumble | Dit (o)/Ding short fade |
| System | Battery level | Low battery | Rumble | Dit (o)/Ding short fade |
| Third Party | Third party message | Message received | Fast double tap, buzz fade | /Ding up (o) |
| Third Party | Third party notification | Notification event | Fast double tap, buzz fade | /Ding down (o) |

For the examples shown, the event class column shows which of four classes the event falls into: Personal, User-Set, System, or Third Party. Within each class, various event types are listed per the event type column. A few examples are listed for each event class, but the list is not meant to be exclusive of other event types. In some embodiments, Personal events are those sent to the device user personally, typically by another user, such as an email, text, or voicemail. User-Set events are events that, as the name implies, are set by the user of the device, e.g., calendar notifications, reminders, timer expiration, alarms going off, etc., according to some embodiments. In some embodiments, System events are events generated by the device or system itself, such as a device pairing or batter level indication. Third Party events can vary greatly, but generally correspond to an event triggered by a third party application running on the device, according to some embodiments. Examples of third party events include messages or notifications corresponding to a social networking application, notifications or reminders corresponding to a gaming application, activity alerts corresponding to a fitness application, or the like.

Note that in the examples shown, regardless of the event type, every event corresponding to a given event class has the same haptic and audio output. According to some embodiments, all Personal event class events result in output of a haptic component that includes a fast double tap first, followed by a ding audio component with a long fade. In this example, the output is perceived by the user as tap-tap-ding (fade). According to some embodiments, all User-Set event class events result in output of a haptic component that includes a slow double tap first, followed by a chime audio component. In this example, the output is perceived by the user as tap—tap-chime.

According to some embodiments, all System event class events result in output of a haptic rumble that overlaps at the end of the rumble with a quieter "dit" audio component, followed by a ding audio component with a short fade that begins after completion of the rumble. In this example, the output is perceived by the user as rumble . . . (dit) . . . -ding (fade). According to some embodiments, all Third Party event class events result in output of a consistent haptic component corresponding to the third party applications including a fast double tap and a buzz fade, with the buzz fade over lapping in part with an audio component, which may vary by the event type or condition associated with the third party application. In this example, the output is perceived by the user as tap-tap-ding (up or down) . . . (buzz (fade)) . . . .

Note that in these examples, both the haptic and audio components uniquely correspond to a given class, such that a user can easily tell from the output that an alert is from a particular event class as distinguished from other classes. In the example of the third party application class, the haptic is identical and the audio is characteristic of the class but varies depending on the event type or condition. In addition, the haptic output portion alone also uniquely corresponds to a given class in these examples, such that a user can tell from the haptic output alone that an alert is from a particular event class, even if the user has the sound turned off on his or her device. In order to provide users with a consistent and easily understandable alert language, the different classes of alerts each correspond to multiple different events, and in embodiments where the alerts are user selectable (or user modifiable), users are optionally provided with options for changing a sound or haptic output associated with an event class, but changing that sound or haptic output will cause the sound or haptic output to change for all events that are associated with that class of alerts. Additionally, in some embodiments, users are provided with the option to assign events to different event classes. This customizability enables users to customize the alerts provided by their device while still maintaining a consistent alert language that enhances the efficiency and effectiveness of the alerts.

It should be understood that the particular order in which the operations in FIG. 25 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1000, 1100, 1200, 1300, 2600, 3000, and 3200) are also applicable in an analogous manner to method 2500 described above with respect to FIG. 25. For example, the inputs, alert conditions, events, applications, states, and haptic outputs described above with reference to method 2500 optionally have one or more of the characteristics of the inputs, alert conditions, events, applications, states, and haptic outputs described herein with reference to other methods described herein (e.g., methods 700, 900, 1000, 1100, 1200, 1300, 2600, 3000, and 3200). For brevity, these details are not repeated here.

Selective Alert Salience for Haptic Output

Alert conditions are selectively subject to an increase in the salience of the haptic output according to some embodiments. In some embodiments, the device 100 can modify the salience of the haptic output to "prime" the user, which helps draw greater attention to the alert. For example, the device 100 can provide a priming haptic output as a precursor to another haptic output, the priming haptic output designed to increase the attentiveness of a user operating the device 100 to the other haptic output. In some circumstances, the salience is increased for some haptics and not others. This is particularly important for users with sensory impairments (e.g, users who cannot hear audible alerts or have reduced sensitivity to vibrating alerts).

Figure 26:
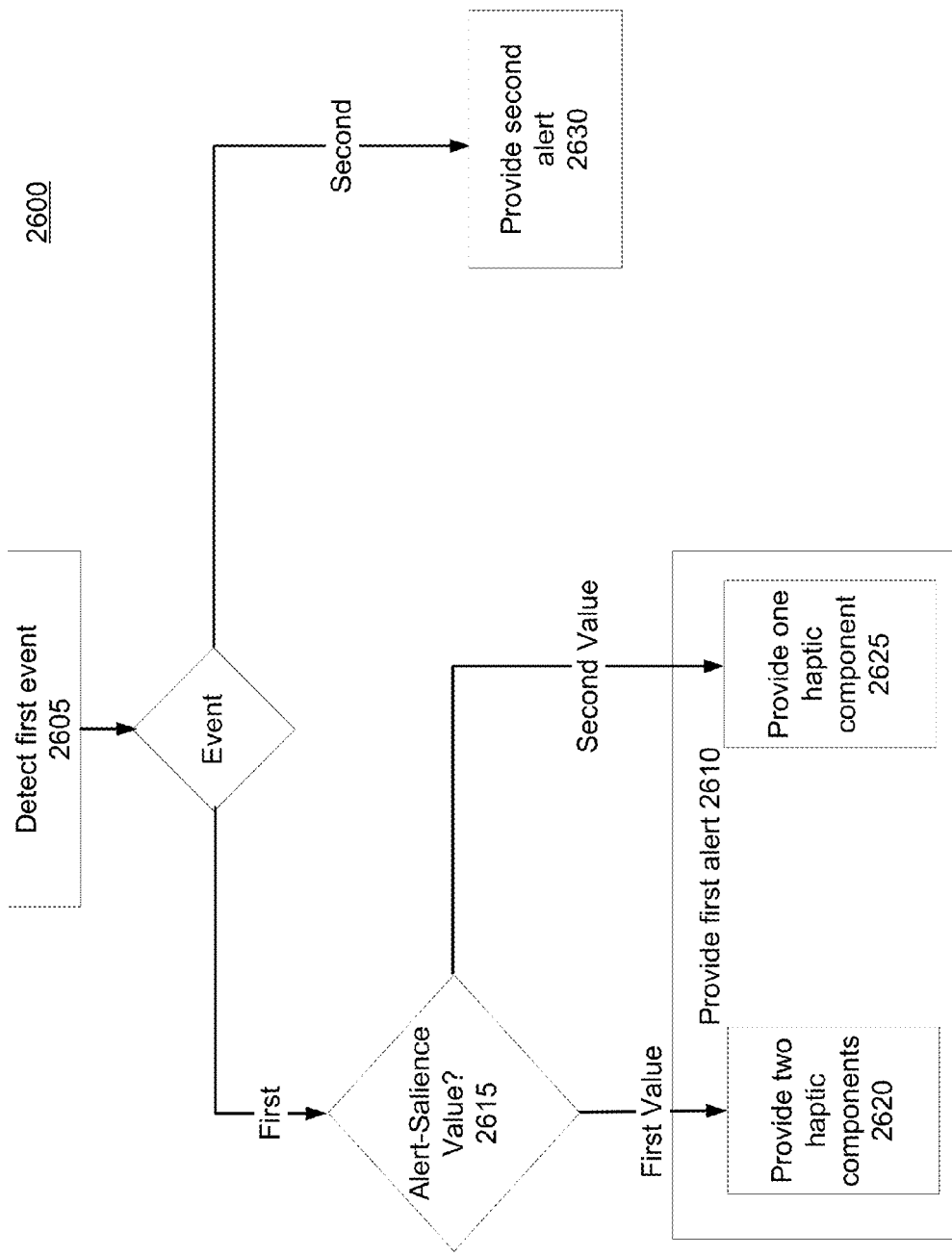
FIG. 26 is a flow diagram of a method for providing selective salience increase for various haptics according to some embodiments.

FIG. 26 is a flow diagram of a method 2600 for providing selective salience increase for various haptics, according to some embodiments. Note that in some embodiments, different steps may be performed other than those shown in FIG. 26.

The method 2600 begins by detecting 2605 the occurrence of a first event at a computing device with a tactile output generator. The event can be of any type, including the event types discussed in conjunction with FIG. 25 above. In response to detecting the occurrence of the first event, events of different types may produce different alerts with different salience. For example, in accordance with a determination that the first event is a first type of event, a first alert is provided 2610 with the tactile output generator that includes a first haptic component, and the haptic component is selected based at least in part on an alert-salience setting of the device. In accordance with a determination that the first event is a second type of event, a second alert is provided 2630, with the tactile output generator that includes a second haptic component selected without regard to the alert-salience setting of the device.

Figure 27:
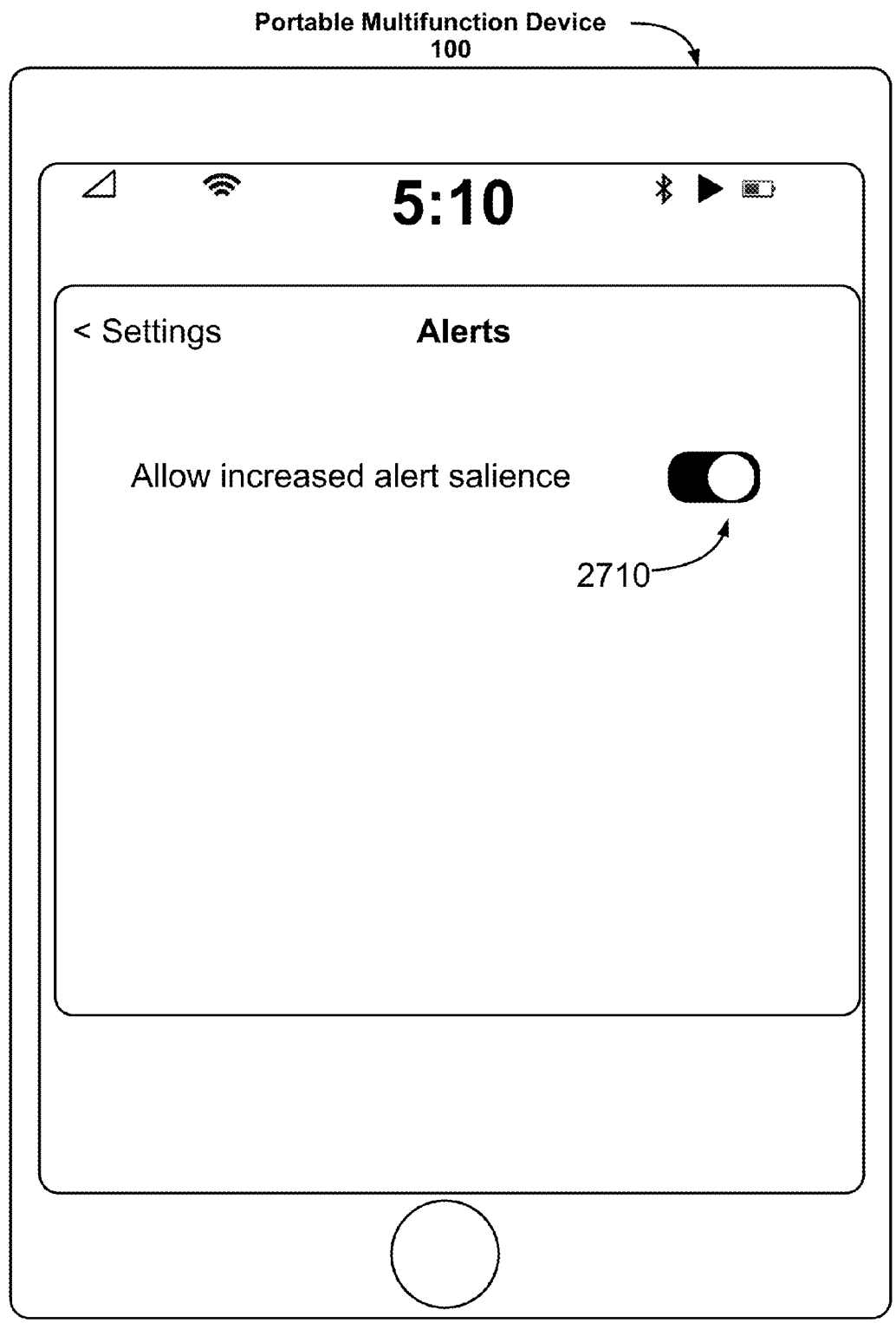
FIG. 27 illustrates an exemplary user interface for an alert-salience setting on a device in accordance with some embodiments.

According to some embodiments, the alert-salience setting of the device has two values, with one value corresponding to increasing salience of the alert and the second value corresponding to not increasing the salience of the alert. FIG. 27 illustrates an exemplary user interface for an alert-salience setting on a device 100 in accordance with some embodiments. As shown, an increased salience alert selector 2710 allows the user to turn use of increased salience on or off, such that "on" indicates that certain alerts will have increased salience, and "off" indicates that no alerts will have increased salience. As discussed herein, some alerts will have increased salience when this setting is on, and some will not take into account the setting. For example, using the exemplary classes discussed in conjunction with FIG. 25, when the alert-salience setting is on, events in the Personal and User-Set event classes will result in haptic output with increased salience, and events in the System and Third Party event classes will be unchanged despite the alert-salience setting being on, according to some embodiments.

When an event type is part of a binary set of related events, one of the two events can be designated as receiving an increased salience haptic according to some embodiments. For example, buddy pairing, when attempted has only two results: successful buddy pairing or failed buddy pairing. For successful budding pairing, increased salience may not be necessary as it is the expected outcome. However, a failure to pair may be unexpected, and thus can be called to the user's attention via an increased saliency haptic to more easily gain the user's attention. Thus, for the buddy pairing event failure result of the binary options, an increased saliency haptic would result, whereas for a buddy pairing success a standard haptic output would be provided, according to some embodiments.

In some embodiments, whether or not an alert has increased salience when the increased-salience setting is on is based on an importance of the event that triggered the alert. For example, in some embodiments events can include information (e.g., in the form of metadata) corresponding to the importance or urgency of the event, such as an urgent or important flag on an email, a message received from a VIP contact, or other similar information indicating that the event is in some way more important than other events. In some embodiments, the content of the event may be examined for keywords indicating importance such as "urgent," "high importance," etc. In some embodiments, an even higher degree of salience can be added for events with more than one increased salience indicator. For example, when a message is received and the increased salience is off, the message triggers a standard haptic for the Personal event class. However, when the same message is received from a VIP contact and the salience setting is off, some increase in salience still may be applied to distinguish the VIP contact over other messaging contacts. And when the increased salience is on, messages received increased salience. Thus, according to some embodiments, an increase from one trigger (e.g., increased salience setting for Personal) can be combined with an increase from another trigger (e.g., message is from a VIP contact) to produce an "extra salience" output. For example, the extra salience output could be three separate priming haptic components preceding the standard haptic for the event class.

Some event types are deemed more important by way of the nature of the event, according to some embodiments. For example, events triggered financial transactions in some instances are considered more important than other events, regardless of the event class that the financial transactions fall within. Thus, specific categories of events considered more sensitive—in the example of financial transactions, these could include any activity associated with banking or stock trading applications, or other events related to money and/or more subject to fraud activities. Another example is events within an event class subject to increased salience (e.g., Personal) that also are message event types likely to have been received directly from a human user other than the user operating the device. For example, an incoming message or call from a known email address or phone number on the user's contact list. For further discussion of event types likely to have been received from a human user other than the user operating the device, see Table 2. In this example, all message event types likely to have been received from a human user have an increased salience haptic (e.g., mail, messages, and voicemail), but other event types in the class do not (e.g., photostream activity).

According to some embodiments, certain event types may be excluded from increased haptic output salience, even when other event types in the event class provide the increased salience output corresponding to an increased salience setting. For example, within an event class (e.g., Personal) with increased saliency on, events triggered by responses to UI interactions (e.g., scrolling, navigating through items, pressing UI buttons, or other user input) do not have increased salience alerts even with the setting on. In some instances, the user input is characteristic of a high level of user engagement with the application or device, and thus is an event that doesn't require increased salience. Thus, the user is not bombarded with an unduly strong feedback signal when the user has a high degree of engagement or interaction with the application/device.

Another condition under which certain event types may be excluded from increased haptic output salience, even when other event types in the event class provide the increased salience output corresponding to an increased salience setting, is when the application providing the alert is in an active state (e.g., being used by the device user). For example, a received message event type is in the Personal event class, and thus typically would be subject to increased salience alerts when the setting is on. However, in the event that the user of the device is using the messaging application at the time the message is received, an increased salience haptic would not be provided. On the other hand, the same received message event would trigger increased salience if the user was not using the messaging application when the message was received.

In the example above in which a first event type results in an alert that includes a haptic component selected based at least on the alert-salience setting and a second event type selects a haptic component without regard to the alert-salience setting, when the setting value corresponds to increasing salience of the alert, the first alert would have increased salience and the second alert would not. Thus, despite the alert-salience setting having a value corresponding to increasing salience of the alert, not all alerts would have increased salience. Continuing the example from above, if the first type of event is an incoming message event, corresponding to a Personal event class type of event, and the second type of event is a payment event, corresponding to a System event class type of event, and the setting value corresponds to increasing salience of the alert, the message (Personal class) event would have increased salience but the payment (System class) event would not, since the second type does not take the setting into consideration. According to some embodiments, Personal and User-Set event classes would have increased salience haptics for alerts when the alert-salience setting is on, whereas System and Third Party event classes would have the standard haptic alert regardless of the alert-salience setting value.

According to some embodiments, the first alert is different from the second alert. For example, the first alert could include a different haptic component than the second alert, or the first alert could include a different audio component than the second alert, or the first alert could include both a different haptic component and a different audio component.

However, in some embodiments the device forgoes the additional haptic component and just provides 2625 the standard haptic component for alerts triggered in response to events in the first plurality of event classes when the alert-salience setting has the second value. Continuing with the above examples related to classes, a standard haptic component would result from alerts triggered in response to Personal or User-Set event class events, when the alert-salience setting has the second value (off). Likewise, in some embodiments the device forgoes providing the additional haptic component and just provides 2625 the standard haptic component for alerts triggered in response to events in a second plurality of event classes, without regard to the alert-salience setting has the first value or the second value. Continuing with the above examples related to classes, a standard haptic component would also result from alerts triggered in response to System or Third Party event class events, regardless of the alert-salience setting value. In some cases the second plurality of event classes is distinct from the first plurality of event classes. Thus, in some examples the additional haptic component is provided only if an incoming event is both of an event class for which the device increases alert-salience and the alert-salience value is set to increasing the salience of the alert. For example, an event in the Person or User-Set event classes, when the alert-salience setting is "on."

According to some embodiments, the method for providing selective salience increase for various haptics includes first determining 2615 a value of the alert-salience setting. In accordance with a determination that the alert-salience setting has a first value, the first alert includes 2620 a first haptic component and a second haptic component, while in accordance with a determination that the alert-salience setting has a second value different from the first value, the first alert includes 2625 the first haptic component but does not include the second haptic component. As an example, the first value could be an "increase alert salience" value and the second value could be a "do not increase alert salience" value. Continuing with the above examples, for an event in the Personal or User-Set event classes, and an alert-salience setting of "increase alert salience" (on), according to some embodiments alerts would include both the first haptic component—the standard haptic component for the corresponding event class—and a second haptic component to increase the saliency of the haptic output associated with the alert. For an event in the System or Third Party event classes, even with an alert-salience setting of "increase alert salience" (on), according to some embodiments alerts would include only the first, standard haptic component for the event corresponding class. According to some embodiments, the method further includes in accordance with a determination that the first event is a third type of event, providing a third alert that includes a haptic component selected based at least in part on the alert-salience setting of the device. In this example, providing the third alert that includes the haptic component selected based at least in part on the alert-salience setting of the device includes determining a value of the alert-salience setting (e.g., similar to step 2615 above). Referring again to the event class examples, if the Personal event class was the first type, the User-Set event class is the third type of this example, according to some embodiments.

According to some embodiments, in accordance with a determination that the alert-salience setting has the first value, the third alert includes a third haptic component and a fourth haptic component, and in accordance with a determination that the alert-salience setting has the second value different from the first value, the third alert includes the third haptic component but does not include the fourth haptic component. As with the prior example, the first value is an increase alert salience value and the second value is a do not increase salience value, according to some embodiments. For example, the third haptic component—the standard haptic component for the corresponding event class—would be paired with the fourth haptic component, to increase the saliency of the haptic output associated with the alert. In addition, in some embodiments, the fourth haptic component is the same as the second haptic component. For example, both the first haptic component and the second haptic component are increased-salience haptic, or priming, components that are used to notify the user that an alert is imminent. In some embodiments, the device provides the second haptic output following and within a specified time interval of providing the priming haptic output. Continuing with the event class examples, the fourth haptic, corresponding to increased salience of event alerts for events in the User-Set event class, is the same as the second haptic, corresponding to increased salience of event alerts for events in the Person event class, both of which haptic components are a priming haptic that precedes the standard haptic for each class.

According to some embodiments, the method further includes, when the first alert is detected while the alert-salience setting of the device has the first value, that the first alert provided in response to the first event includes the first haptic component and the second haptic component and the second alert provided in response to the first event includes a second-alert haptic component. The method goes on, in some embodiments, to receive a request to change the alert-salience setting of the device to the second value while the alert-salience setting of the device has the first value, and in response to receiving the request to change the alert-salience setting, changing the alert-salience setting to the second value. For example, if for Personal event class events the first and second haptic components have been provided due to the alert-salience setting being on, the request is a request to turn the alert-salience setting off. Similarly, the method includes in some embodiments, while the alert-salience setting of the device has the second value, detecting occurrence of a second event, and in response providing a third alert in accordance with a determination that the second event is the first type of event, the third alert including the first haptic component and not including the second haptic component. For example, the third haptic component only has been provided for User-Set event class events, because the alert-salience setting is turned off. Likewise, in accordance with a determination that the second event is the second type of event, the method proceeds with providing the second alert that includes the second-alert haptic component. In some embodiments, the second alert does not include the second haptic component (e.g., the second alert is not affected by the alert-salience setting and does not include a the second "extra salience" haptic component whether the alert-salience setting is set to "increase alert salience" "do not increase alert salience"). For example, the second type of event is a System event class event, and the second haptic component is not included in the output regardless of the alert-salience setting.

According to some embodiments, the first haptic component is different from the second haptic component and the third haptic component based on one or more of spacing between haptic outputs, number of haptic outputs, and change in the amplitude of haptic outputs over time during the haptic component.

In some embodiments, the haptic components are designed to be substantially different so as to enable a user to easily distinguish between the different classes of alerts whether or not an audible component of the alert is provided by the device, as discussed in conjunction with FIG. 25 above. For example, the device may have a plurality of unique alerts that correspond to different events, and the first event class, the second event class, and the third event class correspond to types of events that typically occur more frequently than the events that correspond to unique alerts.

As it relates to classes, a haptic component of an alert for an event in the first event class is distinguishable by the user from a haptic component of an alert for an event in the second event class, both of which are distinguishable by the user from a haptic component of an alert for an event in the third event class. In some cases, events that typically occur more frequently are events that, statistically speaking, occur more frequently than other events. As discussed above in conjunction with Table 9, in some embodiments, events that occur more frequently are grouped together into event classes and provided with a consistent alert so that a user can learn to differentiate between the different types of events that occur frequently.

In some embodiments, the event class associated with the event impacts whether an additional haptic component is provided in conjunction with a triggered alert. According to some embodiments, an additional haptic component is provided 2620 for alerts triggered in response to events in a first plurality of event classes (e.g., Personal) when the alert-salience setting has a first value. For example, in addition to a haptic associated with the first event class, an additional haptic is provided as well. The additional haptic is a priming haptic in some embodiments. For example, in some circumstances the second haptic component precedes the first haptic component.

In some circumstances the event classes corresponds to events generated based on different factors. For example, according to some embodiments, a first class of events includes events generated based on communications from other users, a second class of events includes events generated based on predefined criteria entered by a user of the device, and a third class of events includes events generated based on the satisfaction of device-monitored criteria. According to some embodiments, the event classes are characterized as belonging to a class by the event information, similar to the event classes discussed in conjunction with FIG. 25: Personal, User-Set, System, and Third Party.

In some embodiments, the event classes are configurable such that the device enables a user to select which types of events fall into an event class. However, in some embodiments, the types of events that fall into an event class are predefined, and the device does not enable a user of the device to select which event types fall into a particular event class.

Similarly, according to some embodiments, the alert-salience setting is user configurable, such that the user can select specific event classes or even individual event types for which the user would like increased saliency in the haptic output. Allowing the user to customize haptic output that correlates with events the user deems more important creates a more efficient human-machine interface, thereby reducing the amount of time it takes for a user to perform operations, which consequently reduces energy use and increases battery life for battery powered devices.

Table 10 shows a few exemplary circumstances under which the device 100 has information to selectively increase salience based on an alert-salience setting. The examples shown represent the same four event classes as shown above in Table 9: Personal, User-Set, System, and Third Party, but could be any event class.

TABLE 10

SELECTIVE HAPTIC SALIENCE

| Event Class | Event Type | Condition | Salience Setting | Haptic Output | Audio Output |
|---|---|---|---|---|---|
| Personal | Email message | Email received | Off | Fast double tap | /Ding long fade |
| Personal | Email message | Email received | On | Salient buzz; Fast double tap | /Ding long fade |
| Personal | Text message | Text message received | Off | Fast double tap | /Ding long fade |
| Personal | Text message | Text message received | On | Salient buzz; Fast double tap | /Ding long fade |
| User-Set | Calendar | Calendar notification | Off | Slow double tap | /Chime |
| User-Set | Calendar | Calendar notification | On | Salient buzz; Slow double tap | /Chime |
| User-Set | Reminder | Reminder notification | Off | Slow double tap | /Chime |
| User-Set | Reminder | Reminder notification | On | Salient buzz; Slow double tap | /Chime |
| System | Device pairing | Pairing event | Off | Rumble | Dit (o)/Ding short fade |
| System | Device pairing | Pairing event | On | Rumble | Dit (o)/Ding short fade |
| System | Financial application | Transaction event | Off | Rumble | Dit (o)/Ding short fade |
| System | Financial application | Transaction event | On | Rumble | Dit (o)/Ding short fade |
| Third Party | Third party message | Message received | Off | Fast double tap, buzz fade | /Ding up (o) |
| Third Party | Third party message | Message received | On | Fast double tap, buzz fade | /Ding up (o) |
| Third Party | Third party notification | Notification event | Off | Fast double tap, buzz fade | /Ding down (o) |
| Third Party | Third party notification | Notification event | On | Fast double tap, buzz fade | /Ding down (o) |

For the examples shown, the event class column shows which of four classes the event falls into: Personal, User-Set, System, or Third Party. Within each class, various event types are listed per the event type column. A few examples are listed for each event class, but the list is not meant to be exclusive of other event types. As with the previous chart, regardless of the event type, every event corresponding to a given event class has the same standard haptic and an audio output characteristic of the class, and each class shares the same increased salience output as well for any events corresponding to the event class. In the example of the third party application class, the haptic is identical and the accompanying audio component is characteristic of third party applications even though the audio varies by event type or condition.

Table 10 includes an extra column corresponding to the alert-salience setting. Note that when the alert-salience setting is off, indicating that increased saliency should not be used, the standard haptic and audio output is shown, which corresponds to the examples in Table 9. This maintains the goal of both the haptic and audio components uniquely corresponding to a given class, such that a user can easily tell from the output that an alert is from a particular event class as distinguished from other classes.

For two of the event classes, Personal and User-Set, when the alert-salience is turned on, indicating that increased saliency should be used, a salient buzz haptic is added to the standard output for the class. According to some embodiments, the additional haptic is added to the beginning of the alert such that it precedes the standard output. In this example, a salient buzz haptic component is added, which is a series of taps of a longer duration and of high frequency, such that the user feels a constant vibration or "buzz." According to some embodiments, the salient buzz has a duration of 0.5 seconds or more, and ramps up in intensity from the beginning of the buzz to the end, which assists in getting the user's attention prior to the standard output. Also note that even when the alert-salience setting is on, two of the event classes, System and Third Party, show no increase in saliency of the output, i.e., the standard output is used regardless of the setting.

TABLE 11

ADDITIONAL ALERT TYPES AND CLASSES

| Type | Class | Event | Audio | Haptic (Increased Salience = Off) | Haptic (Increased Salience = On) |
|---|---|---|---|---|---|
| Notification | 3rd Party Notification | 3rd Party Alert | A004 | H004 | H066 |
| Notification | Personal Notification | Mail | A001 | H001 | H066 |

TABLE 11-continued

ADDITIONAL ALERT TYPES AND CLASSES

| Type | Class | Event | Audio | Haptic (Increased Salience = Off) | Haptic (Increased Salience = On) |
|---|---|---|---|---|---|
| Notification | Personal Notification | Messages (App Closed) | A001 | H001 | H066 |
| Notification | Personal Notification | Photostream Activity | A001 | H001 | H001 |
| Notification | Personal Notification | Voicemail Received | A001 | H001 | H066 |
| Notification | System Notification | Payment Geofence | A002 | H002 | H002 |
| Notification | System Notification | Payment Balance | A002 | H002 | H002 |
| Notification | System Notification | Device Pairing Success | A002 | H002 | H002 |
| Notification | System Notification | Device Pairing Connection | A002 | H002 | H002 |
| Notification | User-Set Notification | Calendar | A003 | H003 | H067 |
| Notification | User-Set Notification | ToDo List Reminder | A003 | H003 | H067 |
| Feedback | Camera | Camera Countdown Start | A010 | H010 | H010 |
| Feedback | Camera | Camera Countdown End | A011 | H011 | H011 |
| Feedback | Camera | Camera Shutter | A012 | H012 | H012 |
| Feedback | Communication | Messages (App open, incoming) | A022 | H022 | H022 |
| Feedback | Communication | Messages (App open, outgoing) | A023 | H023 | H023 |
| Feedback | Communication | ET Send | A019 | H019 | H019 |
| Feedback | Communication | Heartbeat | (A020) | H020 | H020 |
| Feedback | Communication | Walkie Talkie | A033 | H033 | H033 |
| Feedback | Communication | Walkie Talkie Start | A034 | H034 | H034 |
| Feedback | Communication | Walkie Talkie End | A035 | H035 | H035 |
| Feedback | Communication | Call End | A057 | H057 | H057 |
| Feedback | Communication | Electronic Touch Receive | A060 | H060 | H060 |
| Feedback | Communication | Electronic Touch Begin | A065 | H065 | H068 |
| Feedback | Communication | Pairing Failure | A021 | H021 | H021 |
| Feedback | Communication | Device Pairing Remote Tap | A057 | H057 | H057 |
| Feedback | Payment | Payment Failure | A021 | H021 | H021 |
| Feedback | Payment | Payment Success | A032 | H032 | H032 |
| Feedback | Phone | Phone Answer | A008 | H008 | H008 |
| Feedback | Phone | Phone Hold | A008 | H008 | H008 |
| Feedback | Phone | Ringtone | A028 | H028 | H028 |
| Feedback | UI Controls | Stopwatch Reset | A008 | H008 | H008 |
| Feedback | UI Controls | Stopwatch Start | A008 | H008 | H008 |
| Feedback | UI Controls | Stopwatch Stop | A008 | H008 | H008 |
| Feedback | UI Controls | Stopwatch Lap | A008 | H008 | H008 |
| Feedback | UI Controls | Timer Cancel | A008 | H008 | H008 |
| Feedback | UI Controls | Timer Start | A008 | H008 | H008 |
| Feedback | UI Controls | Timer Pause | A008 | H008 | H008 |
| Feedback | UI Controls | Workout Select | A008 | H008 | H008 |
| Feedback | UI Controls | Workout Start | A008 | H008 | H008 |
| Feedback | UI Controls | Timer Wheel Hour Detent | A016 | H016 | H016 |
| Feedback | UI Controls | Timer Wheel Minute Detent | A016 | H016 | H016 |
| Feedback | UI Controls | Zoom Detent | A017 | H017 | H017 |
| Feedback | UI Controls | End of List Feedback | (A036) | H036 | H036 |
| Feedback | UI Controls | UI Edge Reached | A036 | H036 | H036 |
| Feedback | UI Controls | UI Turn Switch On | A037 | H037 | H037 |
| Feedback | UI Controls | UI Turn Switch Off | A037 | H037 | H037 |
| Feedback | UI Controls | UI Swipe | A038 | H038 | H038 |
| Feedback | UI Controls | Force Touch Invoke | (A039) | H039 | H039 |
| Feedback | UI Controls | Force Touch Exit | A040 | H040 | H040 |
| Feedback | UI Controls | Silence Notifications | A041 | H041 | H041 |
| Feedback | UI Controls | UI Confirmation | A048 | H048 | H048 |
| Feedback | UI Controls | UI Snap | A048 | H048 | H048 |

TABLE 11-continued

ADDITIONAL ALERT TYPES AND CLASSES

| Type | Class | Event | Audio | Haptic (Increased Salience = Off) | Haptic (Increased Salience = On) |
|---|---|---|---|---|---|
| Feedback | UI Controls | Preview | A050 | H050 | H050 |
| Feedback | Virtual Assistant | Virtual Assistant Start | (A029) | H029 | H029 |
| Feedback | Virtual Assistant | Virtual Assistant Success | (A030) | H030 | H030 |
| Feedback | Virtual Assistant | Virtual Assistant Failure | (A031) | H031 | H031 |
| Alert | Activity | Sedentary Timer | A005 | H005 | H005 |
| Alert | Activity | Activity Goal Behind | A006 | H006 | H006 |
| Alert | Activity | Activity Goal Close | A006 | H006 | H006 |
| Alert | Activity | Activity Goal Attained | A007 | H007 | H007 |
| Alert | Activity | Workout Complete | A007 | H007 | H007 |
| Alert | Activity | Workout Countdown | A009 | H009 | H009 |
| Alert | Navigation | Navigation Generic | A024 | H024 | H024 |
| Alert | Navigation | Navigation: Left Turn | A025 | H025 | H025 |
| Alert | Navigation | Navigation: Right Turn | A026 | H026 | H026 |
| Alert | Stopwatch/Timer/Clock | Clock Tick | A013 | H013 | H013 |
| Alert | Stopwatch/Timer/Clock | Hourly Chime | A014 | H014 | H014 |
| Alert | Stopwatch/Timer/Clock | Alarm | A015 | H015 | H015 |
| Alert | Stopwatch/Timer/Clock | Timer | A015 | H015 | H015 |
| Alert | System Alerts | End of Do Not Disturb | A042 | H042 | H042 |
| Alert | System Alerts | System Startup | A043 | H043 | H043 |
| Alert | System Alerts | Unlock Companion Device | A044 | H044 | H044 |
| Alert | System Alerts | Charging | A045 | H045 | H045 |
| Alert | System Alerts | Unlock Failure | A055 | H055 | H055 |
| Alert | System Alerts | Unlock Success | A056 | H056 | H056 |
| Alert | System Alerts | Dictation Start | A058 | H058 | H058 |
| Alert | System Alerts | Dictation End | A059 | H059 | H059 |
| Alert | System Alerts | Battery Low | A061 | H061 | H061 |
| Alert | System Alerts | Phone Failure | A069 | H069 | H069 |

In Table 11, shown above, the different audio outputs and haptic outputs that correspond to different events are shown. The events are divided into Notifications, Feedback, and Alerts. Audio outputs with the same name correspond to the same (or substantially the same) audio output (audio waveforms). Audio outputs with different names correspond to different (or materially/perceptibly different) audio outputs (audio waveforms). Haptic outputs with the same name correspond to the same (or substantially the same) haptic output (haptic waveforms). Haptic outputs with different names correspond to different (or materially/perceptibly different) haptic outputs (haptic waveforms). Haptic/Audio output names that are enclosed in brackets ( ) are, optionally omitted and replaced with the absence of an audio output or haptic output.

In some embodiments, haptic/audio outputs are grouped into a plurality of types and or classes in addition to the notification classes described above. Notifications generally correspond to haptic/audio outputs that are designed to get the user's attention when the user is not paying attention to the device (e.g., when a new message is received or it is time for a calendar event to occur). Alerts generally correspond to haptic/audio outputs that are designed to alert the user to operations being performed at the device (or conditions of the device) while the user is paying attention to the device (e.g., navigation instructions while the user is walking or driving, device unlock failure/success, etc.). Feedback generally corresponds to haptic/audio outputs that are designed to give the user feedback that inputs from the user have been detected by the device (e.g., scrolling inputs, button selection inputs, sent messages, etc.), or to indicate that the input has caused the device to reach some threshold (e.g., a scrolling limit, a zoom limit, a force/pressure threshold at which an alternative menu is displayed). In some embodiments, when the increased salience setting is "on," increased salience haptic/audio output is provided for notifications, which are designed to get the user's attention when the user is not paying attention, but not for feedback (e.g., because the user is already paying attention to and actively interacting with the device). In some embodiments, increased salience haptic/audio output is provided for some notifications associated with an application (e.g., message notifications) when the application is closed but not for feedback associated with the application when the application is open (e.g., sent and received message alerts when a messaging application is open). For example in Table 11, a Messages Notification uses different haptic outputs based on the increased salience setting (e.g., haptic output H001 when the increased salience setting is off and haptic output H066 when the increased salience setting is on) but Messages Feedback when a message is sent uses the same haptic output without regard to the increased salience setting (e.g., haptic output H023 is used if the increased salience setting is on or off).

In some embodiments the alert salience setting changes a salience of haptic output without changing a salience of corresponding audio output. For example, as shown above in Table 11, the Messages notification uses the same audio output (A001) whether or not the increased salience setting is on, but uses a different haptic output depending on the increased salience setting (e.g., haptic output H001 is used when the increased salience setting is off and haptic output H066 is used when the increased salience setting is on).

It should be understood that the particular order in which the operations in FIG. 26 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1000, 1100, 1200, 1300, 2500, 3000, and 3200) are also applicable in an analogous manner to method 2600 described above with respect to FIG. 26. For example, the inputs, alert conditions, events, applications, states, and haptic outputs described above with reference to method 2600 optionally have one or more of the characteristics of the inputs, alert conditions, events, applications, states, and haptic outputs described herein with reference to other methods described herein (e.g., methods 700, 900, 1000, 1100, 1200, 1300, 2500, 3000, and 3200). For brevity, these details are not repeated here.

Figure 28:
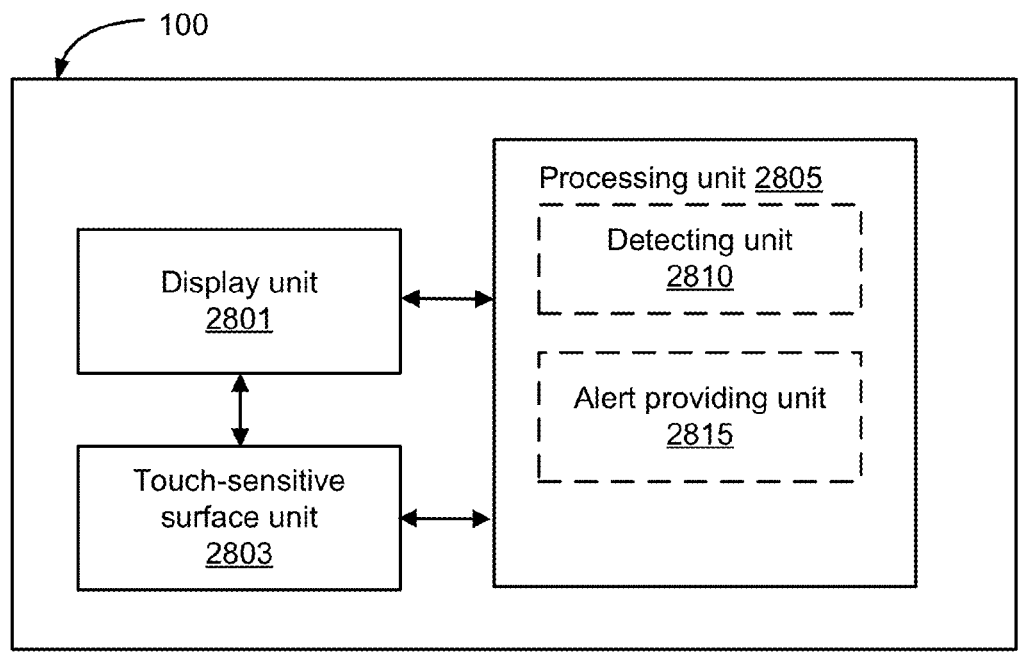
FIG. 28 is a functional block diagram of an electronic device in accordance with some embodiments.

The operations described with reference to FIGS. 25-27 are optionally implemented by components depicted in FIGS. 28-29. FIG. 28 shows an example functional block diagram of device 100 configured in accordance with the principles of the various described embodiments. It is understood by persons of skill in the art that the functional blocks described in FIG. 28 are, optionally, combined or separated into sub-blocks to implement the principles of the various described embodiments. Therefore, the description herein optionally supports any possible combination or separation or further definition of the functional blocks described herein.

As shown in FIG. 28, the device 100 includes a display unit 2801 configured to display an application, a touch-sensitive surface unit 2803 configured to receive user contacts, and a processing unit 2805 coupled to the display unit 2801 and the touch-sensitive surface unit 2803. In some embodiments, the processing unit 2805 includes a detecting unit 2810 and an alert providing unit 2815.

The following 4 paragraphs describe different embodiments that may be implemented, individually or in any combination, by the device 100 illustrated in FIG. 28:

The processing unit 2805 is configured to detect an event at a device with a tactile output generator (e.g., with the detecting unit 2810), and responsive to detecting the event, in accordance with a determination that the event is a type of event in a first event class that includes a plurality of different event types, provide a first alert that includes a first haptic component generated by the tactile output generator (e.g., with the alert providing unit 2815).

In accordance with a determination that the event is a type of event in a second event class that includes a plurality of different event types, processing unit 2805 is configured to provide a second alert that includes a second haptic component, generated by the tactile output generator, that is different from the first haptic component (e.g., with the alert providing unit 2815). In accordance with a determination that the event is a type of event in a third event class that includes a plurality of different event types, processing unit 2805 is configured to provide a third alert that includes a third haptic component, generated by the tactile output generator, that is different from the first haptic component and the second haptic component (e.g., with the alert providing unit 2815).

According to some embodiments, the first class of events includes events generated based on communications from other users, the second class of events includes events generated based on predefined criteria entered by a user of the device, and the third class of events includes events generated based on the satisfaction of device-monitored criteria. According to some embodiments, the first haptic component is different from the second haptic component and the third haptic component based on at least one of: spacing between haptic outputs, number of haptic outputs, and change in the amplitude of haptic outputs over time during the haptic component (e.g., outputs provide by the alert providing unit 2815).

According to some embodiments, the device has a plurality of unique alerts that correspond to different events (e.g., provided by the alert providing unit 2815), and the first event class, the second event class, and the third event class correspond to types of events that typically occur more frequently than the events that correspond to unique alerts.

In response to detecting the event, in accordance with a determination that the event is a type of event in a fourth event class that includes a plurality of different event types, processing unit 2805 is configured to provide a fourth alert that includes a fourth haptic component, generated by the tactile output generator, that is different from the first haptic component, the second haptic component, and the third haptic component (e.g., with the alert providing unit 2815). According to some embodiments, the fourth event class corresponds to an event generated by a third party application. According to some embodiments, the fourth haptic component is differentiated from the first haptic component, the second haptic component, and the third haptic component by a haptic output element that is not included in the first haptic component, the second haptic component, or the third haptic component.

As described above, the operations described with reference to FIGS. 25-27 are optionally implemented by components depicted in FIGS. 28-29. FIG. 29 shows an example functional block diagram of device 100 configured in accordance with the principles of the various described embodiments. It is understood by persons of skill in the art that the functional blocks described in FIG. 29 are, optionally, combined or separated into sub-blocks to implement the principles of the various described embodiments. Therefore, the description herein optionally supports any possible combination or separation or further definition of the functional blocks described herein.

Figure 29:
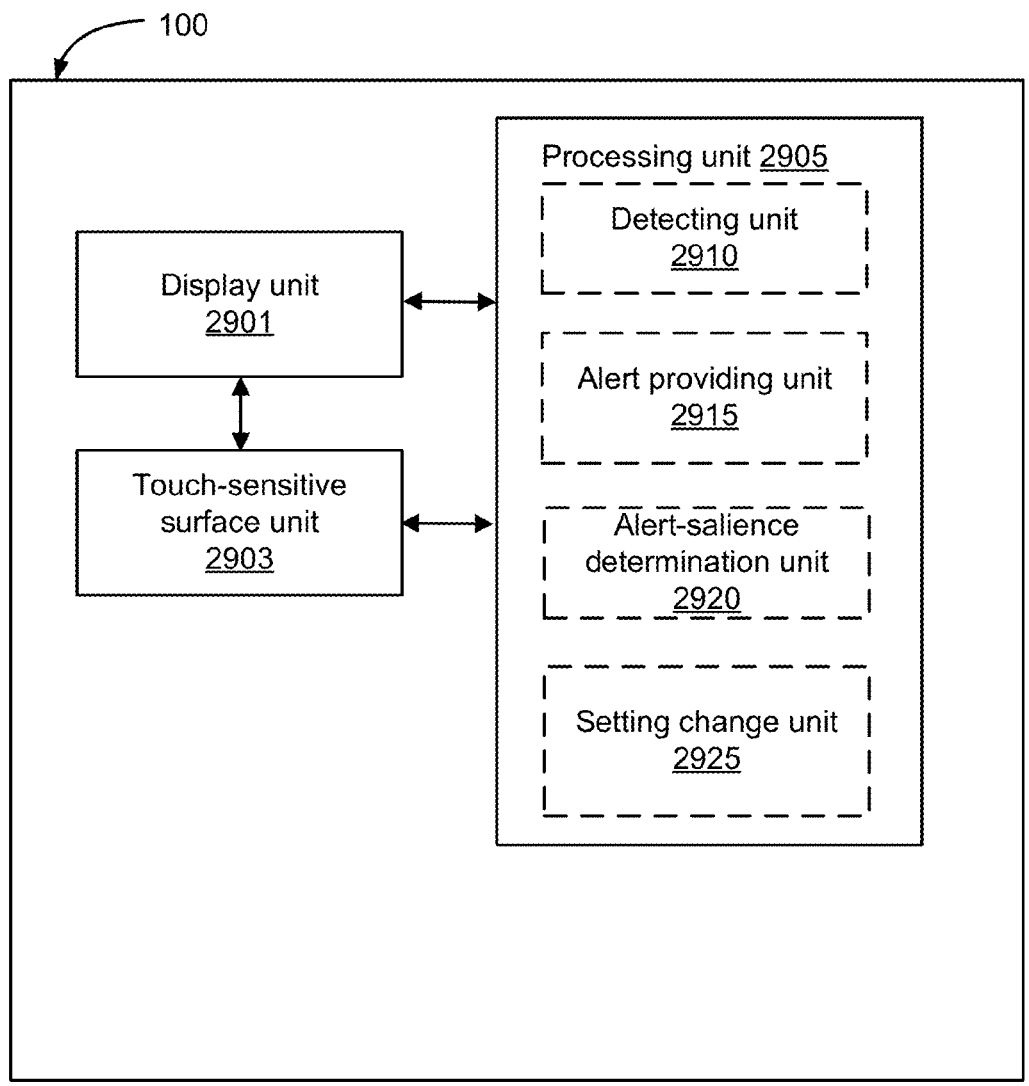
FIG. 29 is a functional block diagram of an electronic device in accordance with some embodiments.

As shown in FIG. 29, the device 100 includes a display unit 2901 configured to display an application, a touch-sensitive surface unit 2903 configured to receive user contacts, and a processing unit 2905 coupled to the display unit 2901 and the touch-sensitive surface unit 2903. In some embodiments, the processing unit 2905 includes a detecting unit 2910, an alert providing unit 2915, an alert-salience determination unit 2920, and an setting change unit 2925.

The following 9 paragraphs describe different embodiments that may be implemented, individually or in any combination, by the device 100 illustrated in FIG. 29:

The processing unit 2905 is configured to detect occurrence of a first event at a computing device with a tactile output generator (e.g., with the detecting unit 2910), and in accordance with a determination that the first event is a first type of event, provide a first alert with the tactile output generator that includes a first haptic component selected based at least in part on an alert-salience setting of the device (e.g., with the alert providing unit 2915). In accordance with a determination that the first event is a second type of event, processing unit 2905 is configured to provide a second alert with the tactile output generator that includes a second haptic component selected without regard to the alert-salience setting of the device (e.g., with the alert providing unit 2915). According to some embodiments, the first alert is different from the second alert.

According to some embodiments, providing the first alert that includes the haptic component selected based at least in part on the alert-salience setting of the device includes determining a value of the alert-salience setting (e.g., with the alert-salience determination unit 2920). According to some embodiments, in accordance with a determination that the alert-salience setting has a first value, the first alert (e.g., provided by the alert providing unit 2915) includes a first haptic component and a second haptic component. According to some embodiments, in accordance with a determination that the alert-salience setting has a second value different from the first value, the first alert (e.g., provided by the alert providing unit 2915) includes the first haptic component but does not include the second haptic component. According to some embodiments, the first value of the alert-salience setting is on and the second value of the alert-salience setting is off. According to some embodiments, the second haptic component precedes the first haptic component.

In accordance with a determination that the first event is a third type of event, processing unit 2905 is configured to provide a third alert that includes a haptic component selected based at least in part on the alert-salience setting of the device (e.g., provided by the alert providing unit 2915). According to some embodiments, the processing unit 2905 providing the third alert that includes the haptic component selected based at least in part on the alert-salience setting of the device includes the processing unit 2905 being configured to determine a value of the alert-salience setting (e.g., with the alert-salience determination unit 2920).

According to some embodiments, in accordance with a determination that the alert-salience setting has the first value, the third alert includes a third haptic component and a fourth haptic component. According to some embodiments, in accordance with a determination that the alert-salience setting has the second value different from the first value, the third alert includes the third haptic component but does not include the fourth haptic component. According to some embodiments, the fourth haptic component is the same as the second haptic component.

According to some embodiments, when the first alert is detected while the alert-salience setting of the device has the first value, the first alert provided in response to the first event includes the first haptic component and the second haptic component and the second alert provided in response to the first event includes a second-alert haptic component (e.g., the alerts are provided by the alert providing unit 2915). According to some embodiments, while the alert-salience setting of the device has the first value, processing unit 2905 is configured to receive a request to change the alert-salience setting of the device to the second value (e.g., with the setting change unit 2925). Also according to some embodiments, in response to receiving the request to change the alert-salience setting to the second value, processing unit 2905 is configured to change the alert-salience setting to the second value (e.g., with the setting change unit 2925).

According to some embodiments, while the alert-salience setting of the device has the second value, processing unit 2905 is configured to detect the occurrence of a second event (e.g., with the detecting unit 2910) and in response to detecting the occurrence of the second event, in accordance with a determination that the second event is the first type of event, processing unit 2905 is configured to provide a third alert that includes the first haptic component and does not include the second haptic component (e.g., with the alert providing unit 2915). According to some embodiments, in accordance with a determination that the second event is the second type of event, processing unit 2905 is configured to provide the second alert that includes the second-alert haptic component (e.g., with the alert providing unit 2915).

According to some embodiments, the processing unit 2905 is configured to provide an additional haptic component for alerts triggered in response to events in a first plurality of event classes when the alert-salience setting has a first value (e.g., with the alert providing unit 2915). According to some embodiments, the processing unit 2905 is configured to forgo providing the additional haptic component for alerts triggered in response to events in the first plurality of event classes when the alert-salience setting has the second value (e.g., with the alert providing unit 2915). According to some embodiments, the processing unit 2905 is configured to forgo providing the additional haptic component for alerts triggered in response to events in a second plurality of event classes, distinct from the first plurality of event classes, without regard to the alert-salience setting has the first value or the second value (e.g., with the alert providing unit 2915).

According to some embodiments, the first class of events includes events generated based on communications from other users, the second class of events includes events generated based on predefined criteria entered by a user of the device, and the third class of events includes events generated based on the satisfaction of device-monitored criteria. According to some embodiments, the first haptic component is different from the second haptic component and the third haptic component based on at least one of: spacing between haptic outputs, number of haptic outputs, and change in the amplitude of haptic outputs over time during the haptic component (e.g., outputs provide by the alert providing unit 2915).

According to some embodiments, the device has a plurality of unique alerts that correspond to different events (e.g., provided by the alert providing unit 2915), and the first event class, the second event class, and the third event class correspond to types of events that typically occur more frequently than the events that correspond to unique alerts.

Application-Specific Haptic/Audio Output

Alert conditions can be triggered within a variety of different application classes (e.g., first party applications, third party applications), triggered by various applications (e.g., email, calendar, text message, payment application, timer application, etc.), and triggered in many different contexts (e.g., action success, action failure, etc.). Which application class, which application, and/or in what context a detected condition is detected provides the basis for generating a corresponding output, according to some embodiments. Providing haptic and/or audio output that correlates with the application class, application, and/or context allows for consistency in haptic and audio branding for the output, and thus creates a more efficient human-machine interface, thereby reducing the amount of time it takes for a user to perform operations, which consequently reduces energy use and increases battery life for battery powered devices.

Table 12 provides an overview of various application classes, applications, and contexts as examples of output brand consistency using both haptic and audio output.

TABLE 12

OUTPUT SEMANTICS OVERVIEW

| Application Class | Applications | Condition | Haptic Output | Audio Output |
|---|---|---|---|---|
| First Party | ANY | ANY | First haptic | First class waveforms (first party) |
| Third Party | ANY | ANY | Second haptic | Second class waveforms (third party) |
| First Party | First application | ANY | First haptic | First application waveforms |
| First Party | Second application | ANY | First haptic | Second application waveforms |
| ANY | Context 1 | Success | First (success) haptic | Context 1 waveforms |
| ANY | Context 2 | Success | First (success) haptic | Context 2 waveforms |
| ANY | Context 1 | Failure | Second (failure) haptic | Context 1 waveforms |
| ANY | Context 2 | Failure | Second (failure) haptic | Context 2 waveforms |

The first two rows of Table 12 show a first application class, first party applications, and a second application class, third party applications. For applications within each class, the alert is a haptic output component corresponding to the class of applications combined with audio output component including waveform variants specific to that application class, e.g., first party application alerts include a first haptic component and a variation of a first class waveform, whereas third party application alerts include a second haptic component and a variation of a second class waveform. This maintains a consistent haptic associated with each application class. However, first party applications each typically have their own haptic, while all third party applications typically share a single haptic. More specific examples are discussed below in conjunction with Table 13.

The third and fourth rows of Table 12 show two different applications within a single class (first party applications), based on any triggering condition. Both applications result in the same (first) haptic output, which corresponds to the first party application class, but each has a different audio output corresponding to a waveform variant for a waveform associated with the particular application. For example, the first application pairs the first haptic output with a waveform variant associated with the first application, with different variants for different conditions within the first application. Similarly, the second application pairs the first haptic output with a waveform variant associated with the second application, with different variants for different conditions within the second application. This maintains a consistent haptic associated with each application. More specific examples are discussed below in conjunction with Table 14.

The last four rows of Table 12 show two different conditions (success, failure), with haptic output consistent across the condition and audio output variable based on the specific context. For example, a success condition provides a consistent first haptic associated with success, whereas context 1 provides a first set of waveforms associated with context 1 and context 2 provides a second set of waveforms associated with context 2. Likewise, a failure condition provides a consistent first haptic associated with failure, whereas context 1 provides a first set of waveforms associated with context 1 and context 2 provides a second set of waveforms associated with context 2. This maintains a consistent haptic associated with each condition (success, failure). More specific examples are discussed below in conjunction with Table 15.

Figure 30:
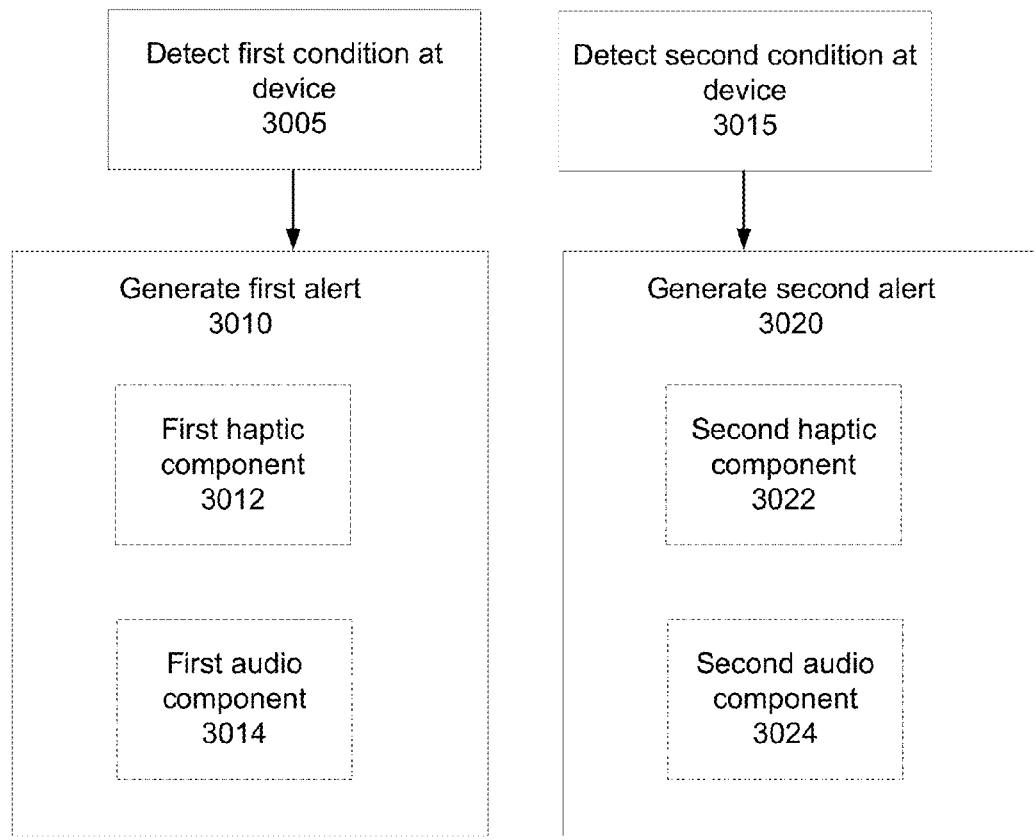
FIG. 30 is a flow diagram of a method for detecting a first condition and a second condition and generating corresponding alerts including haptic and audio outputs according to some embodiments.

Which application class an alert condition is triggered within provides the basis for generating a corresponding output, according to some embodiments. FIG. 30 is a flow diagram of a method 3000 for detecting a first condition and a second condition and generating corresponding alerts including haptic and audio outputs according to some embodiments. Note that in some embodiments, different steps may be performed other than those shown in FIG. 30.

The method begins by, at an electronic device with one or more haptic output devices and one or more audio output devices, detecting 3005 occurrence of a first condition at the device. The first condition can be any of the various alert conditions described elsewhere herein, and the application can be any application executing on the device 100, according to some embodiments. For example, in some embodiments, the occurrence of the condition includes one or more of the receipt of a communication (e.g., a message from an external source), the detection of an input from a user (e.g., a touch, voice, or mechanical input that is associated with feedback), or the detection of the satisfaction of triggering criteria (e.g., the expiration of an alarm, as the completion of a workout, or the like), to name a few. According to some embodiments, the computing device 100 comprises a touch-sensitive display for receiving the user input.

Responsive to detecting the occurrence of the first condition, the device 100 generates 3010 a first alert that corresponds to a respective application in a first class of applications. The first alert includes, in this example, a first haptic component 3012 that is output via the one or more haptic output devices and a first audio component 3014, output via the one or more audio output devices. In this instance, the audio component is composed from an audio waveform that is designated for use by the respective application in the first class of applications. In some embodiments, the first class of applications includes first party applications and the audio component is a unique audio sample that is used to distinguish alerts for the respective application from alerts for other applications. According to some embodiments, the first haptic output is provided via the touch-sensitive display on the computing device 100.

The device 100 also detects 3015 occurrence of a second condition at the device 100, optionally at a later time. Responsive to detecting the occurrence of the second condition, the device generates 3020 a second alert that corresponds to a respective application in a second class of applications that is different from the first class of applications, the second alert including a second haptic component 3022 that is output via the one or more haptic output devices and a second audio component 3024, output via the one or more audio output devices. In this instance, the audio component is composed from an audio waveform that is designated for use by applications in the second class of applications. In some embodiments, the second class of applications includes third party applications and the audio component is an audio sample that is used to distinguish alerts for third party applications from alerts for first party applications. According to some embodiments, the first haptic output is provided via the touch-sensitive display on the computing device 100.

Table 13 shows exemplary haptic and audio outputs corresponding to alerts for various application classes. The first three rows of the table show alerts corresponding to a first application class, e.g., first party applications. For each of the first party email, calendar, and text message applications, the output includes a first haptic that corresponds to the first application class (first party applications) and an audio output that includes a waveform instance corresponding to the first application class (first party applications). Waveform variants are discussed in greater detail below in conjunction with FIG. 31. By providing haptic and audio output that correlates with the application class, the user is provided consistency in branding for output associated with the application class. Tables 9 and 10 above also provide examples of both first party and third party alerts.

Similarly, the last three rows of the table show alerts corresponding to a second application class, e.g., third party applications. For each of the third party message, notification, and alert, the output includes a second haptic that corresponds to the second application class (third party applications), which is different from the first haptic corresponding to the first party application according to some embodiments, and an audio output that includes a waveform instance corresponding to the second application class (third party applications). By providing haptic and audio output that correlates with the application class, the user is provided consistency in branding for output associated with the application class.

TABLE 13

APPLICATION CLASS OUTPUTS

| Application Class | Application | Condition | Haptic Output | Audio Output |
| --- | --- | --- | --- | --- |
| First Party | Email | Email received | First haptic | First class Waveform 1 |
| First Party | Calendar | Calendar notification | First haptic | First class Waveform 2 |
| First Party | Text message | Text message received | First haptic | First class waveform 3 |
| Third Party | 3P message application | Message received | Second haptic | Second class waveform 1 |
| Third Party | 3P notification | Notification event | Second haptic | Second class waveform 2 |
| Third Party | 3P alert | Alert received | Second haptic | Second class waveform 3 |

In addition, although the third party applications have a unique set of haptic alerts, they also can share some of the same haptic feedback. For example, an alert that simulates physical feedback, such as haptic/audio click or a haptic that provides simulated bouncing (rubber band-like) effect that is provided in conjunction with a user interface element such as a scrollable list view bouncing when it reaches the end of the display might be available regardless of the class of application in use. If the application includes a scrollable list, then the output is available for use within the application upon that action, regardless of the application class.

According to some embodiments, the generating 3010 of the first alert of the method is in accordance with a determination that the alert corresponds to a respective application in a first class of applications, and the generating 3020 of the second alert is in accordance with a determination that the alert corresponds to a respective application in a second class of applications that is different from the first class of applications.

According to some embodiments, the first haptic component and the second haptic component are composed from one or more haptic waveforms that are available to both the first class of application and the second class of application. For example, any of the various waveforms described herein, e.g., minitap, microtap, tap, sine wave, etc. FIG. 5, described above, depicts examples of various haptic waveform morphologies.

Device 100 is configured to generate 3010, 3020 different alerts according to some embodiments. The different alerts include a first subset of two or more alerts that include audio components that are available to the first class of applications and are not available to the second class of applications. For example, certain audio components may be designated for use by first party applications, and not available for use by third party applications. The different alerts also include a second subset of two or more alerts that include audio components that are available to the second class of applications and are composed from the audio waveform that is designated for use by the second class of applications. For example, a particular audio waveform may be specific for use by third party applications, and thus provide a consistent audio characteristic of third party applications. FIG. 6, described above, depicts examples of various audio waveform morphologies.

According to some embodiments, the second subset of alerts include two alerts generated by applying different transformations to the same respective audio sample (e.g., a natural audio sample that is a recording of a sound with a microphone or a synthetic audio sample that was generated digitally) that is associated with the second class of applications. In some embodiments, the two alerts include an alert including an audio component generated by applying a first transformation the respective audio sample that is associated with the second class of applications. In some embodiments, this alert is available to a plurality of applications in the second class of applications. The two alerts also, optionally, include a different alert including an audio component generated by applying a second transformation to the respective audio sample that is associated with the second class of applications, wherein the first transformation is different from the second transformation. In some embodiments, this different alert is available to a plurality of applications in the second class of applications. The transformations applied to the waveforms include changing the amplitude, duration, pitch, or number of repetitions of the audio sample, for example.

Likewise, according to some embodiments the first subset of alerts include two alerts generated by applying different transformations to a (same) respective audio sample that is associated with a first application in the first class of applications. In some embodiments, the two alerts include an alert including an audio component generated by applying a first transformation the respective audio sample that is associated with the first application in the first class of applications (e.g., by changing an amplitude, duration, pitch, or number of repetitions of the audio sample). In some embodiments, this alert is available to a plurality of applications in the first class of applications. In some embodiments, this alert is available only to the first application in the first class of applications. The two alerts also, optionally, include a different alert including an audio component generated by applying a second transformation to the respective audio sample that is associated with the first application in the first class of applications, wherein the first transformation is different from the second transformation. In some embodiments, this different alert is available to a plurality of applications in the first class of applications. In some embodiments, this different alert is available only to the first application in the first class of applications.

Similarly, according to some embodiments, the first subset of alerts include two alerts generated by applying different transformations to the same respective audio sample that is associated with a second application in the first class of applications, wherein the respective audio sample that is associated with the second application is different from the respective audio sample that is associated with the first application. For example, the first application and the second application each have characteristic sounds that serve as a "brand" for the application, e.g., a payment application uses alerts generated with a sound sample that is unique to the payment application so that payment success, payment failure, and account activation for the payment application have a recognizably similar sound. By comparison, a virtual assistant application uses alerts generated with a sound sample that is unique to the virtual assistant application, so that virtual assistant success, virtual assistant failure, and virtual assistant ready all have a recognizably similar sound that is different from the recognizably similar sound of alerts for the payment application. In some embodiments, the two alerts include an alert including an audio component generated by applying a first transformation the respective audio sample that is associated with the second application in the first class of applications (e.g., by changing an amplitude, duration, pitch, or number of repetitions of the audio sample). In some embodiments, this alert is available to a plurality of applications in the first class of applications. In some embodiments, this alert is available only to the second application in the first class of applications. The two alerts also, optionally, include a different alert including an audio component generated by applying a second transformation to the respective audio sample that is associated with the second application in the first class of applications, wherein the first transformation is different from the second transformation. In some embodiments, this different alert is available to a plurality of applications in the first class of applications. In some embodiments, this different alert is available only to the second application in the first class of applications.

Which application an alert condition is triggered within provides the basis for generating a corresponding output, according to some embodiments. Table 14 shows exemplary haptic and audio outputs corresponding to alerts for two different applications (email, payment) within a single application class (first party applications). The first three rows of the table show alerts corresponding to a first application, e.g., email. For each of the email conditions email received, email sent, and email deleted, the output includes a first haptic that corresponds to the first application class (first party applications), and an audio output that includes a waveform instance corresponding to the email application. Each email application condition has a waveform variant of the email waveform: first application waveform 1, 2, 3. Waveform variants are discussed in greater detail below in conjunction with FIG. 31. By providing audio output that correlates with the email application, the user is provided consistency in branding for output associated with the email application.

The last three rows of the table show alerts corresponding to a second application, e.g., payment. For each of the payment conditions payment success, payment failure, account activation, the output includes a first haptic that corresponds to the first application class (first party applications), and an audio output that includes a waveform instance corresponding to the payment application. Each payment application condition has a waveform variant of the payment waveform: second application waveform 1, 2, 3. By providing audio output that correlates with the payment application, the user is provided consistency in branding for output associated with the payment application.

TABLE 14

APPLICATION-SPECIFIC AUDIO FOR SHARED HAPTIC

| Application Class | Application | Condition | Haptic Output | Audio Output |
|---|---|---|---|---|
| First Party | Email | Email received | First haptic | First application waveform 1 |
| First Party | Email | Email sent | First haptic | First application waveform 2 |
| First Party | Email | Email deleted | First haptic | First application waveform 3 |
| First Party | Payment | Payment success | First haptic | Second application waveform 1 |
| First Party | Payment | Payment failure | First haptic | Second application waveform 2 |
| First Party | Payment | Account activation | First haptic | Second application waveform 3 |

According to some embodiments, the second subset of alerts is not available to the first class of applications. For example, first party applications are not allowed to use the third party application alert sounds, and optionally vice versa. According to some embodiments, both the first and second subsets of alerts include haptic components that are available to the first class of applications and the second class of applications, such that both third party applications are allowed to use shared haptic components.

According to some embodiments, the different alerts include a third subset of two or more alerts that include audio components that are available to the second class of applications and the first class of applications, e.g., they are designated for shared use. For example, an alert that simulates physical feedback, such as haptic/audio click or a haptic that provides simulated bouncing (rubber band-like) effect that is provided in conjunction with a user interface element such as a scrollable list view bouncing when it reaches the end of the display might be available regardless of the class of application in use. If the application includes a scrollable list, then the output is available for use within the application upon that action, regardless of the application class. Thus, although third party applications have a unique set of haptic alerts, as noted in conjunction with Table 13 above, they also can share some of the same haptic feedback.

According to some embodiments, the first audio component, output via the one or more audio output devices, is composed from an audio waveform that is designated for use by a first application (e.g., a payment application) in the first class of applications (e.g., first party applications). For example, the audio component optionally is a unique audio sample that is used to distinguish alerts for the first application from alerts for other applications. According to some embodiments, the first audio component, output via the one or more audio output devices, is composed from an audio waveform that is designated for use by a second application (e.g., a virtual assistant application) in the first class of applications (e.g., first party applications). For example, the audio component optionally is a unique audio sample that is used to distinguish alerts for the second application from alerts for other applications.

According to some embodiments, the second audio component, output via the one or more audio output devices, is composed from the audio waveform that is designated for use by applications in the second class of application when the alert corresponds to a third application (e.g., a payment application) in the second class of applications (e.g., first party applications). For example, the audio component optionally is a unique audio sample that is used to distinguish alerts for the first application from alerts for other applications.

According to some embodiments, the first audio component, output via the one or more audio output devices, is composed from the audio waveform that is designated for use by applications in the second class of application when the alert corresponds to a second application (e.g., a virtual assistant application) in the second class of applications (e.g., first party applications). For example, the audio component is a unique audio sample that is used to distinguish alerts for the first application from alerts for other applications.

It should be understood that the particular order in which the operations in FIG. 30 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1000, 1100, 1200, 1300, 2500, 2600, and 3200) are also applicable in an analogous manner to method 3000 described above with respect to FIG. 30. For example, the inputs, alert conditions, events, applications, states, and haptic outputs described above with reference to method 3000 optionally have one or more of the characteristics of the inputs, alert conditions, events, applications, states, and haptic outputs described herein with reference to other methods described herein (e.g., methods 700, 900, 1000, 1100, 1200, 1300, 2500, 2600, and 3200). For brevity, these details are not repeated here.

Figure 31:
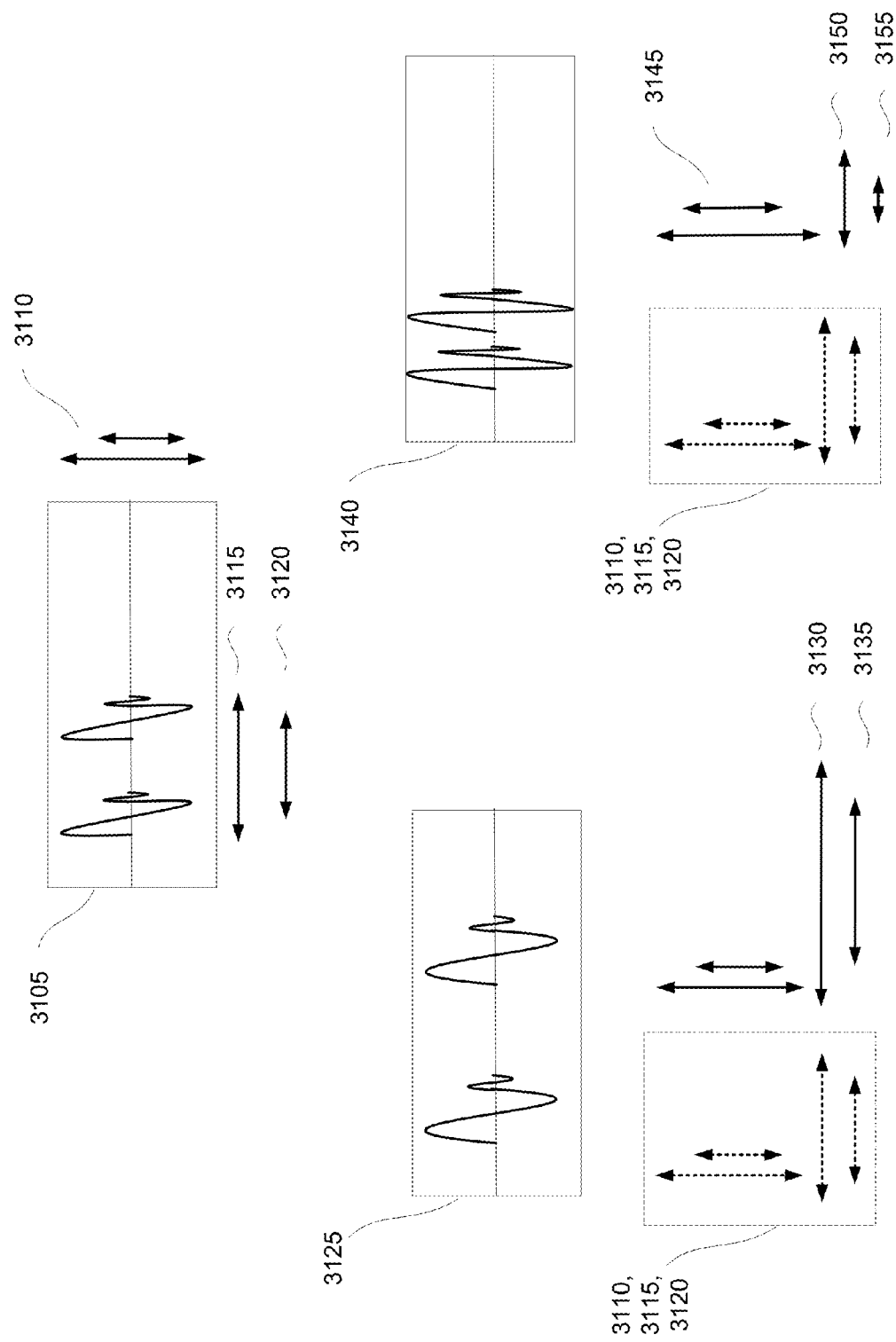
FIG. 31 depicts various instances of a waveform according to some embodiments.

FIG. 31 depicts various instances of a waveform according to some embodiments. The waveform can be haptic or audio. As shown, the waveform 3105 has certain amplitudes 3110 associated with its features, as well as an overall duration 3115 and a frequency 3120 between features of the waveform. Waveform 3125 is waveform 3105 with a transformation applied that does not affect the amplitudes 3110, but results in a longer overall duration 3130 and lower frequency 3135 between features of the waveform. Waveform 3140 is waveform 3105 with a transformation applied that affects both the amplitudes 3145, and results in a shorter overall duration 3150 and higher frequency 3155 between features of the waveform.

Relating these transformed waveforms to the discussion above, waveform 3105 is designated for use with a certain application class or application. For example, a payment application is associated with audio waveform 3105 according to some embodiments. In this example, alerts are generated with a sound sample that is unique to the payment application such that waveform instance 3125 indicates that payment success, waveform instance 3140 indicates payment failure, and waveform instance 3105 indicates account activation for the payment application. Because each waveform instance 3105, 3125, 3140 are based on the same sound sample of waveform 3105, all three have a recognizably similar sound that the user will come to associate with the payment application.

Figure 32:
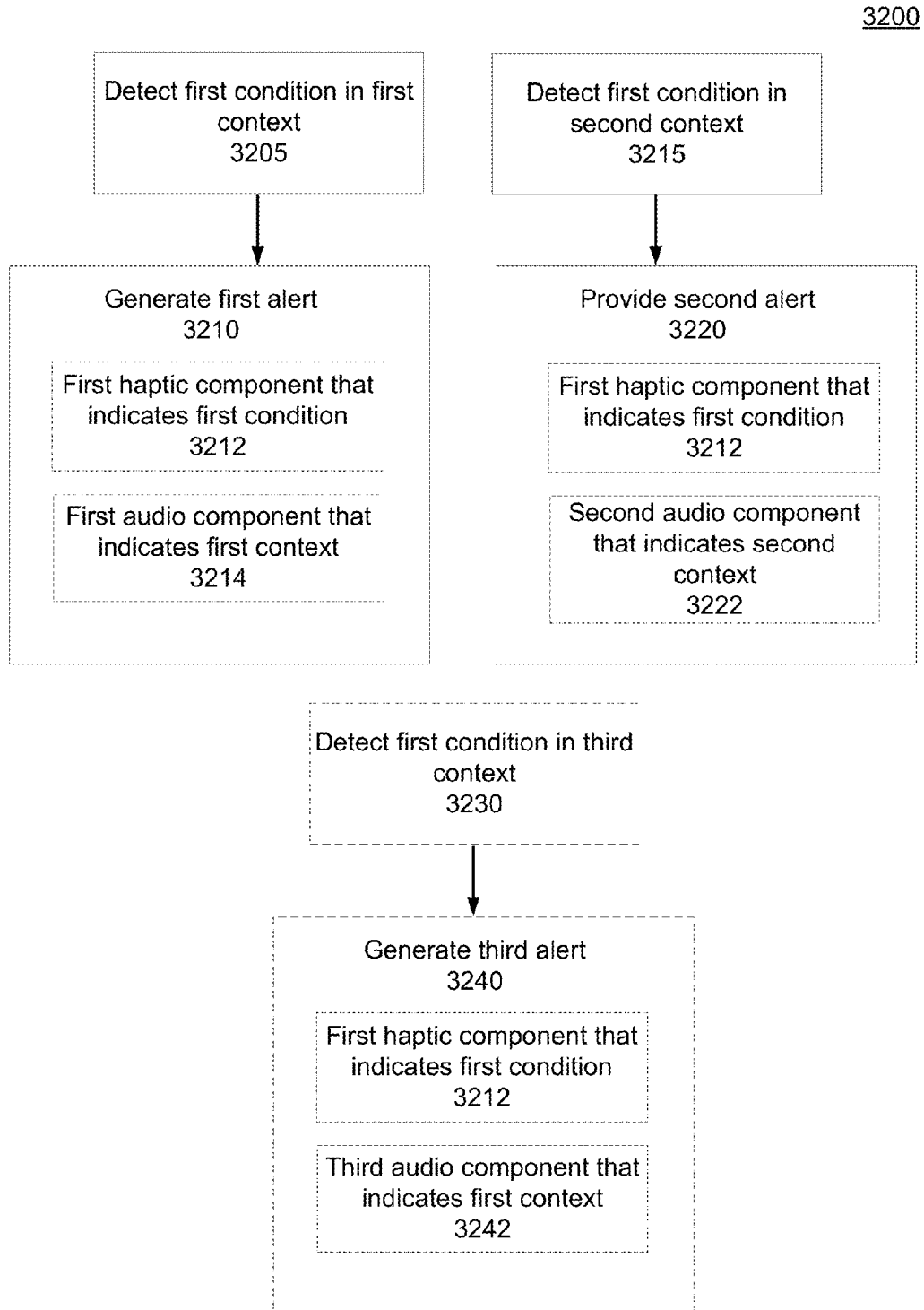
FIG. 32 is a flow diagram of a method for detecting a first condition in a first and second context and generating corresponding alerts including haptic and audio outputs according to some embodiments.

In what context an alert condition is triggered provides the basis for generating a corresponding output, according to some embodiments. Providing haptic and/or audio output that correlates with the context allows for consistency in haptic and audio branding for the output, and thus creates a more efficient human-machine interface, thereby reducing the amount of time it takes for a user to perform operations, which consequently reduces energy use and increases battery life for battery powered devices. FIG. 32 is a flow diagram of a method 3200 for detecting a first condition in a first and second context and generating corresponding alerts including haptic and audio outputs according to some embodiments. Note that in some embodiments, different steps may be performed other than those shown in FIG. 32.

The method begins by, at an electronic device 100 with one or more haptic output devices and one or more audio output devices, detecting 3205 occurrence of a first condition in a first context at the device. For example, the condition is a failure condition and the context of the failure event is that it occurred in a first application. According to some embodiments, the occurrence of the condition includes one or more of the receipt of a communication (e.g., a message from an external source), the detection of an input from a user (e.g., a touch, voice, or mechanical input that is associated with feedback), and the detection of the satisfaction of triggering criteria (e.g., the expiration of an alarm, as the completion of a workout, or the like), to name a few. According to some embodiments, the computing device 100 comprises a touch-sensitive display for receiving the user input.

Responsive to detecting the occurrence of the first condition in the first context, the device 100 generates 3210 a first alert corresponding to the first condition that includes a first haptic component 3212 that indicates the type of condition that occurred (e.g., a failure event occurred) and a first audio component 3214 that indicates that the first condition occurred in the first context (e.g., within a particular application. According to some embodiments, the first haptic output is provided via the touch-sensitive display on the computing device 100.

The device 100 also detects 3215 occurrence of the first condition in a second context that is different from the first context (e.g., in a second application different from the first application. Response to detecting the occurrence of the first condition in the second context, the device 100 generates 3220 a second alert corresponding to the first condition that includes the first haptic component 3212 that indicates that the first condition occurred, e.g., the same haptic component corresponding to a failure in the second application context, and a second audio component 3222, different from the first audio component, that indicates that the first condition occurred in the second context that is different from the first context. For example, the failure event occurred in a second application that is different from the first application, or the failure event includes the option for the user to submit another request for performance of the operation that failed, and thus the audio portion of the output is different from that of the same conditions (failure) in the first context.

According to some embodiments, the generating 3210 of the first alert of the method is in accordance with a determination that the alert corresponds to the first condition having occurred in a first context, and the generating 3220 of the second alert is in accordance with a determination that the first condition occurred in a second context.

By keeping a consistent haptic for a condition (e.g., failure), the haptic waveform has a semantic meaning. Similarly, the haptic meaning associated with the condition is independent of the semantic meaning of the audio component. For example, the audio alert provides context for the haptic alert according to some embodiments because there is a greater dynamic range for audio than for haptic.

According to some embodiments, the method further includes detecting 3230 the occurrence of the first condition (e.g., failure) at the device in a third context different from the first and second contexts. Responsive to detecting the occurrence of the first condition at the device in the third context, the device 100 generates 3240 a third alert corresponding to the first condition in the third context that includes the first haptic component 3212 that indicates the type of condition that occurred (e.g., the same haptic component indicating that a failure event occurred) and a third audio component 3242, different from the first audio component and the second audio component, that indicates that the first condition occurred in the third context (e.g., the failure event occurred in a third application that is different from the first application). According to some embodiments, the generating 3240 of the third alert of the method is in accordance with a determination that the alert corresponds to the first condition having occurred in a third context.

The context in which an alert condition is triggered provides the basis for generating a corresponding output, according to some embodiments. Table 13 shows exemplary haptic and audio outputs corresponding to alerts for two different conditions (success, failure), in different contexts, and across two different application classes. The first two rows of the table show alerts corresponding to a first condition (success). For each context of a success (payment application, email application), the output includes a first haptic that corresponds to the condition (success), and an audio output that includes a waveform instance corresponding to the context of the success (payment, message send).

The third and fourth rows of the table show alerts corresponding to a second condition (failure). For each context of a failure (payment application, email application), the output includes a second haptic that corresponds to the condition (failure), and an audio output that includes a waveform instance corresponding to the context of the success (payment, message send).

The first four rows also correspond to a first application class, first party applications. The last two rows of the table show alerts corresponding to success and failure conditions in the context of a second class of application, e.g., third party applications. In this example, the application is the same, but the audio output varies because the audio provided uses the application class as the context and provides second class waveforms 1, 2 along with the corresponding haptic for the condition (success failure). By providing haptic output that consistently correlates with the condition (success, failure) regardless of context, the user is provided consistency in branding for output associated with the condition, and the audio alert provides context for the haptic alert because there is a greater dynamic range available for audio than for haptic.

TABLE 13

CONTEXT-SPECIFIC AUDIO FOR SHARED HAPTIC

| Application Class | Application | Condition | Haptic Output | Audio Output |
| --- | --- | --- | --- | --- |
| First Party | Payment | Payment success | First haptic | Context waveform 1 |
| First Party | Email | Message send success | First haptic | Context waveform 2 |
| First Party | Payment | Payment failure | Second haptic | Context waveform 1 (First class waveform 1) |
| First Party | Email | Message send failure | Second haptic | Context waveform 2 (First class waveform 2) |
| Third Party | Email | Message send success | First haptic | Second class waveform 1 |
| Third Party | Email | Message send failure | Second haptic | Second class waveform 2 |

According to some embodiments, the first haptic component indicates that an operation requested by the user has failed to occur, the first audio component indicates that the operation failed to occur in a first application (e.g., failure to make payment using a first party payment application), and the second audio component indicates that the operation failed to occur in a second application (e.g., failure to send a message in a third party messaging application). Thus, the haptic component is shared and the audio component varies based on the application the failure occurred in.

According to some embodiments, the first haptic component indicates that an operation requested by the user has successfully to occurred, the first audio component indicates that the operation occurred in a first application and (e.g., a successful payment using a first party payment application), and the second audio component indicates that the operation occurred in a second application. (e.g., a successfully sent message in a third party messaging application). Thus, the haptic component is shared and the audio component varies based on the application the success occurred in. According to some embodiments, the first audio component is generated based on an audio waveform that is designated for use by a first application. In some embodiments, the audio waveform that is designated for use by the first application is also used to generate other audio components for alerts that correspond to the first application, e.g., as described in greater detail above in conjunction with FIG. 30. The second audio component is generated based on an audio waveform that is designated for use by a second application that is different from the first application. In some embodiments, the audio waveform that is designated for use by the second application is also used to generate other audio components for alerts that correspond to the second application, e.g., as described in greater detail above in conjunction with FIG. 30.

According to some embodiments, the first audio component is generated based on an audio waveform that is designated for use by an application in a first class of applications. In some embodiments, the audio waveform that is designated for use by a first party application is also used to generate other audio components for alerts that correspond to the first party application, e.g., as described in greater detail above in conjunction with FIG. 30. The second audio component is generated based on an audio waveform that is designated for use by applications in a second class of applications that is different from the first class of applications. In some embodiments, the audio waveform that is designated for use by third party applications is also used to generate other audio components for alerts that correspond to the third party applications, e.g., as described in greater detail above in conjunction with FIG. 30.

According to some embodiments, the device is configured to provide alerts that include a haptic component and an audio component in response to a plurality of different conditions and a plurality of different contexts. For example, the first condition is signified by the first haptic component, and the second condition that is different than the first condition is signified by the second haptic component that is different than the first haptic component. In some embodiments, the first haptic component and the second haptic component are different because they have a different duration, magnitude, or waveform. In some embodiments, the first audio component and the second audio component are different because they include different numbers of sequential haptic outputs. According to some embodiments, the first context is signified by the first audio component, and the second context that is different from the first context is signified by the second audio component that is different from the first audio component. In some embodiments, the first audio component and the second audio component are different because they are based on different audio samples. In some embodiments, the first audio component and the second audio component are different because they include different numbers of sequential notes.

According to some embodiments, the first condition indicates success of a requested operation and the first haptic component includes a series of haptic outputs that are aligned with features in the first audio component. For example, the alignment may mean the features between the haptic and audio outputs are in synch, mimic one another, and/or mirror one another, e.g., separate haptic outputs in the haptic component are generated that correspond to sequential notes in the audio component. For example, haptic outputs are provided just before or during the sequential notes in the audio component, according to some embodiments. According to some embodiments, the first condition indicates failure of a requested operation and the first haptic component is unaligned with features in the first audio component, e.g., haptic outputs in the haptic component are generated that do not correspond to sequential notes in the audio component. For example, a continuous haptic output is provided that extends across a plurality of sequential notes in the audio component in the audio component.

According to some embodiments, the first condition indicates success of a requested operation and the first haptic component includes a series of haptic outputs that are aligned with features in the second audio component, e.g., separate haptic outputs in the haptic component are generated that correspond to sequential notes in the audio component. For example, haptic outputs are provided just before or during the sequential notes in the audio component according to some embodiments. According to some embodiments, the first condition indicates failure of a requested operation, the first haptic component is unaligned with features in the second audio component, e.g., haptic outputs in the haptic component are generated that do not correspond to sequential notes in the audio component. For example, a continuous haptic output is provided that extends across a plurality of sequential notes in the audio component according to some embodiments.

As discussed in conjunction with FIG. 6, a respective haptic output may be accompanied by a corresponding audio output, with at least a portion of the respective audio output concurrent with at least a portion of the respective haptic output, or the respective audio output occurs close in time to the respective haptic output so that the respective haptic output and the respective audio output are perceptually concurrent or simultaneous. The haptic and audio waveforms need not be perfectly aligned, and the device can take into account the fact that for certain classes of haptic and audio outputs, the haptic and audio outputs will be perceived by a user to be concurrent or simultaneous even if they are slightly offset in time (e.g., because audio output is processed more quickly than haptic output, so providing haptic output before providing audio output will, in some circumstance, cause a user to perceive the audio and haptic output as occurring concurrently or simultaneously).

It should be understood that the particular order in which the operations in FIG. 32 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1000, 1100, 1200, 1300, 2500, 2600, and 3000) are also applicable in an analogous manner to method 3000 described above with respect to FIG. 32. For example, the inputs, alert conditions, events, applications, states, and haptic outputs described above with reference to method 3000 optionally have one or more of the characteristics of the inputs, alert conditions, events, applications, states, and haptic outputs described herein with reference to other methods described herein (e.g., methods 700, 900, 1000, 1100, 1200, 1300, 2500, 2600, and 3000). For brevity, these details are not repeated here.

Figure 33A:
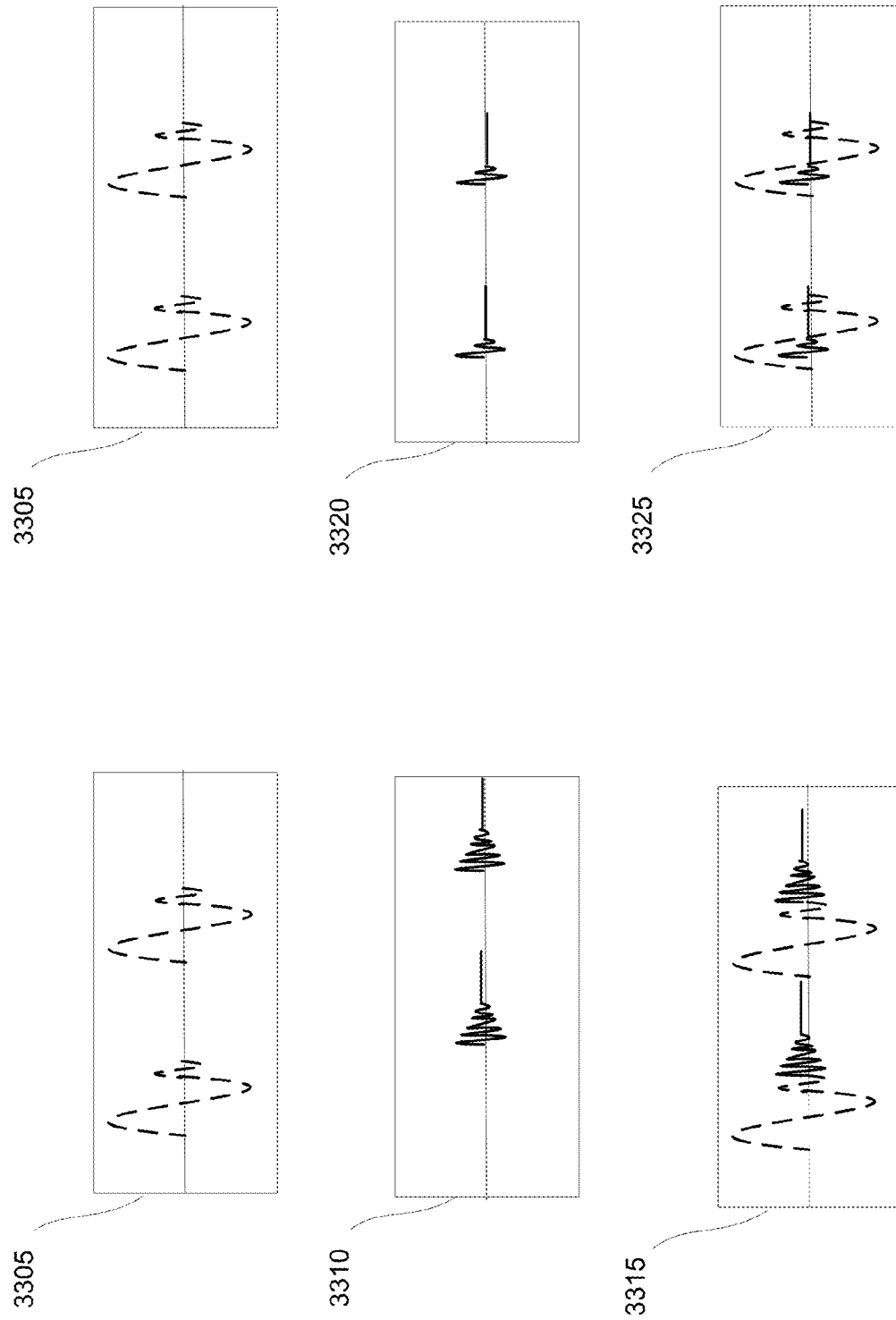
FIG. 33A shows various haptic and audio waveforms, both separate and concurrent in time according to some embodiments.

FIG. 33*a* shows various haptic and audio waveforms, both separate and concurrent in time according to some embodiments. Haptic waveform 3305 and audio waveform 3310, for example, can be used together as the output for an alert. As shown in combined output 3315, haptic waveform 3305 and audio waveform 3310 are not aligned and will be perceived by the user as a haptic followed by audio followed by a haptic followed by audio. However, haptic waveform 3305 and audio waveform 3320, when used together as shown in combined output 3325, are aligned, such that the audio output is perceived by the user as concurrent with the haptic output, even though the alignment is not perfect.

Figure 33B:
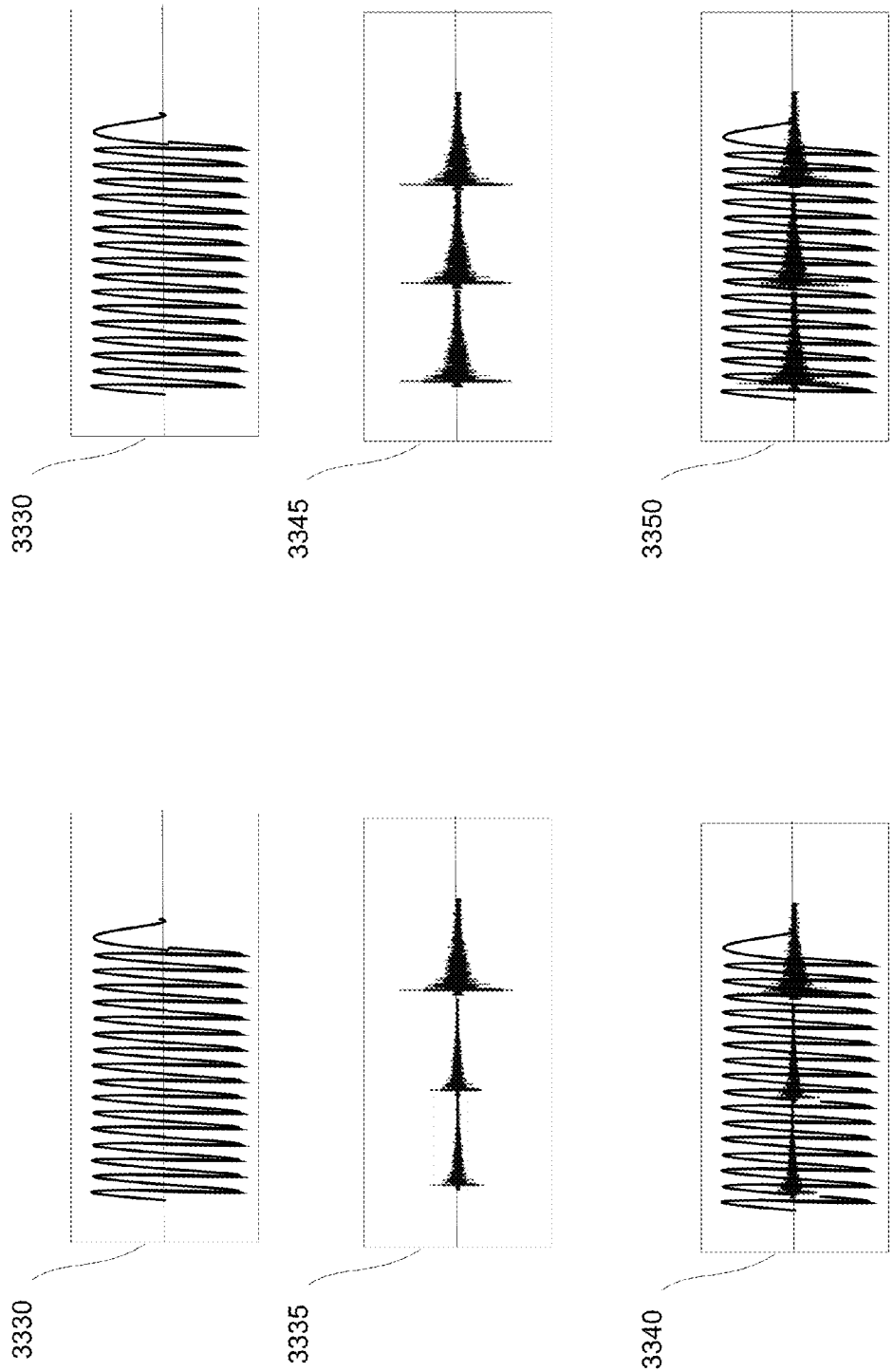
FIG. 33B shows various haptic and audio waveforms, overlapping in time, according to some embodiments.

FIG. 33*b* shows various haptic and audio waveforms, overlapping in time, according to some embodiments. Haptic waveform 3330, for example, is a haptic waveform for a failure event according to some embodiments. The failure haptic 3330 is a sustained buzz according to some embodiments. When failure haptic 3330 is used in conjunction with different audio output, it signals different types of failures and/or failures in different contexts as described in conjunction with FIG. 32. Audio waveform 3335 represents a third party audio waveform, in this example a failure audio sample that sounds like ding-ding-dun. As shown in combined output 3340, haptic waveform 3330 and audio waveform 3335 are aligned. Audio waveform 3345 represents a different third party audio waveform, in this example a try again audio sample that sounds like dun-dun-dun. It is a similar audio sample to the failure audio waveform 3335 as variations of a third party audio waveform, but has three similar features rather than two of one feature and third one that is different. When combined with failure haptic 3330, combined waveform 3350 results. Combined waveform 3350 shares the failure haptic 3330, but differs in context and thus audio output from audio waveform 3335.

Figure 33C:
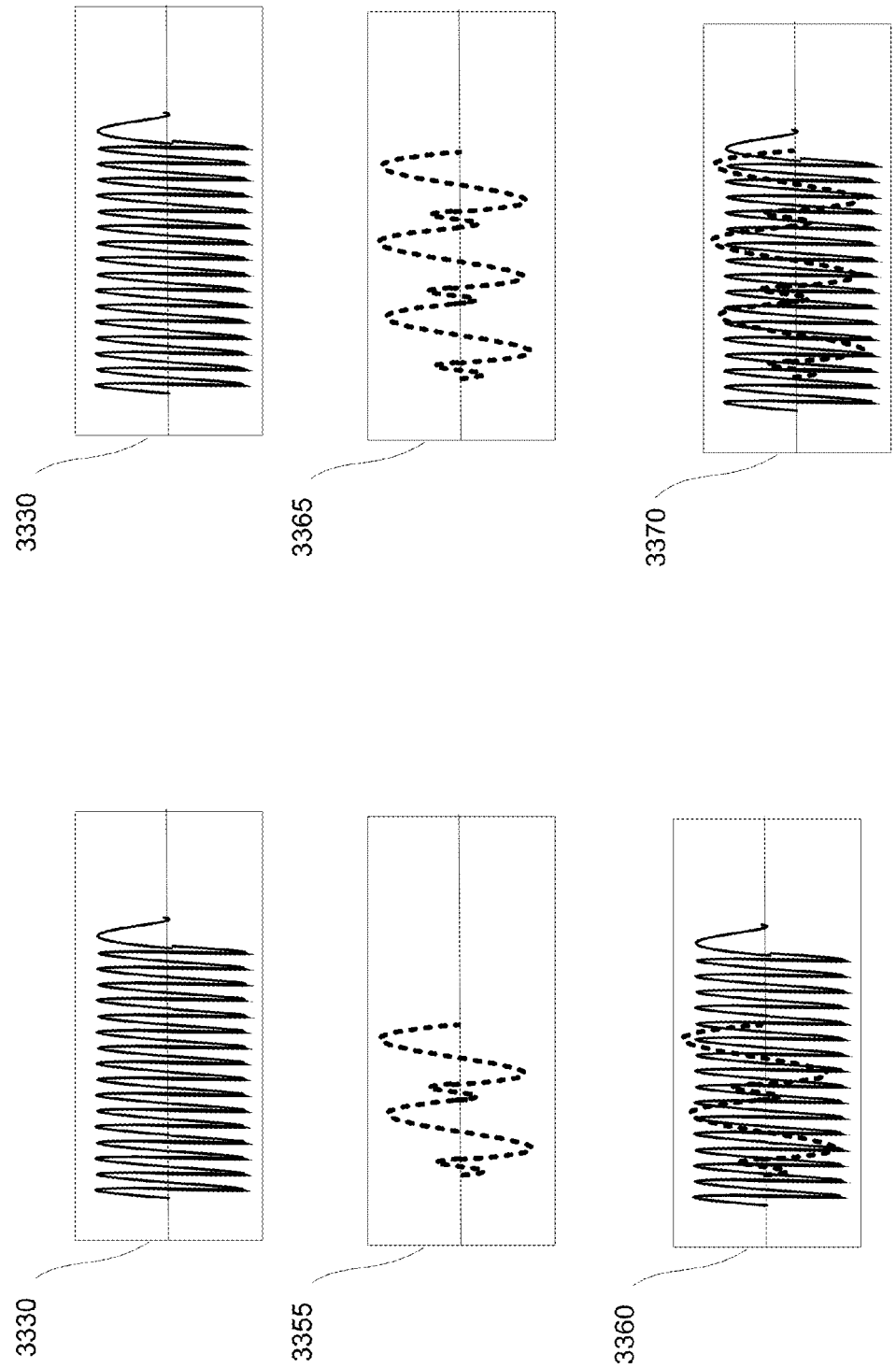
FIG. 33C shows various haptic and audio waveforms, overlapping in time, according to some embodiments.

FIG. 33c shows various haptic and audio waveforms, overlapping in time, according to some embodiments. Haptic waveform 3330, for example, is the same haptic waveform for a failure event as FIG. 33b, according to some embodiments. Failure haptic 3330 is used in conjunction with two different first party audio waveforms (3355, 3365) to produce two different but relate first party alerts. Audio waveform 3355 represents a first party audio waveform for a payment failure audio sample that sounds like de-dum, de-dum. Combined output 3360 shows haptic waveform 3330 and audio waveform 3335 in alignment. Audio waveform 3365 represents a different first party audio waveform, in this example a passcode entry failure sample that sounds like de-dum, de-dum, de-dum. When combined with failure haptic 3330, combined waveform 3370 results. Combined waveform 3370 shares the failure haptic 3330, but differs in context and thus audio output from audio waveform 3355.

Figure 34:
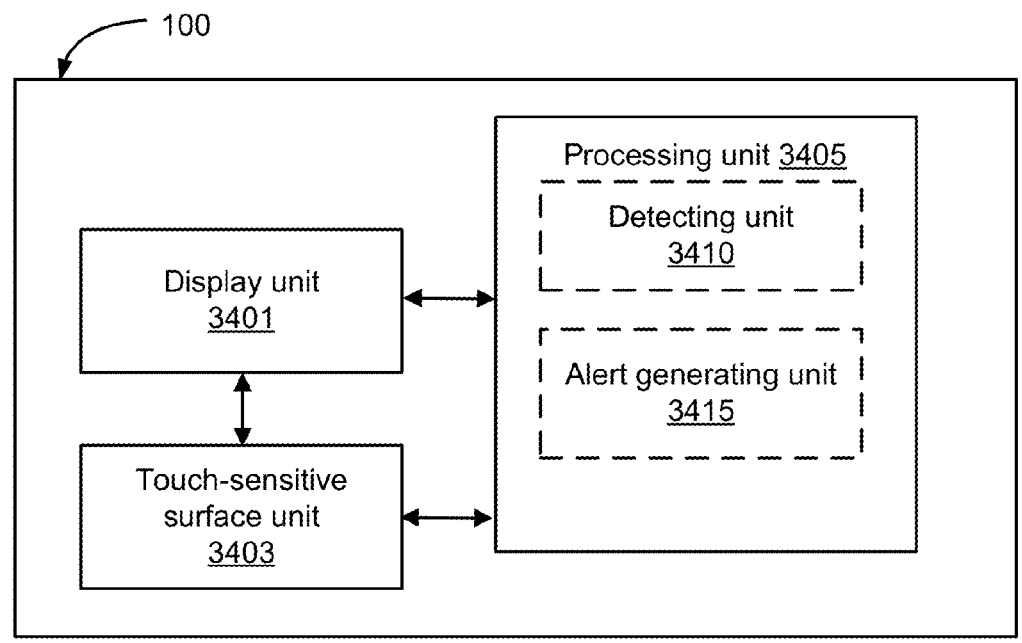
FIG. 34 is a functional block diagram of an electronic device in accordance with some embodiments.

The operations described above with reference to FIGS. 30 and 32 are, optionally, implemented by components depicted in FIGS. 1A-1B, and 34-35. FIG. 34 shows an example functional block diagram of device 100 configured in accordance with the principles of the various described embodiments. It is understood by persons of skill in the art that the functional blocks described in FIG. 34 are, optionally, combined or separated into sub-blocks to implement the principles of the various described embodiments. Therefore, the description herein optionally supports any possible combination or separation or further definition of the functional blocks described herein.

As shown in FIG. 34, the device 100 includes a display unit 3401 configured to display an application, a touch-sensitive surface unit 3403 configured to receive user contacts, and a processing unit 3405 coupled to the display unit 3401 and the touch-sensitive surface unit 3403. In some embodiments, the processing unit 3405 includes a detecting unit 3410 and an alert generating unit 3415.

The following 9 paragraphs describe different embodiments that may be implemented, individually or in any combination, by the device 100 illustrated in FIG. 34:

The processing unit 3405 is configured to detect, at an electronic device with one or more haptic output devices, occurrence of a first condition at the device (e.g., with the detecting unit 3410), and responsive to detecting the occurrence, optionally in accordance with a determination that the alert corresponds to a respective application in a first class of applications, generate a first alert that corresponds to a respective application in a first class of applications (e.g., with the alert generating unit 3415). The processing unit 3405 is also configured to detect occurrence of a second condition at the device (e.g., with the detecting unit 3410), and in response generate a second alert that corresponds to a respective application in a second class of applications that is different from the first class of applications, the second alert including a second haptic component that is output via the one or more haptic output devices and a second audio component, output via the one or more audio output devices, that is composed from an audio waveform that is designated for use by applications in the second class of applications (e.g., with the alert generating unit 3415).

According to some embodiments, the first haptic component and the second haptic component are composed from one or more haptic waveforms that are available to both the first class of application and the second class of application.

According to some embodiments, the device 100 is configured to generate a plurality of different alerts (e.g., by the alert generating unit 3415). The plurality of different alerts includes a first subset of two or more alerts that include audio components that are available to the first class of applications and are not available to the second class of applications and the plurality of different alerts includes a second subset of two or more alerts that include audio components that are available to the second class of applications and are composed from the audio waveform that is designated for use by the second class of applications.

According to some embodiments, the second subset of alerts include two alerts generated (e.g., by the alert generating unit 3415) by applying different transformations to a respective audio sample that is associated with the second class of applications. According to some embodiments, the first subset of alerts include two alerts generated (e.g., by the alert generating unit 3415) by applying different transformations to a respective audio sample that is associated with a first application in the first class of applications.

According to some embodiments, the first subset of alerts include two alerts generated (e.g., by the alert generating unit 3415) by applying different transformations to a respective audio sample that is associated with a second application in the first class of applications, wherein the respective audio sample that is associated with the second application is different from the respective audio sample that is associated with the first application. According to some embodiments, the second subset of alerts is not available to the first class of applications.

According to some embodiments, the first subset of two or more alerts (generated, e.g., by the alert generating unit 3415) include haptic components that are available to the first class of applications and the second class of applications and the second subset of two or more alerts that include haptic components that are available to the second class of applications and the first class of applications.

According to some embodiments, the plurality of different alerts (generated, e.g., by the alert generating unit 3415) includes a third subset of two or more alerts that include audio components that are available to the second class of applications and the first class of applications.

According to some embodiments, the first audio component, output via the one or more audio output devices (e.g., by the alert generating unit 3415), is composed from an audio waveform that is designated for use by a first application in the first class of applications and the first audio component, output via the one or more audio output devices, is composed from an audio waveform that is designated for use by a second application in the first class of applications.

According to some embodiments, the second audio component, output via the one or more audio output devices (e.g., by the alert generating unit 3415), is composed from the audio waveform that is designated for use by applications in the second class of application when the alert corresponds to a third application in the second class of applications and the first audio component, output via the one or more audio output devices, is composed from the audio waveform that is designated for use by applications in the second class of application when the alert corresponds to a second application in the second class of applications.

Figure 35:
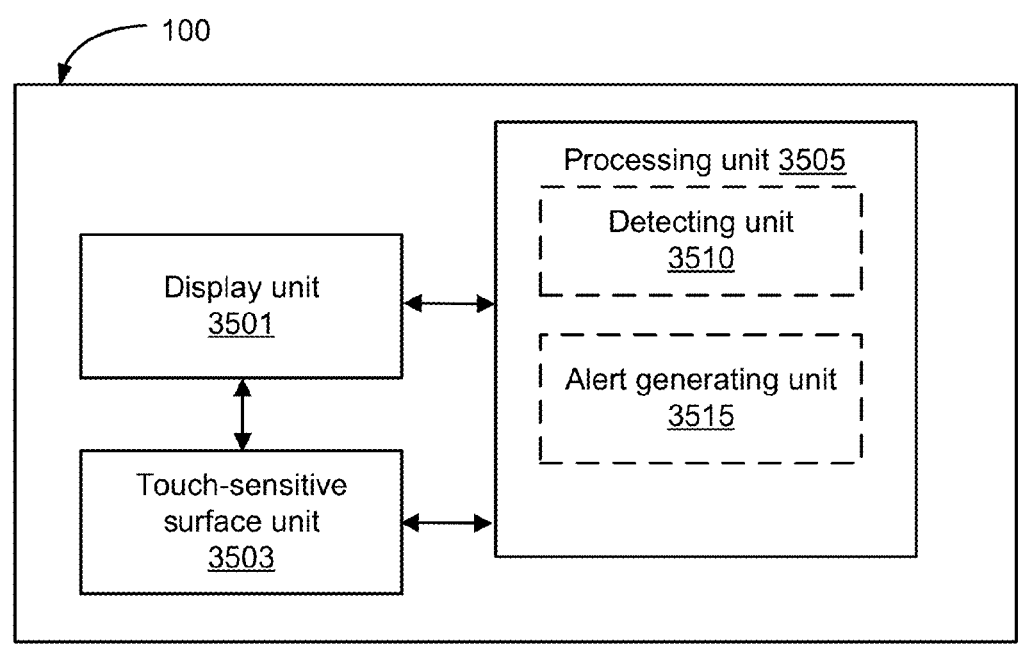
FIG. 35 is a functional block diagram of an electronic device in accordance with some embodiments.

FIG. 35 shows an example functional block diagram of device 100 configured in accordance with the principles of the various described embodiments. It is understood by persons of skill in the art that the functional blocks described in FIG. 35 are, optionally, combined or separated into sub-blocks to implement the principles of the various described embodiments. Therefore, the description herein optionally supports any possible combination or separation or further definition of the functional blocks described herein.

As shown in FIG. 35, the device 100 includes a display unit 3501 configured to display an application, a touch-sensitive surface unit 3503 configured to receive user contacts, and a processing unit 3505 coupled to the display unit 3501 and the touch-sensitive surface unit 3503. In some embodiments, the processing unit 3505 includes a detecting unit 3510 and an alert generating unit 3515.

The following 10 paragraphs describe different embodiments that may be implemented, individually or in any combination, by the device 100 illustrated in FIG. 35:

The processing unit 3505 is configured to detect, at an electronic device with one or more haptic output devices, occurrence of a first condition in a first context (e.g., with the detecting unit 3510), and responsive to detecting the occurrence, generate a first alert corresponding to the first condition that includes a first haptic component that indicates the type of condition that occurred and a first audio component that indicates that the first condition occurred in the first context (e.g., with the alert generating unit 3515).

The processing unit 3505 is also configured to detect occurrence at the device of the first condition in a second context that is different from the first context (e.g., with the detecting unit 3510), and responsive to detecting the occurrence, generating a second alert corresponding to the first condition that includes the first haptic component that indicates that the first condition occurred and a second audio component, different from the first audio component, that indicates that the first condition occurred in the second context that is different from the first context (e.g., with the alert generating unit 3515).

The processing unit 3505 is also configured to detect occurrence at the device of the first condition at the device in a third context different from the first and second contexts (e.g., with the detecting unit 3510), and responsive to detecting the occurrence of the first condition at the device in the third context, generating a third alert corresponding to the first condition in the third context that includes the first haptic component that indicates the type of condition that occurred and a third audio component, different from the first audio component and the second audio component, that indicates that the first condition occurred in the second third context (e.g., with the alert generating unit 3515).

According to some embodiments, the first haptic component indicates that an operation requested by the user has failed to occur, the first audio component indicates that the operation failed to occur in a first application, and the second audio component indicates that the operation failed to occur in a second application.

According to some embodiments, the first haptic component indicates that an operation requested by the user has successfully to occurred, the first audio component indicates that the operation occurred in a first application; and the second audio component indicates that the operation occurred in a second application.

According to some embodiments, the first audio component is generated based on an audio waveform that is designated for use by a first application and the second audio component is generated based on an audio waveform that is designated for use by a second application that is different from the first application.

According to some embodiments, the first audio component is generated based on an audio waveform that is designated for use by an application in a first class of applications and the second audio component is generated based on an audio waveform that is designated for use by applications in a second class of applications that is different from the first class of applications.

According to some embodiments, the device is configured to provide alerts (e.g., with the alert generating unit 3515) that include a haptic component and an audio component in response to a plurality of different conditions and a plurality of different contexts, the first condition is signified by the first haptic component, the second condition that is different than the first condition is signified by the second haptic component that is different than the first haptic component, the first context is signified by the first audio component, and the second context that is different from the first context is signified by the second audio component that is different from the first audio component.

According to some embodiments, the first condition indicates success of a requested operation and the first haptic component includes a series of haptic outputs that are aligned with features in the first audio component and the first condition indicates failure of a requested operation and the first haptic component is unaligned with features in the first audio component, (generated, e.g., by alert generating unit 3515).

According to some embodiments, the first condition indicates success of a requested operation and the first haptic component includes a series of haptic outputs that are aligned with features in the second audio component and the first condition indicates failure of a requested operation, the first haptic component is unaligned with features in the second audio component.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A processor-implemented method performed on a computing device that includes one or more input devices, the method comprising:
   detecting a first alert condition on the computing device, the first alert condition associated with receiving a user input, wherein the user input is an input detected at an input device of the one or more input devices of the computing device;
   responsive to detecting the first alert condition, and in accordance with the first alert condition being associated with receiving a user input at an input device of the computing device, providing a first haptic output on the computing device having a first amplitude and corresponding to the user input on the computing device;
   after providing the first haptic output, detecting a second alert condition associated with automatically triggered notifications in a set of predetermined automatically triggered notifications at the computing device; and
   responsive to detecting the second alert condition, and in accordance with the second alert condition being associated with receiving an automatically triggered notification in the set of predetermined automatically triggered notifications, providing a second haptic output on the computing device having a second amplitude and corresponding to the automatically triggered notifications in the set of predetermined automatically triggered notifications, wherein the second amplitude is greater than the first amplitude.

2. The method of claim 1, wherein the first haptic output is feedback provided in direct response to and as a consequence of the user input.

3. The method of claim 1, wherein the set of predetermined automatically triggered notifications includes reminder notifications automatically generated by an application on the computing device, and automatically-initiated event notifications received by the application.

4. The method of claim 1, further comprising:
   determining whether an input-based modulation condition, corresponding to the user input, exists; and
   responsive to determining that an input-based modulation condition exists, prior to providing the first haptic output, modifying the first haptic output.

5. The method of claim 1, further comprising:
   detecting a respective alert condition;
   determining that the respective alert condition resulted from a respective user input received on the computing device;
   identifying a measure of user engagement with the computing device or an application on the computing device, wherein the measure of user engagement is associated with the detected user input; and
   modulating a first signal intensity of the first haptic output based on the measure of user engagement.

6. The method of claim 1, further comprising:
   detecting a respective alert condition;
   determining that the respective alert condition resulted from receiving the user input on the computing device;
   identifying a location of receiving the user input on the computing device; and
   modulating a spatial haptic energy profile of the first haptic output, by providing greater than a specified proportion of haptic energy of the first haptic output within a specified radius threshold of the location of receiving the user input on the computing device.

7. The method of claim 1, further comprising:
   detecting a respective alert condition;
   determining that the respective alert condition resulted from receiving a user input on the computing device; and
   modulating a spatial haptic energy profile of the first haptic output, by reducing an amplitude of haptic energy of the first haptic output such that it is perceptible at a location of the user input on the computing device.

8. The method of claim 7, wherein:
   the location of receiving the user input on the computing device, varies with time; and
   the spatial haptic energy varies with time corresponding to the time-varying location of receiving the user input.

9. The method of claim 1, further comprising:
   detecting a respective alert condition;
   determining that the respective alert condition resulted from receiving a user input;
   identifying time-varying morphological attributes of the user input; and
   modifying, over time, morphological characteristics of the first haptic output to correspond to the time-varying morphological attributes of the user input.

10. The method of claim 9, wherein:
    the time-varying morphological attributes include a time-dependent contact pressure profile between the user input and a touch-sensitive surface of the computing device; and
    the modifying comprises modulating, with time, an energy profile of the first haptic output to correspond to the time-dependent contact pressure profile between the user input and the touch-sensitive surface of the computing device.

11. The method of claim 1, further comprising:
    detecting a respective alert condition;
    determining that the respective alert condition resulted from a sustained user input;

responsive to the determining, initiating the first haptic output at an initiation time of the sustained user input;
detecting termination of the sustained user input; and
terminating the first haptic output at a termination time of the sustained user input.

12. The method of claim 1, further comprising:
determining whether an ambient condition-based modulation condition exists; and
responsive to determining that an ambient condition-based modulation condition exists, prior to providing the second haptic output, modifying the second haptic output.

13. The method of claim 1, further comprising:
detecting a respective alert condition associated with a respective application;
determining that the respective alert condition did not result from receiving user input at an input device of the one or more input devices of the computing device; and
responsive to determining that the respective alert condition did not result from receiving user input at an input device of the one or more input devices of the computing device:
  determining whether one or more ambient conditions exist for the computing device as potential interference to haptic output at a time of occurrence of the respective alert condition;
  in accordance with a determination that no ambient conditions exist for the computing device as potential interference to haptic output, providing the second haptic output based on a state of receptiveness of a user, and
  in accordance with a determination that one or more ambient conditions exist for the computing device as potential interference to haptic output, delaying providing the second haptic output to the user.

14. The method of claim 1, further comprising:
detecting a respective alert condition associated with a respective application;
determining that the respective alert condition did not result from receiving user input at an input device of the one or more input devices of the computing device; and
responsive to determining that the respective alert condition did not result from receiving user input at an input device of the one or more input devices of the computing device:
  determining whether one or more ambient conditions exist for the computing device as potential interference to haptic output at a time of occurrence of the respective alert condition,
  in accordance with a determination that no ambient conditions exist for the computing device as potential interference to haptic output, providing a first variant of the second haptic output to a user, the first variant of the second haptic output having a first set of output characteristics, and
  in accordance with a determination that one or more ambient conditions exist for the computing device as potential interference to haptic output, providing a second variant of the second haptic output to the user, the second variant of the second haptic output having a second set of output characteristics, the second set of output characteristics different from the first set of output characteristics, the second variant of the second haptic output having greater intensity than the first variant of the second haptic output.

15. The method of claim 1, further comprising:
detecting a respective alert condition associated with a respective application;
determining that the respective alert condition did not result from receiving user input at an input device of the one or more input devices of the computing device; and
responsive to determining that the respective alert condition did not result from receiving user input at an input device of the one or more input devices of the computing device:
  providing a priming haptic output as a precursor to the second haptic output, the priming haptic output to increase an engagement level of a user operating the computing device prior to the second haptic output, wherein at least a portion of the priming haptic output is more pronounced than the second haptic output; and
  providing the second haptic output following and within a specified time interval of providing the priming haptic output.

16. The method of claim 15, wherein the priming haptic output comprises a haptic component with a time-varying waveform morphology characterized by a progressively increasing intensity of the haptic component with time.

17. The method of claim 15, wherein the priming haptic output comprises a haptic component with a time-varying waveform morphology characterized by an emphasized haptic feature followed by a progressively diminishing intensity of the haptic component.

18. The method of claim 15, wherein:
the first haptic output is provided directly, without a corresponding preceding priming haptic output, in response to a corresponding alert condition that results from a received user input.

19. The method of claim 15, wherein characteristics of the priming haptic output are selected based on an urgency or context associated with the respective alert condition.

20. The method of claim 1, wherein:
the first alert condition corresponds to a user selection of a user interface element displayed on an application user interface associated with a first application on the computing device;
the first haptic output comprises a first haptic component including a first haptic feature of a first intensity and a first duration;
the second alert condition corresponds to an alert notification received by the first application;
the second haptic output represents receipt of the alert notification, the second haptic output comprising a second haptic component including a second haptic feature of a second intensity and a second duration; and
the second haptic output is different from and more pronounced than the first haptic output based on the second haptic feature being more pronounced than the first haptic feature, the second intensity being greater than the first intensity, or the second duration being longer than the first duration.

21. The method of claim 1, wherein:
the first haptic output represents the first alert condition; and
the second haptic output represents the second alert condition, the second haptic output different from and having greater intensity than the first haptic output.

22. The method of claim 1, wherein:
the first haptic output has a first set of characteristics comprising one or more of: an amplitude of the first haptic output, a duration of the first haptic output, a regularity associated with the first haptic output, a repetition frequency of haptic features in the first haptic output, a selection of haptic features constituting the first haptic output; and the second haptic output has a second set of characteristics comprising one or more of: an amplitude of the second haptic output, a duration of a haptic component associated with the second haptic output, a regularity associated with the second haptic output, a repetition frequency of haptic features in the second haptic output, a selection of haptic features constituting the second haptic output.

23. The method of claim 1, wherein:
the first haptic output is accompanied by a first audio output;
the second haptic output is accompanied by a second audio output;
and the first audio output is different from the second audio output.

24. The method of claim 1, wherein:
the first haptic output is accompanied by a first audio output;
the second haptic output is accompanied by a second audio output;
the first audio output is similar to the second audio output; and
the first haptic output is different from the second haptic output.

25. The method of claim 24, wherein the first amplitude of the first haptic output and the second amplitude of the second haptic output is further adjusted in inverse relation to a volume setting on the computing device.

26. The method of claim 1, wherein:
the second haptic output is accompanied by an audio output; and
the first haptic output is not accompanied by an audio output.

27. The method of claim 1, wherein:
the one or more input devices of the computing device comprise a touch-sensitive display for receiving the user input; and
the first haptic output and the second haptic output are provided via the touch-sensitive display on the computing device.

28. A non-transitory computer readable storage medium storing executable code, the code when executed causes a processor at a computing device that includes an output generator and one or more input devices to perform the following steps:
detecting a first alert condition on the computing device, the first alert condition associated with receiving a user input, wherein the user input is an input detected at an input device of the one or more input devices of the computing device;
responsive to detecting the first alert condition, and in accordance with the first alert condition being associated with receiving a user input at an input device of the computing device, providing a first haptic output on the computing device having a first amplitude and corresponding to the user input on the computing device;
after providing the first haptic output, detecting a second alert condition associated with automatically triggered notifications in a set of predetermined automatically triggered notifications at the computing device; and
responsive to detecting the second alert condition, and in accordance with the second alert condition being associated with receiving an automatically triggered notification in the set of predetermined automatically triggered notifications, providing a second haptic output on the computing device having a second amplitude and corresponding to the automatically triggered notifications in the set of predetermined automatically triggered notifications, wherein the second amplitude is greater than the first amplitude.

29. The computer readable storage medium of claim 28, wherein the first haptic output is feedback provided in direct response to and as a consequence of the user input.

30. The computer readable storage medium of claim 28, wherein the set of predetermined automatically triggered notifications includes reminder notifications automatically generated by an application on the computing device, and automatically-initiated event notifications received by the application.

31. The computer readable storage medium of claim 28, further storing executable code that when executed causes the processor at the computing device to perform the following steps:
determining whether an input-based modulation condition, corresponding to the user input, exists; and
responsive to determining that an input-based modulation condition exists, prior to providing the first haptic output, modifying the first haptic output.

32. The computer readable storage medium of claim 28, further storing executable code that when executed causes the processor at the computing device to perform the following steps:
detecting a respective alert condition;
determining that the respective alert condition resulted from a respective user input received on the computing device;
identifying a measure of user engagement with the computing device or an application on the computing device, wherein the measure of user engagement is associated with the detected user input; and
modulating a first signal intensity of the first haptic output based on the measure of user engagement.

33. The computer readable storage medium of claim 28, further storing executable code that when executed causes the processor at the computing device to perform the following steps:
detecting a respective alert condition;
determining that the respective alert condition resulted from receiving the user input on the computing device;
identifying a location of receiving the user input on the computing device; and
modulating a spatial haptic energy profile of the first haptic output, by providing greater than a specified proportion of haptic energy of the first haptic output within a specified radius threshold of the location of receiving the user input on the computing device.

34. The computer readable storage medium of claim 28, further storing executable code that when executed causes the processor at the computing device to perform the following steps:
detecting a respective alert condition;
determining that the respective alert condition resulted from receiving a user input on the computing device; and
modulating a spatial haptic energy profile of the first haptic output, by reducing an amplitude of haptic energy of the first haptic output such that it is perceptible at a location of the user input on the computing device.

35. The computer readable storage medium of claim 34, wherein:
the location of receiving the user input on the computing device, varies with time; and
the spatial haptic energy varies with time corresponding to the time-varying location of receiving the user input.

36. The computer readable storage medium of claim 28, further storing executable code that when executed causes the processor at the computing device to perform the following steps:
detecting a respective alert condition;
determining that the respective alert condition resulted from receiving a user input;
identifying time-varying morphological attributes of the user input; and
modifying, over time, morphological characteristics of the first haptic output to correspond to the time-varying morphological attributes of the user input.

37. The computer readable storage medium of claim 36, wherein:
the time-varying morphological attributes include a time-dependent contact pressure profile between the user input and a touch-sensitive surface of the computing device; and
the modifying comprises modulating, with time, an energy profile of the first haptic output to correspond to the time-dependent contact pressure profile between the user input and the touch-sensitive surface of the computing device.

38. The computer readable storage medium of claim 28, further storing executable code that when executed causes the processor at the computing device to perform the following steps:
detecting a respective alert condition;
determining that the respective alert condition resulted from a sustained user input;
responsive to the determining, initiating the first haptic output at an initiation time of the sustained user input;
detecting termination of the sustained user input; and
terminating the first haptic output at a termination time of the sustained user input.

39. The computer readable storage medium of claim 28, further storing executable code that when executed causes the processor at the computing device to perform the following steps:
determining whether an ambient condition-based modulation condition exists; and
responsive to determining that an ambient condition-based modulation condition exists, prior to providing the second haptic output, modifying the second haptic output.

40. The computer readable storage medium of claim 28, further storing executable code that when executed causes the processor at the computing device to perform the following steps:
detecting a respective alert condition associated with a respective application;
determining that the respective alert condition did not result from receiving user input at an input device of the one or more input devices of the computing device; and
responsive to determining that the respective alert condition did not result from receiving user input at an input device of the one or more input devices of the computing device:
determining whether one or more ambient conditions exist for the computing device as potential interference to haptic output at a time of occurrence of the respective alert condition;
in accordance with a determination that no ambient conditions exist for the computing device as potential interference to haptic output, providing the second haptic output based on a state of receptiveness of a user, and
in accordance with a determination that one or more ambient conditions exist for the computing device as potential interference to haptic output, delaying providing the second haptic output to the user.

41. The computer readable storage medium of claim 28, further storing executable code that when executed causes the processor at the computing device to perform the following steps:
detecting a respective alert condition associated with a respective application;
determining that the respective alert condition did not result from receiving user input at an input device of the one or more input devices of the computing device; and
responsive to determining that the respective alert condition did not result from receiving user input at an input device of the one or more input devices of the computing device:
determining whether one or more ambient conditions exist for the computing device as potential interference to haptic output at a time of occurrence of the respective alert condition,
in accordance with a determination that no ambient conditions exist for the computing device as potential interference to haptic output, providing a first variant of the second haptic output to a user, the first variant of the second haptic output having a first set of output characteristics, and
in accordance with a determination that one or more ambient conditions exist for the computing device as potential interference to haptic output, providing a second variant of the second haptic output to the user, the second variant of the second haptic output having a second set of output characteristics, the second set of output characteristics different from the first set of output characteristics, the second variant of the second haptic output having greater intensity than the first variant of the second haptic output.

42. The computer readable storage medium of claim 28, further storing executable code that when executed causes the processor at the computing device to perform the following steps:
detecting a respective alert condition associated with a respective application;
determining that the respective alert condition did not result from receiving user input at an input device of the one or more input devices of the computing device; and
responsive to determining that the respective alert condition did not result from receiving user input at an input device of the one or more input devices of the computing device:
providing a priming haptic output as a precursor to the second haptic output, the priming haptic output to increase an engagement level of a user operating the computing device prior to the second haptic output, wherein at least a portion of the priming haptic output is more pronounced than the second haptic output; and
providing the second haptic output following and within a specified time interval of providing the priming haptic output.

43. The computer readable storage medium of claim 42, wherein the priming haptic output comprises a haptic component with a time-varying waveform morphology characterized by a progressively increasing intensity of the haptic component with time.

44. The computer readable storage medium of claim 42, wherein the priming haptic output comprises a haptic component with a time-varying waveform morphology characterized by an emphasized haptic feature followed by a progressively diminishing intensity of the haptic component.

45. The computer readable storage medium of claim 42, wherein:
the first haptic output is provided directly, without a corresponding preceding priming haptic output, in response to a corresponding alert condition that results from a received user input.

46. The computer readable storage medium of claim 42, wherein characteristics of the priming haptic output are selected based on an urgency or context associated with the respective alert condition.

47. The computer readable storage medium of claim 28, further storing executable code that when executed causes the processor at the computing device to perform the following steps:
the first alert condition corresponds to a user selection of a user interface element displayed on an application user interface associated with a first application on the computing device;
the first haptic output comprises a first haptic component including a first haptic feature of a first intensity and a first duration;
the second alert condition corresponds to an alert notification received by the first application;
the second haptic output represents receipt of the alert notification, the second haptic output comprising a second haptic component including a second haptic feature of a second intensity and a second duration; and
the second haptic output is different from and more pronounced than the first haptic output based on the second haptic feature being more pronounced than the first haptic feature, the second intensity being greater than the first intensity, or the second duration being longer than the first duration.

48. The computer readable storage medium of claim 28, wherein:
the first haptic output represents the first alert condition; and
the second haptic output represents the second alert condition, the second haptic output different from and having greater intensity than the first haptic output.

49. The computer readable storage medium of claim 28, wherein:
the first haptic output has a first set of characteristics comprising one or more of: an amplitude of the first haptic output, a duration of the first haptic output, a regularity associated with the first haptic output, a repetition frequency of haptic features in the first haptic output, a selection of haptic features constituting the first haptic output; and
the second haptic output has a second set of characteristics comprising one or more of: an amplitude of the second haptic output, a duration of a haptic component associated with the second haptic output, a regularity associated with the second haptic output, a repetition frequency of haptic features in the second haptic output, a selection of haptic features constituting the second haptic output.

50. The computer readable storage medium of claim 28, wherein:
the first haptic output is accompanied by a first audio output;
the second haptic output is accompanied by a second audio output;
and the first audio output is different from the second audio output.

51. The computer readable storage medium of claim 28, wherein:
the first haptic output is accompanied by a first audio output;
the second haptic output is accompanied by a second audio output;
the first audio output is similar to the second audio output; and
the first haptic output is different from the second haptic output.

52. The computer readable storage medium of claim 51, wherein the first amplitude of the first haptic output and the second amplitude of the second haptic output is further adjusted in inverse relation to a volume setting on the computing device.

53. The computer readable storage medium of claim 28, wherein:
the second haptic output is accompanied by an audio output; and
the first haptic output is not accompanied by an audio output.

54. The computer readable storage medium of claim 28, wherein:
the one or more input devices of the computing device comprise a touch-sensitive display for receiving the user input; and
the first haptic output and the second haptic output are provided via the touch-sensitive display on the computing device.

55. A computing device comprising:
an output generator;
one or more input devices including a touch-sensitive surface; and
memory storing one or more programs that include instructions for:
detecting a first alert condition on the computing device, the first alert condition associated with receiving a user input on the computing device, wherein the user input is an input detected at an input device of the one or more input devices of the computing device;
responsive to detecting the first alert condition, and in accordance with the first alert condition being associated with receiving a user input at an input device of the computing device, providing a first haptic output on the computing device having a first amplitude and corresponding to the user input on the computing device;
after providing the first haptic output, detecting a second alert condition associated with automatically triggered notifications in a set of predetermined automatically triggered notifications at the computing device; and
responsive to detecting the second alert condition, and in accordance with the second alert condition being associated with receiving an automatically triggered notification in the set of predetermined automatically triggered notifications, providing a second haptic output on the computing device having a second amplitude and corresponding to the automatically triggered notifications in the set of predetermined automatically triggered notifications, wherein the second amplitude is greater than the first amplitude.

56. The computing device of claim 55, wherein the first haptic output is feedback provided in direct response to and as a consequence of the user input.

57. The computing device of claim 55, wherein the set of predetermined automatically triggered notifications includes reminder notifications automatically generated by an application on the computing device, and automatically-initiated event notifications received by the application.

58. The computing device of claim 55, wherein the one or more programs further include instructions for:
   determining whether an input-based modulation condition, corresponding to the user input, exists; and
   responsive to determining that an input-based modulation condition exists, prior to providing the first haptic output, modifying the first haptic output.

59. The computing device of claim 55, wherein the one or more programs further include instructions for:
   detecting a respective alert condition;
   determining that the respective alert condition resulted from a respective user input received on the computing device;
   identifying a measure of user engagement with the computing device or an application on the computing device, wherein the measure of user engagement is associated with the detected user input; and
   modulating a first signal intensity of the first haptic output based on the measure of user engagement.

60. The computing device of claim 55, wherein the one or more programs further include instructions for:
   detecting a respective alert condition;
   determining that the respective alert condition resulted from receiving the user input on the computing device;
   identifying a location of receiving the user input on the computing device; and
   modulating a spatial haptic energy profile of the first haptic output, by providing greater than a specified proportion of haptic energy of the first haptic output within a specified radius threshold of the location of receiving the user input on the computing device.

61. The computing device of claim 55, wherein the one or more programs further include instructions for:
   detecting a respective alert condition;
   determining that the respective alert condition resulted from receiving a user input on the computing device; and
   modulating a spatial haptic energy profile of the first haptic output, by reducing an amplitude of haptic energy of the first haptic output such that it is perceptible at a location of the user input on the computing device.

62. The computing device of claim 61, wherein:
   the location of receiving the user input on the computing device, varies with time; and
   the spatial haptic energy varies with time corresponding to the time-varying location of receiving the user input.

63. The computing device of claim 55, wherein the one or more programs further include instructions for:
   detecting a respective alert condition;
   determining that the respective alert condition resulted from receiving a user input;
   identifying time-varying morphological attributes of the user input; and
   modifying, over time, morphological characteristics of the first haptic output to correspond to the time-varying morphological attributes of the user input.

64. The computing device of claim 63, wherein:
   the time-varying morphological attributes include a time-dependent contact pressure profile between the user input and a touch-sensitive surface of the computing device; and
   the modifying comprises modulating, with time, an energy profile of the first haptic output to correspond to the time-dependent contact pressure profile between the user input and the touch-sensitive surface of the computing device.

65. The computing device of claim 55, wherein the one or more programs further include instructions for:
   detecting a respective alert condition;
   determining that the respective alert condition resulted from a sustained user input;
   responsive to the determining, initiating the first haptic output at an initiation time of the sustained user input;
   detecting termination of the sustained user input; and
   terminating the first haptic output at a termination time of the sustained user input.

66. The computing device of claim 55, wherein the one or more programs further include instructions for:
   determining whether an ambient condition-based modulation condition exists; and
   responsive to determining that an ambient condition-based modulation condition exists, prior to providing the second haptic output, modifying the second haptic output.

67. The computing device of claim 55, wherein the one or more programs further include instructions for:
   detecting a respective alert condition associated with a respective application;
   determining that the respective alert condition did not result from receiving user input at an input device of the one or more input devices of the computing device; and
   responsive to determining that the respective alert condition did not result from receiving user input at an input device of the one or more input devices of the computing device:
      determining whether one or more ambient conditions exist for the computing device as potential interference to haptic output at a time of occurrence of the respective alert condition;
      in accordance with a determination that no ambient conditions exist for the computing device as potential interference to haptic output, providing the second haptic output based on a state of receptiveness of a user, and
      in accordance with a determination that one or more ambient conditions exist for the computing device as potential interference to haptic output, delaying providing the second haptic output to the user.

68. The computing device of claim 55, wherein the one or more programs further include instructions for:
   detecting a respective alert condition associated with a respective application;
   determining that the respective alert condition did not result from receiving user input at an input device of the one or more input devices of the computing device; and
   responsive to determining that the respective alert condition did not result from receiving user input at an input device of the one or more input devices of the computing device:
      determining whether one or more ambient conditions exist for the computing device as potential interference to haptic output at a time of occurrence of the respective alert condition, in accordance with a determination that no ambient conditions exist for the computing device as potential interference to haptic output, providing a first variant of the second haptic output to a user, the first variant of the second haptic output having a first set of output characteristics, and in accordance with a determination that one or more ambient conditions exist for the computing device as potential interference to haptic output, providing a second variant of the second haptic output to the user, the second variant of the second haptic output having a second set of output characteristics, the second set of output characteristics different from the first set of output characteristics, the second variant of the second haptic output having greater intensity than the first variant of the second haptic output.

69. The computing device of claim 55, wherein the one or more programs further include instructions for:

detecting a respective alert condition associated with a respective application;

determining that the respective alert condition did not result from receiving user input at an input device of the one or more input devices of the computing device; and responsive to determining that the respective alert condition did not result from receiving user input at an input device of the one or more input devices of the computing device:

providing a priming haptic output as a precursor to the second haptic output, the priming haptic output to increase an engagement level of a user operating the computing device prior to the second haptic output, wherein at least a portion of the priming haptic output is more pronounced than the second haptic output; and providing the second haptic output following and within a specified time interval of providing the priming haptic output.

70. The computing device of claim 69, wherein the priming haptic output comprises a haptic component with a time-varying waveform morphology characterized by a progressively increasing intensity of the haptic component with time.

71. The computing device of claim 69, wherein the priming haptic output comprises a haptic component with a time-varying waveform morphology characterized by an emphasized haptic feature followed by a progressively diminishing intensity of the haptic component.

72. The computing device of claim 69, wherein:

the first haptic output is provided directly, without a corresponding preceding priming haptic output, in response to a corresponding alert condition that results from a received user input.

73. The computing device of claim 69, wherein characteristics of the priming haptic output are selected based on an urgency or context associated with the respective alert condition.

74. The computing device of claim 55, wherein:

the first alert condition corresponds to a user selection of a user interface element displayed on an application user interface associated with a first application on the computing device;

the first haptic output comprises a first haptic component including a first haptic feature of a first intensity and a first duration;

the second alert condition corresponds to an alert notification received by the first application;

the second haptic output represents receipt of the alert notification, the second haptic output comprising a second haptic component including a second haptic feature of a second intensity and a second duration; and the second haptic output is different from and more pronounced than the first haptic output based on the second haptic feature being more pronounced than the first haptic feature, the second intensity being greater than the first intensity, or the second duration being longer than the first duration.

75. The computing device of claim 55, wherein:

the first haptic output represents the first alert condition; and the second haptic output represents the second alert condition, the second haptic output different from and having greater intensity than the first haptic output.

76. The computing device of claim 55, wherein:

the first haptic output has a first set of characteristics comprising one or more of: an amplitude of the first haptic output, a duration of the first haptic output, a regularity associated with the first haptic output, a repetition frequency of haptic features in the first haptic output, a selection of haptic features constituting the first haptic output; and the second haptic output has a second set of characteristics comprising one or more of: an amplitude of the second haptic output, a duration of a haptic component associated with the second haptic output, a regularity associated with the second haptic output, a repetition frequency of haptic features in the second haptic output, a selection of haptic features constituting the second haptic output.

77. The computing device of claim 55, wherein:

the first haptic output is accompanied by a first audio output;

the second haptic output is accompanied by a second audio output;

and the first audio output is different from the second audio output.

78. The computing device of claim 55, wherein:

the first haptic output is accompanied by a first audio output;

the second haptic output is accompanied by a second audio output;

the first audio output is similar to the second audio output; and the first haptic output is different from the second haptic output.

79. The computing device of claim 78, wherein the first amplitude of the first haptic output and the second amplitude of the second haptic output is further adjusted in inverse relation to a volume setting on the computing device.

80. The computing device of claim 55, wherein:

the second haptic output is accompanied by an audio output; and the first haptic output is not accompanied by an audio output.

81. The computing device of claim 55, wherein:

the one or more input devices of the computing device comprise a touch-sensitive display for receiving the user input; and the first haptic output and the second haptic output are provided via the touch-sensitive display on the computing device.

* * * * *

UNITED STATES PATENT AND TRADEMARK OFFICE
CERTIFICATE OF CORRECTION

PATENT NO. : 10,417,879 B2  
APPLICATION NO. : 14/869829  
DATED : September 17, 2019  
INVENTOR(S) : Moussette et al.

Page 1 of 1

It is certified that error appears in the above-identified patent and that said Letters Patent is hereby corrected as shown below:

In the Claims

Claim 25, Column 133, Line 31, please delete "output is further" and insert --output are further--;

Claim 28, Column 133, Line 46, please delete "code, the" and insert --code, wherein the--;

Claim 52, Column 138, Line 21, please delete "output is further" and insert --output are further--;

Claim 79, Column 142, Line 51, please delete "output is further" and insert --output are further--.

Signed and Sealed this  
Third Day of December, 2019

Andrei Iancu  
*Director of the United States Patent and Trademark Office*